(12) United States Patent
Takeshita

(10) Patent No.: US 12,263,527 B2
(45) Date of Patent: Apr. 1, 2025

(54) COMPUTATION DEVICE, DETECTION SYSTEM, MOLDING DEVICE, COMPUTATION METHOD, DETECTION METHOD, MOLDING METHOD, COMPUTATION PROGRAM, DETECTION PROGRAM, AND MOLDING PROGRAM

(71) Applicants: NIKON CORPORATION, Tokyo (JP); TECHNOLOGY RESEARCH ASSOCIATION FOR FUTURE ADDITIVE MANUFACTURING, Tokyo (JP)

(72) Inventor: Koki Takeshita, Tokyo (JP)

(73) Assignees: Nikon Corporation, Tokyo (JP); Technology Research Association For Future Additive Manufacturing, Tokyo (JP)

( * ) Notice: Subject to any disclaimer, the term of this patent is extended or adjusted under 35 U.S.C. 154(b) by 1084 days.

(21) Appl. No.: 17/251,700

(22) PCT Filed: Jun. 13, 2018

(86) PCT No.: PCT/JP2018/022622
§ 371 (c)(1),
(2) Date: Jul. 12, 2021

(87) PCT Pub. No.: WO2019/239531
PCT Pub. Date: Dec. 19, 2019

(65) Prior Publication Data
US 2021/0387261 A1 Dec. 16, 2021

(51) Int. Cl.
*B22F 10/80* (2021.01)
*B22F 12/90* (2021.01)
(Continued)

(52) U.S. Cl.
CPC .............. *B22F 10/80* (2021.01); *B22F 12/90* (2021.01); *B29C 64/386* (2017.08); *B33Y 50/00* (2014.12);
(Continued)

(58) Field of Classification Search
None
See application file for complete search history.

(56) References Cited

U.S. PATENT DOCUMENTS 5,460,758 A 10/1995 Langer et al.
2015/0061170 A1 3/2015 Engel et al.
(Continued)

FOREIGN PATENT DOCUMENTS

CN 104690269 B 8/2016
CN 106312062 A 1/2017
(Continued)

OTHER PUBLICATIONS

Machine Translation of WO-2017163432-A1 (Year: 2017).*
(Continued)

*Primary Examiner* — Anthony M Liang
(74) *Attorney, Agent, or Firm* — Finnegan, Henderson, Farabow, Garrett & Dunner, L.L.P.

(57) ABSTRACT

A calculation device used in a manufacturing apparatus for producing a 3D manufactured object from a solidified layer formed by heating a layer-shaped material layer formed of a powder material by irradiation with an energy beam includes a detection unit configured to obtain a state of the material layer based on a shape of the formed material layer, and an output unit configured to output information on the state of the material layer obtained by the detection unit to set a manufacturing condition of the manufacturing apparatus.

30 Claims, 32 Drawing Sheets

(51) Int. Cl.
  *B29C 64/386* (2017.01)
  *B33Y 50/00* (2015.01)
  *G06T 7/00* (2017.01)
  *B33Y 10/00* (2015.01)
  *B33Y 30/00* (2015.01)

(52) U.S. Cl.
  CPC .............. *G06T 7/0004* (2013.01); *B33Y 10/00* (2014.12); *B33Y 30/00* (2014.12); *G06T 2207/30144* (2013.01)

(56) References Cited

U.S. PATENT DOCUMENTS

| | | | |
|---|---|---|---|
| 2015/0174658 | A1 | 6/2015 | Ljungblad |
| 2017/0144248 | A1 | 5/2017 | Yoshimura et al. |
| 2017/0144424 | A1 | 5/2017 | Kiriyama et al. |
| 2017/0355147 | A1 | 12/2017 | Buller et al. |
| 2018/0009165 | A1 | 1/2018 | Agawa |
| 2018/0071987 | A1* | 3/2018 | Tsumuraya ........... B29C 64/153 |
| 2018/0169951 | A1* | 6/2018 | Niitani ................. B29C 64/393 |
| 2019/0039323 | A1 | 2/2019 | Nitani |
| 2019/0047229 | A1 | 2/2019 | Niitani |
| 2019/0105843 | A1* | 4/2019 | Saharan ................. B33Y 50/02 |
| 2019/0217386 | A1 | 7/2019 | Morimoto et al. |

FOREIGN PATENT DOCUMENTS

| | | |
|---|---|---|
| CN | 106735199 A | 5/2017 |
| DE | 4112695 A1 | 7/1992 |
| EP | 3 170 649 A1 | 5/2017 |
| EP | 3 243 636 A1 | 11/2017 |
| EP | 3 269 535 A1 | 1/2018 |
| EP | 3 495 077 A1 | 6/2019 |
| EP | 3 536 422 A1 | 9/2019 |
| JP | 6-503764 A | 4/1994 |
| JP | 2015-196265 A | 11/2015 |
| JP | 2017-94540 A | 6/2017 |
| JP | 2018-003147 A | 1/2018 |
| WO | WO 2016/143137 A1 | 9/2016 |
| WO | 2017/015241 A1 | 1/2017 |
| WO | WO-2017163432 A1 * | 9/2017 .............. B22F 10/00 |
| WO | WO 2018/043349 A1 | 3/2018 |
| WO | 2018/082097 A1 | 5/2018 |
| WO | WO 2018/217896 A1 | 11/2018 |

OTHER PUBLICATIONS

Written Opinion of the International Searching Authority for International Application No. PCT/JP2018/022622, mailed Jul. 24, 2018.
Office Action issued by the Japanese Patent Office and mailed on Jun. 20, 2023 in counterpart Japanese Patent Application No. 2022-143105, and computer-generated English Translation thereof.
Office Action issued by the Chinese Patent Office and mailed on May 23, 2023 in counterpart Chinese Patent Application No. 201880096653.0, and English Translation thereof.
International Search Report dated Jul. 24, 2018, in the corresponding PCT International Application.
Communication from the Examining Division issued by the European Patent Office in corresponding with a European Patent Application No. 18922749.9 mailed on Oct. 30, 2023. (5 pages).
Partial Supplementary European search report issued in EP 18922749.9, dated Dec. 1, 2021.
The First Office Action from the State Intellectual Property Office of People's Republic of China, issued in the counterpart Chinese Patent Application No. 201880096653.0 issued Jul. 1, 2022.
Supplementary European search report issued in EP 18922749.9, dated Apr. 11, 2022.
Notice of Reasons for Rejection from the Japanese Patent Office, issued in the counterpart Japanese Patent Application No. 2020-525017 issued Mar. 15, 2022.
Office Action issued by the Japanese Office on Jan. 7, 2025 in counterpart Japanese Patent Application No. 2024-008902, and computer-generated English translation thereof.

* cited by examiner

| MANUFACTURING CONDITION | | POWER DENSITY PD | ENERGY DENSITY ED | TEMPERATURE DISTRIBUTION T(r) | RELATED PARAMETERS | REMARKS: |
|---|---|---|---|---|---|---|
| IRRADIATOR | LASER OUTPUT | O | O | O | $P_L$ | REAL TIME CHANGE, CHANGE FOR FORMING NEXT LAYER, CHANGE FOR PRODUCING NEXT MANUFACTURED OBJECT |
| | WAVELENGTH | O | O | | $\eta$ | CHANGE FOR PRODUCING NEXT MANUFACTURED OBJECT |
| | INTENSITY DISTRIBUTION | O | O | O | d | REAL TIME CHANGE, CHANGE FOR FORMING NEXT LAYER, CHANGE FOR PRODUCING NEXT MANUFACTURED OBJECT |
| | SPOT SIZE | O | O | O | d | REAL TIME CHANGE, CHANGE FOR FORMING NEXT LAYER, CHANGE FOR PRODUCING NEXT MANUFACTURED OBJECT |
| SCANNING UNIT | SCANNING SPEED | O | O | O | v | REAL TIME CHANGE, CHANGE FOR FORMING NEXT LAYER, CHANGE FOR PRODUCING NEXT MANUFACTURED OBJECT |
| | SCANNING PITCH | O | O | O | $\eta$, $\Delta y$ | REAL TIME CHANGE, CHANGE FOR FORMING NEXT LAYER, CHANGE FOR PRODUCING NEXT MANUFACTURED OBJECT |
| | SCANNING PASS | O | O | O | $P_0$ | REAL TIME CHANGE, CHANGE FOR FORMING NEXT LAYER, CHANGE FOR PRODUCING NEXT MANUFACTURED OBJECT |
| ATMOSPHERE INSIDE HOUSING | INERT GAS FLOW VOLUME | O | O | O | $P_0$, $\eta$ | REAL TIME CHANGE, CHANGE FOR FORMING NEXT LAYER, CHANGE FOR PRODUCING NEXT MANUFACTURED OBJECT |
| | INERT GAS FLOWRATE | O | O | O | $P_0$, $\eta$ | REAL TIME CHANGE, CHANGE FOR FORMING NEXT LAYER, CHANGE FOR PRODUCING NEXT MANUFACTURED OBJECT |
| | TEMPERATURE INSIDE HOUSING | O | O | O | $P_0$ | CHANGE FOR FORMING NEXT LAYER, CHANGE FOR PRODUCING NEXT MANUFACTURED OBJECT |

FIG. 8

| | MANUFACTURING CONDITION | POWER DENSITY PD | ENERGY DENSITY ED | TEMPERATURE DISTRIBUTION T(t) | RELATED PARAMETERS | REMARKS: |
|---|---|---|---|---|---|---|
| BLADE | MOVING SPEED | | O | O | $\Delta z, \rho, k, \alpha$ | CHANGE FOR FORMING NEXT LAYER, CHANGE FOR PRODUCING NEXT MANUFACTURED OBJECT |
| | PRESSURE APPLIED TO POWDER MATERIAL | | O | O | $\Delta z, \rho, k, \alpha$ | CHANGE FOR FORMING NEXT LAYER, CHANGE FOR PRODUCING NEXT MANUFACTURED OBJECT |
| | STANDBY TIME | O | | O | $P_0$ | CHANGE FOR FORMING NEXT LAYER, CHANGE FOR PRODUCING NEXT MANUFACTURED OBJECT |
| | BLADE SHAPE | | O | O | $\Delta z, \rho, k, \alpha$ | CHANGE FOR PRODUCING NEXT MANUFACTURED OBJECT |
| | BLADE MATERIAL | | O | O | $\Delta z, \rho, k, \alpha$ | CHANGE FOR PRODUCING NEXT MANUFACTURED OBJECT |
| | LAYER THICKNESS | | O | | $\Delta z$ | CHANGE FOR FORMING NEXT LAYER, CHANGE FOR PRODUCING NEXT MANUFACTURED OBJECT |
| BASE PLATE | BASE PLATE TEMPERATURE | O | | O | $P_0$ | CHANGE FOR PRODUCING NEXT MANUFACTURED OBJECT |
| DESIGN DATA | SLICE MODEL DATA | O | | O | $\Delta z$ | CHANGE FOR PRODUCING NEXT MANUFACTURED OBJECT |
| | SHAPE DATA OF SUPPORT PORTION | | O | O | $P_0$ | CHANGE FOR PRODUCING NEXT MANUFACTURED OBJECT |
| POWDER MATERIAL | PARTICLE DIAMETER/ PARTICLE SIZE DISTRIBUTION | | O | O | $\Delta z, \rho, k, \alpha$ | CHANGE FOR PRODUCING NEXT MANUFACTURED OBJECT |
| | HYGROSCOPICITY | O | | O | $\Delta z, \rho, k, \alpha$ | CHANGE FOR FORMING NEXT LAYER, CHANGE FOR PRODUCING NEXT MANUFACTURED OBJECT |
| | TYPE | | O | O | $\Delta z, \rho, k, \alpha$ | CHANGE FOR PRODUCING NEXT MANUFACTURED OBJECT |

FIG. 9

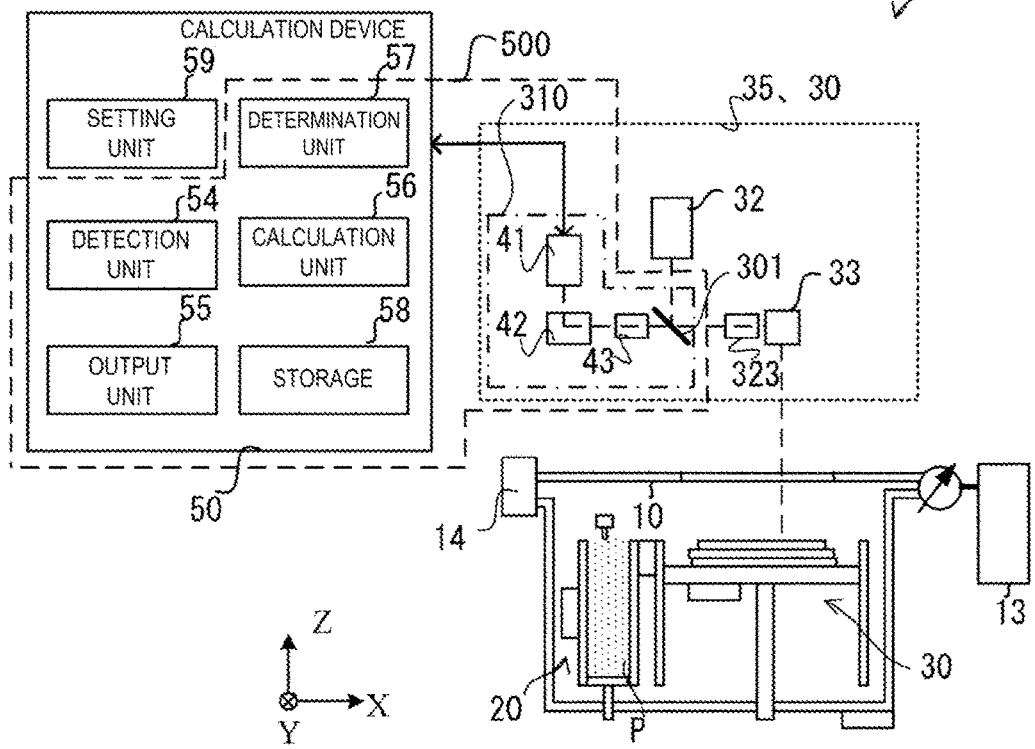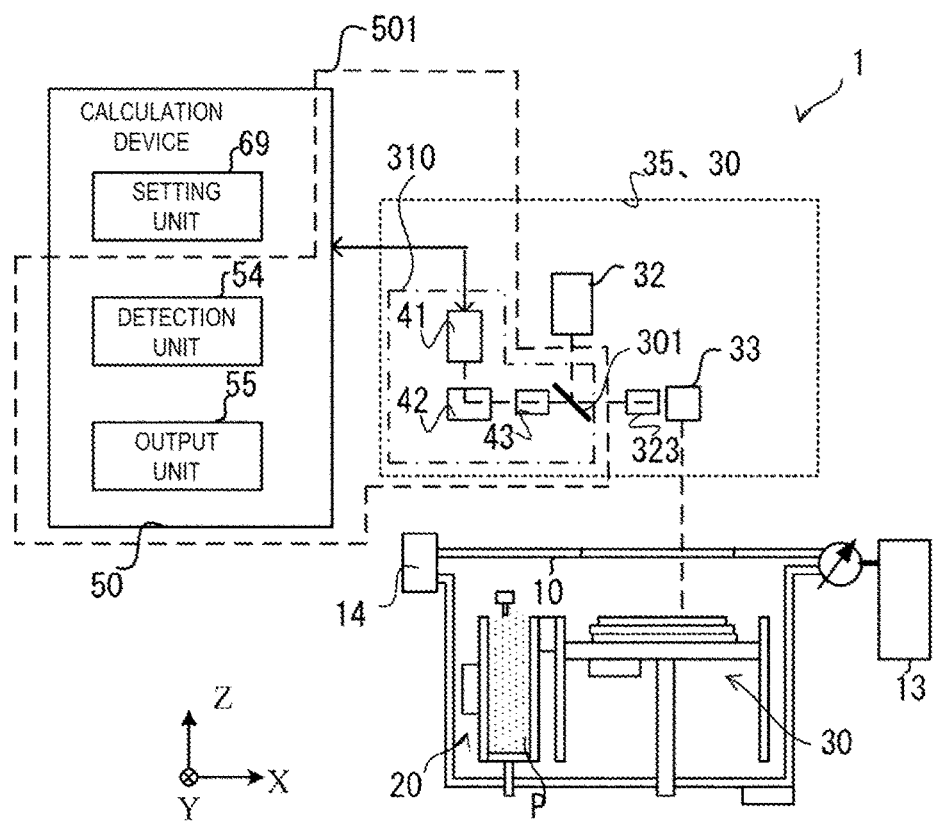
FIG. 18

(a)
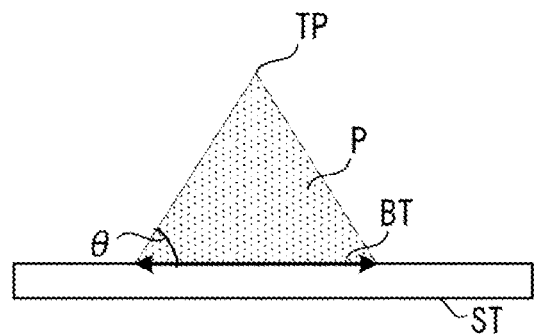
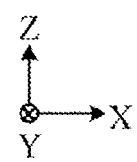
(b)
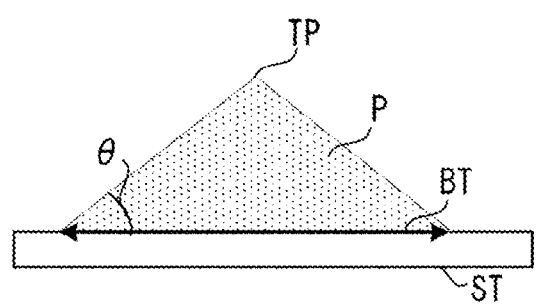
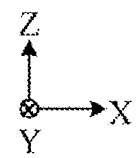
(c)
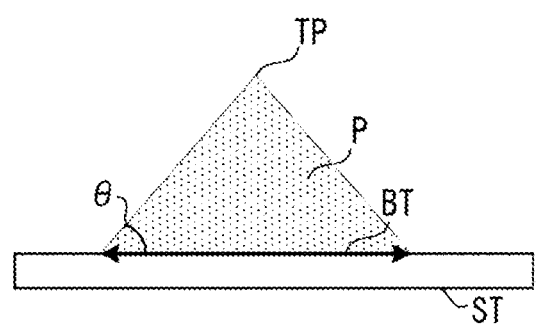
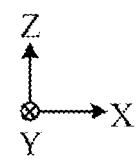
FIG. 24

(a)
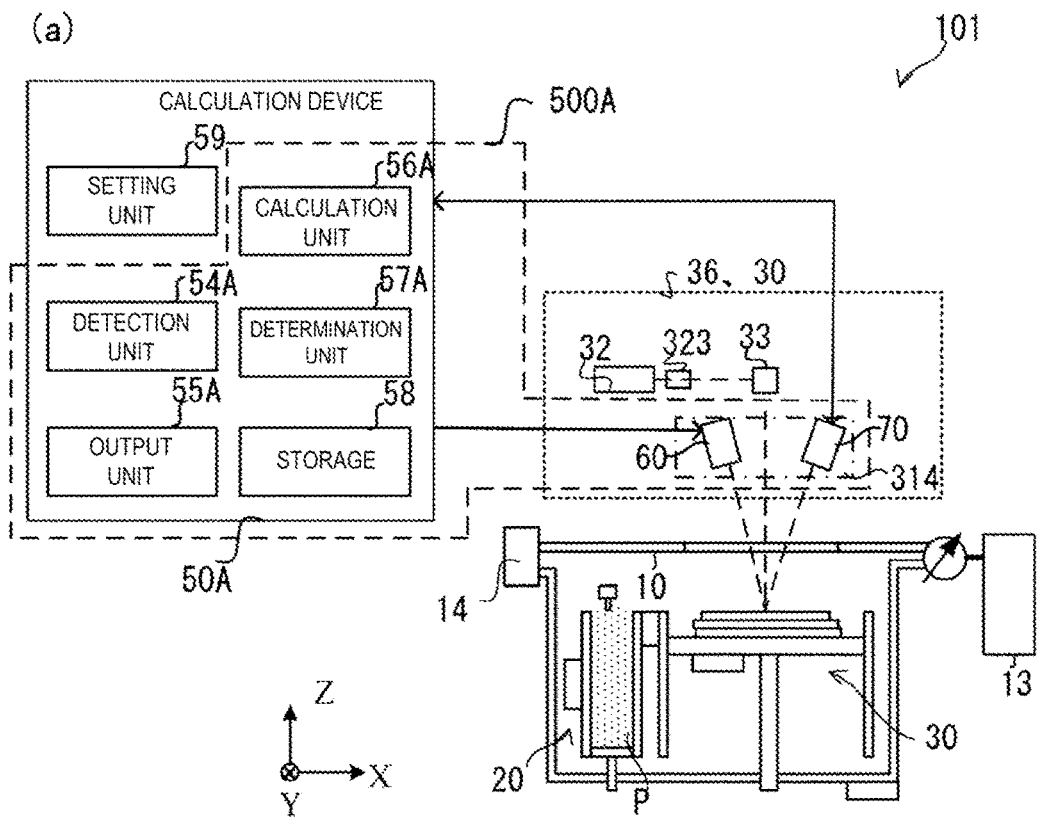
(b)
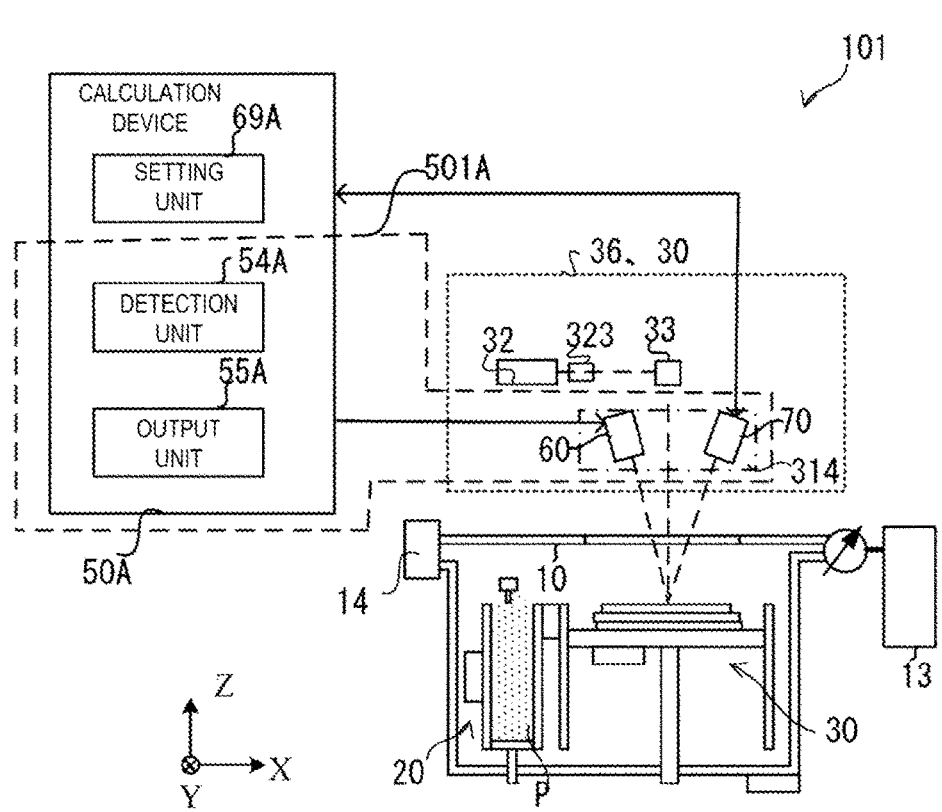
FIG. 27

(a)
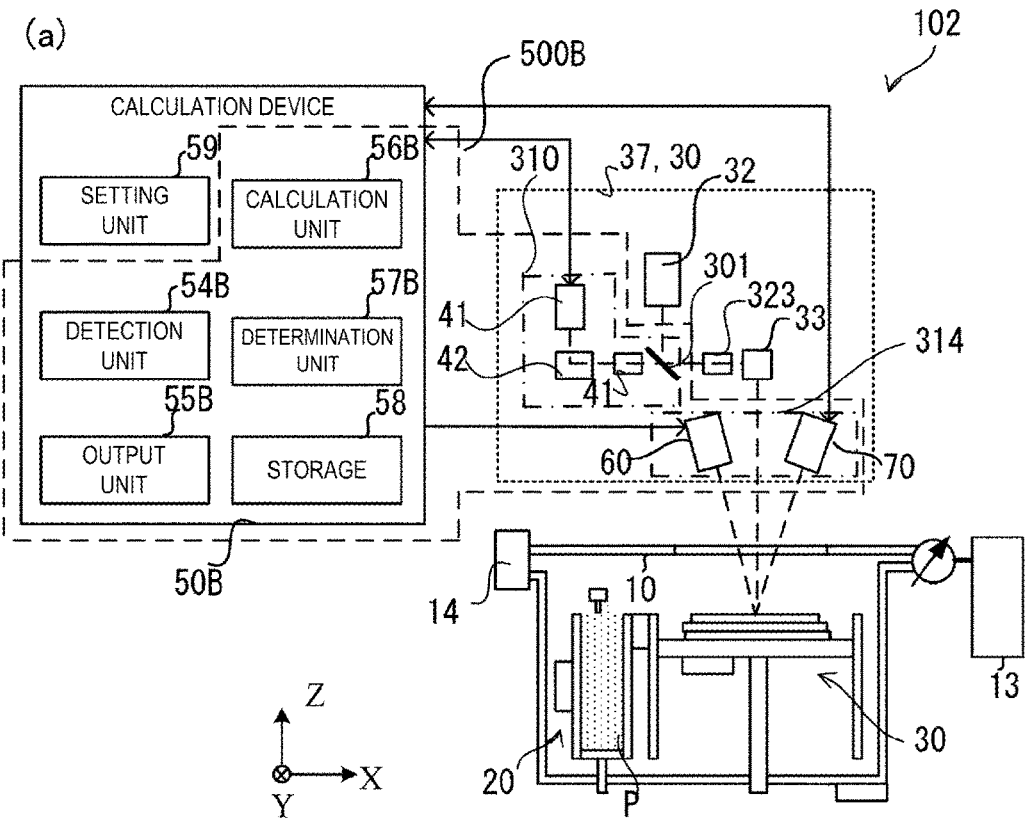
(b)
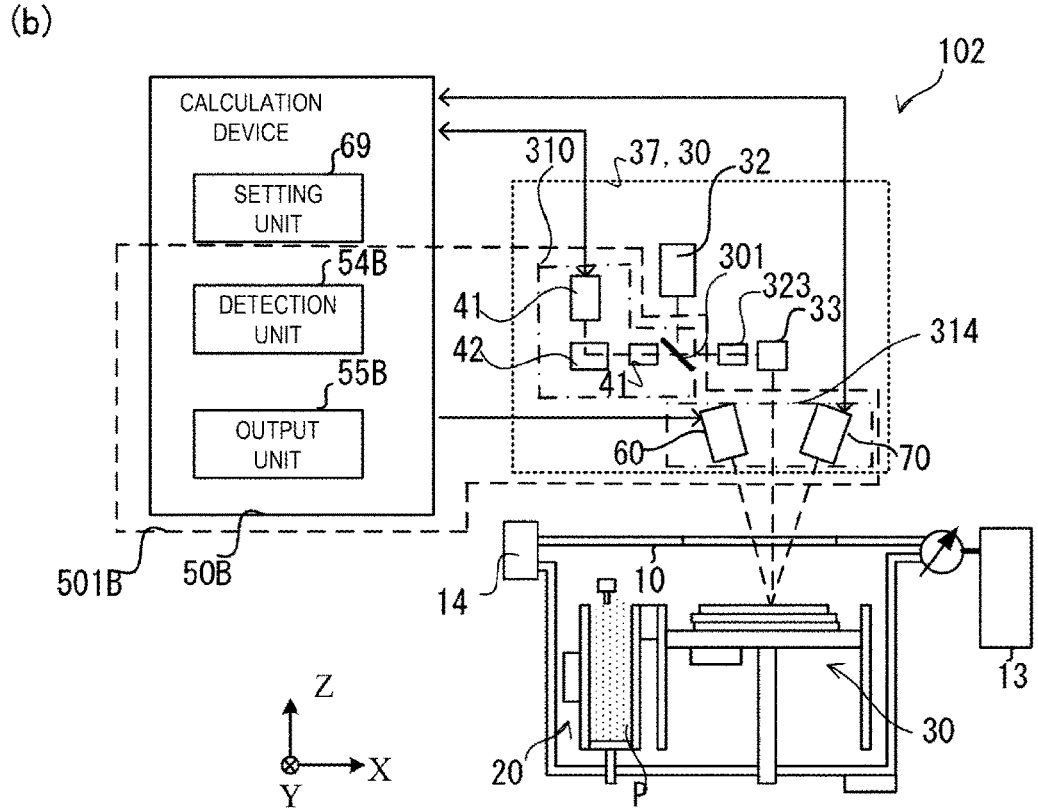
FIG. 32

COMPUTATION DEVICE, DETECTION SYSTEM, MOLDING DEVICE, COMPUTATION METHOD, DETECTION METHOD, MOLDING METHOD, COMPUTATION PROGRAM, DETECTION PROGRAM, AND MOLDING PROGRAM

CROSS-REFERENCE

This application is a U.S. national phase entry of International Application No. PCT/JP2018/022622 which was filed on Jun. 13, 2018, and the disclosure of international application no. PCT/JP2018/022622 is incorporated herein by reference in their entirety.

TECHNICAL FIELD

The present disclosure relates to a calculation device, a detection system, a manufacturing apparatus, a calculation method, a detection method, a manufacturing method, a calculation program, a detection program, and a manufacturing program stored in a non-transitory computer readable medium.

BACKGROUND ART

A known 3D manufactured object production device produces a 3D manufactured object by building layers as a result of solidifying powdery materials by using a light or the like (for example, see U.S. Pat. No. 5,460,758). Unfortunately, the object produced might have a failure.

SUMMARY

According to a first aspect, a calculation device used in a manufacturing apparatus for producing a 3D manufactured object from a solidified layer formed by heating a layer-shaped material layer formed of a powder material by irradiation with an energy beam includes a detection unit configured to obtain a state of the material layer based on a shape of the formed material layer, and an output unit configured to output information on the state of the material layer obtained by the detection unit to set a manufacturing condition of the manufacturing apparatus.

According to a second aspect, a calculation method used in a manufacturing apparatus for producing a 3D manufactured object from a solidified layer formed by heating a layer-shaped material layer formed of a powder material by irradiation with an energy beam includes obtaining a state of the material layer based on a shape of the formed material layer, and outputting information on the obtained state of the material layer to set a manufacturing condition of the manufacturing apparatus.

BRIEF DESCRIPTION OF DRAWINGS

FIG. 8 is a diagram illustrating a relationship between a manufacturing condition, basic conditions (power density, energy density, and temperature distribution), and parameters related to the basic conditions.

FIG. 9 is a diagram illustrating a relationship between a manufacturing condition, basic conditions (power density, energy density, and temperature distribution), and parameters related to the basic conditions.

FIG. 18 is a block diagram schematically illustrating a configuration of a main part of a manufacturing apparatus and a detection system according to a modification (3) of the first embodiment.

FIG. 24 is a diagram schematically illustrating a cross-sectional shape on a ZX plane of a shape formed of a predetermined amount of a powder material as a target of pre-detection.

FIG. 27 is a block diagram schematically illustrating a configuration of a main part of a manufacturing apparatus and a detection system according to a modification of the second embodiment.

FIG. 32 is a block diagram schematically illustrating a configuration of a main part of a manufacturing apparatus and a detection system according to a modification of the third embodiment.

DESCRIPTION OF EMBODIMENTS

First Embodiment

A manufacturing apparatus according to a first embodiment will be described with reference to the drawings. The following description is given using, as an example, a manufacturing apparatus that produces a manufactured object (3D manufactured object) of a three-dimensional shape using Powder Bed Fusion (PBF) which is a known technique. Note that PBF is also known as Selective Laser Sintering (SLS). The manufacturing apparatus is not limited to PBF, and may be a device that produces a 3D manufactured object using other methods such as Direct Energy Deposition (DED), Electron Beam Melting (EBM), and Fused Deposition Manufacturing (FDM).

Figure 1:
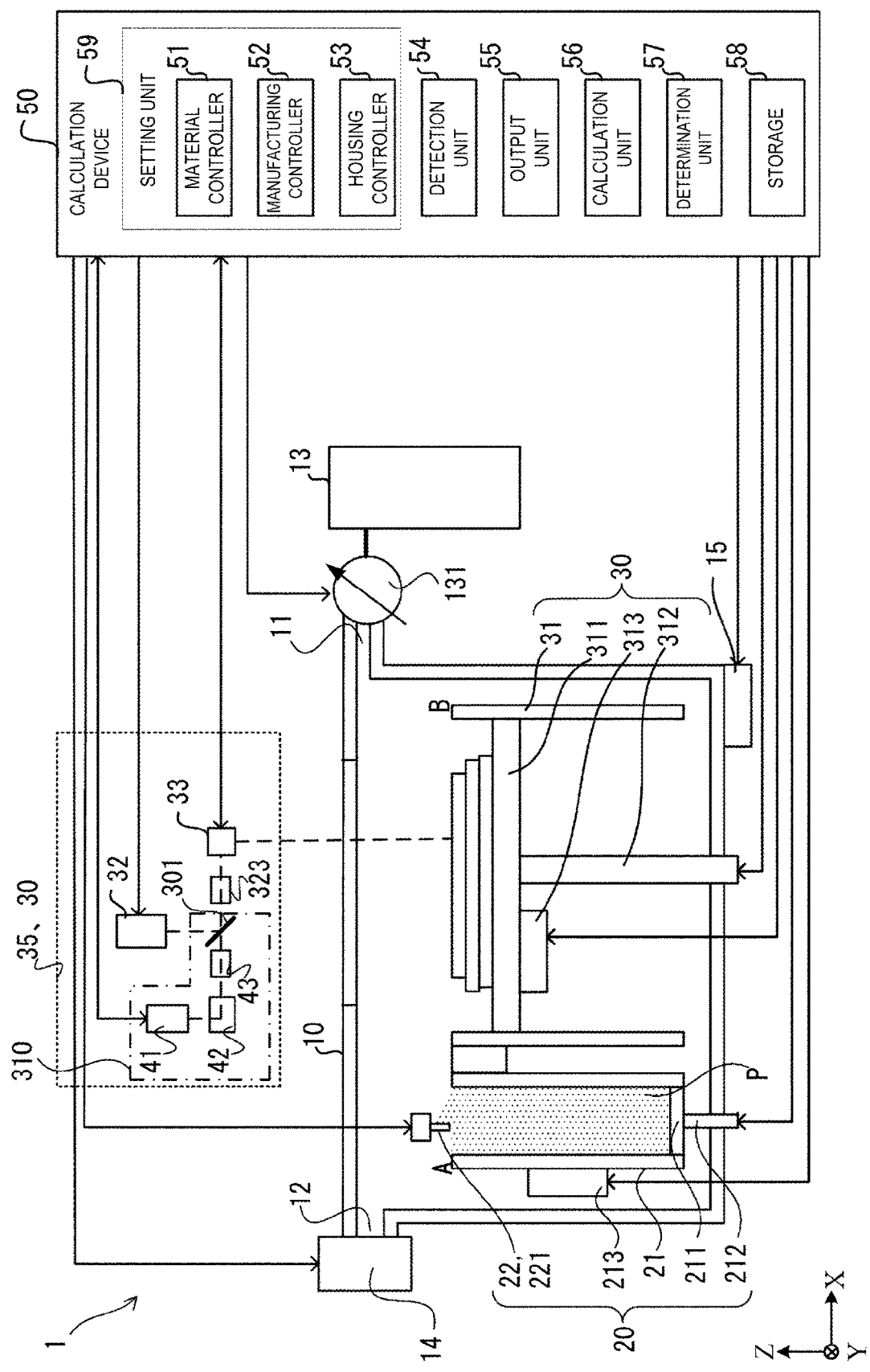
FIG. 1 is a block diagram schematically illustrating a configuration of a manufacturing apparatus according to a first embodiment.
Figure 2:
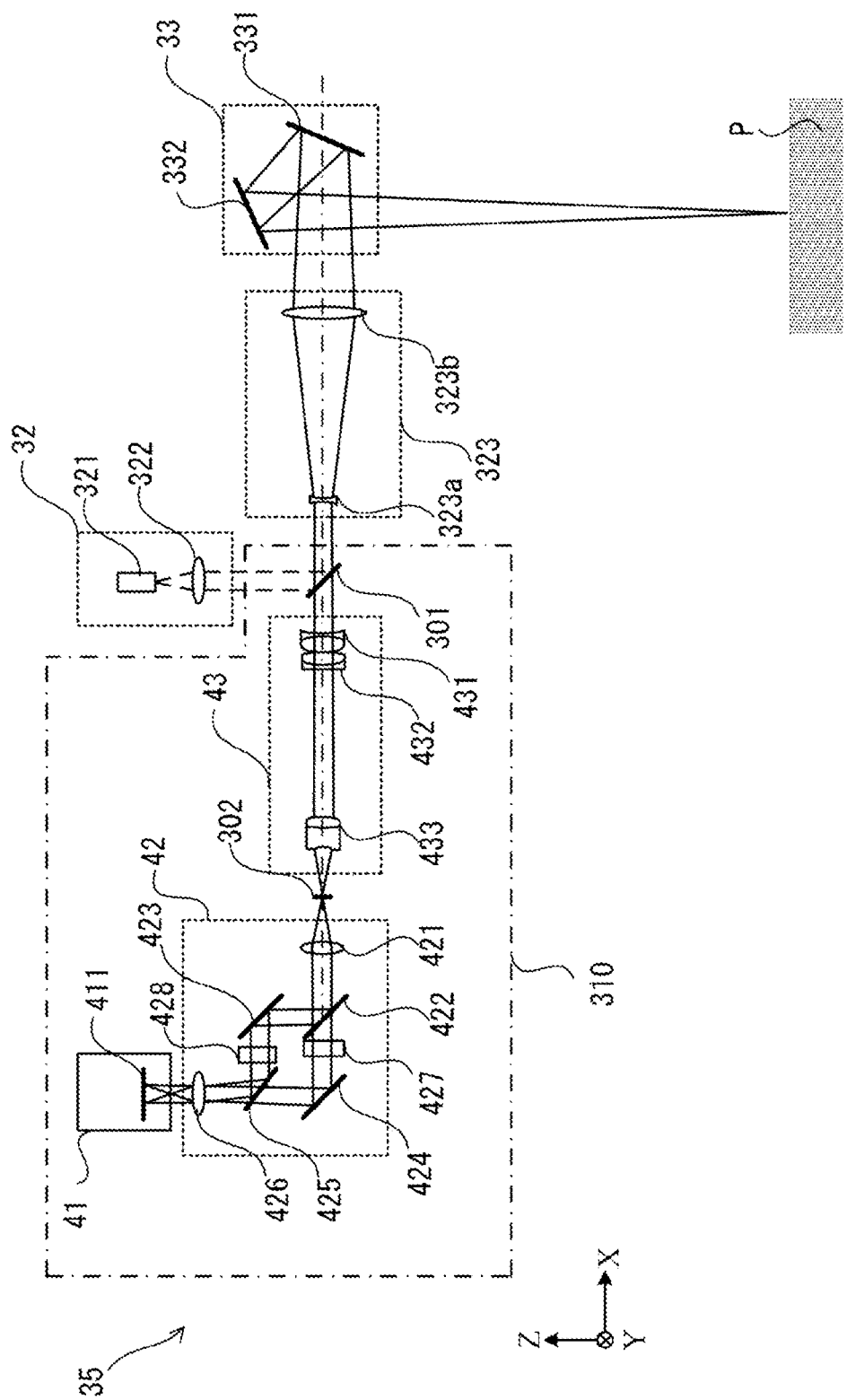
FIG. 2 is a diagram schematically illustrating an example of a specific configuration and arrangement of a manufacturing optical unit included in the manufacturing apparatus.

First of all, a configuration of the manufacturing apparatus 1 will be described with reference to FIGS. 1 and 2. FIG. 1 is a block diagram schematically illustrating a structure of the manufacturing apparatus 1, and FIG. 2 is a diagram schematically illustrating an example of a specific configuration and arrangement of a manufacturing optical unit 35 of the manufacturing apparatus 1. Note that, for the purpose of facilitating the understanding, as illustrated in FIGS. 1 and 2, the following description is performed using an orthogonal coordinate system including an X axis, a Y axis, and a Z axis.

The manufacturing apparatus 1 includes a housing 10, a material layer forming unit 20, a manufacturing unit 30, and a calculation device 50. The material layer forming unit 20 includes a material supply tank 21 and a recoater 22. The manufacturing unit 30 includes a manufacturing tank 31 and the manufacturing optical unit 35. For convenience of explanation, the material layer forming unit 20 and the manufacturing unit 30 are separately described and illustrated as separate configurations, but the material layer forming unit 20 and the manufacturing unit 30 may be collectively referred to as a manufacturing unit.

The material supply tank 21 is a container that contains a powder material P that is a material for manufacturing a 3D manufactured object. The material supply tank 21 has a bottom surface 211 moved in an up-down direction (Z direction) by a driving mechanism 212 including a piston and the like for example. When the bottom surface 211 of the material supply tank 21 moves toward the positive side in the Z direction (upward), the powder material P in the material supply tank 21 is pushed out in an amount corresponding to the raised amount of the bottom surface 211. The powder material P thus pushed out is conveyed to the manufacturing tank 31 described below by the recoater 22 described below.

The material supply tank 21 is provided with a heater 213 for heating the powder material P contained therein. The heater 213 heats the powder material P to a desired temperature, under the control by the calculation device 50 described below. A heater employing a known heating scheme is used as the heater 213. Note that a temperature control element such as a Peltier element may be used as the heater 213. The heater 213 heats the powder material P in the material supply tank 21, so that the temperature of the powder material P is raised in advance before the powder material P is conveyed to the manufacturing tank 31 and then is heated by being irradiated with a laser beam described below. This configuration can reduce the amount of heat required to raise the temperature of the powder material P to a desired temperature (a melting point for example) by heating through the laser beam irradiation. Furthermore, the heater 213 heats the powder material P having high hygroscopicity and low fluidity, thereby lowering the hygroscopicity and increasing the fluidity of the powder material P. With this configuration, the conveyance of the powder material P to the manufacturing tank 31 is facilitated, and uniform flatness, layer thickness, and density of a material layer formed as described in detail below can be achieved. As a result, as described in detail below, when the material layer is irradiated with a laser beam as described in detail below, the temperature inside the material layer increases, due to the laser beam irradiation, uniformly.

Note that the material supply tank 21 is not limited to the configuration in which the powder material P is pushed out from a lower side in the Z direction using the driving mechanism 212. The powder material P contained in the material supply tank 21 may supplied to a dispenser provided on the lower side (negative side in the Z direction) of the material supply tank 21. The powder material P supplied to the dispenser may fall from a discharge portion provided at the lower part (negative side in the Z direction) of the dispenser onto a base plate 311 of the manufacturing tank 31. Then, the dropped powder material P may form into a layer of a uniform thickness through movement of a blade 221 of the recoater 22 described below.

For example, metal powder, resin powder, powder coated with a resin binder, or the like is used as the powder material P. The metal powder may be powder mainly composed of iron based powder. The metal powder mainly composed of the iron based powder may further include one or more of nickel powder, nickel-based composite powder, copper powder, copper based alloy powder, graphitic powder, and the like. Examples of such powder include powder with a compounded amount of iron based powder with an average particle diameter of about 20 μm being 60 to 90% by weight, powder with a compounded amount of one of nickel powder and nickel-based composite powder or both being 5 to 35% by weight, powder with a compounded amount of one of copper powder or copper based alloy powder or both being 5 to 15% by weight, and powder with compounded amount of graphitic powder being 0.2 to 0.8% by weight. For example, powder of polyamide, polypropylene, ABS, and the like with an average particle diameter of about 30 μm to 100 μm may be used as the resin powder. For example, metal particles with surfaces coated by an additive such as phenolic resin or nylon may be used as powder with metal particles coated with resin binder. Ceramic powder may also be used as the powder material P. The ceramic powder may be powder of an oxide such as alumina or zirconia or a nitride such as silicon nitride. Note that the powder material P may be a material other than those described above. The powder material P may be, for example, known metal powder, known resin powder, or known ceramic powder, or may be a powder that is a combination of at least two of the materials that are known metal, known resin, and known ceramic.

In the case described below as an example, metal powder is used as the powder material P.

The recoater 22 includes the blade 221 serving as a material layer forming member, a driving mechanism (not illustrated), and a blade attachment portion (not illustrated). The blade 221 is, for example, a plate-shaped member extending along the Y direction. The blade 221 is attached to the blade attachment portion to be exchangeable among a plurality of types of blades of different materials or shapes. The driving mechanism includes a driving mechanism such as a motor and a guide rail that extends along the X direction, for example, and moves the blade attachment portion along the X direction to move the blade 221 between a position A (a negative side end portion of the material supply tank 21 in the X direction) and a position B (a positive side end portion of the manufacturing tank 31 in the X direction) along the X direction in FIG. 1. With the blade 221 thus moved, the powder material P contained in the material supply tank 21 (more specifically, the powder material P pushed out from the material supply tank 21 in an amount corresponding to the raised amount of the bottom surface 211 of the material supply tank 21 toward the positive side in the Z direction (upward)) is conveyed to the manufacturing tank 31 of the manufacturing unit 30 described below. In this process, the blade 221 moves while applying pressure to press the powder material P downward (negative side in the Z direction). This movement of the blade 221 causes the powder material P to be formed into a layer of a uniform thickness $\Delta d$ in the manufacturing tank 31, whereby a layer of the powder material (hereinafter, referred to as a material layer) known as a powder bed having a flattened surface (surface on the positive side in the Z direction) is formed. In this manner, the blade 221 functions as the material layer forming member. Note that a pressing mechanism (not illustrated) including a cylinder and the like may make the blade 221 apply pressure to the powder material P.

When the blade 221 conveys the powder material P onto an upper part of a solidified layer formed as described below, the solidified layer is formed by irradiating the previously formed material layer with the laser beam, and after a predetermined period of time, the blade 221 again moves from the position A along the X direction to convey the powder material P onto the solidified layer. This predetermined period of time is referred to herein as a standby time of the blade 221. Note that when the powder material P is conveyed onto the base plate 311 described below, the constant thickness $\Delta d$ described above is a thickness from a surface of the base plate 311 to a surface (surface on the positive side in the Z direction) of the material layer. When the powder material P is conveyed onto the upper part (the positive side in the Z direction) of the solidified layer that has been formed as described below, the constant thickness $\Delta d$ described above is a thickness from a surface (surface on the positive side in the Z direction) of the solidified layer upper part to a surface (surface on the positive side in the Z direction) of the material layer formed on the upper part of the solidified layer.

The moving speed of the blade 221 described above, the pressure applied to the powder material by the blade 221, and the standby time of the blade 221 are variably controlled by the calculation device 50. Note that how the material layer is formed is described in detail below.

Note that in the present embodiment, a description is given with the plate-shaped blade 221 being an example of the material layer forming member, but the material layer forming member may be other members, such as a roller, usable for forming the material layer. For example, when the roller is used as the material layer forming member, the roller is attached to have a rotation axis extending along the Y direction, and is moved by the driving mechanism along the X direction while rotating. With this configuration, the roller forms the powder material P into a layer of a constant thickness $\Delta d$ in the manufacturing tank 31, by applying pressure to the powder material P.

The manufacturing tank 31 of the manufacturing unit 30 is a container for manufacturing work in which a 3D manufactured object is formed by building a plurality of solidified layers along the Z direction, through repetition of procedures including forming the material layer and forming the solidified layer by solidifying the formed material layer. The solidified layer according to the present embodiment is a layer formed by irradiating the material layer with a laser beam to heat the powder material P forming the material layer, so that the powder material P melts due to the heating and is then solidified. This will be described below. The base plate 311, which is the bottom surface of the manufacturing tank 31, is a support member that supports the material layer and the solidified layer formed, from the negative side in the Z direction. The base plate 311 is moved in the up-down direction (Z direction) by the driving mechanism 312 such as a motor, for example, included in the manufacturing tank 31. As described in detail below, when the material layer formed by the powder material P supplied on the base plate 311 is irradiated with a laser beam to be heated so that the solidified layer is formed, the base plate 311 moves downward (negative side in the Z direction), and then a new material layer is formed on the upper part surface (positive side in the Z direction) of the solidified layer. This new material layer is solidified, whereby a new solidified layer is formed. The base plate 311 is attached the manufacturing tank 31 so as to be exchangeable among a plurality of types of plates of different materials and thicknesses in the Z direction. In other words, the base plate 311 is attached the manufacturing tank 31 so as to be exchangeable among a plurality of types of plates of different rigidity.

The base plate 311 is provided with a heater 313 for heating the base plate 311. The heater 313 heats (pre-heating) so the material layer and the solidified layer supported by the base plate 311 reach a desired temperature under the control by the calculation device 50 described below. A heater employing a known heating scheme is used as the heater 313. Note that a temperature control element such as a Peltier element may be used as the heater 313. The heater 313 heats (pre-heats) the material layer and the solidified layer inside the manufacturing tank 31. The heater 313 preheats the powder material P forming the material layer to raise its temperature in advance, before the powder material P is irradiated with a laser beam to be heated. This configuration can reduce the amount of heat required to raise the temperature of the powder material P to a desired temperature (a melting point for example) by heating through the laser beam irradiation. Furthermore, the heater 313 heats the solidified layer formed. This configuration suppresses residual stress produced in the solidified layer at the time of cooling, or relaxes the residual stress produced in the solidified layer.

The manufacturing optical unit 35 of the manufacturing unit 30 includes an acquisition unit 310, an irradiator 32, a scanning unit 33, and a focus lens 323. The acquisition unit 310 includes an imager 41, a bifurcated optical system 42, a chromatic aberration correction optical system 43, a half mirror 301, and a field stop 302 described in detail below. The acquisition unit 310 acquires information on at least a part of a predetermined region (including a melted portion in which the powder material P has melted, an unmelted powder material P (material layer) where the powder material P has not melted yet, a region where the powder material has solidified after melting, and the like) including a melted portion in which the powder material P has melted (described in detail below). Note that the half mirror 301 need not be included in the acquisition unit 310, depending on the arrangement of the components of the manufacturing optical unit 35 described in detail below.

Here, the acquisition unit 310 is integrally formed with the irradiator 32 and the scanning unit 33, and thus will be described as a part of the manufacturing optical unit 35 (and thus as a part of the manufacturing unit 30) for convenience of explanation. Still, the acquisition unit 310 is a component having a function (a later described function of acquiring information on at least a part of the predetermined region including the melted portion where the powder material P has melted) different from those of the components (that is, the manufacturing tank 31, the irradiator 32, the focus lens 323, and the scanning unit 33) of the manufacturing unit 30 other than the acquisition unit 310, and thus can be described as a component independent from the manufacturing unit 30. In this case, the manufacturing unit 30 is configured to include the manufacturing optical unit 35 with the irradiator 32, the scanning unit 33, and the focus lens 323, and the manufacturing tank 31. Furthermore, in this case, the half mirror 301 is also part of the manufacturing optical unit 35, and thus can be described as a component of the manufacturing optical unit 35 instead of the acquisition unit 310.

The irradiator 32 includes, for example, a laser oscillator 321 that emits a laser beam as irradiation light with which the material layer is irradiated and heated, and a collimator lens 322 that collimates the laser beam emitted from the laser oscillator 321 into parallel light (see FIG. 2). For example, a carbon dioxide gas laser, a Nd:YAG laser, a fiber laser, or the like can be used as the laser oscillator 321.

The laser oscillator 321 includes, for example, a resonator mirror or the like, and has an amplifier filled with a laser medium and an excitation light source. The light emitted from the laser medium excited by the light from the excitation light source is oscillated through repeated reflections in the amplifier, to be emitted from the laser oscillator as the laser beam. A laser beam oscillation mode (oscillation type) of the laser oscillator 321 includes: continuous wave (CW) oscillation in which the excitation light source is continuously lit; normal pulse oscillation in which the oscillation light source is lit in a pulsating manner and the output waveform of the laser beam by electrically controlling the lighting time length and a current value of the excitation light source; Q-switch pulse oscillation in which a laser beam with a large peak output with a narrow pulse width is emitted within a short period of time; and the like. The laser oscillator 321 emits a laser beam having a wavelength of 1070 nm, for example. Note that the laser oscillator 321 may emit light with other wavelengths, examples of which including: infrared light with a wavelength longer than 800 nm, visible light within a range from 400 nm to 800 nm, and ultraviolet light with a wavelength shorter than 400 nm. Note that a specific configuration of the irradiator 32 will be described below. The irradiator 32 emits the light beam, from the laser oscillator 321, while switching a laser beam intensity distribution among the Gaussian distribution, the top hat distribution, and the like by means of a known shape varying mirror or the like, under the control performed by the calculation device 50.

The irradiator 32 may heat the powder material P by irradiating the material layer with light from a known light emitting diode (LED), or a known particle beam such as an electron beam, photon beam, and neutron beam, instead of using the laser beam. In the present embodiment, an irradiator capable of emitting an energy beam including a known laser beam, light from known LEDs, a known particle beam, and the like is applied as the irradiator 32.

The scanning unit 33 includes a galvano mirror, and scans the material layer with the laser beam emitted from the irradiator 32 in at least one of the X direction and the Y direction. Note that a specific configuration of the scanning unit 33 will be described below.

The imager 41 captures an image of a predetermined region including the melted portion of the material layer irradiated with the laser beam from the irradiator 32 to be melted and a portion therearound, and generates image data on an image of the predetermined region and a portion therearound. The image data thus generated is signal intensities at pixels photoelectrically converted by an image sensor 411 described below from light from the predetermined region including the melted portion of the material layer and a portion therearound. The image data generated is output to the calculation device 50, which will be described below. Note that a specific configuration of the imager 41 will be described below.

Note that, as described above, the manufacturing optical unit 35 has the component irradiating the material layer with the laser beam and the component capturing the image of the material layer partially shared, and thus can also be referred to as an imaging optical system.

The housing 10 incorporates the material supply tank 21, the recoater 22, and the manufacturing tank 31 containing the solidified layer. Note that the housing 10 may not incorporate a part of the driving mechanism 212 that moves the bottom surface 211 of the material supply tank 21, and a part of the driving mechanism 312 that moves the base plate 311 of the manufacturing tank 31. An intake port 11 and a discharge port 12 are formed in the housing 10. A tank 13 filled with inert gas such as argon or nitrogen, for example, is connected to the intake port 11 via an intake device 131 such as a valve. A discharge device 14 including, for example, a vacuum pump or the like is connected to the discharge port 12. With the discharge device 14 and the intake device 131 that are controlled by the calculation device 50, air in the housing 10 to achieve a set pressure in the housing 10. The intake device 131 introduces the inert gas filled in the tank 13 into the housing 10, thereby reducing the oxygen concentration in the housing 10. With the oxygen concentration in the housing 10 thus reduced, oxidation of the powder material P is prevented. The flow volume and flowrate of the inert gas introduced into the housing 10 are controlled by the opening degree of the valve of the intake device 131 and the discharge amount of the discharge device 14. The housing 10 is provided with a heater 15 that performs heating in the housing 10, which is controlled by the calculation device 50 described below heated so that a desired temperature is achieved in the housing 10. A heater employing a known heating scheme is used as the heater 15. Note that a temperature control element such as a Peltier element may be used as the heater 15. The heater 15 heats the material layer and the solidified layer in the manufacturing tank 31 by heating the inside of the housing 10. The heater 15 preheats the powder material P forming the material layer to raise its temperature in advance, before the powder material P is irradiated with a laser beam to be heated. This configuration can reduce the amount of heat required to raise the temperature of the powder material P irradiated by the laser beam to a desired temperature (a melting point for example).

The atmosphere inside the housing 10 including the oxygen concentration in the housing 10, the flow volume and flowrate of the inert gas, the type of inert gas, the pressure inside the housing 10, and the temperature inside the housing 10 are controlled in a manner described above. At least a partial region of the upper surface of the housing 10 (on the positive side in the Z direction) is formed of a translucent material such as glass so that the laser beam from the irradiator 32 can pass therethrough. This partial region is, for example, a region that intersects with the optical path of the laser beam emitted from the scanning unit 33 toward the material layer.

Now, an example of a specific configuration and arrangement of the manufacturing optical unit 35 will be described with reference to FIG. 2.

As illustrated in FIG. 2, the laser beam emitted from the laser oscillator 321 of the irradiator 32 toward the negative side in the Z direction is reflected by the half mirror 301 toward the positive side in the X direction, to be incident on the scanning unit 33 through the focus lens 323. Note that the emission direction of the laser beam from the irradiator 32 is not limited to the negative side in the Z direction, and the direction in which the half mirror 301 reflects the laser beam is not limited to the positive side in the X direction. Based on the relationship between the position where the irradiator 32 is disposed and the position where the material layer and/or the other components of the manufacturing optical unit 35 are disposed, the emission direction of the laser beam and the reflection direction of the half mirror 301 are appropriately determined to be in suitable directions.

The focus lens 323 includes a concave lens 323a and a convex lens 323b. In order to adjust the focusing position (focal length) of the laser beam reflected by the galvano mirrors 331, 332 described below, the concave lens 323a is configured to be movable along the X direction by a driving mechanism (not illustrated) that is controlled by the calculation device 50. Accordingly, depending on the position of the concave lens 323a in the X direction, a luminous flux diameter (spot size) of the laser beam on the material layer can be adjusted. In this case, the distance traveled until the laser beam reaches the surface of the material layer varies depending on how the galvano mirrors 331, 332 are driven (that is, a change in an angle of the galvano mirrors 331, 332) as described below. Thus, with the focus lens 323, the focusing position of the laser beam may be adjusted in accordance with the driving of the galvano mirrors 331, 332, so that the focusing point of the laser beam reflected from the galvano mirrors 331, 332 and the surface of the material layer can be aligned.

Furthermore, as the galvano mirrors 331, 332 are driven, the focusing position of the laser beam may not necessary be adjusted to align the focusing point of the laser beam and the surface of the material layer. For example, the position of the concave lens 323a may be controlled by a driving mechanism (not illustrated) controlled by the calculation device 50 in accordance with the driving of the galvano mirrors 331, 332 (a change in the angle of the galvano mirrors 331, 332) so as to make the luminous flux diameter (spot size) of the laser beam different among irradiation positions of the laser beam on the material layer. Note that the concave lens 323a may not be configured to be movable. The convex lens 323b may be configured to be movable in the X direction by a driving mechanism (not illustrated), or both the concave lens 323a and the convex lens 323b may be configured to be movable in the X direction by a driving mechanism (not illustrated). Furthermore, the focus lens 323 may not be a so-called Galilean type including the concave lens 323a and the convex lens 323b, and other known optical systems may be employed.

Note that the concave lens 323a and the convex lens 323b of the focus lens 323 configured to be movable in the X direction should not be construed in a limiting sense. Based on the relationship between the position where the focus lens 323 is disposed and the positions where the other components of the manufacturing optical unit 35 are disposed, the movement direction of the concave lens 323a and the convex lens 323b is appropriately determined to be a suitable direction.

The scanning unit 33 includes the galvano mirrors 331 and 332. The galvano mirror 331 is arranged at a predetermined angle with respect to the Z axis. The inclination angle of the galvano mirror 331 relative to the Z-axis is changed by control performed by the calculation device 50. The galvano mirror 331 reflects the laser beam traveling from the focus lens 323 toward the positive side in the X direction, to the galvano mirror 332 that is provided more on the positive side in the Z direction than the galvano mirror 331.

The galvano mirror 332 is arranged at a predetermined angle with respect to the XY plane. The inclination angle of the galvano mirror 332 relative to the XY plane is changed by control performed by the calculation device 50. The laser beam reflected by the galvano mirror 331 is reflected by the galvano mirror 332 toward the surface of the material layer. By changing the inclination angle of the galvano mirror 331 with respect to the Z axis and the inclination angle of the galvano mirror 332 with respect to the XY plane, the position on the material layer irradiated with the laser beam moves along at least one of the X axis and the Y axis. Thus, the position on the material layer irradiated with the laser beam can be moved in the XY plane, whereby scanning can be implemented.

Note that the arrangement of the galvano mirrors 331 and 332 and the direction in which the laser beam is reflected by the galvano mirror 331 are not limited to the arrangement and the reflection direction described above. The arrangement of the galvano mirrors 331 and 332 and the direction in which the laser beam is reflected by the galvano mirror 331 are appropriately determined to be suitable, based on the relationship between the position where the scanning unit 33 is arranged and the positions where the other components of the manufacturing optical unit 35 are arranged.

As the amount of the scanning angle set using the galvano mirrors 331, 332 increases, the scanning distance of the laser beam increases. The scanning distance is a distance of movement of the irradiation position in a case where position (irradiation position) on the material layer irradiated with the laser beam moves on the XY plane. Furthermore, as the speed at which the inclination angle of the galvano mirrors 331, 332 is changed increases, the scanning speed of the laser beam increases. The scanning speed is the speed at which the irradiation position on the material layer moves on the XY plane. Thus, the calculation device 50 controls the scanning distance and the scanning speed of the laser beam by controlling the amount of the change speed of the scanning angle of the galvano mirrors 331, 332.

The inclination angle of the galvano mirrors 331, 332 determines the position on the surface of the material layer irradiated with the laser beam. When an image is captured by the imager 41 described below, the generated image data is stored in a storage 58 in association with irradiation position information and time information. The irradiation position information is information indicating an irradiation position of the laser beam. As described above, the irradiation position of the laser beam moves based on the inclination angle of the galvano mirrors 331, 332. Thus, the irradiation position of the laser beam on the material layer is calculated based on the inclination angle of the galvano mirrors 331, 332 detected by an encoder or the like. The irradiation position information associated with the image data may be the inclination angle of the galvano mirrors 331, 332. The time information is time information indicating a timing at which the imager 41 captured an image, with the timing at which the laser beam irradiation has started being the reference.

Note that the scanning unit 33 is not limited to a configuration including the galvano mirrors 331 and 332 as described above. For example, the scanning unit 33 may include a driving mechanism that moves the base plate 311 of the manufacturing tank 31 along at least one of the X direction and the Y direction. In this case, the driving mechanism includes a motor, a guide rail extending in the X direction, a guide rail extending in the Y direction, and the like, and moves the base plate 311 on the XY plane. Thus, the relative positional relationship between the irradiation position of the laser beam and the material layer is changed on the XY plane, and thus the material layer is scanned by the laser beam. In this case, scanning by the laser beam may be implemented by moving the irradiation position of the laser beam on the XY plane using the galvano mirrors 331, 332, and moving the base plate 311 to move the material layer on the XY plane. Furthermore, the inclination angle of the galvano mirrors 331, 332 described above may be fixed, and the scanning by the laser beam may be implemented by only moving the base plate 311 to move the material layer on the XY plane. The components changing the relative positional relationship between the laser beam and the base plate 311 (that is, the material layer) on the XY plane is not limited to those described above, and any other known components may be used.

Light (hereinafter, referred to as thermal radiation light for the sake of explanation) from at least a partial region of a predetermined region (including a melted portion in which the powder material P has melted, an unmelted powder material P (material layer) where the powder material P has not melted yet, a region where the powder material has solidified after melting, and the like) including a melted portion in which the powder material P has melted (described in detail below) on the material layer travels on an optical path coaxial with the optical path of the laser beam but in the opposite direction. In other words, the thermal radiation light travels from the material layer surface toward the positive side in the Z direction, is reflected by the galvano mirror 332 toward the galvano mirror 331, and is reflected in the galvano mirror 331 toward the negative side in the X direction. Light from the predetermined region traveling toward the negative side in the X direction enters the focus lens 323, and passes through the convex lens 323b and the concave lens 323a to be a parallel luminous flux. The thermal radiation light that has passed through the focus lens 323 passes through the half mirror 301, travels toward the negative side in the X direction, and enters the chromatic aberration correction optical system 43. Note that the optical member that reflects the laser beam and transmits the thermal radiation light may not be a half mirror. For example, it may be a known optical member such as a dichroic mirror.

The chromatic aberration correction optical system 43 corrects axial chromatic aberration, traverse chromatic aberration, and the like included in the thermal radiation light, with the thermal radiation light passing through the focus lens 323. The chromatic aberration correction optical system 43 includes a first lens 431, a second lens 432, and a third lens 433, arranged in this order from the positive side in the X direction. Each of the first lens 431 and the second lens 432 is a cemented lens that is a combination of a convex lens and a concave lens. The first lens 431 has a positive refractive index, the second lens 432 has a negative refractive index, and the third lens has a positive refractive index. The first lens 431 and the second lens 432 cause the incident thermal radiation light that has transmitted through the half mirror 301 and is in a state of being the parallel luminous flux to be incident on the third lens 433 on the negative side in the X direction. The third lens 433 focuses the parallel luminous flux to form a first image surface. How the first lens 431, the second lens 432, and the third lens 433 are distributed is determined to prevent the occurrence of the axial chromatic aberration or the traverse chromatic aberration on the first image plane. In this case, how the lenses are distributed is determined to cancel the chromatic aberration included in the thermal radiation light that has passed through the first lens 431 and the second lens 432 with the chromatic aberration caused by the focusing by the third lens 433.

Note that the first lens 431, the second lens 432, and the third lens 433 of the chromatic aberration correction optical system 43 are not limited to those arranged along the X direction. Based on the relationship between the position where the chromatic aberration correction optical system 43 is disposed and the positions where the other components of the manufacturing optical unit 35 are disposed, the direction in which the first lens 431, the second lens 432, and the third lens 433 are arranged is appropriately determined to be a suitable direction.

The field stop 302 is disposed on the first image plane. When the thermal radiation light traveling toward the negative side in the X direction passes through an aperture in the field stop 302, an image is formed based on the luminous flux incident on the imager 41 described below and the field of view of the image (image data) generated is limited. In the present embodiment, the size of the aperture of the field stop 302 is determined so that an image (image data) of a predetermined region including the irradiation position of the laser beam is generated. As a result, an image outside the predetermined region on the material layer is prevented from being included in the image (image data). The thermal radiation light that has passed through the field stop 302 is incident on the bifurcated optical system 42 disposed on the negative side in the X direction of the field stop 302.

The bifurcated optical system 42 includes an objective lens 421, a luminous flux splitting unit 422, luminous flux deflection units 423 and 424, a luminous flux combining unit 425, an imaging lens 426, a first filter 427, and a second filter 428. The objective lens 421 is a collimating lens and collimates the thermal radiation light arrived from the field stop 302 into parallel light. The luminous flux splitting unit 422 includes, for example, a dichroic mirror, a beam splitter, and the like, and transmits a luminous flux of the thermal radiation light of a predetermined wavelength while reflecting a luminous flux without the predetermined wavelength. In the present embodiment, of the incident thermal radiation light, light with a wavelength $\lambda 1$ passes through the luminous flux splitting unit 422 to be guided to the first filter 427 provided on the negative side in the X direction, and light with a wavelength $\lambda 2$ is reflected by the luminous flux splitting unit 422 to be guided to the luminous flux deflection unit 423 provided on the positive side in the Z direction. The luminous flux deflection unit 423 includes, for example, a dichroic mirror and the like, and reflects the light with the wavelength $\lambda 2$ and guides the light to the second filter 428 provided on the negative side in the X direction. Note that in the present embodiment, a description is given assuming that the wavelength $\lambda 1$ is 1250 nm, for example, and the wavelength $\lambda 2$ is 1600 nm, for example. However, the wavelengths $\lambda 1$ and $\lambda 2$ are not limited to the values described above.

The first filter 427 is a band pass filter that transmits the light with the wavelength $\lambda 1$. The light with the wavelength $\lambda 1$ transmitted through the luminous flux splitting unit 422 passes through the first filter 427 to be incident on the luminous flux deflection unit 424 disposed on the negative side in the X direction. The second filter 428 is a band pass filter that transmits the light with the wavelength $\lambda 2$. The light with the wavelength $\lambda 2$ reflected by the luminous flux deflection unit 423 passes through the second filter 428 to enter the luminous flux combining unit 425. The luminous flux deflection unit 424 includes a dichroic mirror and the like for example, and has a luminous flux reflecting surface is disposed at a predetermined inclination angle with respect to the XY plane.

The luminous flux combining unit 425 includes a dichroic mirror and the like for example, and has a luminous flux reflecting surface is disposed at a predetermined inclination angle with respect to the XY plane. The light with the wavelength $\lambda 1$ reflected by the luminous flux deflection unit 424 travels toward the positive side in the Z direction, passes through the luminous flux combining unit 425 to be focused by the imaging lens 426, and then enters the imager 41. The light with the wavelength $\lambda 2$ incident on the luminous flux combining unit 425 is reflected by the luminous flux combining unit 425 toward the positive side in the Z direction to be focused by the imaging lens 426, and then enters the imager 41. Here, the reflecting surface of the luminous flux deflection unit 424 and the reflecting surface of the luminous flux combining unit 425 are arranged at different inclination angles. Thus, the light with the wavelength $\lambda 1$ from the luminous flux deflection unit 424 and the light with the wavelength $\lambda 2$ from the luminous flux combining unit 425 are incident on the imaging lens 426 at different angles, and are focused at different positions on the imaging plane of the image sensor 411 of the imager 41 described below.

The present embodiment employs a configuration in which the angle between the reflecting surface of each of the luminous flux deflection unit 424 and the luminous flux combining unit 425 and the XY plane is variable. Specifically, a driving mechanism (not illustrated) is provided that drives the reflecting surfaces of the luminous flux deflection unit 424 and the luminous flux combining unit 425 under control by the calculation device 50. The driving mechanism drives the reflecting surfaces of the luminous flux deflection unit 424 and the luminous flux combining unit 425 to change the angles between the reflecting surface and the XY plane.

With this configuration, the incident positions of the light with the wavelength $\lambda 1$ and the light with the wavelength $\lambda 2$ on the image sensor 411 are changed in real time.

A configuration may be employed in which an angle formed between the reflecting surface of each of the luminous flux splitting unit 422 described above and the luminous flux deflection unit 423 and the XY plane is variable. Specifically, a driving mechanism (not illustrated) may be provided that drives the reflecting surfaces of the luminous flux splitting unit 422 and the luminous flux deflection unit 423 under the control by the calculation device 50. The driving mechanism may drive the reflecting surfaces of the luminous flux splitting unit 422 and the luminous flux deflection unit 423 to change the angles between the reflecting surface and the XY plane. The example in which the reflecting surfaces of the luminous flux splitting unit 422 and the luminous flux deflection unit 423 are driven by the driving mechanism should not be construed in a limiting sense. The reflecting surfaces of the luminous flux splitting unit 422 and the luminous flux deflection unit 423 may be manually adjusted by the user. This manual adjustment is performed, for example, during initial setting of the manufacturing apparatus 1 at the time of installation, or at the time of maintenance for the manufacturing apparatus 1.

Moreover, the arrangement of components of the bifurcated optical system 42 and the reflection direction of the thermal radiation light are not limited to the above-described arrangement and the reflection direction. The arrangement of the bifurcated optical system 42 and the reflected direction of the thermal radiation light are appropriately determined to be suitable, based on the relationship between the position where the bifurcated optical system 42 is arranged and the positions where the other components of the manufacturing optical unit 35 are arranged.

The imager 41 includes, for example: the image sensor 411 including CMOS, CCD, or the like; a read circuit configured to read an image signal as a result of photoelectric conversion by the image sensor 411; a control circuit for controlling the driving of the image sensor 411; and the like. The thermal radiation light incident on the imager 41 is focused by the imaging lens 426 onto the imaging plane of the image sensor 411. The imager 41 performs photoelectric conversion on the incident luminous flux to generate image data, and outputs the image data to the calculation device 50.

As described above, the reflecting surface of the luminous flux deflection unit 424 and the reflecting surface of the luminous flux combining unit 425 are arranged at different inclination angles. Thus, of the thermal radiation light from the predetermined region of the material layer, the light with the wavelength $\lambda 1$ reflected by the luminous flux deflection unit 424 and the light with the wavelength $\lambda 2$ reflected by the luminous flux combining unit 425 are incident on the imaging lens 426 at different angles, and are focused at different positions on the imaging plane of the image sensor 411. Thus, images respectively based on two beams of light, of the thermal radiation light from the predetermined region of the material layer, with different wavelengths appear at different positions on the same image (same image data).

Note that as described above, the angle formed between each of the reflecting surface of the luminous flux deflection units 422 and 423 and the XY plane, and the angle formed between the reflecting surface of each of the luminous flux deflection unit 424 and the luminous flux combining unit 425 and the XY plane are variable. Thus, with the calculation device 50 controlling the angles between the reflecting surfaces of the luminous flux deflection unit 424 and the luminous flux combining unit 425 and the XY plane, the relative positional relationship between the position at which the light with the wavelength $\lambda 1$ of the thermal radiation light is focused on the image sensor 411 and the position at which the light with the wavelength $\lambda 2$ is focused on the image sensor 411 can be adjusted. When the angle between the reflecting surface of each of the luminous flux splitting unit 422 and the luminous flux deflection unit 423 and the XY plane is variable as described above, the positions on the image sensor 411 on which the light with the wavelength $\lambda 1$ and the light with the wavelength $\lambda 2$ are focused can be adjusted by also changing the angle between each of the reflecting surface luminous flux splitting unit 422 and the luminous flux deflection unit 423 and the XY plane.

With the above-described configuration illustrated in FIG. 2, the optical system for the laser beam irradiation and the optical system for imaging by the imager 41 are coaxially arranged. Thus, the configuration of the optical systems is simplified, whereby an increase in the size of the device can be suppressed.

With the bifurcated optical system 42, light beams of two different wavelengths $\lambda 1$ and $\lambda 2$ are focused on different positions on the image sensor 411. Images based on the two light beams of different wavelengths of the thermal radiation light from a predetermined region (including a melted portion in which the powder material P has melted, an unmelted powder material P (material layer) where the powder material P has not melted yet, a region where the powder material has solidified after melting, and the like) including a melted portion in which the powder material P has melted appear at different positions on the same image (on the same image data). A detection unit 54 of the calculation device 50 described below converts a ratio between brightness information pieces of the respective images at different positions on the same image (same image data) into a temperature of the predetermined region (including a melted portion in which the powder material P has melted, an unmelted powder material P (material layer) where the powder material P has not melted yet, a region where the powder material has solidified after melting, and the like) including a melted portion in which the powder material P has melted, using a known two-color method described below. Here, the brightness information is a brightness value or a value related to brightness. The material layer irradiated with the laser beam includes the region where the powder material P has melted, the unmelted powder material P that has not melted yet, and the region solidified after the melting, resulting in varying phase states as will be described below in detail. Thus, in the predetermined region of the material layer, the light emissivity differs among the phase states. The light emissivity also differs among the types of the powder material P.

Furthermore, as will be described in detail below, a fume is generated from the region where the powder material P has melted by being irradiated with the laser beam. The fume is composed of a large number of fine floating particles as a result of the powder material P turning into vapor by being heated through the laser beam irradiation, and the vapor turning into a solid by being cooled in the air. The thermal radiation light with two wavelengths is attenuated by being scattering in the fume. Still, with the two-color method, the conversion to the temperature is implemented based on the ratio (for example the ratio between the brightness values) between the brightness information on the image data generated based on the light with the wavelength $\lambda 1$ and the brightness information on the image data generated based on the light with the wavelength $\lambda 2$, and thus emissivity of the predetermined region (including a melted portion in which the powder material P has melted, an unmelted powder material P (material layer) where the powder material P has not melted yet, a region where the powder material has solidified after melting, and the like) including a melted portion and the thermal radiation light including two wavelengths are not affected by the scattering in the fume. Thus, information on the temperature of the material layer is acquired based the image data generated by the imager 41 without being affected by the state of the powder material P being irradiated with the laser beam, the fume, and the like.

Note that the configuration and arrangement of the manufacturing optical unit 35 are not limited to the above described example illustrated in FIG. 2.

For example, the acquisition unit 310 may include two imagers 41, with one imager capturing an image based on the light with the wavelength $\lambda 1$ and the other imager capturing an image based on the light with the wavelength $\lambda 2$ out of the thermal radiation light. The two imagers are arranged so that the imaging plane of the image sensor of one imager is parallel to the YZ plane, and the imaging plane of the imager included in the other imager is parallel to the XY plane. The bifurcated optical system 42 includes the luminous flux splitting unit 422, the first filter 427, and the second filter 428, as illustrated in FIG. 2. The field stop 302 illustrated in FIG. 2 is not provided. The third lens 433 of the chromatic aberration correction optical system 43 is located in front of each of the two imagers 41. In other words, the first filter 427, the second filter 428, and the luminous flux splitting unit 422 of the bifurcated optical system 42 are disposed between the second lens 432 and the third lens 433 of the chromatic aberration correction optical system 43. Of the luminous flux that has passed through the first lens 431 and the second lens 432 of the chromatic aberration correction optical system 43, the light with the wavelength $\lambda 1$ obtained passes through the luminous flux splitting unit 422 and the first filter 427 to travel toward the negative side in the X direction, and is focused by one third lens 433 onto the image sensor of one imager. The light with the wavelength $\lambda 2$ reflected by the luminous flux splitting unit 422 travels toward the positive side in the Z direction, passes through the second filter 428, and is focused by the other third lens 433 onto the image sensor of the other imager. Thus, the imagers can generate respective image data pieces corresponding to different wavelengths.

Furthermore, the acquisition unit 310 may use a filter capable of switching the wavelength of transmitted light, instead of the bifurcated optical system 42 illustrated in FIG. 2 for example. The filter is disposed between the second lens 432 and the third lens 433 of the chromatic aberration correction optical system 43 and has a region (first region) transmitting the light with the wavelength $\lambda 1$ and a region (second region) transmitting the light with the wavelength $\lambda 2$. The first region and the second regions of the filter are alternately inserted on the optical path of the thermal radiation light at a predetermined time interval. For example, a plurality of filters having different wavelength transmittance are provided in a disc shaped member (turret), with the surface of the turret disposed in parallel with the YZ plane. The turret is configured to be rotatable, by an unillustrated driving mechanism, about the center of the turret. For example, when the first filter and the second filter are provided as a plurality of filters having different wavelength transmittances in the turret, the rotation of the turret caused by the driving mechanism results in the first filter and the second filter being alternately inserted on the optical path of the thermal radiation light at a time interval corresponding to the rotation speed. While the first filter is inserted on the optical path, the light with the wavelength λ1 of the thermal radiation light is transmitted to be focused by the third lens 433 onto the image sensor 411 of the imager 41. While the second filter is inserted on the optical path, the light with the wavelength λ2 passes through to be focused by the third lens 433 onto the image sensor 411. In this way, at a time interval corresponding to the rotation speed of the turret, the imager 41 generates image data based the light with the wavelength λ1 and image data based on the light with the wavelength λ2. Note that in this case, the field stop 302 illustrated in FIG. 2 is not provided. Thus, the imager 41 can generate image data for each of the different wavelengths at a time interval corresponding to the rotation speed of the turret.

Alternatively, a filter for selecting one of the wavelength λ1 and the wavelength λ2 depending on the arrangement of pixels forming the image sensor 411 may be provided on the image sensor 411 of the imager 41. In this case, the bifurcated optical system 42 and the field stop 302 illustrated in FIG. 2 are not provided. The configuration enables the image data to be generated with the wavelengths λ1 and λ2.

Alternatively, as illustrated in FIG. 3(a), a first focus lens 324 that adjusts the focusing position of the laser beam on the material layer, and a second focus lens 325 that adjusts the focusing position of the emitted light from the material layer on the image sensor 411. The first focus lens 324 and the second focus lens 325 respectively include concave lenses 324a and 325a and convex lenses 324b and 325b that are similar to the concave lens 323a and the convex lens 323b of the focus lens 323 illustrated in FIG. 2.

In the example illustrated in FIG. 3(a), the laser beam from the laser oscillator 321 travels toward the positive side in the Z direction, passes through the first focus lens 324, passes through the half mirror 301, and enters the scanning unit 33. The thermal radiation light is incident on the half mirror 301 through the scanning unit 33, and to be reflected by the half mirror 301 toward the positive side in the Z direction. The thermal radiation light is transmitted through the second focus lens 325 and is transmitted through the chromatic aberration correction optical system 43 having the same configuration as that illustrated in FIG. 2, to be incident on the bifurcated optical system 42. The bifurcated optical system 42 also has the same configuration as that illustrated in FIG. 2, whereby the thermal radiation light turns into light beams with two wavelengths which are focused on different positions on the image sensor 411 of the imager 41.

Note that the laser oscillator 321 and the first focus lens 324 may be arranged along the Z direction, and the second focus lens 325, the chromatic aberration correction optical system 43, and the bifurcated optical system 42 may be arranged along the X direction.

In other words, in the example illustrated in FIG. 3(a), the acquisition unit 310 includes the imager 41, the bifurcated optical system 42, the chromatic aberration correction optical system 43, the second focus lens 325, and the half mirror 301. With this configuration, the acquisition unit 310 acquires information on a predetermined region (including a melted portion in which the powder material P has melted, an unmelted powder material P (material layer) where the powder material P has not melted yet, a region where the powder material has solidified after melting, and the like) including a melted portion in which a part of the powder material P has melted.

The acquisition unit 310 is a component having a function (a function of acquiring information on at least a part of the predetermined region including the melted portion where the powder material P has melted) different from those of the components of the manufacturing unit 30 other than the acquisition unit 310, and thus can be described as components independent from the manufacturing unit 30 (manufacturing optical unit 35). Furthermore, in this case, the half mirror 301 is also part of the manufacturing optical unit 35, and thus can be described as a component of the manufacturing optical unit 35 instead of the acquisition unit 310.

Alternatively, as illustrated in FIG. 3(b), an fθ lens 326 may be provided between the scanning unit 33 and the material layer instead of the focus lens 323. The fθ lens 326 is a lens that focuses light at an incident angle θ at a position of an image height f×θ, where f represents the focal length of the fθ lens 326. Thus, when the laser beam scanning is performed by the scanning unit 33, the focusing point of the laser beams with the inclination angles changed in accordance with the incident angles of the galvano mirrors 331 and 332 are set to be at different positions on the same plane (that is, on the material layer).

In this case, the laser beam emitted from the irradiator 32 travels toward the positive side in the X direction, passes through the half mirror 301, and is emitted onto the material layer via the scanning unit 33 and the fθ lens 326. The thermal radiation light reaches the half mirror 301 via the fθ lens 326 and the scanning unit 33, is reflected toward the positive side in the Z direction by the half mirror 301, and is incident on the imager 41 via the first lens 431 and the bifurcated optical system 42. With this configuration, image data pieces for different respective wavelengths can be generated as in the case illustrated in FIG. 2.

The laser oscillator 321 may be arranged along the Z direction, and the first lens 431 and the bifurcated optical system 42 may be arranged along the X direction.

In other words, the acquisition unit 310 includes the imager 41, the bifurcated optical system 42, the chromatic aberration correction optical system 43, and the half mirror 301, as illustrated in FIG. 3(b). With this configuration, the acquisition unit 310 acquires information on a predetermined region (including a melted portion in which the powder material P has melted, an unmelted powder material P (material layer) where the powder material P has not melted yet, a region where the powder material has solidified after melting, and the like) including a melted portion in which a part of the powder material P has melted.

The acquisition unit 310 is a component having a function (a function of acquiring information on at least a part of the predetermined region including the melted portion where the powder material P has melted) different from those of the components of the manufacturing unit 30 other than the acquisition unit 310, and thus can be described as components independent from the manufacturing unit 30 (manufacturing optical unit 35). Furthermore, in this case, the half mirror 301 is also part of the manufacturing optical unit 35, and thus can be described as a component of the manufacturing optical unit 35 instead of the acquisition unit 310.

Note that the detection unit 54 may not use the two-color method. For example, thermal image data may be generated based on image data based on light with any one type of wavelengths in the thermal radiation light from at least a part of the predetermined region including the melted portion where the powder material P has melted. In this case, the bifurcated optical system 42 of the acquisition unit 310 may be replaced with a component including the objective lens 421, a filter for selecting any one type of the wavelengths, and the imaging lens 426. In this case, the chromatic aberration correction optical system 43 of the acquisition unit 310 may be omitted. Note that the detection unit 54 may generate the thermal image data based not only on any one type of the wavelengths, but also on light of any three or more types of the wavelengths. This case can be achieved with the number of branches of the optical path increased in the bifurcated optical system 42 of the acquisition unit 310.

The calculation device 50 illustrated in FIG. 1 is a processor that includes a microprocessor and its peripheral circuits, and controls the components of the manufacturing apparatus 1 by reading and executing a control program stored in advance in the storage 58 including a non-volatile storage medium (such as a flash memory for example). The calculation device 50 includes a setting unit 59, the detection unit 54, an output unit 55, a calculation unit 56, and a determination unit 57. Note that the calculation device 50 may include a CPU, an ASIC, a programmable MPU, and the like.

The setting unit 59 sets various conditions (manufacturing conditions) for the manufacturing apparatus 1 to manufacture the 3D manufactured object based on state information output from the output unit 55 described below. Note that the state information will be described below. The setting unit 59 includes a material controller 51, a manufacturing controller 52, and a housing controller 53.

The material controller 51 controls operations of the material layer forming unit 20 in accordance with a material layer forming condition, which is a condition for forming the material layer. The material layer forming conditions include the moving speed of the blade 221, the pressure applied from the blade 221 to the powder material P, the standby time of the blade 221, and the material of the blade 211. The material controller 51 controls the operation of the material layer forming unit 20 in accordance with a condition associated with the powder material P. The condition associated with the powder material P includes the particle diameter/particle size distribution of the powder material P, the hygroscopicity of the powder material P, and the type of powder material P, which will be described in detail below. In this case, the material controller 51 controls the operation of the driving mechanism 212 that drives the bottom surface 211 of the material supply tank 21 and the heating temperature for heating the powder material contained in the material supply tank 21 using the heater 213. When change information is generated by the calculation unit 56 described below, the material controller 51 changes the operation of the material layer forming unit 20 in accordance with the material layer forming condition based on the content of the change information and the condition associated with the powder material P.

The manufacturing controller 52 controls the operation of the manufacturing unit 30. The manufacturing controller 52 controls the irradiator 32 based on a condition of the laser beam emitted to the powder material P for heating the powder material P. The condition of the laser beam includes the output of the laser beam, the wavelength of the laser beam, the intensity distribution of the laser beam, and the luminous flux size (spot size) of the laser beam as described below in detail. The manufacturing controller 52 controls the scanning unit 33 based on a scanning condition for laser beam scanning to heat the powder material P. The scanning condition includes a scanning speed of the laser beam, an interval of irradiation positions of the laser beam, and a scanning pass of the laser beam, which will be described in detail below. The manufacturing controller 52 controls the operation of the base plate 311 based on a supporting unit condition associated with the base plate 311 that supports the powder material P and the solidified layer. The support unit condition includes the temperature of the base plate 311, which will be described in detail below. The manufacturing controller 52 controls the heating temperature of the heater 313 that heats the base plate 311 based on this supporting unit condition. Furthermore, the manufacturing controller 52 controls the operation of the driving mechanism 312 that drives the base plate 311 of the manufacturing tank 31. The manufacturing controller 52 changes the design data of the solidified layer and the 3D manufactured object in accordance with the content of the change information. The design data includes slice model data and shape data on the support portion which will be described in detail below. When the change information is generated by the calculation unit 56 described below, the manufacturing controller 52 changes the operation of the manufacturing unit 30 and the design data in accordance with the content of the change information.

The housing controller 53 controls the operation of the intake device 131 and the discharge device 14 and the operation of the heater 15 in accordance with a condition related to the atmosphere inside the housing 10. The condition associated with the atmosphere inside the housing 10 includes the flow volume and flowrate of the inert gas introduced into housing 10 and the temperature inside housing 10, which will be described in detail below. When the calculation unit 56 described below generates the change information, the housing controller 53 changes the operation of the intake device 131, the discharge device 14, and the heater 15, in accordance with the condition associated with the atmosphere inside the housing 10 based on the content of the change information.

The storage 58 stores, in addition to the control program described above, various types of information used for detection of the state of at least a part of the predetermined region including the melted portion by the detection unit 54, generation of the change information by the calculation unit 56, and determination processing by the determination unit 57 as will be described below in detail.

The detection unit 54 detects the state of at least a part of the predetermined region in the material layer based on the image data generated by the imager 41 described above. Here, as described below, the predetermined region includes a melted portion in which the powder material P has been melted by being irradiated with the laser beam, an unmelted powder material P (material layer) that has not melted yet, a region solidified after the melting, a region where spatter has occurred, and a region where a fume has been produced. In the following description, this predetermined region is referred to as a detection target region.

In order to set the manufacturing condition of the manufacturing apparatus 1, the output unit 55 outputs state information based on a state of at least a part of the detection target region obtained by the detection unit 54 to the setting unit 59 (in particular, at least one of the material controller 51, the manufacturing controller 52, and the housing controller 53) described above. The state information based on the state of at least a part of the detection target region obtained includes the change information for changing the manufacturing condition, for producing the 3D manufactured object, detected by the calculation unit 56 described below, and information on the state itself of at least a part of the detection target region detected by the detection unit 54. Hereinafter, for convenience of explanation, the expression at least a part of the detection target region will be simply referred to as a detection target region.

The calculation unit 56 generates change information for changing the manufacturing condition based on the state of the detection target region obtained by the detection unit 54. When the determination unit 57 described below determines that the solidified layer formed needs to be repaired, the calculation unit 56 generates repair information for repairing the solidified layer.

The determination unit 57 determines whether the manufacturing condition is to be changed, based on the state of the detection target region obtained by the detection unit 54. Furthermore, the determination unit 57 determines whether the solidified layer is to be repaired, based on the state of the detection target region obtained by the detection unit 54.

Note that the details of the processing executed by the detection unit 54, the calculation unit 56, and the determination unit 57 will be described below.

Next, the operation of the manufacturing apparatus 1 having the above-described configuration will be described.

First of all, the housing controller 53 controls the intake device 131, the discharge device 14, and the heater 15 to achieve a set atmosphere in the housing 10.

The housing controller 53 controls the opening degree of the valve of the intake device 131 and the discharge amount of the discharge device 14 so that set pressure is achieved in the housing 10. The housing controller 53 controls the valve opening degree of the intake device 131 to introduce the inert gas into the housing 10 to lower the oxygen concentration in the housing 10. With the oxygen concentration dropped, oxidation of the powder material P forming an oxide film on the surfaces of the particles of the powder material P is prevented when the powder material P is irradiated with the laser beam to be melted. When the oxide film is formed on the surfaces of the particles of the powder material P, the specific heat changes in accordance with the thickness of the oxide film. Thus, as described below, the thermal absorption and thermal conduction of the powder material P irradiated with the laser beam might be affected. This may cause melt defects and the like, including the powder material P remaining unmelted, the solidified layer formed having a shape failure or insufficient strength, a failure to obtain a solidified layer with desired metallographic structure, and the like. With the oxygen concentration in the housing 10 dropped, oxidation of the powder material P which may lead to the melt defects are prevented.

The housing controller 53 controls the heating output of the heater 15 and heats the interior of the housing 10 to achieve a temperature inside the housing 10 set as the manufacturing condition.

When the oxygen concentration drops below a predetermined concentration due to the inert gas introduced into the housing 10 and the inside of the housing 10 is heated up to the set temperature by the heater 15, the material controller 51 controls the driving mechanism 212 to move (raise) the bottom surface 211 of the material supply tank 21 toward the positive side in the Z direction. The manufacturing controller 52 controls the driving mechanism 312 to move (descend) the base plate 311 of the manufacturing tank 31 toward the negative side in the Z direction by a distance corresponding to the thickness Δd of the material layer to be formed. The material controller 51 controls the driving mechanism of the recoater 22 to move the blade 221 from the position A to the position B along the X direction. The blade 221 that has started to move from position A conveys the powder material P pushed out from the material supply tank 21 due to the rise of the bottom surface 211, onto the base plate 311 of the manufacturing tank 31 on the positive side in the X direction. The powder material P conveyed onto the base plate 311 is formed into a layer on the base plate 311 with the height (Z direction thickness) from the surface of the base plate 311 being uniform due to the pressure downward (negative side in the Z direction) applied from the lower end (negative side in the Z direction) of the blade 221 moving toward the positive side in the X direction. As a result, a material layer having a constant thickness (layer thickness) from the surface of the base plate 311 is formed. In this process, the material controller 51 controls the moving speed of the blade 221 and the pressure applied from the blade 221 to the powder material P, whereby the desired thickness of the layer thickness of the material layer, the flatness of the material layer surface, the density, and the like desired by the user can be achieved. It is noted that density is the thickness of the material layer with respect to the amount of the powder material P in the formed material layer, and the lower the density indicates a greater proportion of gaps in the material layer.

The irradiator 32 irradiates the formed material layer with the laser beam. The scanning unit 33 scans the surface of the material layer using the laser beam from the irradiator 32. The route (scanning route) of the laser beam for scanning is set based on slice model data that is a combination of data pieces of a shape as a result of slicing design data on the 3D manufactured object produced by the manufacturing apparatus 1, that is, shape data on a 3D shape of a 3D manufactured object, such as CAD data and STL data converted from the CAD data, at a predetermined interval (corresponding to the layer thickness of the material layer for example) along the Z direction. This slice model data is shape data on the solidified layer defining the shape of the solidified layer in each layer.

The manufacturing controller 52 of the calculation device 50 determines the scanning pass of the scanning performed by the scanning unit 33 using the laser beam, so that the powder material P on the material layer surface if irradiated with the laser beam, in accordance with the shape determined by the slice model data on the 3D manufactured object corresponding to the position of the base plate 311 in the Z direction.

Note that in order to prevent deformation, damage, and the like of the 3D manufactured object and the solidified layer during the manufacturing process, the manufacturing is performed while forming a support portion supporting a solidified layer and the 3D manufactured object being formed. Shape data on the support portion representing information such as the shape and thickness of the support portion is shape data on the 3D manufactured object (that is, data on the shape of the support portion in the CAD data or the STL data) or slice model data generated based on the shape data on the 3D manufactured object.

Manufacturing orientation data on the 3D manufactured object is data indicating a manufacturing orientation of the 3D manufactured object (shape data on the 3D manufactured object) for setting the slice model data. The manufacturing orientation is an orientation for manufacturing a 3D manufactured object. In a case where a prism shaped 3D manufactured object is formed, the information indicates whether the solidified layers are built along an axial direction of the prism, or are started to be formed from a side surface of the prism so as to be built in a direction crossing the axial direction of the prism, and the like for example.

When the slice model data is generated, shape change due to the thermal expansion is preferably taken into consideration, rather than using the design data directly. Specifically, the solidified layer at the time of being formed has a temperature higher than that under a normal temperature state, due to the laser beam irradiation. In view of this, when there is a large difference in temperature between the temperature in an environment where the 3D manufactured object is used and a temperature at which the solidified layer is formed, the slice model data is preferably generated based on data (shape data on 3D manufactured object) which is design data including such a difference while taking the coefficient of linear expansion of such a temperature difference into consideration.

Furthermore, tolerance information calculated based on CAD data is preferably set for individual slice model data. This tolerance information can be set for each slice model data in a manner described in JP 2006-59014 A, for example.

The design data on the shape of the 3D manufactured object includes the shape data on the solidified layer, the manufacturing orientation data, the shape data on support portion supporting the solidified layer or the 3D manufactured object, or the shape data on the 3D manufactured object. Based on this design data, the manufacturing controller 52 scans the surface of the material layer with the laser beam from the irradiator 32. When the manufacturing controller 52 changes the design data on the 3D manufactured object and changes the slice model data based on the design data, the manufacturing controller 52 scans the surface of the material layer with the laser beam from the irradiator 32, in accordance with the changed slice model data.

The laser beam emitted onto the powder material P is absorbed into the powder material P at an absorption rate determined by the conditions such as the output and wavelength of the emitted laser beam, the type of the powder material P, the shape of the particles of the powder material P, the surface shape of the material layer, and the like. The absorption of the laser beam causes the powder material P irradiated with the laser beam to be rapidly heated to have a temperature rise, and the heat is transferred to the powder material P in the periphery. When the temperature rising due to the heating reaches the melting point of the powder material P, the powder material P on the surface of the material layer melts, vaporizes, and the vapor pressure rises with the emission of evaporate, whereby a recess portion in a melting state is formed in the surface of the material layer. The laser beam emitted into this recess portion is further absorbed by the melted portion, whereby the cycle of melting, evaporating, and emitting evaporates is repeated. As a result, the recess portion becomes a hole having an increased depth below the material layer (negative side in the Z direction), and the laser beam is repeatedly reflected on the wall surface of the hole, whereby the absorption of the laser beam is largely increased. As a result, a deep hole (keyhole) with an increased depth toward the downward side is formed. With the laser beam repeatedly reflected on the wall surface of the hole, the keyhole has an approximately circular cross-section shape along the XY plane. With the keyhole formed at the position irradiated with the laser beam, the inside of the material layer is directly heated. It is known that a stronger energy applied to the powder material P through the laser beam irradiation leads to a deeper shape of the keyhole, and that a higher temperature of the powder material P leads to a larger aperture. In the keyhole, with the absorption rate of the laser beam repeatedly reflected on the wall surface increased as described above, evaporates are generated and are ejected from the keyhole opening (upper surface opening) in a form of a fume. The ejection of the fume involves scattering of a part of the melted portion (part of the powder material P melted) around the keyhole in a form of a particulate spatter.

When the scanning unit 33 performs the scanning in a state where the keyhole is formed, the powder material P positioned in an advancing direction (positive side in the X direction when the scanning is performed toward the positive side in the X direction) of the scanning laser beam with the keyhole maintained due to the balanced force such as the vapor pressure inside the keyhole, the surface tension of the melted portion, and the gravity on the melted portion. The melt produced by the melting of the powder material P mixes with the melt produced from the powder material P around the keyhole, whereby a melt pool in a liquid phase is formed around the keyhole.

Figure 4:
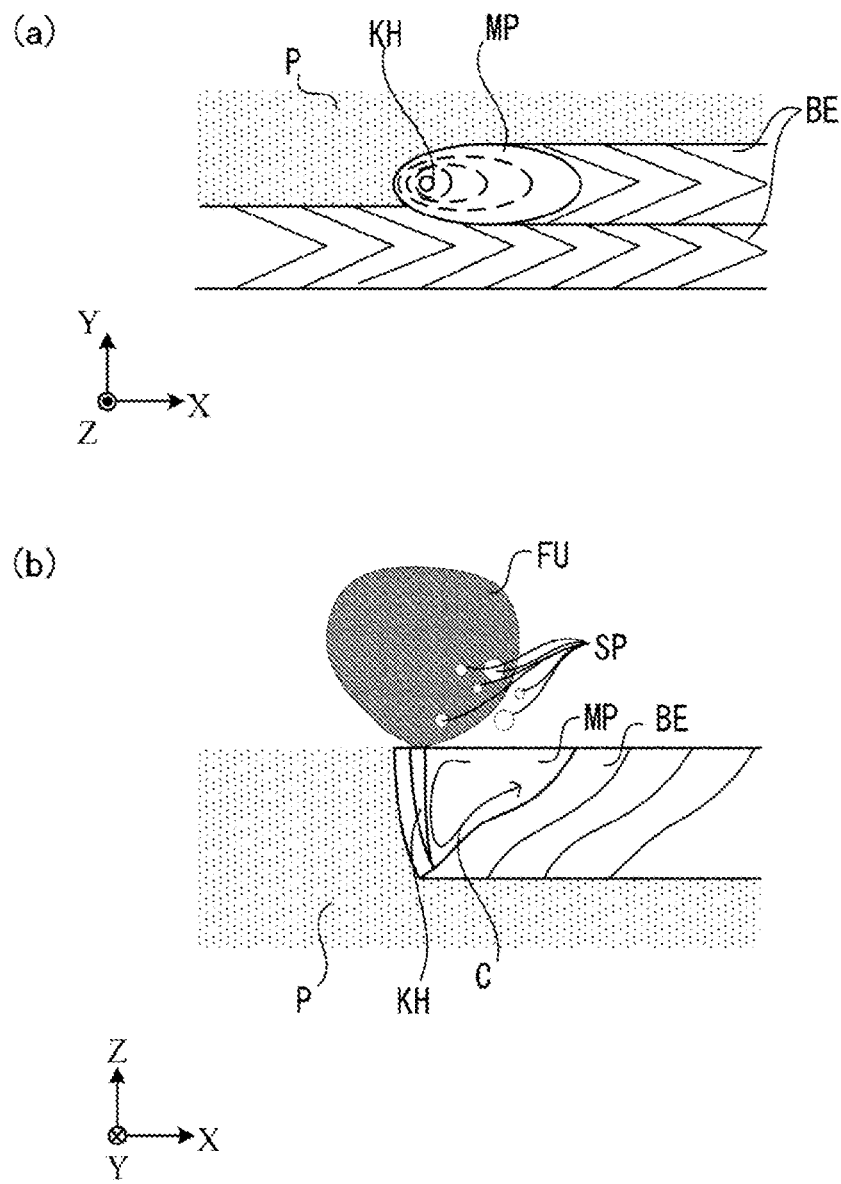
FIG. 4 is a diagram schematically illustrating a state of a melt pool on a material layer and a portion therearound generated by laser beam irradiation.

FIG. 4 is a diagram schematically illustrating a state of a melt pool formed by irradiating the material layer with the laser beam and a portion therearound. FIG. 4(a) is a plan view schematically illustrating a state of the melt pool on the material layer on the XY plane and FIG. 4(b) is a cross-sectional view thereof along the ZX plane. In FIG. 4, a keyhole KH formed as described above, a melt pool MP, a powder material P that has not yet started to melt, fume FU, spatter SP, and a solidified region BE formed with the melt pool MP solidified as described below. Note that FIG. 4 illustrates a case in which the scanning of the laser beam is performed from the positive side toward the negative side in the X direction. Also, in FIG. 4(a), the isotherms in the melt pool MP are indicated by dashed lines. In the melt pool MP, convection as indicated by an arrow C in FIG. 4(b) is generated for example, due to a difference in the surface tension caused by a difference in temperature between the surface and the inside of the melt pool MP. When the convection C becomes large due to heat generated by the laser beam irradiation, the amount of generated fume FU increases, and a portion of the melted powder material P around the keyhole KH is blown out of the melt pool MP, to scatter around the keyhole KH and the melt pool MP as the spatter SP.

Excessive heat due to the laser beam irradiation results in a large or disturbed convection C in the melt pool MP. A large convection C leads to increased stirring of the melt pool MP, resulting in an increase in the spattering amount of the spatter SP or the spattering speed of the spatter SP. Furthermore, when the convection C is interrupted to be irregular in the melt pool MP, the spattering direction of the spatter SP would not be in a certain direction (for example, behind the scanning direction of the laser beam) as viewed from the keyhole KH, and scatters to be in front of and on the side of the laser beam scanning direction. Furthermore, as the excessive heat due to laser beam irradiation increases, the produced amount of the fume FU increases, resulting in a higher concentration of the fume FU or a larger diffusion range of the fume FU produced in the keyhole KH.

When the keyhole KH moves in as the laser beam scanning proceeds, a new melt pool MP is formed around the traveling direction side (negative side in the X direction in FIG. 4) of the keyhole KH, and with the already formed (not yet solidified) melt pool MP is located on the rear side with respect to the keyhole KH (on the positive side in the X direction in FIG. 4), the oval shape of the melt pool MP becomes oval on the XY plane, as illustrated in FIG. 4(a). As the laser beam moves from the irradiation position during the scanning, the portion cooled due to the decrease in the absorption of the energy of the laser beam or due to the impact of the flow volume, the flowrate, of the like of the inert gas in the housing 10, is solidified to be the solidified region BE. As the keyhole KH continues to move along while the laser beam scanning proceeds, a continuous solidified region BE is formed with the powder material P solidified, in the region of the material layer irradiated with the laser beam. With the laser beam irradiation performed to provide an interval between the solidified region BE to be formed and the already formed solidified region BE (the two solidified regions BE extending in the X direction in FIG. 4(a)) enabling them to be in contact with each other, the solidified regions BE fuse with each other. Note that the interval between the two different solidified regions BE extending in the same direction is determined by the scanning interval (scanning pitch) of the laser beam scanning. The scanning interval (scanning pitch) is a distance between irradiation positions of two adjacent laser beams in a direction (the Y direction in FIG. 4(a)) crossing the scanning direction of the laser beam (the X direction in FIG. 4(a)). When the plurality of solidified regions BE formed are welded together, a layer-shaped solidified layer having a predetermined thickness is formed along the Z direction.

While the solidified layer is being formed, the imager 41 captures an image of the surface of the material layer to generate image data. As illustrated in FIG. 2, the thermal radiation light incident on the imager 41 travels along the same axis as the laser beam emitted from the irradiator 32 but in the opposite direction. Thus the center of the imaging field of the imager 41 (that is, the center of the image captured by the imager 41) substantially matches the position of the material layer irradiated with the laser beam. When the material layer is irradiated with the laser beam by the irradiator 32, the imager 41 captures the image of the detection target region including the melt pool MP on the XY plane with the position of the surface of the material layer irradiated with the laser beam (the position of the keyhole KH in a case where the keyhole KH is generated) being at the center, and generates image data. Thus, the detection target region includes the powder material P (unmelted powder material P) of the material layer immediately before the melting begins, the melt pool MP, and the solidified region BE (in other words, a part of the solidified layer). Furthermore, when the spatter SP and the fume FU are produced from the keyhole KH, the spatter SP and the fume FU are also included in the detection target region. The laser beam scanning by the scanning unit 33 involves movement of the detection target region, the image of which is captured by the imager 41, over the surface of the material layer.

The imager 41 captures the image at a predetermined time interval, for example, each time the XY plane is scanned by the scanning unit 33 with the laser beam by a predetermined distance.

With the solidified layer formed, the manufacturing controller 52 controls the driving mechanism 312 to move (descend) the base plate 311 of the manufacturing tank 31 toward the negative side in the Z direction by a distance corresponding to the layer thickness Δd of the material layer to be formed. The material controller 51 controls the driving mechanism 212 to move the bottom surface 211 of the material supply tank 21 toward the positive side in the Z direction, and controls the driving mechanism of the recoater 22 to move the blade 221 from the position A to the position B along the X direction. As a result, the powder material P is formed in to a layer with a uniform height (the thickness in the Z direction from the upper part of the solidified layer) on the upper part (in the positive side in the Z direction) of the solidified layer. As a result, a new material layer with a constant layer thickness Δd as the thickness from the upper part of the solidified layer is formed on the upper part of the solidified layer.

The new material layer is scanned by the scanning unit 33 using the laser beam emitted from the irradiator 32 on the XY plane. The melt pool MP as a result of the powder material P melting by being irradiated with the laser beam is formed, fuses with the solidified regions BE adjacent thereto in the X direction and the Y direction as described above, and the melt pool MP flows toward the lower layer (negative side in the Z direction) to fuse with the lower solidified layer (negative side in the Z direction) that has been formed. As a result, a new solidified layer is formed on the upper part of the already formed solidified layer.

The manufacturing apparatus 1 repeats the formation of the material layer and the formation of the solidified layer, and thus produces a 3D manufactured object in which a plurality of solidified layers are layered along the Z direction.

When the 3D manufactured object is produced as described above with a manufacturing failure such as a defect of the solidified layer, shape defect, abnormal surface roughness or metallographic structure, the 3D manufactured object is difficult to repair after it has been produced. The manufacturing defect inside the 3D manufactured object is particularly difficult to repair. Because there are so many parameters for setting the conditions for producing the 3D manufactured object, it is difficult or is extremely time consuming to set the conditions for producing the 3D manufactured object to be free of manufacturing defects.

In the manufacturing apparatus 1 of the present embodiment, the detection unit 54, the calculation unit 56, and the determination unit 57 of the calculation device 50 generate information for changing various conditions (hereinafter, referred to as manufacturing conditions) for producing the 3D manufactured object based on the state of the detection target region determined when the production of the 3D manufactured object starts or during the production, or information for repairing a solidified layer. Based on this information, the material controller 51, the manufacturing controller 52, and the housing controller 53 control the operation of each of the components of the manufacturing apparatus 1 to prevent the solidified layer from having a manufacturing defect during the production, or when a manufacturing defect occurs, to repair the manufacturing defect at the timing when it can still be repaired.

The processing executed by the detection unit 54, the calculation unit 56, and the determination unit 57 will be described below.

First of all, a concept based on which the detection unit 54, the calculation unit 56, and the determination unit 57 that execute the processing described below will be described.

In the present embodiment, to prevent the solidified layer from having the solidified layer formed by irradiating the powder material P forming the material layer with the laser beam from the irradiator 32, and thus to produce a 3D manufactured object with occurrence of the manufacturing defect prevented, control is performed to keep the following basic condition within a certain range. Examples of the basic condition include a power density PD [J/mm$^2$], which is the amount of heat that flows into the powder material P per unit area of the material layer due to the laser beam irradiation, an energy density ED [J/mm$^2$] that is an amount of heat flowing in to the powder material P per unit area of the material layer due to the laser beam irradiation, and a temperature distribution T(r)[° C.]Δd of the powder material P in the melt pool MP as a result of melting due to the laser beam irradiation and a region therearound. The power density PD, the energy density ED, and the temperature distribution T(r) are respectively expressed by the following Formulae (1) to (3):

$$PD = \{\eta \times (P_L + P_0)\}/(d \times v) \quad (1);$$

$$ED = \rho \times \{\eta \times (P_L + P_0)\}/(v \times \Delta y \times \Delta z) \quad (2); \text{ and}$$

$$T(r) = \{\eta \times P_L/(2\pi k \times r)\} \times \exp\{(-v) \times (x+r)/2\alpha\} + T_0 \quad (3).$$

Note that Formulae (1) to (3) include the following parameters: $P_L$ represents the output of the laser beam (hereinafter, referred to as a laser output) [W]; $P_O$ represents the energy [W] applied from an external heat source, that is, energy applied from the base plate 311 to the powder material P or the energy applied from a heater or the like outside the manufacturing apparatus 1 to the powder material P; η represents the energy absorption rate of the powder material P, and is a value differing among types of the powder material P for example; v represents the scanning speed [mm/s] of the laser beam; d represents the luminous flux size (spot size) of the laser beam on the surface of the material layer [mm]; Δy is the interval of the scanning pass (scanning pitch) [mm], that is, an interval of irradiation positions of the laser beam along a direction crossing the scanning direction of the laser beam; Δz represents the layer thickness, that is, the Z direction thickness of the material layer to be formed [mm]; ρ represents the density of the material layer; and k represents the thermal conductivity of the powder material P [W/mm/K];

r represents the distance [mm] from the center of the sphere defined with the irradiation position of the laser beam at the center;

x represents a distance [mm] on the XY plane along the scanning direction from the laser irradiation position;

α represents the thermal diffusivity of the powder material P [mm²/s]; and $T_0$ represents the initial temperature of the powder material P [° C.].

A higher value of the power density PD expressed in Formula (1) above, that is, a larger amount of heat flowing into the powder material P facilitates the melting of the powder material P. Formula (1) indicates that at least one of the parameters may be controlled based on the following policy to increase the power density PD to facilitate the melting of the powder material P. Regarding the parameter for example, a powder material P having a high laser beam absorption rate may be used. Regarding the parameters $P_L$ and $P_O$, for example, the laser output may be increased or the amount of heat applied to the powder material P from the external source may be increased. Regarding the parameter d, for example, the spot size of the laser beam may be reduced so that the amount of heat per unit area on the material layer due to the laser beam irradiation increases to increase the heat input efficiency for the amount of heat flowing into the powder material P. Regarding the parameter v, for example, the scanning speed may be reduced and the time period during which the powder material P in a unit area of the material layer is irradiated with the laser beam may be increased, so that the amount of heat flowing into the powder material P increases.

With a smaller value of the power density PD expressed in Formula (1), melting of the powder material P is further suppressed. When the powder material P is excessively melting, at least one of the parameters described above may be controlled in a policy opposite to that described above, to reduce the value of power density PD in Formula (1). The opposite policy is implemented with at least one of the following example policies implemented. Regarding the parameter η, for example, a powder material P having a low absorption rate is used. Regarding the parameters $P_L$ and $P_O$, for example, the laser output is decreased or the amount of heat applied to the powder material P from the external source is decreased. Regarding the parameter d, for example, the spot size is increased. Regarding the parameter v, for example, the scanning speed is increased.

A larger value of the energy density ED Expressed in Formula (2) facilitates the melting of the powder material P. Formula (2) indicates that at least one of the parameters may be controlled based on the following policy to increase the value of the energy density ED to facilitate the melting of the powder material P. Regarding the parameter η, for example, a powder material P having a high laser beam absorption rate is used as in the case of Formula (1) described above. Regarding the parameters $P_L$ and $P_O$, for example, the laser output is increased or the amount of heat applied to the powder material P from an external heating device is increased. Regarding the parameter ρ, for example, the density of the material layer is increased to reduce gaps in the material layer. This facilitates transmission of heat generated by the laser beam irradiation into the powder material P. Regarding the parameter v, for example, the scanning speed may be reduced and the time period during which the powder material P in a unit area of the material layer is irradiated with the laser beam is increased. This increases the amount of heat that flows into the powder material P. Regarding the parameter Δy, for example, the scanning pitch is narrowed. This increases an impact of heat from the adjacent solidified region BE. Regarding the parameter Δz, for example, the layer thickness is reduced. This increases the impact of the heat from the solidified layer already formed as the lower layer (on the negative side in the Z direction), thereby increasing the initial temperature of the powder material P. This configuration can reduce the amount of heat required to raise the temperature of the powder material P irradiated with the laser beam to a desired temperature (a melting point for example).

With a smaller value of the energy density ED expressed in Formula (2), melting of the powder material P is further suppressed. When the powder material P is excessively melting, at least one of the parameters described above may be controlled in a policy opposite to that described above, to reduce the value of energy density ED in Formula (2). The opposite policy is implemented with at least one of the following example policies implemented. Regarding the parameter η, for example, a powder material P having a low absorption rate is used. Regarding the parameters $P_L$ and $P_O$, for example, the laser output is decreased or the amount of heat applied to the powder material P from the external source is decreased. Regarding the parameter ρ, for example, the density is reduced. Regarding the parameter v, for example, the scanning speed is reduced. Regarding the parameter Δy, for example, the scanning pitch is w. Regarding the parameter Δz, for example, the layer thickness is increased.

While the increase in the power density PD and the energy density ED facilitates the melting of the powder material P, excessively increased power density PD and energy density ED affects the convection C in the melt pool MP described above, resulting in more spatter SP and fume FU produced. When the spatter SP scattered from the melt pool MP due to the laser beam irradiation drops onto the material layer that has not yet been irradiated with the laser beam or on the solidified region BE that has been formed, and then is solidified, it remains as a solidified granular deposit on the material layer surface or on the upper surface of the solidified layer. Because the spatter SP is spherical, when a new material layer is formed on the solidified layer, the powder material P is less likely to enter between the bottom of the solidified spatter SP and the surface of the solidified layer on the solidified region BE, and thus voids may be formed. The void formed due to the powder material P failing to enter may cause a melt defect such as a cavity or the like formed inside the solidified layer when the next solidified layer is formed. Furthermore, when the spatter SP is remelted during formation of another solidified region BE, the desired metallographic structure (crystal structure) cannot be obtained at the locations where the spatter SP has been remelted, and thus manufacturing defects may occur.

Furthermore, when the fume FU generated by the laser beam irradiation is accumulated in the vicinity of the position on the material layer irradiated with the laser beam, the energy of the laser beam toward the material layer is attenuated by the fume FU. As a result, the effect of heating the powder material P by the laser beam irradiation might be compromised, and thus an expected melting state might fail to be obtained. As described above, the attachment of the spatter SP and the production of the fume FU involves a risk of occurrence of manufacturing defects such as defects in the 3D manufactured object, shape defects, insufficient strength due to a failure to obtain the desired metallographic structure (crystal structure) due to the melt defects. Thus, the power density PD and the energy density ED need to be controlled so as not to be excessively increased, to suppress the production of the spatter SP and the fume FU which may lead to the manufacturing defect of a 3D manufactured object as described above.

On the other hand, excessively reduced power density PD and energy density ED results in a failure to sufficiently receive the energy of the laser beam by the powder material P, causing melt defects and the like, such as the powder material P not melting (unmelted) or a failure to obtain the melt pool MP of a desired size. Thus, manufacturing defects may occur in the 3D manufactured object. The power density PD and the energy density ED need to be controlled so as not to be excessively reduced.

Thus, the power density PD and the energy density ED need to be kept in a certain range without being too large or too small. This certain range is calculated from the results of various tests and simulations by the user so that a high-quality 3D manufactured object can be obtained. Note that a certain range of the power density PD and the energy density ED for obtaining a high-quality 3D manufactured object is referred to as a desired range.

The temperature distribution T(r) in Formula (3) indicates a temperature expected to be obtained at a position (x, y, z) at any distance r on or in the material layer from the center, which is the position on the material layer irradiated with the laser beam, when the laser beam is emitted onto the material layer under the currently set manufacturing conditions. In other words, Formula (3) is for estimating a state of transmission of heat in the material layer as a result of laser beam irradiation under the currently set manufacturing conditions. Thus, with Formula (3), the progress of the melting of the powder material P or the progress state of solidifying after the melting on the surface of the material layer (X direction and Y direction) and in the depth direction (Z direction) is estimated. With Formula (3), the state of change in temperature of the powder material P depending on the distance from the center with the position irradiated with the laser beam can be estimated. Thus, a range expected to be a melt pool MP, which is a region having a higher temperature than a predetermined temperature (for example, an oval range in the XY plane) can be recognized. The temperature distribution in the range expected to be the melt pool MP can be recognized three-dimensionally according to the distance from the position irradiated with the laser beam. Thus, the state of change in temperature inside the melt pool MP is controlled with the manufacturing conditions set to maintain the temperature distribution T(r) within a certain range. As a result, the crystal structure in the solidified layer after the solidifying can be maintained with a desired structure, and the convection C of the melt pool MP can be controlled.

Furthermore, convection C of the melt pool MP due to the laser beam irradiation affects the shape of the melt pool MP (that is, the shape of the solidified region BE after solidifying and the blending depth during the melting toward the negative side in the Z direction). Thus, with the temperature distribution T(r) maintained in a certain range, the state of the convection C of the melt pool MP, representing the behavior of the heat due to the laser beam irradiation in the melt pool MP, is controlled. As a result, the occurrence of poor blending is suppressed, and the occurrence of manufacturing defects such as insufficient strength and reduced durability of the solidified layer is suppressed. As described above, the convection C affects the generation of the spatter SP or the fume FU. Thus, with the temperature distribution T(r) maintained in a constant range, the production of the spatter SP and the fume FU can be suppressed, whereby the occurrence of manufacturing defects caused by the spatter SP and the fume FU can be suppressed. This certain range is calculated from the results of various tests and simulations by the user so that a high-quality 3D manufactured object can be obtained. Note that a certain range of the temperature distribution T(r) for obtaining a high-quality 3D manufactured object is referred to as a desired range.

It suffices if at least one of the basic conditions (1) to (3) satisfies the desired range.

Next, a description will be given on processing executed by the detection unit 54, the calculation unit 56, and the determination unit 57 for changing the manufacturing conditions based on Formula (1) to (3) described above.

The detection unit 54 obtains the state of the detection target region described above based on the image data from the imager 41. The state of the detection target region includes at least one of: the state of the powder material P before being heated by the laser beam irradiation; the melting state in the detection target region; the state of the spatter SP; and the state of the fume FU produced by heating due to the laser beam irradiation. The detection unit 54 obtains information on a temperature of at least a part of the melt pool MP and a portion therearound (a semi-solidified region in which the melt transitioned into a solid phase after melting, or the solidified region BE), as an example of the melting state in the detection target region. The detection unit 54 obtains, for example, at least one of a spattering direction, a spattering amount, and a spattering speed of the spatter SP, as the state of the spatter SP. The detection unit 54 obtains, for example, at least one of the concentration and the range of the fume FU as the state of the fume FU. Considering the state of the detection target region that is the target of the obtaining (specifically, the state of the powder material P, the melting state, the state of the spatter SP, the state of the fume FU, and the like described above), obtaining the state of the detection target region can be regarded as an act of measuring the state of the detection target region, calculating the state of the detection target region, evaluating the state of the detection target region, or detecting a state of the detection target region.

A change in the manufacturing conditions based on the state of the detection target region obtained by the detection unit 54 according to the present embodiment includes a real time change, a change for forming a next layer, and a change for producing the next manufactured object. With the real time change, the manufacturing conditions are changed when the material layer used for obtaining the state of the detection target region is irradiated with the laser beam to form the solidified layer or while the solidified layer is being formed. Thus, with the real time change, the manufacturing conditions are changed for the unfused powder material P in the material layer while the solidified layer is being formed. With the change for forming the next layer, the manufacturing conditions are changed when forming, after a solidified layer has been formed, the next material layer or the solidified layer is started to be formed from the next material layer of the next layer. Therefore, with the change for forming the next layer, the manufacturing conditions are changed for the new powder material P supplied on the solidified layer formed or for the new powder material P supplied on the solidified layer. With the change for producing the next manufactured object, the manufacturing conditions are changed when the layering of the solidified layers have been completed, that is, when the production of a 3D manufactured object has been completed, and production of the next 3D manufactured object starts.

Now, processing of obtaining the state of the detection target region by the detection unit 54, and processing of generating the change information for changing the manufacturing conditions by the calculation unit 56 will be separately described below.

(1) Processing of Determining State of Detection Target Region

The detection unit 54 obtains the state of the detection target region on the material layer using the image data generated by the imager 41. As described above, the image data output from the imager 41 includes information on light beams with the different wavelengths $\lambda 1$ and $\lambda 2$ in the thermal radiation light from the detection target region. The detection unit 54 obtains information on the temperature of at least a part of the melt pool MP and a portion therearound, based on the ratio between the brightness information on the wavelength $\lambda 1$ included in the image data on the image including the detection target region and the brightness information on the wavelength $\lambda 2$ included in the image data. In this case, the detection unit 54 generates image data (hereinafter, referred to as thermal image data) in which the brightness information pieces of the wavelength $\lambda 1$ and the wavelength $\lambda 2$ in the image data are converted into temperature by using a known two-color method for example. The thermal image data is the signal intensity at each pixel corresponding to the temperature. The detection unit 54 calculates the ratio (for example, the ratio between the brightness values) between the brightness information on the light with the wavelength $\lambda 1$ and the brightness information on the light with the wavelength $\lambda 2$ included in the image data, and compares the ratio with data indicating the relationship between the reference ratio obtained based on gray or black colored objects or the like and the temperature, to convert the ratio between the brightness values of the wavelengths $\lambda 1$ and $\lambda 2$ at any position on the image data into temperature. Thus, the thermal image data representing the temperature at any position on the detection target region on the image data is generated. The detection unit 54 can obtain, from the thermal image data, a temperature distribution, a maximum temperature, a minimum temperature, an average temperature, and the like of the detection target region. The detection unit 54 generates the thermal image data for each image data generated by the imager 41. Each thermal image data generated by the detection unit 54 is stored and preserved in the storage 58.

Figure 5:
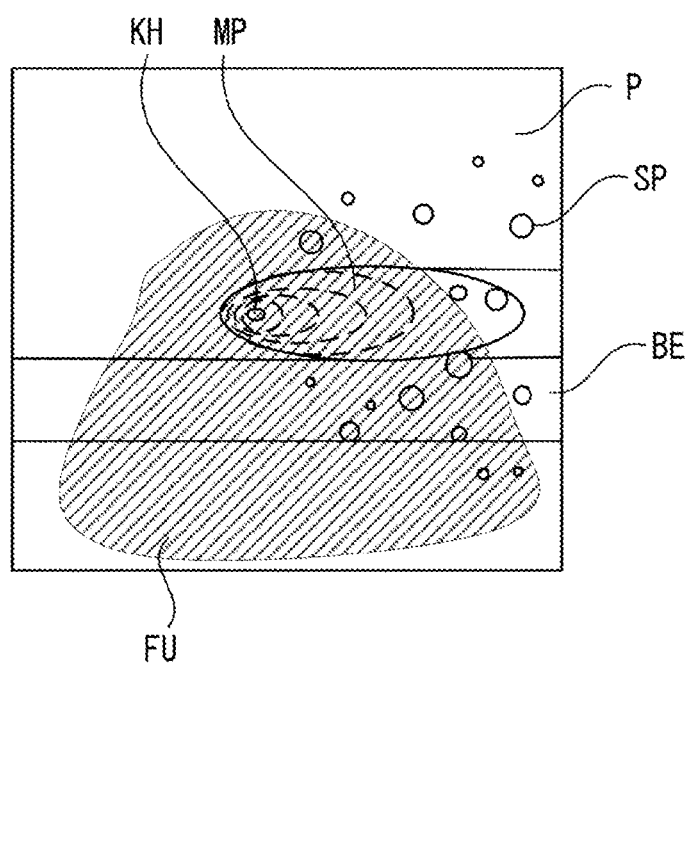
FIG. 5 is a diagram schematically illustrating an example of a thermal image corresponding to generated thermal image data.

FIG. 5 is a diagram schematically illustrating an example of a thermal image corresponding to the thermal image data generated by the detection unit 54 based on the image data obtained by imaging the detection target region illustrated in FIG. 4(a), and illustrates a case where the material layer is scanned by the laser beam from the positive side toward the negative side in the X direction. Note that, in FIG. 5, for convenience of illustration, a difference in temperature in the melt pool MP in the thermal image is represented by the isotherms indicated by the dotted line, and a hatched area represents a range affected by the fume FU.

As described above, while the material layer is being irradiated with laser beam, the detection target region including the melt pool MP of the material layer is imaged by the imager 41. Thus, the generated thermal image data (thermal image) includes the melt pool MP, the solidified region BE where the solidifying has completed, and the powder material P, with the keyhole KH at the center of the image. Since the laser beam scanning is performed toward the negative side in the X direction, in the thermal image, the melt pool MP is an oval shaped region that is larger on the positive side in the X direction than on the negative side in the X direction from the keyhole KH. When the particulate spatter SP scatters due to the laser beam irradiation, the spatter SP is also included in thermal image data (thermal image) because it has heat. Furthermore, in the case where the fume FU, which is an evaporate, is produced by the laser beam irradiation, the fume FU is also included in the thermal image data (thermal image) because it has heat.

The detection unit 54 obtains, from the thermal image illustrated in FIG. 5, as the state of the detection target region, the state of the powder material P before heating due to the laser beam irradiation, the melting state in the detection target region, the state of the spatter SP, and the state of the fume FU. Now, a description will be separately given on detection of the state of the powder material P before the heating by the laser beam irradiation, detection of the melting state in the detection target region, detection of the state of the spatter SP, and detection of the state of the fume FU that are the states of the detection target region.

<Detection of State of Powder Material P Before Heating by Laser Beam Irradiation>

The detection unit 54 obtains, in the thermal image data, information on the temperature of a region other than the melt pool MP or the solidified region BE, as the state of the powder material P before the heating by the laser beam irradiation, for example. In this case, the detection unit 54 obtains a region with a temperature lower than a first predetermined temperature. The first predetermined temperature is set, for example, based on the melting point of the powder material P. Note that the first predetermined temperature is not limited to the melting point, and may be a solidus temperature or a liquidus temperature, or may be a temperature in a range from the solidus temperature to the liquidus temperature.

When the detection unit 54 obtains the temperature of the powder material P in the material layer before heating by the laser beam irradiation, a region in the scanning direction relative to the laser beam irradiation position can be estimated as a region on the material layer in which the temperature of the powder material P is to be obtained. The detection unit 54 obtains the temperature of a region of the estimated region that is lower than the first predetermined temperature as the temperature of the powder material P before heating by the laser beam irradiation.

Note that the detection unit 54 may identify the melt pool MP and the solidified region BE from the image data on the detection target region captured by an imager different from the imager 41, and based on the melt pool MP and the solidified region BE identified in the image data, may identify the powder material P before heating by the laser beam irradiation on the thermal image data by removing the melt pool MP and the solidified region BE from the thermal image data. In this case, the imager 41 and the imager different from the imager 41 need to be controlled to synchronize the timing of capturing the images of the detection target region.

Using the thermal image data, the detection unit 54 obtains the temperature distribution, the maximum temperature, the minimum temperature, the average temperature, and the like of the powder material P before heating, as information on the temperature of the powder material P before heating by the laser beam irradiation. As a result, the detection unit 54 can obtain an initial temperature $T_0$, which is a parameter according to Formula (3) above.

Furthermore, the detection unit 54 may use a known image processing method on the image data captured by the imager 41 to identify the foreign matter and the spatter SP included in the powder material P as the state of the powder material P before heating.

Note that the detection unit 54 may not obtain the state of the powder material P before heating by the laser beam irradiation from the thermal image data based on the two-color method. For example, the acquisition unit 310 may acquire temperature data based on infrared radiation from the powder material P before the laser beam irradiation using a known radiation thermometer instead of the imager 41, the bifurcated optical system 42, the chromatic aberration correction optical system 43, and the field stop 302. In this case, the detection unit 54 may determine the state of the powder material P before heating by the laser beam irradiation based on the temperature data acquired by the acquisition unit 310 (the radiation thermometer not illustrated).

Furthermore, the acquisition unit 310 may not use the radiation thermometer, and may use a known contact thermometer such as a thermocouple. In this case, as the acquisition unit 310, a plurality of thermocouples are installed at any positions in the manufacturing tank 31 of the manufacturing unit 30 and in the material layer forming unit 20, and temperature data of the respective positions is acquired by the plurality of thermocouples. Then, the detection unit 54 may use the data on the correlation between the temperature data obtained by the thermocouple and the temperature data on the powder material P before heating by the laser beam irradiation to obtain the state of the powder material P before heating by the laser beam irradiation. Note that the data on the correlation between the temperature data obtained by the thermocouple and the temperature data on the powder material P before heating by the laser beam irradiation is stored in the storage 58 in advance.

<Detection of Melting State>

The detection unit 54 obtains, from the thermal image data, information on the temperature of the melt pool MP and a portion therearound (the solidified region BE in the detection target region) as the melting state. In this case, the detection unit 54 obtains a region in the thermal image data with a high temperature equal to or higher than the first predetermined temperature as a region including the keyhole KH and the melt pool MP. When detection unit 54 obtains the temperature of the solidified region BE after laser beam irradiation, the region in the direction opposite to the scanning direction with respect to the irradiation position of the laser beam can be estimated as the region in which the temperature of the solidified region BE is to be determined. The detection unit 54 obtains the temperature of a region of the estimated region that is lower than the first predetermined temperature as the temperature of the solidified region BE after heating by the laser beam irradiation.

Note that the detection unit 54 may estimate a region (semi-solidified region) where the melt pool MP in a liquid phase has started to be solidified and thus transitioned to a solid phase, among regions at or above the first predetermined temperature in the thermal image data, to obtain the temperature of the region separately from the keyhole KH and the melt pool MP.

Information on the temperature of at least a part of the melt pool MP and a portion therearound obtained by the detection unit 54 includes: a temperature distribution, a maximum temperature, a minimum temperature, an average temperature of the melt pool MP; a position of the keyhole KH; an opening diameter of the keyhole KH (for example, the length of the short axis) at the uppermost surface (surface of the material layer); the size of the melt pool MP and the thermal conductivity; the temperature gradient on the surface of the melt pool MP; the solidification rate indicating a change in temperature at a boundary portion of the melt pool MP on the surface; a thermal history of the melt pool MP; and the like. Similarly, the detection unit 54 obtains the temperature distribution of the solidified region BE and the semi-solidified region, the maximum temperature of the solidified region BE and the semi-solidified region, the minimum temperature of the solidified region BE and the semi-solidified region, the average temperature of the solidified region BE and the semi-solidified region, the size of the solidified region BE and the semi-solidified region, the thermal conductivity of the solidified region BE and the semi-solidified region, the temperature gradient of the solidified region BE and the semi-solidified region, the solidification rate of the solidified region BE and the semi-solidified region, the thermal history of the solidified region BE and the semi-solidified region, and the like, as the information on temperature.

The detection unit 54 obtains the temperature at a plurality of positions in a region of the thermal image data estimated to be the melt pool MP, and determines the temperature distribution of the melt pool MP by setting an isotherm for each predetermined temperature, for example. The detection unit 54 obtains the highest temperature among the regions of the thermal image data estimated to be the melt pool MP as the maximum temperature, and determines the lowest temperature as the minimum temperature. The detection unit 54 obtains the temperature at each of a plurality of positions in the region of the thermal image data estimated to be the melt pool MP, and calculates the average temperature of the melt pool MP by calculating the average of the determined temperatures. The detection unit 54 obtains the center of the thermal image data to be the position of the keyhole KH. The detection unit 54 obtains a range that can be regarded as being at a temperature approximately the same as the temperature at the center of the thermal image data as the opening of the keyhole KH on the upper surface, and determines the length of the short axis of the opening thus obtained, as the opening diameter.

The detection unit 54 obtains the size of the melt pool MP from the area of the region at or above the first predetermined temperature on the thermal image. From the size of the melt pool MP, the detection unit 54 obtains the thermal conductivity. In this case, the detection unit 54 calculates the thermal conductivity by converting the distance from the keyhole KH in the thermal image data to the position at the first predetermined temperature into the distance r on the material layer, inputs a value of the first predetermined temperature, the distance r, and a value of each parameter determined by the currently set manufacturing conditions in Formula (3), and calculates the thermal conductivity by solving the Formula (3) described above for the parameter k.

The detection unit 54 obtains a temperature gradient on the surface of the melt pool MP, and a solidification rate, which is a change in temperature at the boundary portion of the melt pool MP on the surface, based on how dense/sparse the isotherms are on the thermal image (thermal image data).

Using the plurality of pieces of thermal image data pieces generated by capturing images at a predetermined interval, the detection unit 54 obtains the thermal history in the melt pool MP and a portion therearound. The thermal history is data representative of temperature changes in a certain location of the material layer. An example of the detection of the thermal history is described below.

As described above, the image data generated by the imager 41, irradiation position information indicating the irradiation position (i.e., the position of the keyhole KH) of the laser beam, and time information are stored in association with each other. The detection unit 54 obtains the thermal history based on the irradiation position information associated with the image data. The processing of detecting the thermal history executed by the detection unit 54 is described in an example where the thermal history is obtained for a position Q1 separated from a position Q2 where the keyhole KH (that is, the center of the image) is provided by a distance m toward the positive side in the X direction in the certain thermal image (first thermal image). The detection unit 54 obtains the temperature at the position Q1 from the first thermal image data. Then, after a predetermined period of time (after the irradiation position of the laser beam has changed by a predetermined distance), the detection unit 54 obtains the position Q1 on a second thermal image different from the first thermal image.

Specifically, the detection unit 54 obtains the position of the keyhole KH1 on the material layer that is the center in the first thermal image and the position of the keyhole KH2 on the material layer that is the center in the second thermal image, based on the irradiation position of the laser beam at the time when first image data is generated and the irradiation position of the laser beam at the time when second image data is generated. When the scanning with the laser beam is performed toward the negative side in the X direction, the position Q2 (the keyhole KH in the first thermal image) on the second thermal image is at a position shifted from the center of the second thermal image toward the positive side in the X direction by a value of a distance on the thermal image corresponding to a difference n between positions of the keyholes KH1 and KH2 on the material layer. The detection unit 54 obtains the position Q1 as a position separated from the position Q2 on the second thermal image toward the positive side in the X direction by the distance m, and obtains the temperature at this position from the second thermal image data. The detection unit 54 can obtain the thermal history at the position Q1 by similarly obtaining the temperature at the position Q1 from a plurality of pieces of thermal image data thereafter.

The detection unit 54 obtains information on the temperature of the solidified region BE from the thermal image data as a state of a portion around the melt pool MP. In this case, the detection unit 54 obtains the temperature distribution, the average temperature, and the like of the solidified region BE. Note that the detection unit 54 may obtain the information on the temperature of the powder material P obtained as the state of the powder material P before heating, as the state of a portion around the melt pool MP.

The detection unit 54 may not obtain, from the thermal image data based on the two-color method, information (that is, the melting state) on the temperature of the melt pool MP and the portion therearound (the solidified region BE in the detection target region). For example, the acquisition unit 310 may acquire temperature data based on infrared radiation from the melt pool MP and a portion therearound using a known radiation thermometer instead of the imager 41, the bifurcated optical system 42, the chromatic aberration correction optical system 43, and the field stop 302. In this case, the detection unit 54 may determine the melting state based on the temperature data acquired by the acquisition unit 310 (the radiation thermometer not illustrated).

Furthermore, the acquisition unit 310 may not use the radiation thermometer, and may use a known contact thermometer such as a thermocouple. In this case, as the acquisition unit 310, a plurality of thermocouples are installed at any positions in the manufacturing tank 31 of the manufacturing unit 30 and in the material layer forming unit 20, and temperature data of the respective positions is acquired by the plurality of thermocouples. Then, the detection unit 54 may utilize data on the correlation between the temperature data obtained by the thermocouple and the temperature data on the melt pool MP and a portion therearound (the solidified region BE within the detection target region) to obtain the melting state. The data on the correlation between the temperature data obtained by the thermocouple and the temperature data on the melt pool MP and a portion therearound (the solidified region BE within the detection target region) may be stored in the storage 58 in advance.

<Detection of State of Spatter SP>

The detection unit 54 obtains at least one of a spattering amount, a spattering direction, and a spattering speed of the spatter SP as the state of the spatter SP. As described above, the state of the spatter SP is associated with the convection C in the melt pool MP. Thus, the detection unit 54 can indirectly obtain the state of the convection C inside the melt pool MP by obtaining the state of the spatter SP.

Figure 6:
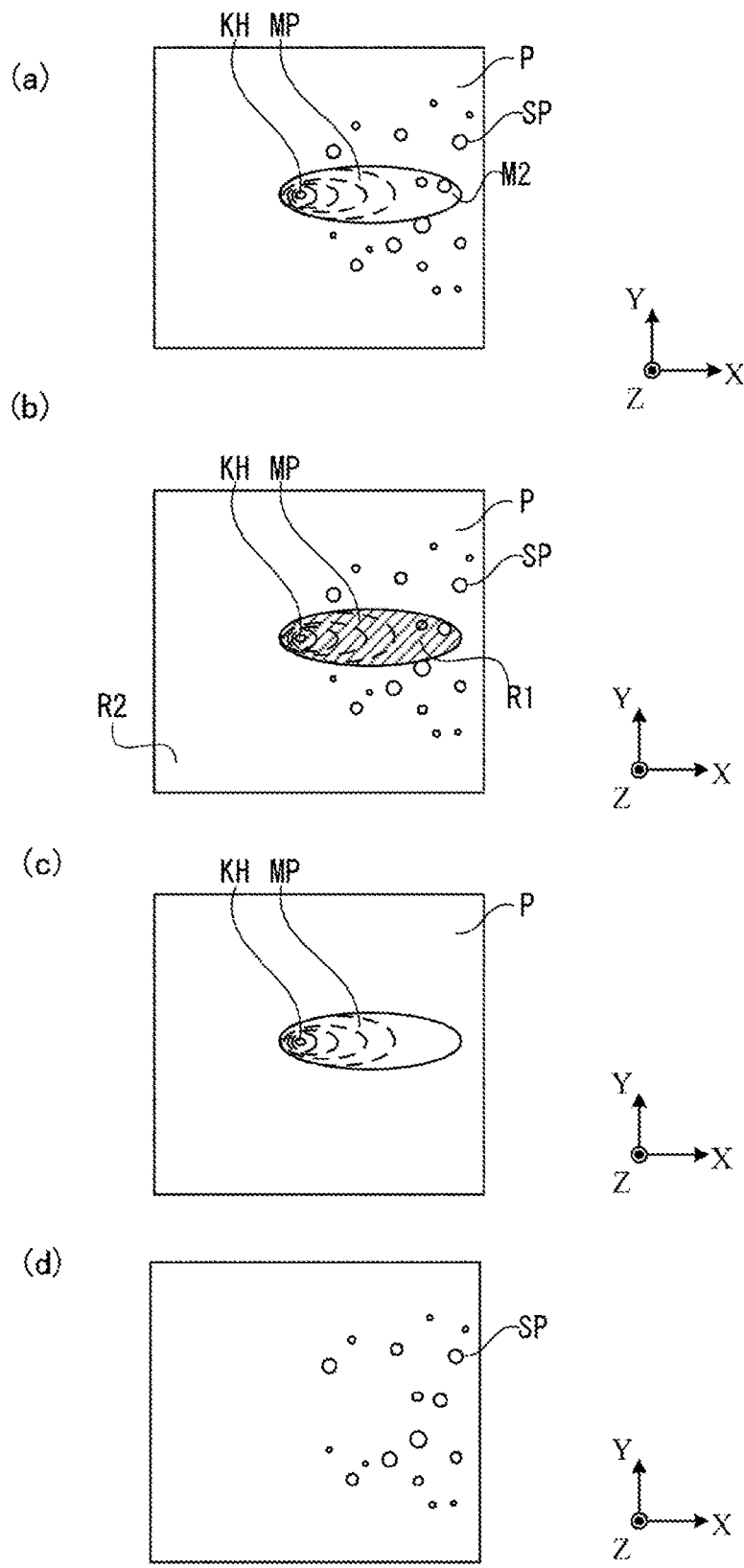
FIG. 6 is a diagram for explaining a process for determining a state of a spatter from the generated thermal image data.

FIG. 6 illustrates, for convenience of explanation, a thermal image as a result of removing the fume FU and the solidified region BE from that in FIG. 5, as a thermal image corresponding to the thermal image data used to determine the state of the spatter SP. The detection unit 54 sets the region of interest used to determine the state of the spatter SP in the thermal image data.

In this case, the detection unit 54 sets, as the region of interest, a region excluding a region occupied by the keyhole KH and the melt pool MP in the thermal image illustrated in FIG. 6(*a*). The detection unit 54 can estimate, for example, a region (removal target region) including the keyhole KH and the melt pool MP, using Formula (3) expressing the temperature distribution T(r) described above. Formula (3) expressing the temperature distribution T(r), as described above, uses as the parameter, the temperature of the powder material P at any distance r from the irradiation position of the laser beam (that is, the position of the keyhole KH), and uses manufacturing conditions for producing a 3D manufactured object such as the laser beam output.

The detection unit 54 obtains the high-temperature region at or above the first predetermined temperature including the position of the keyhole KH (that is, the center of the thermal image), based on the Formula (3) expressing the temperature distribution T(r) and the set manufacturing conditions, and determines the determined high-temperature region to be the removal target region. As described above, the melt pool MP has an oval shape on the XY plane, and thus the region including the keyhole KH and the melt pool MP has an oval shape. The detection unit 54 inputs the value of the first predetermined temperature and the values of each parameters determined by the currently set manufacturing conditions into the temperature distribution T(r) in Formula (3), and calculates the parameter r to calculate an oval region at or higher than the first predetermined temperature. The detection unit 54 detects, on the thermal image data (thermal image), a region included in the calculated oval region as a high-temperature region, and determines the high-temperature region to be the removal target region.

Note that the removal target region is not limited to the region including the keyhole KH and the melt pool MP detected, and a region including the solidified region BE in addition to the high-temperature region of the oval shape described above may be detected as the removal target region.

FIG. 6(b) is a diagram schematically illustrating a removal target region R1 (illustrated as a hatched area in FIG. 6(b)) obtained by the detection unit 54 for the thermal image illustrated in FIG. 6(a), and a region of interest R2 set based on the removal target region R1. The region of interest R2 is the area in which no melting of the powder material P has occurred due to the laser beam irradiation. Thus, in a case where the region of interest R2 includes a high-temperature region, the detection unit 54 obtains the high-temperature region to be the spatter SP. The detection unit 54 obtains the spattering amount of the spatter SP by counting the number of high-temperature regions included in the region of interest R2.

The detection unit 54 can determine the spattering direction of the spatter SP on the XY plane by obtaining the direction from the center of the thermal image, that is, from the irradiation position of the laser beam, toward each of the high-temperature regions included in the region of interest R2.

The detection unit 54 obtains the spattering speed of the spatter SP using the plurality of pieces of thermal image data. The detection unit 54 extracts, for example, a spatter SP that has dropped and attached onto the material layer or the solidified region BE, that is, the spatter SP staying in the same portion on the material layer or the solidified region BE from two pieces of thermal image data different from each other in the time information, and excludes the spatter SP from the spattering speed detection target, as in the case of obtaining the thermal history. The detection unit 54 obtains, from among the spatters SP remaining as the detection target (that is, the spatters SP that have been displaced over time), spatters SP the size and the temperature of which can be regarded as being the same between one thermal image data (thermal image) and the other thermal image data (thermal image), as the scattering spatter SP (the same spatter). The detection unit 54 obtains, for the spatter SP determined to be the same spatter, a position (first position) in a space above the material layer from one thermal image data (thermal image) and obtains a position (second position) in a space above the material layer from the other thermal image data (thermal image). The detection unit 54 calculates (detects) the spattering speed of the spatter SP (the same spatter SP scattering) from the first position, the second position, and the difference in time information between the two pieces of thermal image data.

Note that the detection unit 54 may determine the state of the spatter SP without setting the region of interest R2 on the thermal image data (thermal image). In this case, the detection unit 54 sums up and averages the plurality of pieces of thermal image data generated from the image data output by the imager 41 to generate average thermal image data. Note that the plurality of pieces of thermal image data may be thermal image data generated from image data associated with different pieces of time information. The plurality of pieces of thermal image data may be thermal image data at different time points or different positions generated in advance and stored in the storage 58. The detection unit 54 may generate the average thermal image data each time the thermal image data is generated, or may generate the average thermal image data each time a predetermined number of pieces of thermal image data are generated. The generation state of the spatter SP (the number, position, size, and the like of the spatter SP on the thermal image data) varies among pieces of thermal image data. Thus, at the same position in a plurality of thermal images, a spatter SP detected in a certain thermal image may not necessarily be detected on many other thermal images. In the average thermal image data generated based on these plurality of pieces of thermal image data (average thermal images), the spatter SP is removed by summing up and averaging the position at which the spatter SP is detected in certain thermal image data (thermal image) and the positions where the spatter SP is not detected in many other pieces of thermal image data (thermal images). The average thermal image data (average thermal image) from which the spatter SP has been removed includes the keyhole KH and the melt pool MP.

FIG. 6(c) schematically illustrates an example of an average thermal image corresponding to the average thermal image data generated by the processing described above. As illustrated in FIG. 6(c), the average thermal image includes no high-temperature region other than the keyhole KH and the melt pool MP. The detection unit 54 obtains a difference between the thermal image data (detection target image data) corresponding to the thermal image for detecting the spatter SP illustrated in FIG. 6(a) and the average thermal image data corresponding to the average thermal image illustrated in FIG. 6(c). As a result, as illustrated in FIG. 6(d), an image in which the keyhole KH and the melt pool MP have been removed is generated from the detection target data. Since the high-temperature region on the image is the spatter SP, the detection unit 54 obtains at least one of the spattering amount, the spattering direction, and the spattering speed of the spatter SP a manner that is the same as that described above with reference to FIG. 6(b). In particular, the detection unit 54 can also determine the spattering direction of the spatter SP that has scattered in the positive side in the X direction (rearward with respect to the scanning direction of the laser beam) with respect to the center of the thermal image.

Note that the detection unit 54 may not obtain the state of the spatter from the thermal image data based on the two-color method. For example, the acquisition unit 310 may acquire image data on the detection target region using an imager (not illustrated), instead of the imager 41, the bifurcated optical system 42, the chromatic aberration correction optical system 43, and the field stop 302. The imager (not illustrated) may have the same configuration as the imager 41 in FIG. 1, or may have other known configurations. In this case, the detection unit 54 executes known image processing on the image data acquired by the acquisition unit 310 (imager (not illustrated)), and detects a circular image of a predetermined size as an image of the spatter in the image. Then, the detection unit 54 obtains at least one of the spattering amount, the spattering direction, and the spattering speed of the spatter SP from a change in the position of the detected image of the spatter over time and the number of such positions.

Note that the correlation between the state of the spatter SP and the melting state of the melt pool MP can be recognized from the correlation between the state of the spatter SP (spattering amount, spattering direction, and spattering speed of the spatter SP) and the convection C of the melt pool MP, and the correlation between the convection C of the melt pool MP and the melting state of the melt pool MP (information on temperature). Thus, the detection unit 54 may determine the melting state of the melt pool MP (indirectly) based on the state of the spatter SP obtained. In this case, data on the correlation between the state of the spatter SP and the melting state of the melt pool MP is stored in the storage 58 in advance.

<Detection of State of Fume FU>

The detection unit 54 obtains at least one of the concentration and the range of the fume FU from the thermal image data as the state of the fume FU. As described above, the state of the fume FU is associated with the convection C in the melt pool MP. Thus, the detection unit 54 can indirectly obtain the state of the convection C inside the melt pool MP by obtaining the state of the fume FU.

Figure 7:
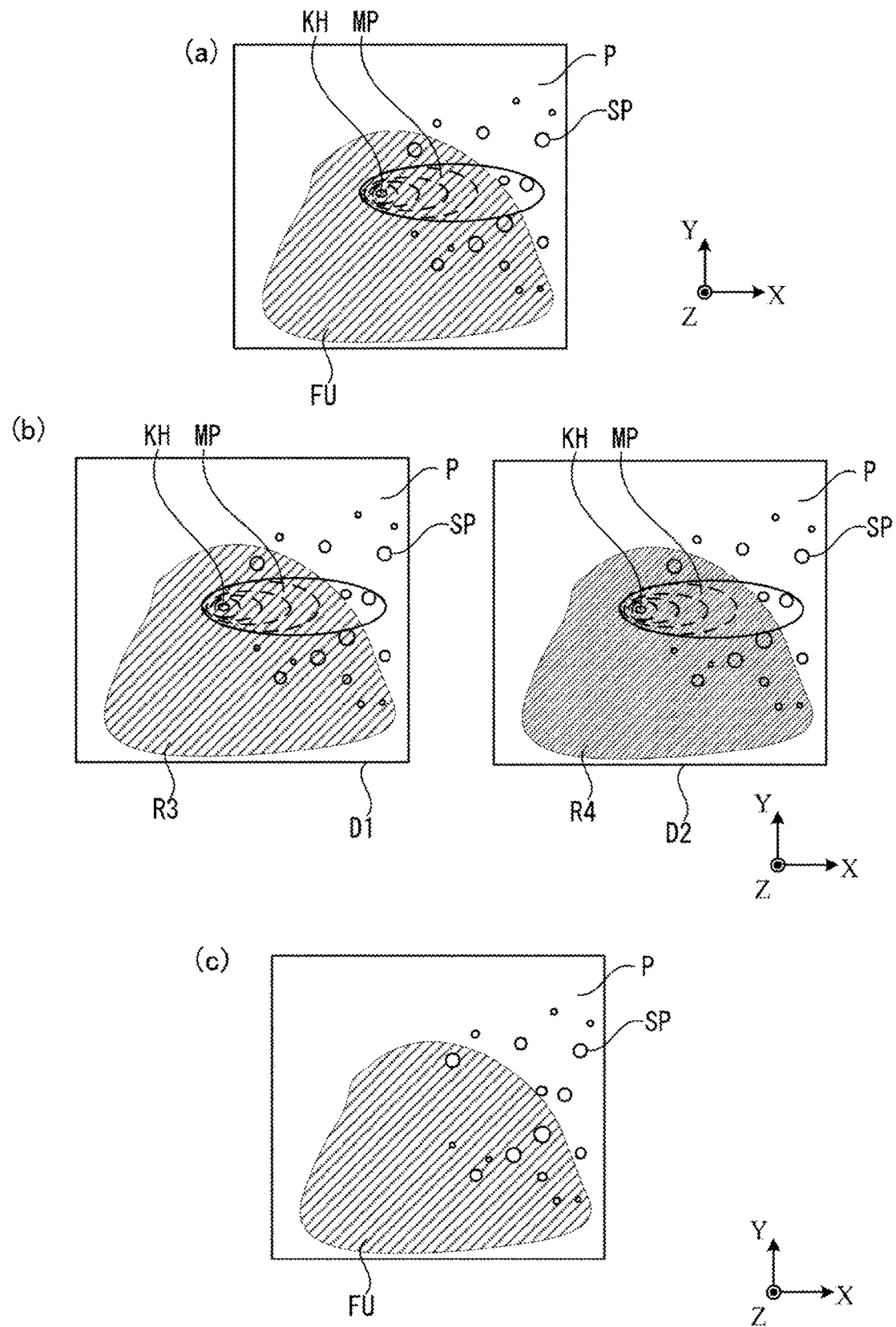
FIG. 7 is a diagram for explaining a process for determining a state of a fume from generated thermal image data.

FIG. 7 illustrates an example of a thermal image corresponding to the thermal image data used to obtain the state of the fume FU. Note that, in FIG. 7, the solidified region BE is omitted for convenience of illustration. As described above, since the fume FU is produced from the melt pool MP formed by the laser beam irradiation, the light from the detection target region of the material layer is affected by the fume FU to have the brightness reduced. Note that in FIG. 7, the hatched region represents a region in which the brightness value has decreased due to the influence of the fume FU.

FIG. 7(*a*) illustrates a thermal image that is the same as the thermal image illustrated in FIG. 5. FIG. 7(*b*) illustrates images corresponding to pieces of image data generated with the light with the wavelength $\lambda 1$ and the light with the wavelength $\lambda 2$ respectively incident on different positions on the image sensor 411. This image data is original image data of the thermal image data corresponding to the thermal image. The original images illustrated in FIG. 7(*b*) includes an image D1 based on the light with the wavelength $\lambda 1$ on the left side of the diagram, and an image D2 based on the light with the wavelength $\lambda 2$ on the right side of the diagram.

As described above, since the brightness value of the emitted light from the detection target region of the material layer is affected by the fume FU, the brightness value of both the image D1 and the image D2 are reduced. The image D1 is assumed to be a brighter (high brightness) image than the image D2. However, because light is affected by the fume FU to be scattered, the brightness drops in a region R3 and a region R4 affected by the fume FU in both the bright image D1 and the dark image D2. The rate of this reduction of brightness is substantially the same between the bright image D1 and the dark image D2. The detection unit 54 distinguishes the melt pool MP, the keyhole KH and the spatter SP, from the fume FU based on whether the ratio of the brightness value between the image D1 and the image D2 changes. Because the fume FU blocks light from the melt pool MP, the brightness value of both the light with the first wavelength $\lambda 1$ and the light with the second wavelength $\lambda 2$ decreases, but the ratio of the brightness value between the image D1 and the image D2 remains unchanged. On the other hand, the melt pool MP, the keyhole KH, and the spatter SP involves a change in the ratio of the brightness values. Since the brightness information on each pixel of the image D1 and the image D2 is known, the detection unit 54 can distinguish the melt pool MP, the keyhole KH, and the spatter SP, from the fume FU based on whether the ratio of the brightness value changes. The detection unit 54 obtains the fume FU (the region R3 in the image D1 and the region R4 in the image D2) thus distinguished as a range of the fume FU.

The detection unit 54 obtains the concentration of the fume FU by determining the degree of reduction in the brightness value using either the image D1 or the image D2. The detection unit 54 calculates the difference between the brightness value of the range of the fume FU determined as described above (the region R3 in the image D1 or the region R4 in the image D2), and the brightness value of the other region, that is, the region not affected by the fume FU and thus the brightness value is not reduced, and calculates the concentration of the fume FU based on this difference. Note that data associating the difference between the brightness values with the concentration of the fume is stored in advance in the storage 58, and the detection unit 54 refers to this data to calculate the concentration of the fume FU from the calculated difference. Note that the detection unit 54 may compare the brightness value of the image D1 or the image D2 in the image data acquired at a timing different from that when the image data corresponding to the original image illustrated in FIG. 7(*b*) is acquired, and the brightness value of the image D1 or image D2 in the image data of the master image of FIG. 7(*b*), to calculate the difference.

Note that in the images D1 and D2, the brightness values of the image D1 and the image D2 are both reduced due to the influence of the fume FU, and thus the thermal image generated based on the ratio between the brightness information on the light with the wavelength $\lambda 1$ and the brightness information on the light with the wavelength $\lambda 2$ is free of influence of the thermal radiation light being blocked by the fume FU.

Note that the detection unit 54 may determine the state of the fume FU using the average thermal image data. The average thermal image data is generated in a manner that is the same as that in the generation method described in the processing for obtaining the state of the spatter SP. The state of production of the fume FU (concentration and range of the fume FU on the thermal image data) varies among pieces of thermal image data. Thus, at the same position in a plurality of thermal images, a fume FU detected in a certain thermal image may not necessarily be detected on many other thermal images. In the average thermal image data generated by averaging these plurality of pieces of thermal image data, the influence of the fume FU is removed by summing and averaging the position in thermal image data affected by the fume FU and positions in many other pieces of thermal image data unaffected by the fume FU. The average thermal image data from which the fume FU has been removed includes the keyhole KH and the melt pool MP. In this case, the detection unit 54 generates average thermal image data corresponding to the average thermal image similar to that illustrated in FIG. 6(*c*).

The detection unit 54 obtains a difference between the thermal image data (detection target image data) corresponding to the thermal image for detecting the fume FU illustrated in FIG. 7(*a*) and the average thermal image data. As a result, as illustrated in FIG. 7(*c*), an image in which the keyhole KH and the melt pool MP have been removed is generated from the detection target data. The high-temperature region on the image (image data) corresponds to the fume FU and the spatter SP. The spatter SP appears as a small spot on the image (image data), and thus the detection unit 54 obtains the range of the fume FU by removing high-temperature regions indicated by such spots from the image data. As a result, the detection unit 54 obtains the diffusion state of the fume FU, that is, the range of the fume FU. Since the fume FU also carries an amount of heat, the detection unit 54 obtains the temperature in the range of the fume FU detected, from the image data corresponding to the image illustrated in FIG. 7(c). A higher temperature indicates a larger amount of fume FU produced, that is, a higher concentration of the fume FU. Accordingly, the detection unit 54 obtains the concentration of the fume FU based on the temperature within the range of the fume FU obtained. In this case, data in which the temperature and concentration of the fume FU are associated with each other is stored in advance in the storage 58, and the detection unit 54 can refer to this data and obtain the concentration of the fume FU from the temperature obtained in the image illustrated in FIG. 7(c).

Note that in the processing for obtaining the state of the spatter SP described above with reference to FIG. 6, from which the fume FU is omitted. However, in actual cases, the fume FU may be generated and the thermal image may include an image of the fume FU. Thus, the detection unit 54 distinguishes the melt pool MP, the keyhole KH, and the spatter SP from the fume FU using the method described in the processing for obtaining the state of the fume FU, and removes the fume FU from the thermal image data (thermal image). The detection unit 54 may acquire the state of the spatter SP from the thermal image data (thermal image) from which the fume FU has been removed using the method described with reference to FIG. 6. Furthermore, the detection unit 54 may determine the state of the spatter SP by distinguishing the fume FU and the spatter SP based on the difference in area, from the image data corresponding to the image illustrated in FIG. 7(c) generated based on the average thermal image data. In this case, an area that can be assumed in advance as the size of the spatter SP is set as a threshold value, and the detection unit 54 identifies a region larger than this threshold value as the fume FU, and the region smaller than the threshold value as the spatter SP.

Note that the detection unit 54 may not obtain the state of the fume FU from the thermal image data based on the two-color method. For example, the acquisition unit 310 may use an illumination device and an imager (not illustrated), instead of the imager 41, the bifurcated optical system 42, the chromatic aberration correction optical system 43, and the field stop 302. In this case, as an example, an illumination device and an imager are respectively disposed on the positive and the negative side in the X direction with respect to the center of the base plate 311 in FIG. 1, in the space between the base plate 311 and the manufacturing optical system 35. Note that the illumination device and the imager are arranged facing each other so that the illumination light from the illumination device is received by the imager. As an example, the illumination device (not illustrated) is a known surface-emitting LED, and the imager (not illustrated) has the same configuration as the imager 41 in FIG. 1.

Here, when the fume FU is generated in the space between the base plate 311 and the manufacturing optical system 35 due to the laser beam irradiation, the illumination light from the illumination device is scattered by the fume FU before being received by the imager. Thus, compared with the intensity of light received via a region including no fume FU, the intensity of the light received via the region where the fume FU is produced is low. Accordingly, the detection unit 54 can determine a range in which the fume is produced by comparing the signal intensity at each pixel in the image data generated by the imager with a predetermined threshold value.

Further, a higher concentration of the fume FU leads to a larger impact of the scattering due to the fume FU, resulting in a larger attenuation of the intensity of the illumination light from the illumination device. Accordingly, the detection unit 54 can determine the concentration (distribution of concentration) of the fume FU based on the signal intensity at each pixel in the image data generated by the imager.

Note that the acquisition unit 310 may have sets of illumination devices (not illustrated) and imagers arranged in different orientations (for example, the illumination devices are respectively disposed on the positive side in the X direction and the positive side in the Y direction and the imagers are respectively disposed on the negative side in the X direction and on the negative side in the Y direction with respect to the center of the base plate 311). Under this condition, the detection unit 54 may obtain the spatial range and concentration of the fume FU produced, based on the signal intensity at each pixel in the pieces of image data respectively generated by the imagers.

Note that the illumination device (not illustrated) may not be a surface-emitting LED, and other known components may be used as long as it is capable of emitting surface light in a space in which the fume FU is likely to be produced. Furthermore, surface emission is not an essential feature, and a known point-emitting illumination device may be used.

Note that the correlation between the state of the fume FU and the melting state of the melt pool MP can be recognized from the correlation between the state of the fume FU (the range and the concentration of the spatter SP) and the convection C of the melt pool MP, and the correlation between the convection C of the melt pool MP and the melting state of the melt pool MP (information on temperature). Thus, the detection unit 54 may determine the melting state of the melt pool MP (indirectly) based on the state of the fume FU obtained. In this case, data on the correlation between the state of the fume FU and the melting state of the melt pool MP is stored in the storage 58 in advance.

(2) Processing for Changing Manufacturing Conditions

The calculation unit 56 is configured to, in a case where the manufacturing condition needs to be changed based on the state of the detection target region obtained by the detection unit 54 as described above, set the parameters expressed in Formulae (1) to (3) described above, to maintain the value of at least one of the power density PD, the energy density ED, and the temperature distribution T(r) in the formulae within a desired range. The case where the manufacturing conditions need to be changed is a case where manufacturing defects may occur in the 3D manufactured object, such as insufficient melting, a shape abnormality, or a failure to obtain a desired metal crystal when manufacturing is performed under the currently set manufacturing conditions. The determination unit 57 determines whether the manufacturing conditions need to be changed. When the state of the detection target region obtained by the detection unit 54 falls within the reference range described below, the determination unit 57 determines that the manufacturing condition needs to be changed.

The calculation unit 56 generates the change information, which is information for changing the manufacturing condition to obtain a value of a set parameter. In the present embodiment, examples of manufacturing conditions to be modified include the following (2-1) to (2-7):

(2-1) a condition for the laser beam emitted toward the powder material P of the material layer, namely, conditions associated with the irradiator 32;

(2-2) a scanning condition for scanning a material layer with a laser beam, namely, a condition associated with the scanning unit 33;

(2-3) a condition associated with the atmosphere inside housing 10;

(2-4) a material layer forming condition for forming the material layer;

(2-5) a supporting unit condition associated with the base plate 311 of manufacturing tank 31;

(2-6) design information (design data) related to the shape of the solidified layer or the 3D manufactured object; and (2-7) a condition related to the powder material P.

Specific examples of the manufacturing conditions (2-1) to (2-7) above will be described below.

FIGS. 8 and 9 illustrate an example of the relationship among the main manufacturing condition, the basic conditions (the power density PD, the energy density ED, and the temperature distribution T(r)), and the parameters in Formulae (1) to (3). In FIG. 8 and FIG. 9, circles indicate basic conditions that can be controlled with the corresponding manufacturing conditions, and blanks indicate basic conditions that cannot be controlled or controlled with a limited effect. Furthermore, FIGS. 8 and 9 illustrate the parameters in Formulas (1) to (3) related to the manufacturing conditions. The comment column in FIGS. 8 and 9 indicate the timing at which the change can be made on the manufacturing conditions, that is, the real time change, the change for forming the next layer, and/or change for producing the next manufactured object described above.

(2-1) Condition Related to Irradiator 32

As illustrated in FIG. 8, a specific example of the manufacturing conditions related to the condition for the laser beam emitted from the irradiator 32 includes at least one of: an output of the laser beam [W] (laser output), a wavelength of the laser beam [nm], a laser beam intensity distribution (profile), and a laser beam luminous flux size [mm] (spot size).

The laser output has an impact on the amount of heat applied to the powder material P irradiated with the laser beam emitted from the laser oscillator 321. A larger laser output results in a larger amount of heat absorbed in the powder material P. The laser output is a manufacturing condition with which the change information is generated in relation to the parameter $P_L$ described above. As described above, an increase in the laser output leads to an increase in the values of the power density PD, energy density ED, and temperature distribution T(r). The change information for changing the laser output is a new output value of the laser beam to be emitted from the irradiator 32 and correction value for the output value of the currently set laser beam.

The wavelength of the laser beam is related with the absorption rate at which the powder material P absorbs the laser beam. Generally, the shorter the wavelength of the laser beam, the higher the absorption rate of the powder material P. That is, the wavelength of the laser beam is a manufacturing condition with which the change information is generated in association with the parameter η, and when the wavelength of the laser beam increases, the value of the parameter η decreases. Thus, the wavelength of the laser beam affects the values of the power density PD and the energy density ED. The change information for changing the wavelength of the laser beam is, for example, information indicating which one of the wavelengths with which the laser beam can be emitted is used.

Regarding the intensity distribution (profile) of the laser beam, in the present embodiment, it is possible to switch between the laser beam of the Gaussian distribution and the laser beam of the top hat distribution as described above. The intensity distribution of the laser beam of the Gaussian distribution is highest around the center axis of the laser beam luminous flux and gradually decreases toward the periphery. The intensity distribution of the laser beam of the top hat distribution is uniform also in periphery regions away from the center axis of the luminous flux of the laser beam as compared with the laser beam of the Gaussian distribution. Thus, in the case of the laser beam of the top hat distribution, a wide range on the material layer is irradiated with the laser beam having the required intensity for melting the powder material P as compared with the laser beam of the Gaussian distribution. Thus, the intensity distribution of the laser beam affects the spot size of the laser beam at the upper surface of the material layer. Thus, the intensity distribution of the laser beam is a manufacturing condition in which the change information is generated in association with the parameter d. Switching the intensity distribution of the laser beam to the top hat distribution increases the spot size and reduces the amount of heat that flows into the powder material P per unit area on the material layer due to the laser beam irradiation. Thus, when the intensity distribution of the top hat distribution is set, the value of the parameter d increases and the values of the power density PD and energy density ED decrease.

In the laser beam of the Gaussian distribution, the intensity distribution becomes the highest around the center axis of the luminous flux of the laser beam, and thus a small range on the material layer is irradiated with a laser beam with intensity sufficient for melting the powder material P, as compared with the laser beam of the top hat distribution. This decreases the spot size and increases the amount of heat that flows into the powder material P per unit area on the material layer due to the laser beam irradiation. Thus, when the intensity distribution of the Gaussian distribution is set, the value of the parameter d decreases and the values of the power density PD and energy density ED increase.

The change information for changing the intensity distribution of the laser beam is information indicating, for example, which of the Gaussian distribution and the top hat distribution is used for the laser beam emitted.

Note that the intensity distribution of the laser beam is affected by the laser quality [$M^2$]. If $M^2$ is 1, the Gaussian distribution in single mode is set to be the intensity distribution of the laser beam, a larger deviation of $M^2$ from 1 (where $M^2$ is a value equal to or larger than 1) results in a larger change from the single mode Gaussian distribution. Accordingly, depending on the laser quality, the value of the parameter d changes.

The spot size of the laser beam affects the range of the material layer irradiated with the laser beam on the XY plane. A smaller spot size of the laser beam with which the upper surface of the material layer is irradiated leads to a larger amount of heat per unit area on the material layer, resulting in a larger amount of heat flowing into the powder material P per unit area on the material layer. As a result, melting of the powder material P irradiated with the laser beam is facilitated, affecting convection C in the melt pool MP. Thus, the spot size of the laser beam is a manufacturing condition with which the change information is generated in association with the parameter d. An increase in the spot size leads to an increase in the parameter d, resulting in a decrease in the amount of heat that flows into the powder material P per unit area on the material layer due to the laser beam irradiation, thereby reducing the values of the power density PD and the energy density ED. The spot size affects the value of the temperature distribution T(r). The change information for changing the spot size of the laser beam is, for example, the position of the concave lens 323a of the focus lens 323 in the X direction or the amount of movement of the concave lens 323a from the current position.

The wavelength of the laser beam can be changed at the timing to be the change for producing a next manufactured object. The other manufacturing conditions can be changed at any of the timings to be the real time change, the change for forming the next layer, and the change for producing the next manufactured object.

(2-2) Condition Related to Scanning Unit 33

A specific example of the manufacturing condition for the scanning condition for scanning a material layer with a laser beam includes at least one of the conditions including: the scanning speed (mm/s) of the laser beam, an interval (scanning pitch) (mm) between two adjacent irradiation positions of the laser beams in a direction crossing the scanning direction of the laser beam; and a scanning pass of the laser beam.

The scanning speed of the laser beam is related to the time of the laser beam irradiation per unit area on the surface of the material layer, and has an impact on the amount of heat flowing into the powder material P per unit area of the material layer due to the laser beam irradiation, and the temperature change (temperature gradient) in the melt pool MP associated with the movement of the position irradiated with the laser beam. A higher scanning speed of the laser beam leads to a smaller amount of heat that flows into the powder material P included in each unit area of the surface of the material layer due to the laser beam irradiation. A lower scanning speed of the laser beam leads to a larger amount of heat that flows into the powder material P included in each unit area of the surface of the material layer due to the laser beam irradiation. The scanning speed of the laser beam is a manufacturing condition with which the change information is generated in association with the parameter v described above. An increase in the scanning speed leads to an increase in the parameter v, resulting in a decrease in the values of the power density PD, energy density ED, temperature distribution T(r). The change information for changing the scanning speed is, for example, a new change speed of the inclination angle of the galvano mirrors 331, 332 and a correction value for the change speed of the currently set inclination angle.

A small scanning pitch results in a larger impact of heat from the adjacent solidified region BE already formed by the laser beam irradiation. Thus, the initial temperature of the powder material P not irradiated with the laser beam increases, and the amount of heat required to increase to the desired temperature (for example, the melting point) is reduced. Specifically, a smaller scanning pitch leads to a higher heat absorption rate of the powder material P, and a larger scanning pitch leads to a smaller heat absorption rate of the powder material P. Furthermore, when the scanning pitch is small, heat from a direction different from the scanning direction of the laser beam in the melt pool MP affects the convection C.

A large scanning pitch leads to a small impact of heat from the adjacent solidified region BE already formed by the laser beam irradiation, resulting in a larger amount of heat for raising the initial temperature of the powder material P not irradiated with the laser beam to the desired temperature (for example, the melting point).

The scanning pitch is a manufacturing condition with which the change information is generated in association with the parameters $\eta$ and the $\Delta y$. A large scanning pitch leads to a small value of the parameter $\eta$ and a large value of the parameter $\Delta y$, resulting in a small value of the energy density ED. The scanning pitch affects power density PD and temperature distribution T(r) values. The change information for changing the scanning pitch is, for example, a newly set angle to which the current setting angle of the galvano mirrors 331, 332 is changed or a correction value for changing the current setting angle to a newly set angle.

The scanning pass of the laser beam is a manufacturing condition related to a method of setting a path along which a surface of a material layer is irradiated with a laser beam. Examples of the scanning pass include: emitting the laser beam along a contour of the shape (produced model) based on the slice model data and then emitting the laser beam inside the contour; emitting the laser beam inside the contour of the shape (produced model) based on the slice model data and then emitting the laser beam along the contour of the shape (produced model) based on the slice model data. Furthermore, the scanning pass of the laser beam is determined to be a route that is less likely to involve occurrence of residual stress in the solidified layer formed, for example, by laser beam, based on the initial temperature $T_0$ of the material layer before being irradiated with the laser beam.

For example, when the scanning pass of the laser beam is for emitting the laser beam along a contour of the shape (produced model) based on the slice model data and then emitting the laser beam inside the contour, the initial temperature of the powder material P on the inner side of the contour rises due to diffusion of heat from the laser beam that has been emitted onto the contour of the shape (manufacturing model) based on the slice model data. Thus, the scanning path of the laser beam is a manufacturing condition with which the change information is generated in relation association with the parameter $P_0$ depending on the scanning pass to be changed, affects the values of the power density PD, energy density ED, temperature distribution T(r). The change information for changing the scanning pass is, for example, information on a value of a new inclination angle of the galvano mirrors 331, 332 and on a timing when the inclination angle value is set.

The manufacturing conditions can be changed at any of the timings to be the real time change, the change for forming the next layer, and the change for producing the next manufactured object.

(2-3) Condition Associated with the Atmosphere Inside Housing 10

Specific examples of manufacturing conditions related to the atmosphere inside the housing 10 include at least one of the conditions including: the flow volume [mm$^3$/s] of the inert gas introduced into the housing 10; a flowrate of the [mm/s] of the inert gas introduced into the housing 10; and the temperature [° C.] inside the housing 10.

In the present embodiment, the flow volume and the flowrate of the inert gas affect the initial temperature of the material layer before being irradiated with the laser beam or the fume FU produced from the powder material P due to the laser beam irradiation. For example, when the flow volume or the flowrate of the inert gas is larger or high, the surface of the material layer is cooled by the inert gas, whereby a large amount of heat is required for raising the temperature of the powder material P irradiated with the laser beam to the desired temperature (for example, the melting point). Thus, the flow volume and flowrate of the inert gas affect the initial temperature of the powder material P before being irradiated with the laser beam and thus are manufacturing conditions associated with the parameter $P_0$.

Furthermore, if, for example, the flow volume and the flowrate of the inert gas are small and low, the fume FU produced by the laser beam irradiation remains in the vicinity of the irradiation position of the laser beam and obstructs the optical path of the laser beam toward the material layer. As a result, the amount of heat that flows into the powder material P due to the laser beam irradiation decreases, which may result in a melting state different from the expected melting state. Thus, the flow volume and flowrate of the inert gas are manufacturing conditions that affect the heat absorption rate of the powder material P irradiated with the laser beam, and thus are manufacturing conditions associated with the parameter $\eta$. The flow volume and the flowrate of the inert gas are manufacturing conditions with which the change information is generated in association with the parameters $P_0$ and $\eta$, and when the flow volume of the inert gas increases and the flowrate increases for example, the value of the parameter $P_0$ decreases, the value of the parameter $\eta$ increases, and the value of the temperature distribution $T(r)$ decreases. The flow volume and flowrate of the inert gas affect the values of power density PD and energy density ED. The change information for changing the flow volume and the flowrate of the inert gas is, for example, a new opening degree of the valve that is the intake device 131, a new exhaust amount of the discharge device 14, a new discharge amount of the discharge device 14, or a correction value for the valve opening degree or the discharge amount currently set.

The temperature in the housing 10 is a manufacturing condition affecting the initial temperature of the material layer before being irradiated with the laser beam, and the change information is generated in association with the parameter $P_0$. A higher temperature inside the housing 10 leads to the powder material P more warmed up to have a higher initial temperature, resulting in a larger amount of heat required for raising the temperature of the powder material P to a desired temperature (melting point for example) by the laser beam irradiation. Thus, the temperature in the housing 10 affects the initial temperature before the powder material P is irradiated with the laser beam, and thus is a manufacturing condition associated with the parameter $P_0$. For example, a higher temperature in the housing 10 leads to a larger value of the parameter $P_0$, resulting in a larger values of the power density PD, the energy density ED, and the temperature distribution $T(r)$. The change information for changing the temperature inside the housing 10 is, for example, a new heating output value for the heater 15, or a correction value for the heating output of the heater 15 currently set.

The temperature inside the housing 10 can be changed as the change for forming the next layer or the change for producing the next manufactured object. The flow volume and the flowrate of the inert gas introduced into the housing 10 can be changed at any of the timings to be the real time change, the change for forming the next layer, and the change for producing the next manufactured object.

(2-4) A Material Layer Forming Condition for Forming the Material Layer

Specific examples of the manufacturing conditions for forming the material layer include at least one of conditions including: the moving speed [mm/s] of the blade 221, the pressure [Pa] applied by the blade 221 to the powder material P; the standby time [s] of the blade 221 before the new material layer is started to be formed on the solidified layer after the solidified layer has been formed; the shape of the blade 221; the material of the blade 221; and the layer thickness [mm] of the material layer on the base plate 311.

The moving speed of the blade 221 and the pressure applied by the blade 221 to the powder material P affects the flatness of the surface of the material layer to be formed as well as the layer thickness and density of the material layer. For example, a higher moving speed of the blade 221 leads to a lower flatness of the surface of the material layer, a larger layer thickness, and a smaller density, as compared with a case where the moving speed of the blade 221 is low. A higher pressure of the blade 221 applied to the powder material P leads to a higher flatness of the surface of the material layer, a smaller layer thickness, and a higher density, as compared with a case where the pressure of the blade 221 is low. Thus, the moving speed of the blade 221 is a manufacturing condition that affects the parameters $\Delta z$, $\rho$, k, and $\alpha$. A change in the moving speed of the blade 221 affects the values of the energy density ED and the temperature distribution $T(r)$ for example. The pressure applied by the blade 221 to the powder material P is a manufacturing condition with which the change information is generated in association with the parameters $\Delta z$, $\rho$, k, and $\alpha$. For example, a larger pressure leads to larger values of the parameters $\rho$, k, and $\alpha$ an d a smaller value of the parameter $\Delta z$, resulting in a larger values of the energy density ED and the temperature distribution $T(r)$. The change information for changing the moving speed of the blade 221 is a new value for the motor output serving as the driving mechanism for moving the blade 221 and a correction value for the motor output currently set. The change information for changing the pressure at which the blade 221 applies to the powder material P may be, for example, a value of the new driving amount of the pressing mechanism, or a correction value for the drive amount of the pressing mechanism that is currently set.

The standby time of the blade 221 is a time period from the end of the laser beam irradiation to the material layer due to the completion of the forming of the solidified layer to the start of the conveyance of the powder material P by the blade 221 from the material supply tank 21 to the manufacturing tank 31 as described above. The standby time of the blade 221 affects the initial temperature of the newly formed material layer on the solidified layer. Specifically, a longer standby time leads to a larger drop in the temperature of the solidified layer that has been raised by the laser beam irradiation, rendering the initial temperature of the newly formed material layer on the upper part of the solidified layer difficult to rise. This configuration results in a larger amount of heat required to raise the temperature of the powder material P to a desired temperature (a melting point for example) by heating. Thus, the standby time of the blade 221 is a manufacturing condition with which the change information is generated in association with the parameter $P_0$. For example, a longer standby time leads to a smaller value of the parameter $P_0$, resulting in smaller values of the power density PD, energy density ED, and temperature distribution $T(r)$. The change information for changing the standby time of the blade 221 is, for example, a value indicating the timing when the motor serving as the driving mechanism that moves the blade 221 starts to be driven, or a correction value for the currently set timing when the motor starts driving.

If there is a defect in the blade 221, depending on the shape of the defect, the thickness of the material layer will not be uniform for example. In other words, the flatness decreases, the layer thickness becomes different from the desired one, the density in the material layer fails to be uniform, or the planar roughness increases. Furthermore, even if there is no defect in the blade 221, when the blade 221 changes in shape, the area of the blade 221 to be in contact with the powder material P changes, meaning that the density, flatness, and layer thickness of the material layer vary depending on the shape of the blade 221. Due to the properties of the material of the blade 221 and the material (type) of the powder material P, the movement of the blade 221 is compromised due to factors such as friction, and the powder material P fails to be uniformly conveyed onto the base plate 311 or the solidified layer. Thus, there is a risk that the flatness of the material layer formed may decrease, the layer thickness may be different from the desired one, the density in the material layer may fail to be uniform, or the planar roughness may increase. Thus, the shape and the material of the blade 221 is a manufacturing condition that affects the parameters $\Delta z$, $\rho$, $k$, and $\alpha$. A change in the shape and the material of the blade 221 affects the values of the energy density ED and the temperature distribution T(r).

Note that the shape and material of the blade 221 can be changed by changing the type of blade 221. In this case, the change information for changing the shape and the material of the blade 221 is information indicating the replacement of the blade 221, for example. In this case, the manufacturing apparatus 1 issues, for example, a notification to request for the replacement of the blade 221. As a method for the notification, the manufacturing apparatus 1 may make the message indicating that the type of inert gas needs to be changed to be displayed on a monitor (not illustrated), or to be emitted as a voice from a speaker (not illustrated). Furthermore, when a configuration in which the blade 211 is auto-replaceable among a plurality of types is employed, the type of blade 211 is automatically replaced under the control of the material controller 51. Furthermore, in a case where the blade 221 described above is structured to have a variable shape, the shape of the blade 221 can be changed in accordance with the control by the material controller 51. The change information generated in this case is, for example, information instructing the shape of the blade 221 to be changed.

When the layer thickness of the material layer is large, the amount of heat generated by the laser beam irradiation might not reach the surface (lower surface) of the material layer on the negative side in the Z direction, to result in a manufacturing defect such as insufficient melting. The layer thickness is a manufacturing condition with which change information is generated in association with the parameter $\Delta z$. For example, when a larger layer thickness leads to a larger value of the parameter $\Delta z$, resulting in a smaller value of the energy density ED. The change information for changing the layer thickness may be, for example, a value of new pressure applied to the powder material P by the blade 221 of the recoater 22 as described above, or may be a correction value for the new driving amount of the pressing mechanism of the blade 221, or a correction value for the currently set drive amount of the pressing mechanism.

The shape and material of the blade 221 can be changed as the change for producing the next manufactured object. The moving speed of the blade 221, the pressure applied to the powder material P, the standby time, and the layer thickness of the material layer can be changed as the change for forming the next layer or the change for producing the next manufactured object.

(2-5) Supporting Unit Condition Associated with Base Plate 311 of Manufacturing Tank 31

The manufacturing condition associated with the base plate 311 of the manufacturing tank 31 includes the temperature [° C.] of the base plate 311.

The temperature of the base plate 311 affects the initial temperature of the material layer formed thereon, and a higher temperature of the base plate 311 leads to the powder material P more warmed up. Thus, a higher temperature of the base plate 311 leads to a higher the initial temperature of the powder material P. This configuration results in a smaller amount of heat required to raise the temperature of the powder material P irradiated with the laser beam to a desired temperature (a melting point for example). Thus, the temperature of the base plate 311 is a manufacturing condition with which the change information is generated in association with the parameter $P_0$. For example, a higher temperature of the base plate 311 leads to a larger value of the parameter $P_0$, resulting in larger values of the power density PD, energy density ED, and temperature distribution T(r). The change information for changing the temperature of the base plate 311 is, for example, a new heating output value for the heater 313, or a correction value for the heating output of the heater 313 currently set.

Note that, a higher temperature of the base plate 311, leads to a smaller amount of drop in the temperature of the solidified layer the temperature of which has been risen due to the laser beam irradiation, whereby an impact of the residual stress produced when the melt pool MP solidifies is reduced. Furthermore, as described above, a higher temperature of the base plate 311 can save the amount of heat required for raising the temperature of the powder material P irradiated with the laser beam to a desired temperature, whereby the scanning speed can be increased without changing the laser beam output.

The temperature of the base plate 311 can be changed as the change for forming the next layer or the change for producing the next manufactured object.

(2-6) Design Data Related to the Shape of the Solidified Layer or the 3D Manufactured Object Specific examples of the design data related to the shape of the 3D manufactured object as the manufacturing condition include at least one of data including: slice model data that is shape data on the solidified layer to be formed; and shape data on the support portion for supporting the solidified layer or the 3D manufactured object.

The slice model data is shape data for determining the shape of the solidified layer to be formed on the XY plane, the thickness of the solidified layer (slice pitch), and the like. The slice model data is a manufacturing condition with which the change information is generated in association with the parameter $\Delta z$. In other words, a thicker solidified layer results in a larger value of the parameter $\Delta z$. A change in the slice model data, which is the shape data, may lead to a change in various manufacturing conditions of the laser beam from the irradiator 32 and various manufacturing conditions for scanning by the scanning unit 33. Thus, the slice model data affects the values of the power density PD, energy density ED, and temperature distribution T(r). The change information for changing the slice model data is, for example, a new shape of the solidified layer on the XY plane, a new thickness of the solidified layer, or a correction value for the shape of the solidified layer on the XY plane, or the correction value for the thickness of the solidified layer.

As described above, the shape data on the support part indicates a shape such as a thickness and a length of the support portion that supports the 3D manufactured object to prevent deformation or breakage of the solidified layer or the 3D manufactured object. The shape of the support portion is determined by the shape, size, and the like of the solidified layer or the 3D manufactured object to be supported. A larger volume of the support portion leads to a larger impact of the heat of the part of the solidified layer formed by the laser beam irradiation to be the support part, on the material layer (powder material P) formed on the solidified layer. Further, a higher initial temperature of the powder material P heated by the base plate 311 leads to a larger amount of heat transmitted to the material layer (powder material P) from the base plate 311 through the portion of the solidified layer formed as the support portion. Thus, the shape data on the support portion is a manufacturing condition that affects the parameter $P_0$ depending on the volume of the support portion and the temperature of the base plate 311, and affects the values of the energy density ED and the temperature distribution T(r). The change information for changing the shape data of the support unit is, for example, a value of a new shape (length, thickness, or the like) of the support portion, or a correction value for the current shape (length, thickness, and the like) of the support portion.

The slice model data and the shape data on the support portion can be corrected as the change for producing the next manufactured object.

(2-7) Condition Related to Powder Material P

Specific examples of the manufacturing conditions associated with the powder material P include at least one of conditions including: the particle diameter/particle size distribution of the powder material P; the hygroscopicity of the powder material P; and the type of powder material P.

Variations in the particle diameter/particle size distribution of the powder material P within the material layer affect the thermal diffusion and thermal conductivity of the material layer irradiated with the laser beam, which may cause melt defects and the like. Furthermore, when the powder material P having variations in particle diameter/particle size distribution is conveyed to the manufacturing tank 31 by the blade 221, variations in thickness and density may occur in the material layer, resulting in a risk of occurrence of defects such as voids in the solidified layer formed. The particle diameter/particle size distribution is a manufacturing condition with which the change information is generated in association with the parameters $\Delta z$, $\rho$, $k$, and $\alpha$. For example, a large particle diameter/particle size distribution leads to a large value of the parameter $\Delta z$ and smaller values of the parameters $\rho$, $k$, and $\alpha$, resulting in larger values of the energy density ED and the temperature distribution T(r). The change information for changing the particle diameter/particle size distribution of the powder material P is, for example, information instructing removal of the material layer formed and for forming a new material layer.

The powder material P with high hygroscopicity has poor fluidity, and is less likely to be conveyed smoothly to the manufacturing tank 31 with the blade 221. As a result, the flatness or the layer thickness of the formed material layer is less likely to be uniform, and the surface roughness is likely to be high. Thus, the hygroscopicity of the powder material P is a manufacturing condition that affects the parameter $\Delta z$. Furthermore, when the hygroscopicity of the powder material P is high, the flatness, the layer thickness, and the density of the material layer are less likely to be uniform. Thus, a uniform temperature rise due to the laser beam irradiation might fail to be achieved, and defects such as a void and the like in the solidified layer formed may occur due to melt defects. Furthermore, the powder material P having a high hygroscopicity has a low thermal conductivity and thermal diffusion, and thus may cause defects such as voids in the solidified layer formed due to melt defects. Thus, the hygroscopicity of the powder material P is a manufacturing condition with which the change information is generated in association with the parameters $k$ and $\alpha$. For example, a higher hygroscopicity of the powder material P leads to smaller values of the parameters $k$ and $\alpha$, resulting in a smaller value of the temperature distribution T(r). The hygroscopicity of the powder material P affects the values of power density PD and energy density ED. The change information for changing the hygroscopicity includes, for example, information indicating that the powder material P needs to be heated by the heater 213 and a value of the heating output of the heater 213.

The type of powder material P includes powder materials P different from each other in material or additives. A difference in the type of the powder material P is related to a difference in the particle size, the thermal conductivity, the thermal diffusion, and the like of the powder. For example, with the same pressure applied to the powder materials P with different particle sizes by the blade 221 when forming the material layer, the powder material P with a larger particle size results in a larger gap between particles in the material layer compared with that in the case of the powder material P with a small particle size, whereby a material layer with a larger layer thickness or lower density is obtained. Thus, the type of powder material P is a manufacturing condition that affects the parameters $\Delta z$, $\rho$, $k$, $\alpha$ and affects the energy density ED and the temperature distribution T(r). The change information for changing the type of the powder material P is, for example, information indicating that a different type of powder material P is to be used. In this case, the manufacturing apparatus 1 issues, for example, a notification that prompts a user to replace the powder material P. As a method for the notification, the manufacturing apparatus 1 may make the message indicating that the type of powder material P needs to be changed to be displayed on a monitor (not illustrated), or to be emitted as a voice from a speaker (not illustrated). With a configuration in which a plurality of automatically replaceable material supply tanks 21 respectively accommodate a plurality of different types of powder material P, the type of the powder material P is automatically replaced when the material supply tank 21 is replaced in accordance with the control by the material controller 51.

The particle diameter/particle size distribution and the type of the powder material P can be changed as the change for producing the next manufactured object. The hygroscopicity of the powder material P can be corrected as the change for forming the next layer or the change for producing the next manufactured object.

Note that, with reference to FIGS. 8 and 9, examples of associated parameters are described as parameters highly associated with the manufacturing conditions included in (2-1) to (2-7) described above, and thus largely change in response to a change in the manufacturing conditions. However, when each of the manufacturing conditions is changed, parameters, among the parameters included in Formulae (1) to (3), other than the parameters described above are also affected. Thus, the change information for changing the manufacturing conditions may be generated so that at least one of the power density PD, the energy density ED, and the temperature distribution T(r) can be kept within a desired range, while taking into consideration the fact that the parameters other than those exemplified above change.

Note that, in the present embodiment, the manufacturing conditions may include the manufacturing conditions of (2-1) to (2-8) described above, as well as other known manufacturing conditions in the manufacturing apparatus 1. The other manufacturing conditions include the oscillation mode of the laser beam from the irradiator 32, the polarization state of the laser beam, the type of inert gas, the oxygen concentration in the housing 10, the pressure [Pa] in the housing 10, the type of the base plate 311, the manufacturing orientation data, the shape data of the 3D manufactured object, and the oxygen concentration of the powder material P.

As described above, in the present embodiment, the oscillation mode of the laser beam can be switched between a CW (continuous) oscillation and a pulse oscillation. The pulse oscillation is performed with shorter ON time than the CW oscillation, and thus results in a smaller amount of heat absorbed in the powder material P at the position irradiated with the laser beam than that in the case of the CW oscillation. Thus, the amount of heat that flows into the powder material P differs between the oscillation modes, meaning that the oscillation mode affects the melting of the powder material P. In particular, the oscillation mode is known to have an impact on the depth of the keyhole KH or the width of the solidified region BH. Thus, the oscillation mode affects the values of the power density PD, the energy density ED, and the temperature distribution T(r). The change information for changing the oscillation mode of the laser beam is, for example, information indicating which of the CW (continuous) oscillation and the pulse oscillation is used for the laser beam emission. The oscillation mode of the laser beam can be changed at any of the timings to be the real time change, the change for forming the next layer and the change for producing the next manufactured object.

Examples of the polarization state of the laser beam include circular polarization, linear polarization, and the like. When the powder material P is a metallic material, absorption of the laser beam is affected by the polarization state of the laser beam. That is, the polarization state of the laser beam affects the amount of heat that flows into the powder material P irradiated with the laser beam. Thus, the polarization state of the laser beam is a manufacturing condition that affects at least one of the values of the power density PD, the energy density ED, and the temperature distribution T(r). The change information for changing the polarization state of the laser beam is information indicating which of the polarization states (for example, circular polarization, linear polarization, or the like) that can be set to the laser beam emitted from the irradiator 32 is to be set. The polarization state of the laser beam can be changed as the change for producing the next manufactured object.

Examples of the type of inert gas selectable include nitrogen, argon, and the like. The type of inert gas is a manufacturing condition selected depending on the type of the powder material P. For example, if the powder material P is titanium, argon may be used as the inert gas because the powder material P reacts with nitrogen. An inappropriate inert gas selected for the type of powder material P causes such a reaction between the powder material P and the inert gas, which affects the values of the power density PD, the energy density ED, and the temperature distribution T(r). The change information for changing the type of inert gas is information indicating the use of different types of inert gas. In this case, the manufacturing apparatus 1 issues, for example, a notification that prompts a user to replace the type of inert gas. As a method for the notification, the manufacturing apparatus 1 may make the message indicating that the type of inert gas needs to be changed to be displayed on a monitor (not illustrated), or to be emitted as a voice from a speaker (not illustrated). Note that the type of inert gas can be replaced by replacing the tank 13. With a configuration in which a plurality of automatically replaceable tanks 13 respectively accommodate a plurality of different types of inert gas, the type of inert gas automatically replaced when the tank 13 is replaced is in accordance with the control by the housing controller 53. The type of the inert gas can be changed as the change for producing the next manufactured object.

The oxygen concentration in the housing 10 is a manufacturing condition for setting the concentration not causing oxidation of the material layer during melting or solidifying. As described above, the oxidation of the powder material P results in an oxide film formed on the surface thereof. The specific heat changes in accordance with the thickness of the oxide film, thereby affecting absorption and conduction of heat of the powder material P Therefore, the oxygen concentration in the housing 10 is a manufacturing condition that affects the values of the energy density ED and the temperature distribution T(r). The change information for changing the oxygen concentration in the housing 10 is, for example, a new opening degree of the valve that is the intake device 131, a new exhaust amount of the discharge device 14, a new discharge amount of the discharge device 14, or a correction value for the valve opening degree or the discharge amount currently set. The oxygen concentration inside the housing 10 can be changed as the change for forming the next layer or the change for producing the next manufactured object.

Since the 3D manufactured object is produced in a state in which the inside of the housing 10 is held at a predetermined pressure, the pressure within the housing 10 is controlled as a manufacturing condition. The pressure in the housing 10 affects the surface tension of the melt pool MP. As described above, the convection C in the melt pool MP occurs due to the difference in surface tension between the surface of the melt pool MP and the inside, and thus the pressure in the housing 10 is a manufacturing condition that affects the convection C of the melt pool MP. Because the convection C affects the temperature distribution within the melt pool MP, the pressure inside the housing 10 is a manufacturing condition that affects the temperature distribution T(r). The change information for changing the pressure inside the housing 10 is, for example, a new discharge amount of the discharge device 14 or a correction value for the currently configured exhaust volume. The pressure inside the housing 10 can be changed as the change for forming the next layer or the change for producing the next manufactured object.

The manufacturing orientation data is data indicating the manufacturing orientation of the solidified layer and the 3D manufactured object as described above, and is used for setting the slice model data. When the manufacturing orientation is changed, various manufacturing conditions for the laser beam from the irradiator 32 and various manufacturing conditions for scanning by the scanning unit 33 might be changed. Thus, the manufacturing orientation data affects the values of the power density PD, the energy density ED, and the temperature distribution T(r). The change information generated for the manufacturing orientation data is, for example, information indicating the slice direction set for a new manufacturing orientation. The manufacturing orientation data can be changed as the change for producing the next manufactured object.

The shape data on the 3D manufactured object is design data (that is, CAD data or STL data). Thus, the shape data on the 3D manufactured object is a manufacturing condition a change of which may result in a change in various manufacturing conditions for the laser beam from the irradiator 32 and various manufacturing conditions for scanning by the scanning unit 33. Thus, the shape data on the 3D manufactured object affects the values of the power density PD, the energy density ED, and the temperature distribution T(r). The change information for changing the shape data on the 3D manufactured object is, for example, a value indicating a new shape of the 3D manufactured object, and a correction value for the current shape of the 3D manufactured object. The shape data on the 3D manufactured object can be corrected as the change for producing the next manufactured object.

As described above, in the present embodiment, the base plate 311 is configured to be selectable from among a plurality of types of base plates of different thicknesses or materials and attached. The type of the base plate 311 is a manufacturing condition for preventing deformation of the solidified layer due to residual stress produced when the melt pool MP is solidified, and for enabling the base plate 311 having the necessary rigidity (thickness or material) for maintaining the shape of the solidified layer to be selected. The residual stress is produced in accordance with a change in temperature of the melted powder material P until it is solidified. Thus, the type of the base plate 311 to suppress the production of the residual stress is a manufacturing condition associated with the temperature distribution T(r). The base plate 311 can be changed as the change for producing the next manufactured object. The change information for changing the type of the base plate 311 is, for example, information indicating that a different type of base plate 311 is to be used. In this case, the manufacturing apparatus 1 issues, for example, a notification that prompts a user to replace the type of base plate 311. As a method for the notification, the manufacturing apparatus 1 may make the message indicating that the type of base plate 311 needs to be changed to be displayed on a monitor (not illustrated), or to be emitted as a voice from a speaker (not illustrated). Furthermore, when a configuration in which the base plate 311 is auto-replaceable among multiple types is employed, the type of base plate 311 is automatically replaced under the control of the manufacturing controller 52.

The oxidation of the powder material P results in an oxide film formed on the surface thereof as described above. The specific heat changes in accordance with the thickness of the oxide film. The oxide film of the powder material P affects the thermal conductivity of the powder material P, and thus may cause melt defects or the like. Thus, the oxygen concentration of the powder material P is a manufacturing condition affecting the value of the energy density ED. The change information generated for the oxygen concentration of the powder material P includes, for example, information indicating that the powder material P needs to be heated by the heater 213 and a value of the heating output of the heater 213. The oxygen concentration of the powder material P can be changed as the change for producing the next manufactured object.

Next, a specific example of the change information generated by the calculation unit 56 will be described. The following description is given for an example in which the calculation unit 56 generates the change information in order to keep at least one of the power density PD, the energy density ED, and the temperature distribution T(r) within a desired range.

A case in which the parameter $P_L$ is changed based on the state of the detection target region obtained by the detection unit 54 will be described. When the parameter $P_L$ is increased, that is, when the value of the power density PD, energy density ED, or temperature distribution T(r) is increased, the calculation unit 56 generates the change information to increase the laser output of the laser beam from the irradiator 32, for example. When the parameter $P_L$ is reduced, that is, when the value of the power density PD, energy density ED, or temperature distribution T(r) is decreased, the calculation unit 56 generates the change information to reduce the laser output of the laser beam from the irradiator 32. The change information thus generated is an output value of the laser beam emitted from the irradiator 32. The output unit 55 outputs the generated change information to the manufacturing controller 52 of the setting unit 59 as state information. The manufacturing controller 52 changes the output value of the laser beam that is set to the output value indicated by the change information, and makes the laser beam with the output value emitted from the irradiator 32 for example.

Data in which the value of the parameter $P_L$ and the laser output are associated with each other is stored in the storage 58 in advance. The calculation unit 56 reads the value of the laser output corresponding to the desired value as the parameter $P_L$ from this data, and generates the change information as the value of the new laser output thus read.

A case in which the parameter $P_O$ is changed based on the state of the detection target region obtained by the detection unit 54 will be described. When the parameter $P_O$ is increased, that is, when the value of the power density PD, energy density ED, or temperature distribution T(r) is increased, the calculation unit 56 generates the change information to implement at least one of the following changes in the manufacturing conditions. In this case, examples of a change in the manufacturing conditions include a reduction in the flow volume and flowrate of the inert gas, an increase in the temperature inside the housing 10, a reduction in the standby time of the blade 221, and an increase in the temperature of the base plate 311 for example. When the parameter $P_O$ is reduced, that is, when the value of the power density PD, energy density ED, or temperature distribution T(r) is reduced, the calculation unit 56 generates the change information to implement at least one of the following changes in the manufacturing conditions. In this case, examples of a change in the manufacturing conditions include an increase in the flow volume and flowrate of the inert gas, a reduction in the temperature inside the housing 10, an increase in the standby time of the blade 221, and a reduction in the temperature of the base plate 311.

When the change information for changing the flow volume and the flowrate of the inert gas is generated, the output unit 55 outputs the generated change information to the housing controller 53 of the setting unit 59 as the state information. For example, the housing controller 53 changes the currently set opening degree of the intake device 131 and discharge amount of the discharge device 14 to the valve opening degree and the discharge amount indicated by the change information, and makes the intake device 131 and the discharge device 14 operate with the valve opening degree and the discharge amount thus changed.

When the change information for changing the temperature in the housing 10 is generated, the output unit 55 outputs the generated change information to the housing controller 53 as the state information. The housing controller 53 changes the currently set heating output of the heater 15 to the heating output indicated by the change information, and makes the heater 15 operate with the heating output thus changed for example.

When the change information for changing the standby time of the blade 221 is generated, the output unit 55 outputs the generated change information to the material controller 51 of the setting unit 59 as the state information. The material controller 51 changes the currently set standby time to the standby time indicated by the change information, and moves the blade 221 based on the standby time thus changed for example.

When the change information for changing the temperature in the base plate 311 is generated, the output unit 55 outputs the generated change information to the manufacturing controller 52 of the setting unit 59 as the state information. The manufacturing controller 52 changes the currently set heating output of the heater 313 to the heating output indicated by the change information, and makes the heater 313 operate with the heating output thus changed for example.

The data in which the value of the parameter $P_0$, the flow volume and the flowrate of the inert gas, the temperature in the housing 10, the standby time of the blade 221, and the temperature of the base plate 311 are associated with each other is stored in the storage 58 in advance. The calculation unit 56 reads the values of the manufacturing conditions corresponding to the desired values as the values of the parameters from the data, and generates the change information as the new values thus read.

Note that the parameter $P_0$ is also affected by the shape (thickness, length, and the like) of the support portion depending on the scanning pass of the laser beam, the volume of the support portion and the temperature of the base plate 311. Thus, the calculation unit 56 generates the change information for the scanning pass of the laser beam and the shape data on the support portion.

A case in which the parameter $\eta$ is changed based on the state of the detection target region obtained by the detection unit 54 will be described. When the parameter $\eta$ is increased, that is, when the value of the temperature distribution T(r) is reduced and the value of the energy density ED is increased, the calculation unit 56 generates the change information to implement at least one of the following changes in the manufacturing conditions for example. In this case, changing the manufacturing conditions includes: changing the wavelength of the laser beam to a short wavelength; shortening the scanning pitch; increasing the flow volume of the inert gas; and increasing the flowrate of the inert gas.

On the other hand, when the parameter $\eta$ is reduced, that is, when the value of the temperature distribution T(r) is increased and the value of the energy density ED is reduced, the calculation unit 56 generates the change information to implement at least one of the following changes in the manufacturing conditions for example. In this case, changing the manufacturing conditions includes: changing the wavelength of the laser beam to a long wavelength; making the scanning pitch longer; reducing the flow volume of the inert gas; and reducing the flowrate of the inert gas.

The change information on the wavelength of the laser beam is output to the manufacturing controller 52 by the output unit 55. The manufacturing controller 52 changes the wavelength of the laser beam that is set to the wavelength indicated by the change information, and makes the laser beam with the wavelength emitted from the irradiator 32 for example.

When the change information for changing the wavelength of the laser beam is generated, the output unit 55 outputs the generated change information to the manufacturing controller 52 of the setting unit 59 as the state information. The manufacturing controller 52 changes the wavelength of the laser beam that is set to the wavelength indicated by the change information, and makes the laser beam with the wavelength emitted from the irradiator 32 for example.

When the change information for changing the scanning pitch is generated, the output unit 55 outputs the generated change information to the manufacturing controller 52 of the setting unit 59 as the state information. The manufacturing controller 52 changes the currently set angle of the galvano mirrors 331, 332 to a new set angle indicated by the change information, and operates the scanning unit 33 at the modified set angle for example.

When the change information for changing the flow volume and the flowrate of the inert gas is generated, the output unit 55 outputs the state information to the housing controller 53 of the setting unit 59 as the state information as in the case described above. The housing controller 53 makes the intake device 131 and the discharge device 14 operate, for example, with a valve opening degree and a discharge amount changed based on the change information.

Data in which the value of the parameter the scanning pitch, and the flow volume and the flowrate of the inert gas are associated with each other is stored in advance in the storage 58. The calculation unit 56 reads the values of the manufacturing conditions corresponding to the desired values as the parameters from the data, and generates the change information as the new values thus read.

A case in which the parameter d is changed based on the state of the detection target region obtained by the detection unit 54 will be described. When the parameter d is increased, that is, when the value of the power density PD and energy density ED is reduced, the calculation unit 56 generates the change information to implement at least one of the following changes in the manufacturing conditions for example. In this case, changing the manufacturing conditions includes changing the intensity distribution of the laser beam to the top hat distribution and increasing the spot size of the laser beam. When the parameter d is reduced, that is, when the value of the power density PD and energy density ED is increased, the calculation unit 56 generates the change information to implement at least one of the following changes in the manufacturing conditions for example. In this case, changing the manufacturing conditions includes changing the intensity distribution of the laser beam to the Gaussian distribution and reducing the spot size of the laser beam.

When the change information for changing the intensity distribution of the laser beam is generated, the output unit 55 outputs the generated change information to the manufacturing controller 52 of the setting unit 59 as the state information. The manufacturing controller 52 changes the intensity distribution of the laser beam that is set to the intensity distribution indicated by the change information, and makes the laser beam with the intensity distribution emitted from the irradiator 32.

When the change information for changing the spot size is generated, the output unit 55 outputs the generated change information to the manufacturing controller 52 of the setting unit 59 as the state information. The manufacturing controller 52 controls the driving mechanism (not illustrated) to move the concave lens 323a to a position in the X direction indicated by the change information for example.

Data in which the value of the parameter d and the intensity distribution and the spot size of the laser beam are associated with each other is stored in the storage 58 in advance. The calculation unit 56 reads the values of the manufacturing conditions corresponding to the desired values as the parameters from the data, and generates the change information as the new values thus read.

Note that when changing the parameter d, the calculation unit 56 may generate the change information on the spread angle of the laser beam affecting the intensity distribution of the laser beam.

A case in which the parameter v is changed based on the state of the detection target region obtained by the detection unit 54 will be described. When the parameter v is increased, that is, when the values of the power density PD, energy density ED, and temperature distribution T(r) is reduced, the calculation unit 56 generates the change information to increase the scanning speed of the laser beam for example. When the parameter v is reduced, that is, when the values of the power density PD, energy density ED, and temperature distribution T(r) is increased, the calculation unit 56 generates the change information to reduce the scanning speed of the laser beam for example.

When the change information for changing the scanning speed of the laser beam is generated, the output unit 55 outputs the generated change information to the manufacturing controller 52 of the setting unit 59 as the state information. The manufacturing controller 52 changes the currently set value of the change speed of the inclination angle of the galvano mirrors 331, 332 to a newly set change speed of the inclination angle indicated by the change information, and operates the scanning unit 33 at the set change speed of the inclination angle for example.

Data in which the parameter v and the scanning speed of the laser beam are associated with each other is stored in the storage 58 in advance. The calculation unit 56 reads the value of the scanning speed corresponding to the desired value as the value of the parameter v from the data, and generates the change information as the new scanning speed of the laser beam.

A case in which the parameter $\Delta y$ is changed based on the state of the detection target region obtained by the detection unit 54 will be described. When the parameter $\Delta y$ is increased, that is, when the value of the energy density ED is reduced, the calculation unit 56 generates the change information to increase the scanning pitch. When the parameter $\Delta y$ is reduced, that is, when the value of the energy density ED is increased, the calculation unit 56 generates the change information to reduce the scanning pitch. As described above, the output unit 55 outputs the generated change information to the manufacturing controller 52 of the setting unit 59 as state information. The manufacturing controller 52 changes the currently set angle to a new set angle indicated by the change information, and operates the scanning unit 33 at the modified set angle for example.

Data in which the parameter $\Delta y$ and the scanning pitch of the laser beam are associated with each other is stored in the storage 58 in advance. The calculation unit 56 reads the value of the scanning pitch corresponding to the desired value as the value of the parameter $\Delta y$ from the data, and generates the change information as the new scanning pitch.

A case in which the parameter $\Delta z$ is changed based on the state of the detection target region obtained by the detection unit 54 will be described. When the parameter $\Delta z$ is increased, that is, when the value of the energy density ED or temperature distribution T(r) is reduced, the calculation unit 56 generates the change information to implement at least one of the following changes in the manufacturing conditions, for example. In this case, changing the manufacturing conditions includes: reducing the pressure applied from the blade 221 to the powder material P to increase the layer thickness; increasing the particle diameter/particle size distribution to increase the variation in particle size; and increasing the thickness of the slice model data as the shape data on the solidified layer. As a result, the transmission of heat, due to the laser beam irradiation, to the powder material P is impeded. When the parameter $\Delta z$ is reduced, that is, when the value of the energy density ED or temperature distribution T(r) is increased, the calculation unit 56 generates the change information to implement at least one of the following changes in the manufacturing conditions, for example. In this case, changing the manufacturing conditions includes: increasing the pressure applied from the blade 221 to the powder material P to reduce the layer thickness; reducing the particle diameter/particle size distribution to reduce the variation in particle size; and reducing the thickness of the slice model data. As a result, the transmission of heat, due to the laser beam irradiation, to the powder material P is facilitated.

When the change information for changing the pressure applied by the blade 221 to the powder material P is generated, the output unit 55 outputs the generated change information to the material controller 51 of the setting unit 59 as the state information. The material controller 51 controls the pressing mechanism for the blade 221 to cause the blade 221 to apply a pressure, based on the change information, to the powder material P for example.

When the change information for changing the particle diameter/particle size distribution is generated, the output unit 55 outputs the generated change information to the material controller 51 and the manufacturing controller 52 of the setting unit 59 as the state information. The material controller 51 and the manufacturing controller 52 control the recoater 22, the driving mechanism 212, and the driving mechanism 312, for example, to remove the formed material layer and to newly form a material layer.

When the change information for changing the slice model data that is the shape data on the solidified layer is generated, the output unit 55 outputs the generated change information to the manufacturing controller 52 of the setting unit 59 as the state information. The manufacturing controller 52 changes the value of the manufacturing condition for the irradiator 32 to emit the laser beam, the value of the manufacturing condition for the scanning unit 33 to perform the laser beam scanning, and the movement amount of the driving mechanism 312, so that the solidified layer can be formed to have the new thickness based on the change information. In this case, data in which the thickness of the solidified layer to be formed and the manufacturing condition for the irradiator 32 to emit the laser beam, and the value of the manufacturing condition for the scanning unit 33 to perform the laser beam scanning are associated with each other is stored in the storage 58. With reference to this data, the manufacturing controller 52 makes the irradiator 32 and the scanning unit 33 operate under manufacturing conditions suitable for the thickness of the new solidified layer.

The data in which the parameter $\Delta z$, the pressure applied to the powder material P, the particle diameter/particle size distribution, and the thickness of the slice model data are stored in the storage 58 in advance. The calculation unit 56 reads the values of the manufacturing conditions corresponding to the desired values as the value $\Delta z$ of the parameter from the data, and generates the change information as the new values thus read.

Note that the parameter Δz is also affected by the moving speed of the blade 221, the type (shape and material) of the blade 221, the hygroscopicity of the powder material P, and the type of the powder material P, the calculation unit 56 may generate the change information for each of the above.

Furthermore, since Δz can be changed by changing the amount of movement of the base plate 311 in the Z direction, the calculation unit 56 may generate the change information based on the drive amount of the driving mechanism 312 for moving the base plate 311.

A case in which the parameters ρ, k, and α are changed based on the state of the detection target region obtained by the detection unit 54 will be described. When the parameters ρ, k, and α are increased, that is, when the values of the energy density ED and the temperature distribution T(r) are increased, the calculation unit 56 generates the change information to implement at least one of the following changes in the manufacturing conditions for example. In this case, changing the manufacturing conditions includes: increasing the pressure applied from the blade 221 to the powder material P; and reducing the particle diameter/particle size distribution to reduce the variation in particle size. Thus, the density of the powder material P is increased, whereby the thermal conductivity and thermal diffusion of the powder material P increase. As a result, transmission of heat generated by the laser beam irradiation to the material layer is facilitated. When the parameters ρ, k, and α are reduced, that is, when the values of the energy density ED and the temperature distribution T(r) are reduced, the calculation unit 56 generates the change information to implement at least one of the following changes in the manufacturing conditions for example. In this case, changing the manufacturing conditions includes: reducing the pressure applied from the blade 221 to the powder material P; and increasing the particle diameter/particle size distribution to increase the variation in particle size. Thus, the density of the powder material P is reduced, whereby the thermal conductivity and thermal diffusion of the powder material P decrease. As a result, transmission of heat generated by the laser beam irradiation to the material layer is impeded.

The data in which the parameters ρ, k, and α, the pressure applied to the powder material P, and the particle diameter/particle size distribution are stored in the storage 58 in advance. The calculation unit 56 reads the values of the manufacturing conditions corresponding to the desired values as the values of the parameters from the data, and generates the change information as the new values thus read.

Note that for the parameters ρ, k, and α also affected by the moving speed of the blade 221, the type (shape and material) of the blade 221, and the type of the powder material P, the calculation unit 56 may generate the change information for each of the above.

The parameters k and α are also affected by the hygroscopicity of the powder material P. When the parameters k and α are increased, that is, when the value of the temperature distribution T(r) is increased, the calculation unit 56 decreases the hygroscopicity.

When the calculation unit 56 generates the change information in the manner described above, the output unit 55 outputs the generated change information, as state information, to the material controller 51, the manufacturing controller 52, and/or the housing controller 53 of the setting unit 59 according to the content of the manufacturing condition to be changed. The material controller 51 is configured to control, for example, the operation of the material layer forming unit 20, that is, the operation of the driving mechanism 212 that drives the bottom surface 211 of the material supply tank 21, the operation of the blade 221 (moving speed of the blade 221, the pressure applied by the blade 221 applies to the powder material P, and the standby time of the blade 221), and the heating temperature of the heater 213 that heats the powder material contained in the material supply tank 21. For example, the manufacturing controller 52 controls the operation of the irradiator 32, the scanning unit 33, the base plate 311, and the driving mechanism 312 that drives the heater 313 in accordance with the content of the change information, and changes the design data. For example, the housing controller 53 controls the operation of the heater 15, the intake device 131, and the discharge device 14 in accordance with the change information to control the atmosphere in the housing 10.

Note that the calculation unit 56 may also use a correction value that is a value of a difference between the new value of each generated manufacturing condition and the value of the current manufacturing condition, as the change information. In this case, the output unit 55 outputs the change information generated by the calculation unit 56 to the setting unit 59 as state information. The material controller 51, the manufacturing controller 52, and the housing controller 53 control the operation of each component using the input state information as a correction value for correcting the manufacturing condition.

Next, one of specific examples of the processing executed by the detection unit 54 and the calculation unit 56 is described for a case of the real time change, and a case of the change for forming the next layer.

First of all, one of specific examples of the processing is described for the case of real time change. In the following description, an example is given of cases in which a state of the powder material P before heating and the melting state are obtained by the detection unit 54 as the state of the detection target region.

First of all, processing for the real time change will be described in an example case where the detection unit 54 information on the temperature of the powder material P (that is, around the melt pool MP) that has not been heated to melt by the laser beam irradiation as the state of the detection target region, and the calculation unit 56 generates the change information to keep the value of the energy density ED in the desired range. Note that the calculation unit 56 is not limited to generating the change information to keep the value of the energy density ED in the desired range, and may generate the change information so as to maintain at least one of the values of the power density PD, the value of the energy density ED, and the temperature distribution T(r) in a desired range.

Figure 10:
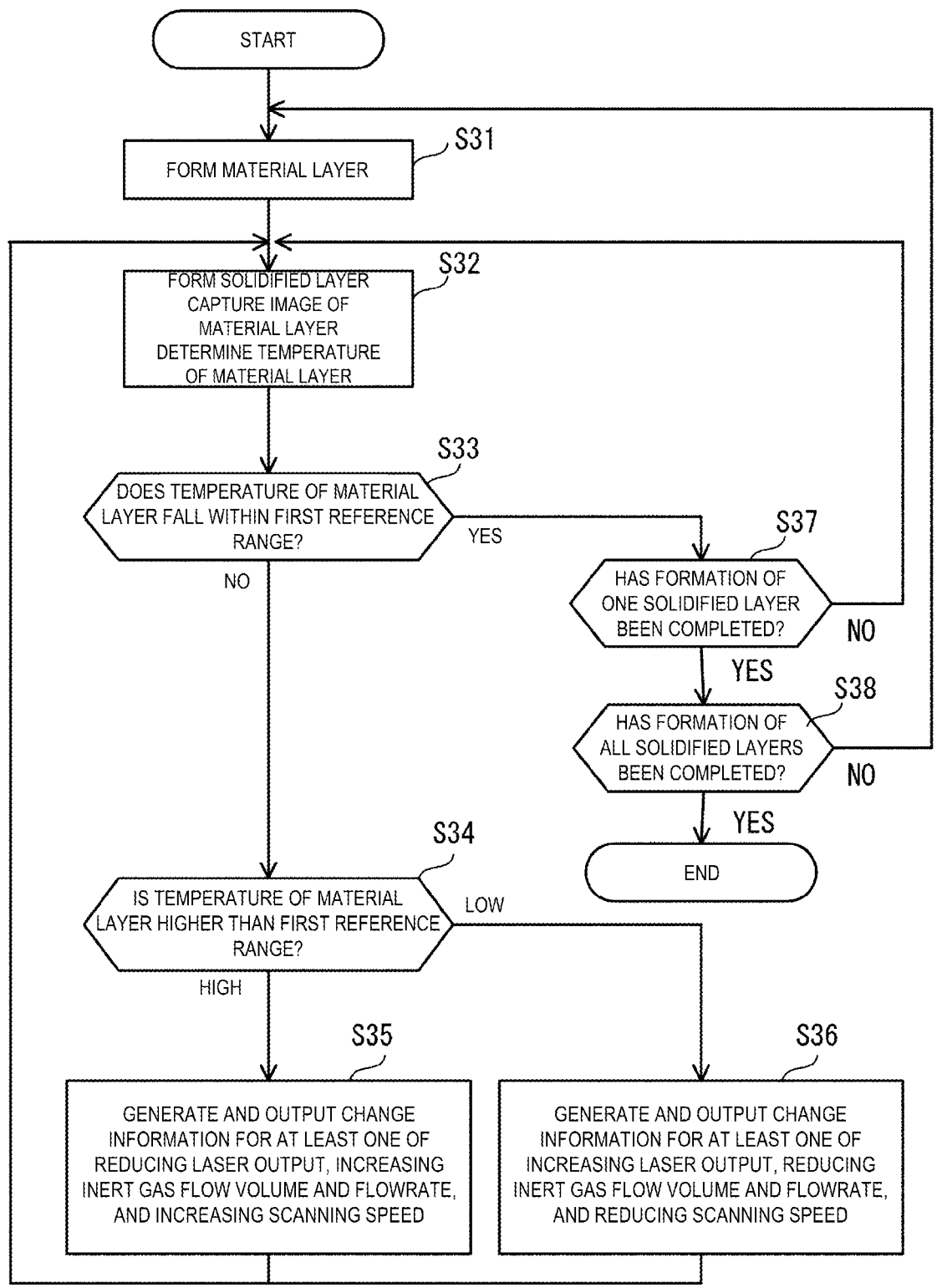
FIG. 10 is a flowchart for explaining processing in the case of real time change.

Each processing in a flowchart illustrated in FIG. 10 is stored in the storage 58 of the calculation device 50, and is read and executed by the calculation device 50.

In step S31, the material controller 51 makes the material layer forming unit 20 form a material layer under the set manufacturing conditions and, then the processing proceeds to step S32. In step S32, the manufacturing controller 52 makes the manufacturing unit 30 form the solidified layer under the set manufacturing conditions. When the laser beam irradiation by the irradiator 32 starts, the calculation device 50 makes the imager 41 capture an image of a detection target region on the surface of the material layer. The detection unit 54 generates thermal image data based on the image data generated based on the image captured by the imager 41, and obtains the temperature of the powder material P in the material layer before melting from the thermal image data. The detection unit 54 may obtain the temperature of the solidified region BE adjacent to the route of the laser beam scanning.

In step S33, the determination unit 57 determines whether the temperature of the powder material P of the material layer obtained by the detection unit 54 falls within a predetermined first reference range. The first reference range is a temperature range of the material layer (powder material P) for keeping the energy density ED within the desired range described above. The first reference range (the range of the temperature of the powder material P) is set based on a correlation between the temperature of the powder material P and the energy density ED obtained, for example, by the user through various tests, simulations, etc. The first reference range is stored in advance in the storage 58, and the determination unit 57 reads the first reference range and uses the first reference range in step S33 or the determination processing in step S34 described below.

Note that when the powder material P is aluminum, for example, the range of temperature falling within the first reference range may be 20° C.±5° C. under room temperature, and may be 200° C.±10° C. when pre-heated, for example. When the determination unit 57 determines that the temperature of the material layer does not fall within the first reference range, the processing proceeds to step S34, and when the determination unit 57 determines that the temperature of the material layer falls within the first reference range, the processing proceeds to step S37, which will be described below. In other words, the determination unit 57 determines whether to generate the change information in step S33.

Note that the first reference range described above is not limited to the energy density ED, and may be set to keep the power density PD and the temperature distribution T(r) within a desired range.

In step S34, the determination unit 57 determines whether the temperature of the material layer is higher than or lower than the first reference range. When the determination unit 57 determines that the temperature of the material layer is higher than the first reference range, the processing proceeds to step S35, and when the determination unit 57 determines that the temperature of the material layer is lower than the first reference range, the processing proceeds to step S36.

Note that in a case where the detection unit 54 obtains the temperature of the adjacent solidified region BE, when being affected by heat of the adjacent solidified region BE, the determination unit 57 compares at least one of the energy density ED, the power density PD, and the temperature distribution T(r) with the first reference range set as a range of temperatures of the material layer for maintaining at least one of the energy density ED, the power density PD, and the temperature distribution T(r) within a desired range.

In step S35, the calculation unit 56 generates change information for changing the manufacturing condition to reduce the value of the energy density ED so that the energy density ED falls within the desired range. The energy density ED is reduced because of the following reason. When the temperature of the material layer is higher than the first reference range, the temperature of the powder material P increases to a desired temperature (melting point for example) by the laser beam irradiation even with a small amount of heat. Thus, the energy density ED of the energy absorbed by the powder material P might be excessive.

The output of the laser beam from the irradiator 32 may be reduced to reduce the value of the energy density ED to reduce the value of the energy absorbed by the powder material P. Furthermore, the effect of heating the powder material P by the laser beam irradiation may be reduced with the flow volume of the inert gas increased to increase the flowrate of the inert gas to thereby cool the surface of the material layer to reduce the temperature of the powder material P. Furthermore, the energy absorbed by the powder material P may be reduced by increasing the scanning speed of the laser beam from the scanning unit 33 to shorten the period of time during which the same position on the material layer is irradiated with the laser beam.

Based on the above ideas, the calculation unit 56 generates the change information so that at least one of reduction of the parameter $P_L$, $P_O$ and the increase in the parameter v is achieved for reducing the value of the energy density ED for example. In this case, the calculation unit 56 generates the change information to make at least one of the following changes in the manufacturing condition: changing the manufacturing condition associated with the parameter $P_L$ to lower the laser output; changing the manufacturing condition associated with the parameter $P_O$ to increase the flow volume and the flowrate of the inert gas; and changing the manufacturing condition associated with the parameter v to increase the scanning speed.

In this case, the calculation unit 56 calculates the amount (reduced amount) by which the value of the energy density ED is reduced, based on a difference between the temperature of the material layer obtained by the detection unit 54 and any value (for example, a maximum value or a median value) within the first reference range. In this case, the data in which the reduced amount of the energy density ED and the difference between the temperature of the material layer and any value within the first reference range (for example, the maximum value or the median value) are stored in the storage 58 in advance, and the calculation unit 56 calculates the reduced amount of the value of the energy density ED by referring to the data. Based on the reduced amount of energy density ED, the calculation unit 56 calculates a new value for each of the parameters $P_L$, $P_O$, and v using Formula (2). The calculation unit 56 calculates values of each corresponding manufacturing corresponding to the calculated new parameter value by referring to the data stored in the storage 58 in which the value of each parameter and the value of each manufacturing condition are associated, and generates the change information as the resultant value of the manufacturing condition. Note that as described above, the calculation unit 56 may generate, as the change information, a correction value that is a difference between the value of the new manufacturing condition and the value of the current manufacturing condition, and the output unit 55 may output the correction value to the setting unit 59 as the state information.

The output unit 55 outputs the change information generated by the calculation unit 56 as the state information to the setting unit 59 (at least one of the manufacturing controller 52 and the housing controller 53). Upon receiving the change information, the manufacturing controller 52 causes at least one of the following operations to be performed by at least one of the irradiator 32 and the scanning unit 33. The operation of the irradiator 32 in this case is to emit the laser beam with a new laser output based on the change information. The operation of the scanning unit 33 is to drive the galvano mirrors 331, 332 at a new inclination angle change speed based on the change information. Upon receiving the change information, the housing controller 53 makes the intake device 131 and the discharge device 14 operate with the new valve opening degree and the discharge amount based on the change information. The processing then returns to step S32.

In step S36, the calculation unit 56 generates change information for changing the manufacturing condition to increase the value of the energy density ED. The value of the energy density ED is increased because of the following reason. When the temperature of the material layer is lower than the first reference range, a large amount of heat is required to raise the temperature of the powder material P irradiated with the laser beam to a desired temperature (melting point for example). Thus, the energy density ED of the energy absorbed by the powder material P might be insufficient.

In this case, the calculation unit 56 changes the manufacturing condition to increase the value of the energy density ED based on the idea opposite to that in step S35 described above. In this case, the calculation unit 56 generates the change information so that at least one of increase in the parameter $P_L$, $P_O$ and reduction of the parameter v is achieved. In this case, the calculation unit 56 generates the change information to make at least one of the following changes in the manufacturing condition: changing the manufacturing condition associated with the parameter $P_L$ to increase the laser output; changing the manufacturing condition associated with the parameter $P_O$ to reduce the flow volume and the flowrate of the inert gas; and changing the manufacturing condition associated with the parameter v to lower the scanning speed. The calculation unit 56 calculates the amount (increased amount) by which the value of the energy density ED is increased, based on a difference between the temperature of the material layer obtained by the detection unit 54 and any value (for example, a minimum value or a median value) within the first reference range. In this case, the data in which the increased amount and the difference between the temperature of the material layer and any value within the first reference range (for example, the minimum value or the median value) are stored in the storage 58 in advance, and the calculation unit 56 calculates the increased amount of the value of the energy density ED by referring to the data. Based on the increased amount of energy density ED, the calculation unit 56 calculates a new value for each of the parameters $P_L$, $P_O$, and v. The calculation unit 56 calculates values of each corresponding manufacturing corresponding to the calculated new parameter value by referring to the data stored in the storage 58 in which the value of each parameter and the value of each manufacturing condition are associated, and generates the change information as the resultant value of the manufacturing condition.

The output unit 55 outputs the change information as the state information to the setting unit 59 (at least one of the manufacturing controller 52 and the housing controller 53). Upon receiving the change information, the manufacturing controller 52 causes at least one of the following operations to be performed by at least one of the irradiator 32 and the scanning unit 33. The operation of the irradiator 32 in this case is to emit the laser beam with a new laser output based on the change information. The operation of the scanning unit 33 is to drive the galvano mirrors 331, 332 at a new inclination angle change speed based on the change information. Upon receiving the change information, the housing controller 53 makes the intake device 131 and the discharge device 14 operate with the new valve opening degree and the discharge amount based on the change information. The processing then returns to step S32. Also in this case, the calculation unit 56 may generate, as the change information, a correction value that is a difference between the value of the new manufacturing condition and the value of the current manufacturing condition, and the output unit 55 may output the correction value to the setting unit 59 as the state information.

In step S37, to which the processing proceeds in a case where the temperature of the material layer falls within the first reference range, the calculation device 50 determines whether formation of one solidified layer has been completed. When the formation of one solidified layer has not been completed yet, a result of the determination by the calculation device 50 in step S37 is NO, and the processing returns to step S32. When the formation of one solidified layer has been completed, a result of the determination by the calculation device 50 in step S37 is YES, and the processing proceeds to step S38. In step S38, the calculation device 50 determines whether formation of all the solidified layers has been completed. When the formation of all the solidified layers has not been completed yet, a result of the determination by the calculation device 50 in step S38 is NO, and the processing proceeds to step S31. When the formation of all the solidified layers has been completed, a result of the determination by the calculation device 50 in step S38 is YES, and the entire processing is terminated.

Note that, in the example described above, the detection unit 54 obtains the temperature of the powder material P before being heated by the laser beam irradiation, but the present disclosure is not limited to this example. For example, a foreign matter or the spatter SP mixed in the powder material P of the material layer may be identified. In this case, the detection unit 54 may use a known image processing method on the image data captured by the imager 41 to identify the foreign matter and the spatter SP, without obtaining the information on the temperature using the two-color method. In this case, the detection unit 54 may use a pre-acquired training image to identify the powder material P, the foreign object, and the spatter SP from the image data captured by the imager 41 while distinguishing them from each other, based on differences in the size and shape among particles of the powder material P, the foreign matter, and the spatter SP for example. Furthermore, for example, the foreign matter and the spatter SP may be identified in a color image captured and generated by an imager different from the imager 41.

Through the processing described above, the energy density ED, which is one of the basic conditions related to melting and solidifying of the powder material P, is maintained within a desired range, and the occurrence of a manufacturing defect of the solidified layer due to insufficient energy or excessive energy in the powder material P can be suppressed.

Next, as an example of a specific example of processing in the case of real time change, an example will be described in which the detection unit 54 obtains information on the temperature of the melt pool MP and a portion therearound as the melting state, and the calculation unit 56 generates the change information so as to keep the value of the energy density ED within the desired range. Note that the calculation unit 56 is not limited to generating the change information to keep the value of the energy density ED in the desired range, and may generate the change information so as to maintain at least one of the values of the power density PD, the value of the energy density ED, and the temperature distribution T(r) in a desired range.

Figure 11:
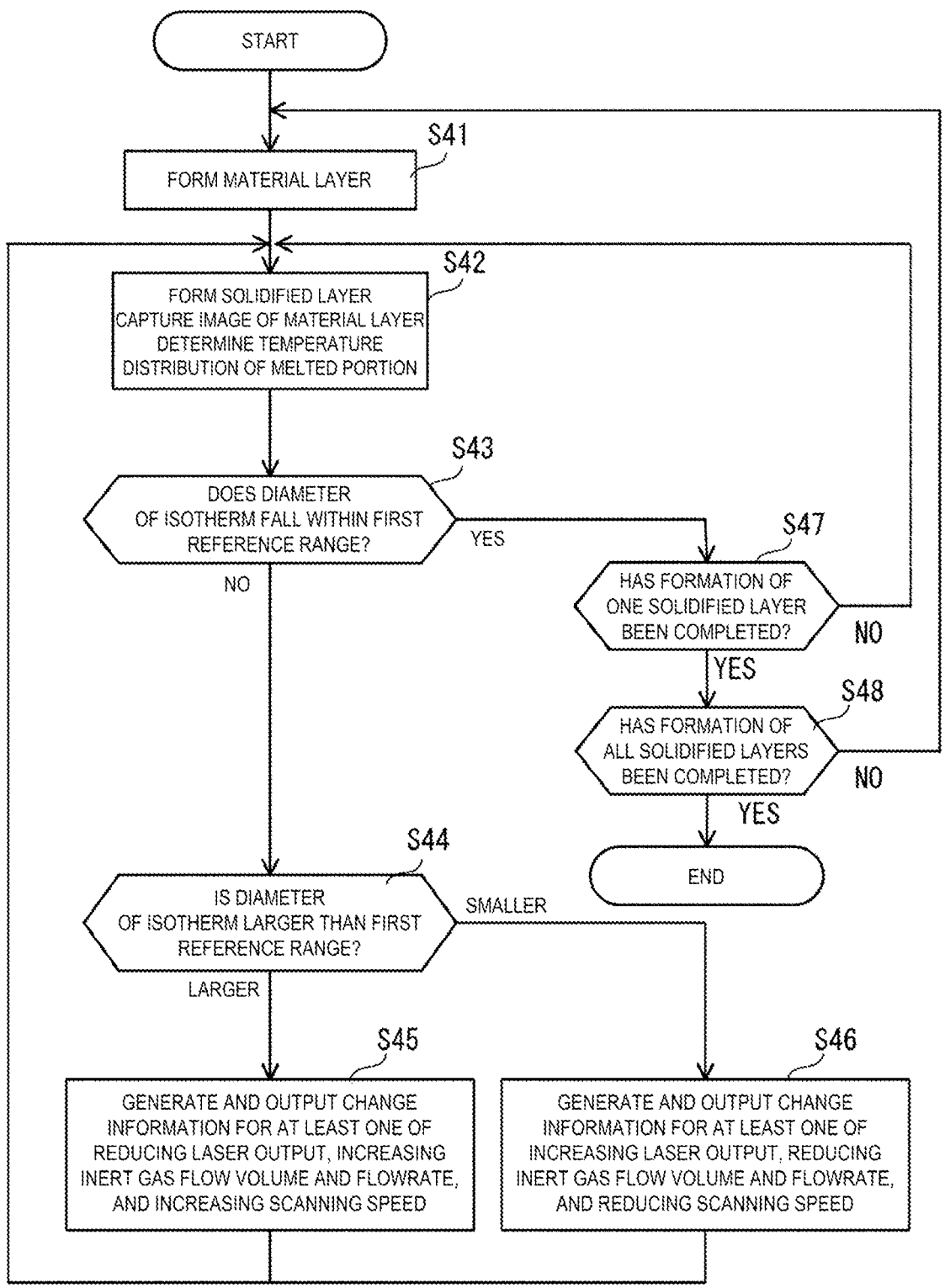
FIG. 11 is a flowchart for explaining processing in the case of real time change.

Each processing in a flowchart illustrated in FIG. 11 is stored in the storage 58 of the calculation device 50, and is read and executed by the calculation device 50.

The processing in steps S41 and S42, is similar to that in steps S31 and S32 in the flowchart illustrated in FIG. 10.

Still, in step S42, the detection unit 54 uses the thermal image data generated from the image data generated based on an image captured by the imager 41, and obtains the temperature distribution of the melt pool MP as information related to the temperature in the melt pool MP and a portion therearound. The specific example illustrated in FIG. 11 is an example in which the detection unit 54 obtains, from the thermal image data, a diameter of an isotherm corresponding to any temperature of the melt pool MP.

In step S43, the determination unit 57 determines whether the temperature distribution of the melt pool MP obtained by the detection unit 54, that is, the diameter of the isotherm corresponding to any temperature of the melt pool MP falls within the predetermined first reference range. The first reference range is the range defined by the diameter of the isotherm to keep the temperature distribution T(r) within the desired range. This first reference range is set based on a correlation between the temperature distribution (diameter of an isotherm corresponding to any temperature) of the melt pool MP obtained and the temperature distribution T(r) obtained, for example, by the user through various tests, simulations, etc. The first reference range is stored in advance in the storage 58, and the determination unit 57 reads the first reference range and uses the first reference range in step S43 or the determination processing in step S44 described below. When the determination unit 57 determines that the diameter of the isotherm in the melt pool MP does not fall within the first reference range, the processing proceeds to step S44, and when the determination unit 57 determines that the diameter of the isotherm falls within the first reference range, the processing proceeds to step S47, which will be described below. In other words, the determination unit 57 determines whether to generate the change information in step S43.

Note that the first reference range described above is not limited to the temperature distribution T(r), and may be set to keep the power density PD and the energy density ED within a desired range. The range of the diameter of the isotherm that is the first reference range may be a range of the diameter of the isotherm corresponding to the temperature range from a temperature between the melting point and the liquidus temperature to a temperature between the melting point and the solidus temperature of the powder material P used.

In step S44, the determination unit 57 determines whether the diameter of the isotherm exceeds or falls below the first reference range. When the determination unit 57 determines that the diameter of the isotherm is determined to exceed the first reference range, the processing proceeds to step S45, and when the determination unit 57 determines that the diameter of the isotherm falls below the first reference range, the processing proceeds to step S46.

In step S45, the calculation unit 56 generates change information for changing the manufacturing condition to reduce the value of the energy density ED so that the value of the energy density ED falls within the desired range. The value of the energy density ED is decreased because of the following reason. The diameter of the isotherm in the melt pool MP exceeding the first reference range indicates that the melt pool MP is greater than the melt pool MP expected to be obtained with the manufacturing conditions currently set. Thus, the energy density ED of the energy absorbed by the powder material P inside the material layer is anticipated to be excessive.

In this case, as in the processing in step S35 in FIG. 10, the calculation unit 56 generates the change information so that at least one of reduction of the parameter $P_L$, $P_0$ and the increase in the parameter v is achieved to reduce the value of the energy density ED. In other words, the calculation unit 56 generates the change information so that at least one of reduction of the laser output, increase in the flow volume of the inert gas, increase in the flowrate, and reduction of the scanning speed is achieved. The specific processing executed by the calculation unit 56 to generate the change information is executed in a manner similar to that in step S35 illustrated in FIG. 10, by referring to the data stored in the storage 58. The output unit 55 outputs the change information generated by the calculation unit 56 as the state information to the setting unit 59 (at least one of the manufacturing controller 52 and the housing controller 53). Upon receiving the change information, the manufacturing controller 52 causes at least one of the following operations to be performed by at least one of the irradiator 32 and the scanning unit 33. The operation of the irradiator 32 in this case is to emit the laser beam with a new laser output based on the change information. The operation of the scanning unit 33 is to drive the galvano mirrors 331, 332 at a new inclination angle change speed based on the change information. Upon receiving the change information, the housing controller 53 makes the intake device 131 and the discharge device 14 operate with the new valve opening degree and the discharge amount based on the change information. The processing then returns to step S42.

In step S46, the calculation unit 56 generates change information for changing the manufacturing condition to increase the value of the energy density ED so that the value of the energy density ED falls within the desired range. The energy density ED is increased because of the following reason. The diameter of the isotherm in the melt pool MP falling below the first reference range indicates that the melt pool MP is smaller than the melt pool MP expected to be obtained with the manufacturing conditions currently set. Thus, the energy density ED of the energy absorbed by the powder material P inside the material layer is anticipated to be insufficient.

In this case, as in the processing in step S36 in FIG. 10, the calculation unit 56 generates the change information so that at least one of increase in the parameter $P_L$, $P_0$ and the reduction of the parameter v is achieved to increase the energy density ED. In other words, the calculation unit 56 generates the change information so that at least one of increase in the laser output, reduction of the flow volume and the flowrate of the inert gas, and reduction of the scanning speed is achieved. The specific processing executed by the calculation unit 56 to generate the change information is executed in a manner similar to that in step S36 illustrated in FIG. 10, by referring to the data stored in the storage 58. The output unit 55 outputs the change information generated by the calculation unit 56 as the state information to the setting unit 59 (at least one of the manufacturing controller 52 and the housing controller 53). Upon receiving the change information, the manufacturing controller 52 causes at least one of the following operations to be performed by at least one of the irradiator 32 and the scanning unit 33. The operation of the irradiator 32 in this case is to emit the laser beam with a new laser output based on the change information. The operation of the scanning unit 33 is to drive the galvano mirrors 331, 332 at a new inclination angle change speed based on the change information. Upon receiving the change information, the housing controller 53 makes the intake device 131 and the discharge device 14 operate with the new valve opening degree and the discharge amount based on the change information. The processing then returns to step S42.

In steps S45 and S46, the calculation unit 56 may generate, as the change information, a correction value that is a difference between the value of the new manufacturing condition and the value of the current manufacturing condition, and the output unit 55 may output the correction value to the setting unit 59 as the state information.

The processing in steps S47 and S48, to which the processing proceeds when the diameter of the isotherm is within the first reference range is similar to the processing in steps S37, S38 of FIG. 10.

Through the processing described above, the basic conditions for melting and solidifying the powder material P are maintained within a desired range, and the occurrence of a manufacturing defect of the solidified layer due to insufficient melting or excessive melting can be suppressed.

Note that, in step S42, the detection unit 54 may obtain the ratio between the long axis and the single axis of the melt pool MP on the XY plane, and the temperature gradient of the melt pool MP on the XY, as the information on the melt pool MP and a portion therearound. Also in this case, a ratio between the long axis and the short axis of the melt pool MP on the XY plane or the temperature gradient of the melt pool MP on the XY plane for maintaining at least one of the energy density ED, power density PD, and temperature distribution $T(r)$ within a desired range may be used as the first reference range. Also in this case, the first reference range is set based on the results of various tests and simulations by the user, as described above.

When the ratio between the long axis and the short axis of the melt pool MP exceeds the first reference range, the energy density ED of the energy absorbed by the powder material P is excessive, and the melt pool MP is anticipated to be larger than the melt pool MP expected to be obtained from the currently set manufacturing condition. Thus, the calculation unit 56 may generate the change information in a manner that is the same as that in step S45 to reduce the value of the energy density ED. When the ratio between the long axis and the short axis of the melt pool MP falls below the first reference range, the calculation unit 56 may generate the change information in a manner that is the same as that in step S46.

When the temperature gradient of the melt pool MP exceeds the first reference range, the energy density ED of the energy absorbed by the powder material P is excessive, and the variation in temperature in the melt pool MP is anticipated to be large. Thus, the calculation unit 56 may generate the change information in a manner that is the same as that in step S45 to reduce the value of the energy density ED. When the temperature gradient of the melt pool MP falls below the first reference range, the calculation unit 56 may generate the change information in a manner that is the same as that in step S46.

Next, as an example of a specific example of processing in the case of real time change, an example will be described in which the detection unit 54 obtains the state of the spatter SP, and the calculation unit 56 generates the change information so as to keep the value of the energy density ED within the desired range. Note that the calculation unit 56 is not limited to generating the change information to keep the value of the energy density ED in the desired range, and may generate the change information so as to maintain at least one of the values of the power density PD, the value of the energy density ED, and the temperature distribution $T(r)$ in a desired range.

Figure 12:
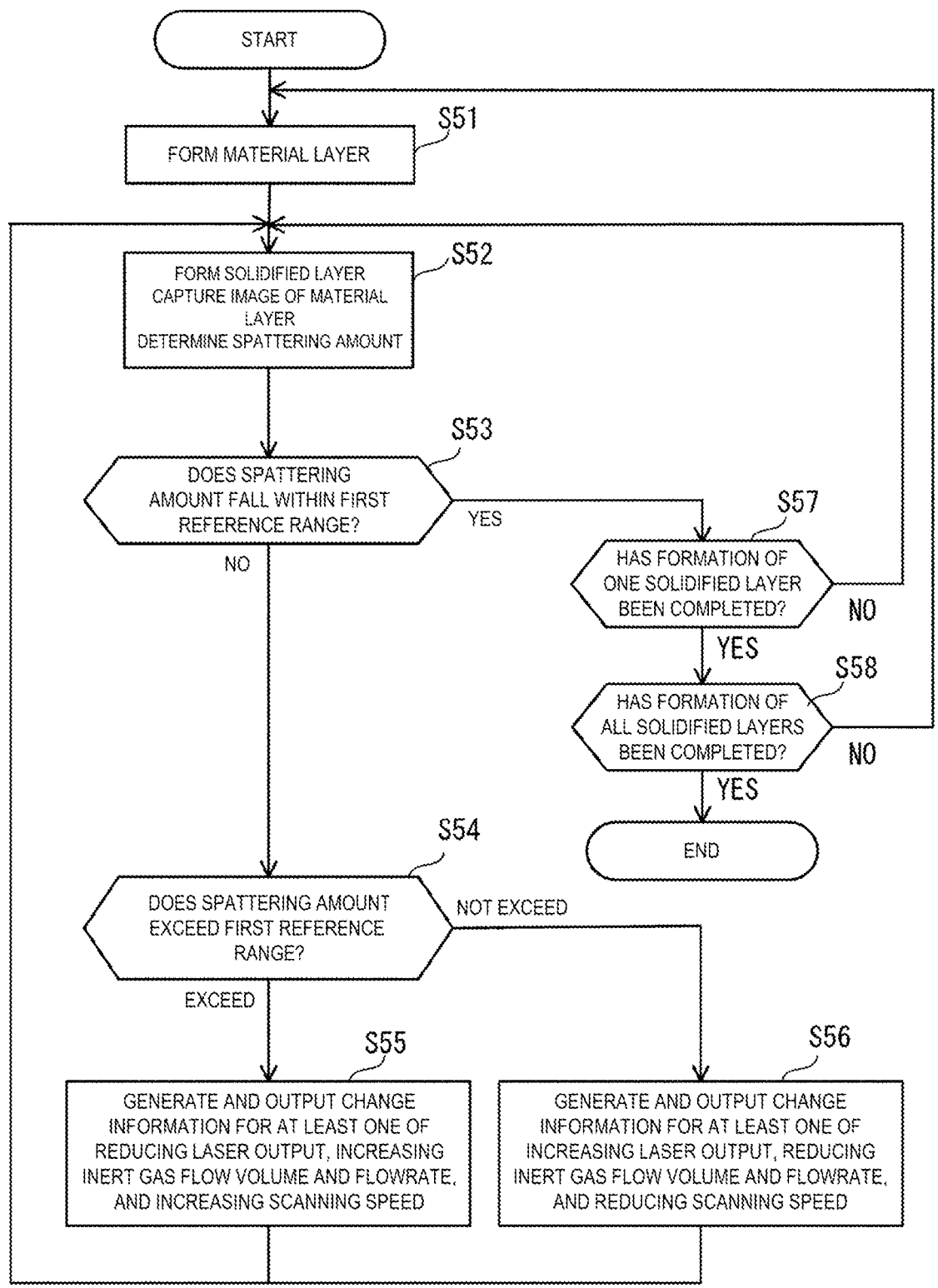
FIG. 12 is a flowchart for explaining processing in the case of real time change.

Each processing in a flowchart illustrated in FIG. 12 is stored in the storage 58 of the calculation device 50, and is read and executed by the calculation device 50.

The processing in steps S51 and S52, is similar to that in steps S31 and S32 in the flowchart illustrated in FIG. 10. Still, in step S52, the detection unit 54 uses the thermal image data generated from the image data generated based on an image captured by the imager 41, and obtains the state of the spatter SP from the thermal image data using the method described with reference to FIG. 6. The specific example illustrated in the flowchart of FIG. 12 is described as an example in which the detection unit 54 obtains the spattering amount of the spatter SP as the state of the spatter SP.

In step S53, the determination unit 57 determines whether the state of the spatter SP, that is, the spattering amount of the spatter SP obtained by the detection unit 54 falls within a predetermined first reference range. The first reference range is a temperature range of the spattering amount of the spatter SP for keeping the energy density ED within the desired range. The range of the spattering amount of the spatter SP is set based on a correlation between the spattering amount of the spatter SP and the energy density ED obtained, for example, by the user through various tests, simulations, etc. The range of the spattering amount of the spatter SP (first reference range) is stored in advance in the storage 58, and the determination unit 57 reads the first reference range and uses the first reference range in step S53 or the determination processing in step S54 described below. When the determination unit 57 determines that the spattering amount of the spatter SP does not fall within the first reference range, the processing proceeds to step S54, and when the determination unit 57 determines that the spattering amount of the spatter SP falls within the first reference range, the processing proceeds to step S57, which will be described below. In other words, the determination unit 57 determines whether to generate the change information in step S53.

Note that the first reference range described above is not limited to the energy density ED, and may be set to keep the power density PD and the temperature distribution $T(r)$ within a desired range.

In step S54, the determination unit 57 determines whether the spattering amount of the spatter SP exceeds or falls below the first reference range. When the determination unit 57 determines that the spattering amount of the spatter SP exceeds the first reference range, the processing proceeds to step S55, and when the determination unit 57 determines that the spattering amount of the spatter SP falls below the first reference range, the processing proceeds to step S56.

In step S55, the calculation unit 56 generates change information for changing the manufacturing condition so as to lower the value of the energy density ED in order to include the value of the energy density ED to the desired range. The value of the energy density ED is decreased because of the following reason. The spattering amount of the spatter SP exceeding the first reference range indicates that the amount of heat applied to the powder material P is excessive, and that the convection C of the melt pool MP is large. Thus, the energy density ED of the energy absorbed by the powder material P is anticipated to be excessive.

In this case, as in the processing in step S35 in FIG. 10 and in step S45 in FIG. 11, the calculation unit 56 generates the change information so that at least one of reduction of the parameter $P_L$, $P_O$ and the increase in the parameter v is achieved to reduce the value of the energy density ED. In other words, the calculation unit 56 generates the change information so that at least one of reduction of the laser output, increase in the flow volume and the flowrate of the inert gas, and increase in the scanning speed is achieved. The specific processing executed by the calculation unit 56 to generate the change information is executed in a manner similar to that described above with reference to FIG. 10, by referring to the data stored in the storage 58. The output unit 55 outputs the change information generated by the calculation unit 56 as the state information to the setting unit 59 (at least one of the manufacturing controller 52 and the housing controller 53). Upon receiving the change information, the manufacturing controller 52 performs at least one of causing the irradiator 32 to emit the laser beam with the new laser output based on the change information, and causing the scanning unit 33 to drive the galvano mirrors 331, 332 to at the new inclination angle change speed based on the change information. Upon receiving the change information, the housing controller 53 makes the intake device 131 and the discharge device 14 operate with the new valve opening degree and the discharge amount based on the change information. The processing then returns to step S52.

In step S56, the calculation unit generates change information for changing the manufacturing condition to increase the value of the energy density ED so that the value of the energy density ED falls within the desired range. The value of the energy density ED is increased because of the following reason. The spattering amount of the spatter SP falling below the first reference range indicates that the amount of heat applied to the powder material P is insufficient, and that the convection C of the melt pool MP is small. Thus, the energy density ED of the energy absorbed by the powder material P is anticipated to be insufficient.

In this case, as in the processing in step S36 in FIG. 10 and in step S46 in FIG. 11, the calculation unit 56 generates the change information so that at least one of increase in the parameter $P_L$, $P_O$ and the reduction of the parameter v is achieved to increase the value of the energy density ED. In other words, the calculation unit 56 generates the change information so that at least one of increase in the laser output, reduction of the flow volume and the flowrate of the inert gas, and reduction of the scanning speed is achieved. The specific processing executed by the calculation unit 56 to generate the change information is executed in a manner similar to that described above with reference to FIG. 10, by referring to the data stored in the storage 58.

The output unit 55 outputs the change information generated by the calculation unit 56 as the state information to the at least one of the manufacturing controller 52 and the housing controller 53. Upon receiving the change information, the manufacturing controller 52 causes at least one of the following operations to be performed by at least one of the irradiator 32 and the scanning unit 33. The operation of the irradiator 32 in this case is to emit the laser beam with a new laser output based on the change information. The operation of the scanning unit 33 is to drive the galvano mirrors 331, 332 at a new inclination angle change speed based on the change information. Upon receiving the change information, the housing controller 53 makes the intake device 131 and the discharge device 14 operate with the new valve opening degree and the discharge amount based on the change information. The processing then returns to step S52.

In steps S55 and S56, the calculation unit 56 may generate, as the change information, a correction value that is a difference between the value of the new manufacturing condition and the value of the current manufacturing condition, and the output unit 55 may output the correction value to the setting unit 59 as the state information.

The processing in steps S57 and S58, to which the processing proceeds when spattering amount of the spatter is within the first reference range is similar to the processing in steps S37, S38 of FIG. 10.

Through above processing, the state inside the melt pool MP is controlled, whereby the occurrence of internal defects in the solidified layer produced when the melt pool MP is solidified is reduced.

Note that in step S52, the detection unit 54 may obtain the spattering direction and spattering speed of the spatter SP as the state of the spatter SP using the method described using FIG. 6.

When the detection unit 54 obtains the spattering direction of the spatter SP, the first reference range is a range of the spattering direction of the spatter SP so that at least one of the power density PD, the energy density ED, and the temperature distribution T(r) is kept within a desired range. The range (first reference range) of the spattering direction of the spatter SP is set, for example, based on the results of various tests, simulations, and the like by the user, as in step S53 described above. The determination unit 57 determines that the spattering direction of the spatter SP with respect to the keyhole KH is outside the first reference range when the direction randomly fluctuates without being fixed in a certain direction (rearward with respect to the scanning direction of the laser beam for example). As described above, the spattering direction of the spatter SP not fixed to a certain direction indicates a state where an excessive amount of energy is received by the powder material P. This state indicates that the keyhole KH is deep and the convection C of the melt pool MP is massive, and thus the calculation unit 56 generates the change information so as to reduce the value of the energy density ED.

When the detection unit 54 obtains the spattering speed of the spatter SP, the first reference range is a range of the spattering speed of the spatter SP to maintain at least one of the power density PD, the energy density ED, and the temperature distribution T(r) within a desired range. The range (first reference range) of the spattering speed of the spatter SP is set, for example, based on the results of various tests, simulations, and the like by the user, as in step S53 described above. The determination unit 57 determines that high spattering speed does not fall within the first reference range. As described above, a high spattering speed of the spatter SP indicate a massive convection C of the melt pool MP, and thus the calculation unit 56 generates the change information so as to reduce the value of the energy density ED.

Furthermore, the detection unit 54 may determine the state of the fume FU as the state of the detection target region.

A case in which the detection unit 54 obtains the concentration of the fume FU as the state of the fume FU using the method described using FIG. 7 will be described. In this case, the first reference range is a range of the concentration of the fume FU that maintains at least one of the power density PD, the energy density ED, and the temperature distribution T(r) within a desired range. The range (first reference range) of the concentration of the fume FU is set, for example, based on the results of various tests, simulations, and the like by the user, as in step S33, step S43, and step S53 described above. The determination unit 57 determines that a higher concentration does not fall within the first reference range. As described above, a higher concentration of the fume FU means that a larger amount of fume FU is produced, indicating that excessive energy is absorbed by the powder material P and thus indicating that the temperature within the melt pool MP is too high. Thus, the calculation unit 56 generates the change information so as to reduce the value of the energy density ED.

A case in which the detection unit 54 obtains the range of the fume FU as the state of the fume FU using the method described using FIG. 7 will be described. In this case, the first reference range is a range of the fume FU that maintains at least one of the power density PD, the energy density ED, and the temperature distribution T(r) within a desired range. The range (first reference range) of the fume FU is set, for example, based on the results of various tests, simulations, and the like by the user, as in step S53 described above. The determination unit 57 determines that the fume FU of a large range, that is, with a wide are on the thermal image does not fall within the first reference range. As described above, a large range of the fume FU means that a large amount of fume FU is produced, indicating that excessive energy is absorbed by the powder material P and thus indicating that the temperature within the melt pool MP is too high. Thus, the calculation unit 56 generates the change information so as to reduce the value of the energy density ED.

Note that, in steps S35, S36, S45, S46, S55, and S56 in the flowcharts illustrated in FIGS. 10, 11, and 12 described above, the calculation unit 56 may vary which of the parameters $P_L$, $P_0$, and v is changed or not changed depending on a request from the user for the production of the 3D manufactured object. For example, if the user desires to avoid long manufacturing time, in the above steps S36, S46, and S56, the calculation unit 56 may change the value of the parameter $P_L$ and not change the value of the parameter v so that the scanning speed of the laser beam is not reduced. As an example, in a case where the energy density ED is lower than the desired range, the calculation unit 56 generates the change information to increase the value of the parameter $P_L$ without changing the value of the parameter v. In this case, the manufacturing time is maintained, but the temperature change during the process of solidifying the powder material P melted by the laser beam irradiation increases, so the residual stress of the solidified layer increases. As a result, the quality of the 3D manufactured object produced may be compromised.

On the other hand, when the user desires to avoid a degradation of the quality of the 3D manufactured object produced, in the above steps S36, S46, and S56, the calculation unit 56 may change the value of the parameter v and not change the value of the parameter $P_L$ so that the output of the laser beam does not increase. As an example, in a case where the energy density ED is lower than the desired range, the calculation unit 56 generates the change information to reduce the value of the parameter v without increasing the value of the parameter $P_L$. In this case, the residual stress in the solidified layer due to the temperature change does not increase, and the quality of the 3D manufactured object is maintained, but the manufacturing time may become long.

As described above, because there are a plurality of types of parameters that can be changed in order to maintain the energy density ED within the desired range, parameters to be changed by the calculation unit 56 may be determined based on an instruction from the user. In this case, the calculation unit 56 broadcasts to the user, information (hereinafter, referred to as designation target information) for accepting the predetermined designation by the user for determining the parameter to be changed. For example, an unillustrated display device such as a liquid crystal display that can communicate with the calculation unit 56 may display designation target information including parameters (for example, the parameter v and the parameter $P_L$) that can be changed by the calculation unit 56 to maintain the energy density ED within a desired range. The user designates a parameter displayed on the display device (e.g., the parameter v is designated for example) using an unillustrated designation device, such as a mouse. The calculation unit 56 generates the change information to the value of the parameter (parameter v) designated by the user so as to maintain the energy density ED within the desired range.

Note that for convenience of explanation, an example where the unillustrated display device displays the designation target information including two types of parameters (the parameter v and the parameter $P_L$) based on the flowcharts illustrated in FIGS. 10 to 12, but the parameters displayed on the display device as the designation target information are not limited to the two types of parameters (the parameter v and the parameter $P_L$). For example, the calculation unit 56 may make the display device display, as designation target information, a plurality of parameters changeable to maintain the basic condition and a detail condition (described below) within a desired range, among parameters $P_0$, η, d, Δy, Δz, ρ, k, r, x, α, and $T_0$ other than the parameter v and the parameter $P_L$. When at least one of the plurality of displayed parameters is designated by the user, the calculation unit 56 generates the change information for changing the value of the parameter designated by the user to maintain the basic condition and the detailed condition (described below) within the desired range.

Further, the designation target information displayed on the unillustrated display device by the calculation unit 56 is not limited to parameters. For example, the calculation unit 56 may display, as the designation target information on the display device, a plurality of manufacturing conditions that can be changed in order to maintain the basic condition and the detail condition (described below) within the desired range, among the manufacturing conditions described above.

The manufacturing time and quality of the 3D manufactured object are affected by the parameters and manufacturing conditions changed. Thus, the designation of the parameters and manufacturing conditions by the user as described above should not be construed in a limiting sense, and the user may select whether the manufacturing time or the quality of the 3D manufactured object is to be prioritized (maintained). In this case, as an example, the calculation unit 56 displays, as the designation target information on the unillustrated display device, items for prioritizing time and prioritizing quality. The user uses an unillustrated designation device, such as a mouse, to designate one of the items for prioritizing time and prioritizing quality displayed on the display device. The calculation unit 56 generates change information for changing a parameter or a value of the manufacturing condition corresponding to the item designated by the user to maintain the basic condition and detailed condition (described below) within a desired range. As an example, in a case where the energy density ED is lower than the desired range, the calculation unit 56 generates the change information to change the value of the parameter $P_L$ without changing the value of the parameter v, when the user designates the item for prioritizing time for example. On the other hand, the calculation unit 56 generates the change information to change the value of the parameter v without changing the value of the parameter $P_L$, when the user designates the item for prioritizing quality.

Note that, in addition to prioritizing time or quality, an item prioritizing balance, for prioritizing a balance between manufacturing time and quality may be displayed as the designation target information on the display device (not illustrated) together with at least one of the items for prioritizing time and quality. As an example, in a case where the energy density ED is lower than the desired range, the calculation unit 56 generates the change information to change both the value of the parameter $P_L$ and the value of the parameter v, when the user designates the item for prioritizing balance for example.

Note that the items for prioritizing time, quality, and balance may be displayed on the display device in any known ways such as with character strings and icons as long as the user can identify them.

Note that the unillustrated display device may not be a liquid crystal display, and may be a known display device such as an organic EL display or a head-mounted display. The designation device (not illustrated) may not be a mouse and may be a known device, such as a touch panel.

Note that how the user is notified of the designation target information is not limited to displaying on the display device. For example, a speaker (not illustrated) and a microphone may be used. Specifically, the calculation unit 56 may broadcast the designation target information to the user through the speaker (voice), and accept the designation from the user through the microphone (voice). Other known methods may also be used.

Furthermore, in steps S35, S36, S45, S46, S55, and S56, the calculation unit 56 may generate the change information for the manufacturing condition other than the parameters $P_L$, $P_0$, and v described above, which has an impact on the energy density ED and can be changed by real time change. For example, the calculation unit 56 may generate change information for the oscillation mode of the laser beam of the irradiator 32, the intensity distribution of the laser beam, a spot size of the laser beam, and a scanning pass and a scanning pitch of the laser beam of the scanning unit 33.

First of all, one of specific examples of the processing is described for the case of change for forming a next layer. In the following description, a case where the detection unit 54 obtains the melting state as the state of the detection target region, and a case where the detection unit 54 obtains the state of the spatter SP are separately described.

First of all, the following case is described as the processing for change for forming the next layer. Specifically, the detection unit 54 obtains information on the temperature of the melt pool MP and a portion therearound is obtained as the melting state while the solidified layer is being formed. Based on the information on the temperature obtained by the detection unit 54 while the solidified layer is being formed, the calculation unit 56 generates the change information to keep the value of the energy density ED, for forming a new solidified layer on top of the solidified layer, within a desired range. Note that the calculation unit 56 is not limited to generating the change information to keep the value of the energy density ED in the desired range, and may generate the change information so as to maintain at least one of the values of the power density PD, the value of the energy density ED, and the temperature distribution T(r) in a desired range.

Figure 13:
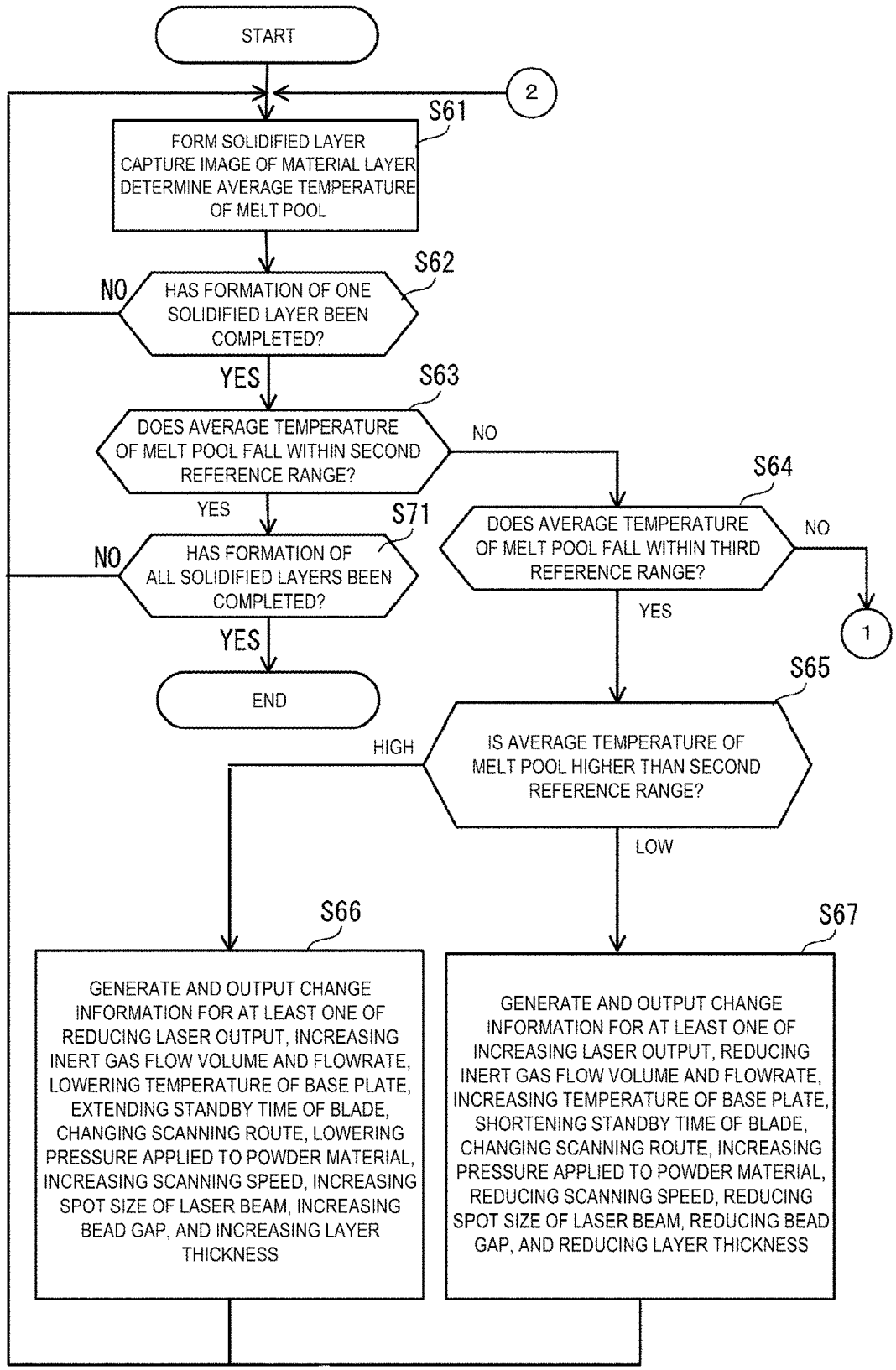
FIG. 13 is a flowchart for explaining processing in the case of change for forming a next layer.
Figure 14:
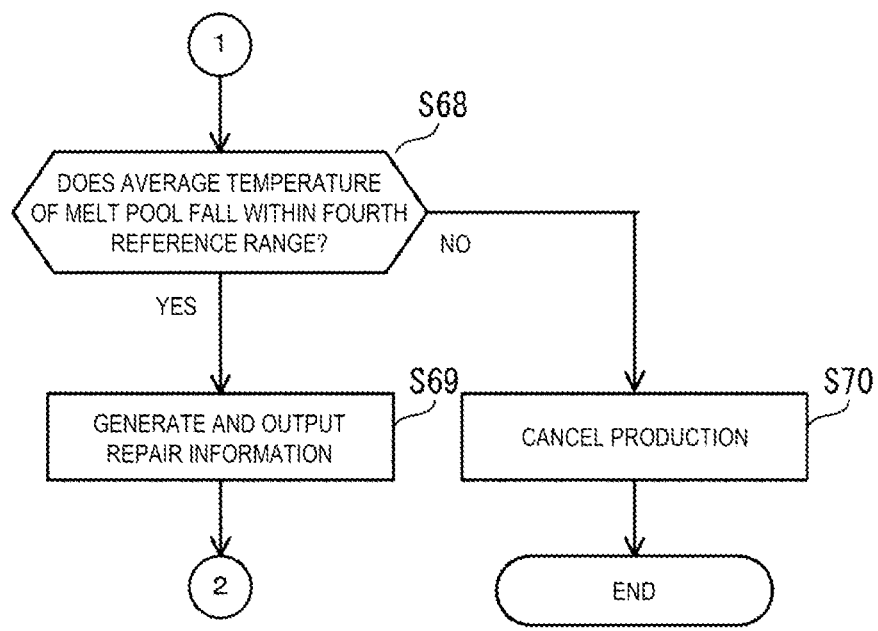
FIG. 14 is a flowchart for explaining processing in the case of change for forming a next layer.

Each processing in flowcharts illustrated in FIGS. 13 and 14 is stored in the storage 58 of the calculation device 50, and is read and executed by the calculation device 50.

In step S61, the manufacturing controller 52 makes the manufacturing unit 30 form the solidified layer under the set manufacturing conditions. While the solidified layer is being formed, the calculation device 50 causes the imager 41 to capture an image of the detection target region on the surface of the material layer at a predetermined time interval or each time the XY plane is scanned by a predetermined distance with the laser beam by the scanning unit 33 for example. The detection unit 54 generates thermal image data each time the image data from the imager 41 is output, obtains information on the temperature of the melt pool MP and a portion therearound for each generated thermal image data, and stores the information in the storage 58. The specific examples illustrated in the flowcharts illustrated in FIG. 13 and FIG. 14 are described as an example of a case in which the detection unit 54 obtains the average temperature of the melt pool MP as information related to the temperature of the melt pool MP and a portion therearound. The detection unit 54 obtains a high-temperature region at or higher than a first predetermined temperature in the thermal image data as a region corresponding to the melt pool MP on the image, obtains the temperatures at any given points in the high-temperature region on the image, and averages the temperatures thus obtained to obtain the average temperature of the melt pool MP.

Note that the detection unit 54 generates and stores the thermal image data in the storage 58 while the solidified layer is being formed, and may obtain the average temperature of the melt pool MP from each of the plurality of pieces of thermal image data stored in the storage 58 after formation of one solidified layer ends.

In step S62, the calculation device 50 determines whether formation of one solidified layer has been completed. When the formation of one solidified layer has been completed, a result of the determination by the calculation device 50 in step S62 is YES, and the processing proceeds to step S63. When the formation of one solidified layer has not been completed yet, a result of the determination by the calculation device 50 in step S62 is NO, and the processing returns to step S61.

In step S63, the determination unit 57 determines whether the temperature distribution of the melt pool MP obtained by the detection unit 54, that is, the average temperature of the melt pool MP falls within a predetermined second reference range. The second reference range is a temperature range of the average temperature of the melt pool MP for keeping the energy density ED within the desired range. The second reference range (the range of the average temperature of the melt pool MP) is set based on a correlation between the average temperature of the melt pool MP and the energy density ED obtained, for example, as a result of various tests, simulations, etc. by the user. The second reference range is stored in advance in the storage 58, and the determination unit 57 reads the second reference range and uses the second reference range in step S63 or the determination processing in step S65 described below. When the determination unit 57 determines that the average temperature of the melt pool MP does not fall within the second reference range, the processing proceeds to step S64, and when the determination unit 57 determines that the average temperature of the melt pool MP falls within the second reference range, the processing proceeds to step S71, which will be described below. In other words, the determination unit 57 determines whether to generate the change information in step S63.

Note that the second reference range described above is not limited to the energy density ED, and may be set to keep the power density PD and the temperature distribution T(r) within a desired range. The range of the average temperature that is the second reference range may be a temperature range from a temperature between the melting point and the liquidus temperature to a temperature between the melting point and the solidus temperature of the powder material P used.

In step S64, the determination unit 57 determines whether the average temperature of the melt pool MP obtained by the detection unit 54 falls within a predetermined third reference range. The third reference range is a temperature range of the average temperature of the melt pool MP for keeping the energy density ED within the desired range when the manufacturing condition is changed. The maximum value of the third reference range is greater than the maximum value of the second reference range, and the minimum value of the third reference range is smaller than the minimum value of the second reference range. Note that the third reference range may be from a value close to the maximum value and a value close to the minimum value. When the average temperature of the melt pool MP falls within the third reference range, that is, when the determination unit 57 determines that the energy density ED is maintained within a desired range by changing the manufacturing condition (and thus the occurrence of the manufacturing defect can be suppressed), the processing proceeds to step S65. When the average temperature of the melt pool MP does fall within the third reference range, that is, when the determination unit 57 determines that the energy density ED cannot be maintained within a desired range by changing the manufacturing condition (and thus the occurrence of the manufacturing defect cannot be suppressed), the processing proceeds to step S68 described below.

Note that the third reference range described above is not limited to the energy density ED, and may be set to keep the power density PD and the temperature distribution T(r) within a desired range when the manufacturing condition is changed. The range of the average temperature that is the third reference range may be a temperature range from a temperature between the melting point and the liquidus temperature to a temperature between the melting point and the solidus temperature of the powder material P used. Note that the third reference range is stored in advance in the storage 58.

In step S65, the determination unit 57 determines whether the average temperature of the melt pool MP is higher than or lower than the second reference range. When the average temperature of the melt pool MP is higher than the second reference range, that is, when the energy density ED of the energy absorbed by the powder material P is excessive but the determination unit 57 determines that the value of the energy density ED can be within the desired range by changing the manufacturing condition, the processing proceeds to step S66. When the average temperature of the melt pool MP is lower than the second reference range, that is, when the energy density ED of the energy absorbed by the powder material P is insufficient but the determination unit 57 determines that the value of the energy density ED can be within the desired range by changing the manufacturing condition, the processing proceeds to step S67.

In step S66, the calculation unit 56 generates change information for changing the manufacturing condition so as to lower the value of the energy density ED so that the value of the energy density ED is included in the desired range. The value of the energy density ED is decreased because of the following reason. The average temperature of the melt pool MP exceeding the second reference range indicates that the amount of heat to the melt pool MP is greater than the amount of heat expected to be obtained with the manufacturing conditions currently set, and thus that the temperature of the melt pool MP is excessively high. Thus, the energy density ED of the energy absorbed by the powder material P is anticipated to be excessive.

The output of the laser beam from the irradiator 32 may be reduced to reduce the value of the energy density ED to reduce the amount of heat received by the powder material P, so that the energy received by the powder material P can be reduced. Furthermore, the flow volume and the flowrate of the inert gas may be increased to cool the surface of the material layer to thereby lower the temperature of the powder material P. Then, a large amount of heat is required for raising the temperature of the powder material P to a desired temperature (melting point for example) by laser beam irradiation.

The temperature before irradiating the powder material P with the laser beam is higher than the expected temperature, and thus the amount of heat required to raise the temperature of the powder material P to the desired temperature may be lower. In this case, the impact of the heat from the solidified layer formed to the powder material P may be reduced by implementing at least one of the following: lowering the temperature of the powder material P before irradiated with the laser beam by lowering the temperature of the base plate 311, and setting the time until the material layer is formed on the solidified layer to be long so that the inert gas cools the solidified layer. Furthermore, the heat of the solidified layer may be likely to be transmitted to the upper part (positive side in the Z direction) of the material layer because the thickness of the material layer formed on the solidified layer is thin in the Z-direction. In such a case, the heat capacity may be increased by increasing the thickness of the material layer (that is, increasing the layer thickness), so that the heat is less likely to be transmitted to the upper part of the material layer from the solidified layer that has been formed.

Furthermore, the temperature may be raised due to a long heating time of the material layer by the laser beam irradiation, because the scanning distance of the laser beam is long. Thus, the scanning pass may be set to involve a short scanning distance of the laser beam, so that the period during which the material layer is irradiated with the laser beam is affected by heat. Furthermore, the amount of energy absorbed by the powder material P may be reduced by increasing the scanning speed of the laser beam from the scanning unit 33 to shorten the period of time during which the same position on the material layer is irradiated with the laser beam. Furthermore, the amount of energy received by the material layer per unit area might be large because the amount of heat is concentrated within a small range on the material layer due to a small spot size of the laser beam. Thus, the heat generated by the laser beam may be prevented from being concentrated within a small range on the material layer.

Furthermore, an impact of the heat transmitted from the solidified region BE already solidified to the melt pool MP may be large due to a short scanning pitch. Thus, the scanning pitch may be increased to reduce the impact of the heat transmitted from the solidified region BE already solidified. Furthermore, when the density of the material layer is high, the heat produced by the laser beam irradiation might be likely to be transmitted to the material layer. Thus, the pressure applied from the blade 221 to the powder material P may be reduced to reduce the density, so that the transmission of heat in the material layer is impeded.

Based on the above ideas, the calculation unit 56 generates the change information so that at least one of reduction of the parameters $P_L$, $P_O$, $\rho$ and an increase in the parameters v, $\Delta y$, $\Delta z$ is achieved, whereby the energy density ED for forming the next solidified layer is reduced from the current density. In this case, the calculation unit 56 generates the change information to make at least one of the following changes in the manufacturing condition: Changing the manufacturing condition associated with the parameter $P_L$ is lowering the laser output. Changing the manufacturing condition associated with the parameter $P_O$ is at least one of increasing the flow volume and flowrate of the inert gas, reducing the output of the heater 313 to lower the temperature of the base plate 311, extending the standby time of the blade 221, and changing the scanning pass. Changing the manufacturing condition associated with the parameter $\rho$ is to lower the pressure applied to the material layer of the blade 221. Changing the manufacturing condition associated with the parameter v to increase the scanning speed. Changing the manufacturing conditions associated with the parameter $\Delta y$ is at least one of increasing the spot size of the laser beam and increasing the scanning pitch. Changing the manufacturing condition associated with the parameter $\Delta z$ is increasing the layer thickness.

As in the case described with reference to FIGS. 10, 11, and 12 described above, the calculation unit 56 generates the change information by referring to the data in which the values of the parameters of the values of the manufacturing conditions are associated with each other, stored in the storage 58 in advance. The output unit 55 outputs the change information generated by the calculation unit 56 as the state information to the setting unit 59 (at least one of the material controller 51, the manufacturing controller 52 and the housing controller 53). Upon receiving the change information, the material controller 51 makes the recoater 22 perform at least one of the following operations. Operation of the recoater 22 in this case includes moving the blade 221 after a new standby time based on the change information elapses, and moving the blade 221 to apply a new pressure based on the change information. Upon receiving the change information, the manufacturing controller 52 causes at least one of the following operations to be performed by at least one of the irradiator 32, the scanning unit 33, and the heater 313. The operation of the irradiator 32 in this case includes emitting the laser beam with a new laser output based on the change information, and moving the focus lens 323 to a new position in the X direction based on the change information. The operation of the scanning unit 33 is to drive the galvano mirrors 331, 332 at a new inclination angle or at a new inclination angle change speed based on the change information. The operation of the heater 313 is to operate with a new heating output based on the change information. Upon receiving the change information, the housing controller 53 makes the intake device 131 and the discharge device 14 operate with the new valve opening degree and the discharge amount based on the change information. The processing then returns to step S61.

In step S67, the calculation unit 56 generates change information for changing the manufacturing condition to increase the value of the energy density ED so that the value of the energy density ED falls within the desired range. Raising the energy density ED value is for the following reason. The average temperature of the melt pool MP falling below the second reference range indicates that the amount of heat to the melt pool MP is smaller than the amount of heat expected to be obtained with the manufacturing conditions currently set, and thus that the temperature of the melt pool MP is excessively low. Thus, the energy density ED of the energy absorbed by the powder material P is anticipated to be insufficient.

In this case, the calculation unit 56 generates the change information to increase the value of the energy density ED based on the idea opposite to that in step S66 described above. In this case, the calculation unit 56 generates the change information so that at least one of increase in the parameter $P_L$, $P_O$, $\rho$ and reduction of the parameter v, $\Delta y$, $\Delta z$ is achieved. In this case, the calculation unit 56 generates the change information to make at least one of the following changes in the manufacturing condition: Changing the manufacturing condition associated with the parameter $P_L$ is to increase the laser output. Changing the manufacturing condition associated with the parameter $P_O$ is at least one of reducing the flow volume and flowrate of the inert gas, increasing the output of the heater 313 to raise the temperature of the base plate 311, shortening the standby time of the blade 221, and changing the scanning pass. Changing the manufacturing condition associated with the parameter $\rho$ is to increase the pressure applied to the material layer of the blade 221. Changing the manufacturing condition associated with the parameter v to lower the scanning speed. Changing the manufacturing conditions associated with the parameter $\Delta y$ is at least one of reducing the spot size of the laser beam and reducing the scanning pitch. Changing the manufacturing condition associated with the parameter $\Delta z$ is reducing the layer thickness.

As in the case described with reference to FIGS. 10, 11, and 12 described above, the calculation unit 56 generates the change information by referring to the data in which the values of the parameters of the values of the manufacturing conditions are associated with each other, stored in the storage 58 in advance. The output unit 55 outputs the change information generated by the calculation unit 56 as the state information to the setting unit 59 (at least one of the material controller 51, the manufacturing controller 52 and the housing controller 53). Upon receiving the change information, the material controller 51 makes the recoater 22 perform at least one of the following operations. Operation of the recoater 22 in this case includes moving the blade 221 after a new standby time based on the change information elapses, and moving the blade 221 to apply a new pressure based on the change information. Upon receiving the change information, the manufacturing controller 52 causes at least one of the following operations to be performed by at least one of the irradiator 32, the scanning unit 33, and the heater 313. The operation of the irradiator 32 in this case includes emitting the laser beam with a new laser output based on the change information, and moving the focus lens 323 to a new position in the X direction based on the change information. The operation of the scanning unit 33 is to drive the galvano mirrors 331, 332 at a new inclination angle or at a new inclination angle change speed based on the change information. The operation of the heater 313 is to operate with a new heating output based on the change information. Upon receiving the change information, the housing controller 53 makes the intake device 131 and the discharge device 14 operate with the new valve opening degree and the discharge amount based on the change information. The processing then returns to step S61.

Note that in steps S66 and S67, the calculation unit 56 may also use a difference between the value of the new manufacturing condition and the value of the current manufacturing condition, as the change information.

In step S68 illustrated in FIG. 14, the determination unit 57 determines whether the average temperature of the melt pool MP falls within a predetermined fourth reference range. The fourth reference range is a range of the average temperature of the melt pool MP in which the energy density ED can be kept within a desired range by performing a predetermined repair on the solidified layer formed. In other words, the determination unit 57 determines whether to repair the solidified layer in step S68. The maximum value of the fourth reference range is a value that is greater than the maximum value of the third reference range by a predetermined percentage. The minimum value of the fourth reference range is a value that is smaller than the minimum value of the third reference range by a predetermined percentage. Note that the fourth reference range may be from a value close to the maximum value and a value close to the minimum value. When the average temperature of the melt pool MP falls within the fourth reference range, that is, when the determination unit 57 determines that the value of the energy density ED can be within the desired range if the solidified layer that has been formed is repaired, the processing proceeds to step S69. In other words, when the average temperature of the melt pool MP falls within the third reference range, the determination unit 57 determines that change information needs to be generated and when the average temperature does not fall within the third reference range, the determination unit 57 determines that the solidified layer needs to be repaired.

When the average temperature of the melt pool MP does not fall within the fourth reference range, that is, when the determination unit 57 determines that the value of the energy density ED cannot be within the desired range even if the solidified layer that has been formed is repaired, the processing proceeds to step S70.

Note that the fourth reference range described above is not limited to the energy density ED, and may be set to keep the power density PD and the temperature distribution T(r) within a desired range when the solidified layer that has been formed is repaired. The range of the average temperature that is the fourth reference range may be a temperature range from a temperature between the melting point and the liquidus temperature to a temperature between the melting point and the solidus temperature of the powder material P used. Note that the fourth reference range is stored in advance in the storage 58.

In step S69, the calculation unit 56 generates repair information for executing repair processing. As the repair processing, the manufacturing apparatus 1 performs, for example, remelt processing including irradiating the solidified layer that has been formed with the laser beam again to melt and solidify the layer. In this case, based on a difference between the average temperature of the melt pool MP obtained from the temperature data image and any value (for example, the median value) within the second reference range, the calculation unit 56 generates the repair information as a value of the manufacturing condition for the irradiator 32 to emit the laser beam such as a laser output, a beam quality, an oscillation mode, a wavelength of the laser beam, a polarization state of the laser beam, the intensity distribution of the laser beam, and the spot size of the laser beam. Note that the difference between the average temperature of the melt pool MP and any value (for example, the median value) within the second reference range, and the value of the manufacturing condition for the irradiator 32 to emit the laser beam are stored in advance in the storage 58 as the associated data. The calculation unit 56 generates the repair information with reference to this data. The output unit 55 outputs the repair information generated by the calculation unit 56 to the manufacturing controller 52. The manufacturing controller 52 causes the irradiator 32 to output the laser beam based on the repair information, whereby the repair processing is executed. The processing then returns to step S61 of FIG. 13.

In step S70, the calculation device 50 cancels the production of the next 3D manufactured object and terminates the processing. Thus, when the average temperature of the melt pool MP is within the fourth reference range in step S68, the determination unit 57 determines that the solidified layer needs to be repaired, and when the average temperature of the melt pool MP is outside the fourth reference range, the determination unit 57 determines that the production needs to be canceled.

The processing in step S71, to which the processing proceeds when the average temperature of the melt pool MP falls within the second reference range is similar to the processing in step S38 of FIG. 10.

Through the processing described above, the basic condition for melting and solidifying the powder material P is guaranteed for forming the next solidified layer, whereby with the manufacturing defect of the solidified layer due to insufficient melting or excessive melting and when the manufacturing defect occurs in the solidified layer formed, the defect is repaired.

Note that, in steps S66 and S67 in the flowchart illustrated in FIG. 13 described above, the calculation unit 56 makes which of the parameters $P_L$, $P_0$, $\rho$, v, $\Delta$y, and $\Delta$z is changed or not changed vary depending on a request from the user for the production of the 3D manufactured object. For example, if the user desires to avoid long manufacturing time, in the above step S67, the calculation unit 56 may not change the value of the parameter v so that the scanning speed of the laser beam is not reduced.

Furthermore, in steps S66 and 67, the calculation unit 56 may generate the change information for the manufacturing condition other than the manufacturing condition described above which has an impact on the energy density ED and can be changed as a change for forming the next layer. For example, the calculation unit 56 may generate change information for the laser beam oscillation mode and laser beam intensity distribution of the irradiator 32, for the moving speed of the blade 221, and for the hygroscopicity of the powder material P.

Note that, as in the above described cases, the calculation unit 56 may broadcast the designation target information to the user and accept a user's designation in order to determine parameters and manufacturing conditions for which the change information is generated.

Next, the following case is described as an example of processing executed for a change for forming the next layer. The detection unit 54 obtains information on the temperature of the melt pool MP and a portion therearound as the melting state while the solidified layer is being formed. Based on the information on the temperature obtained by the detection unit 54 while the solidified layer is being formed, the calculation unit 56 generates the change information to keep the value of the temperature distribution T(r), for forming a new solidified layer on top of the solidified layer, within a desired range. Note that the calculation unit 56 is not limited to generating the change information to keep the value of the temperature distribution T(r) in the desired range, and may generate the change information so as to maintain at least one of the values of the power density PD, the value of the energy density ED, and the temperature distribution T(r) in a desired range.

Figure 15:
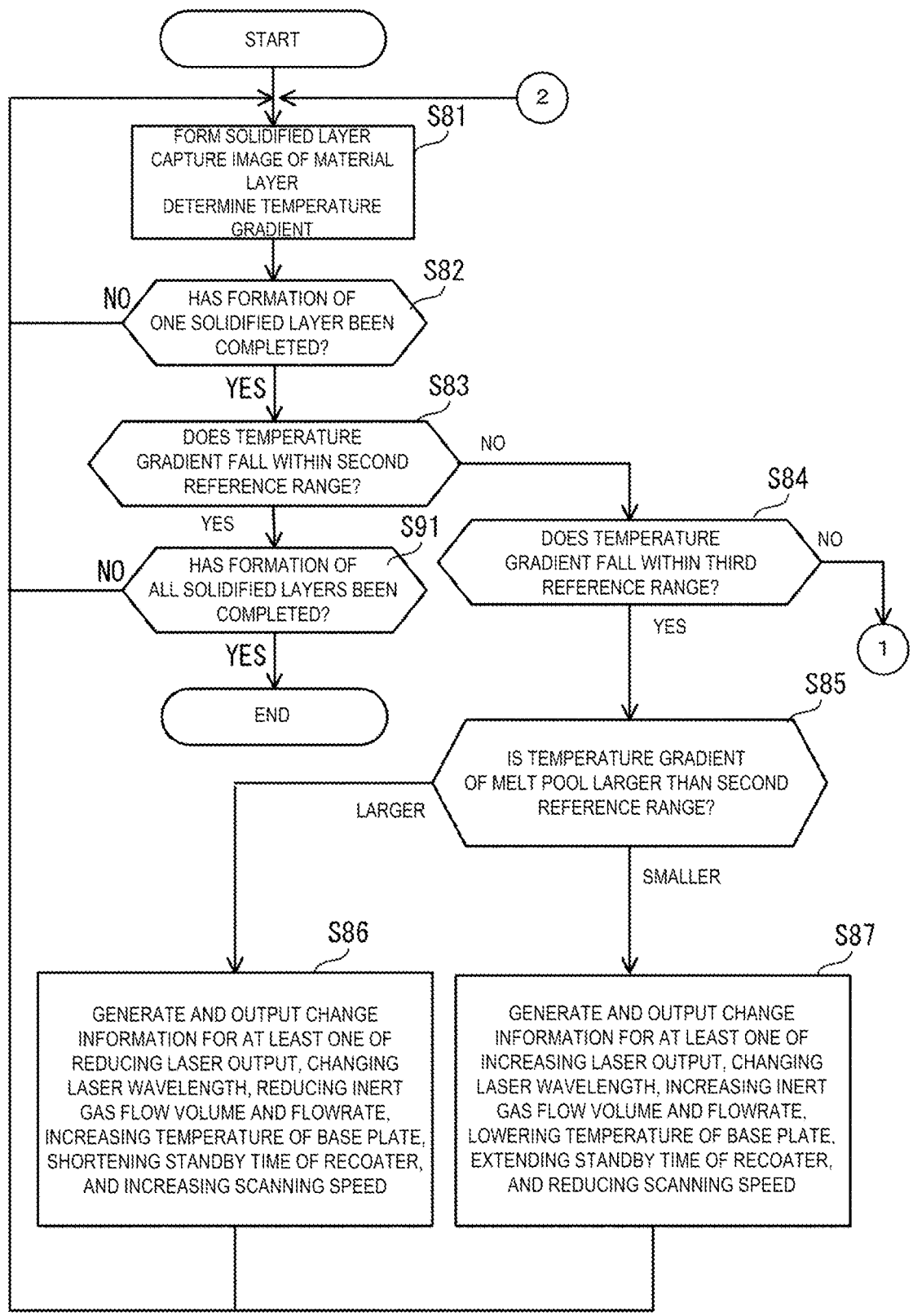
FIG. 15 is a flowchart for explaining processing in the case of change for forming a next layer.
Figure 16:
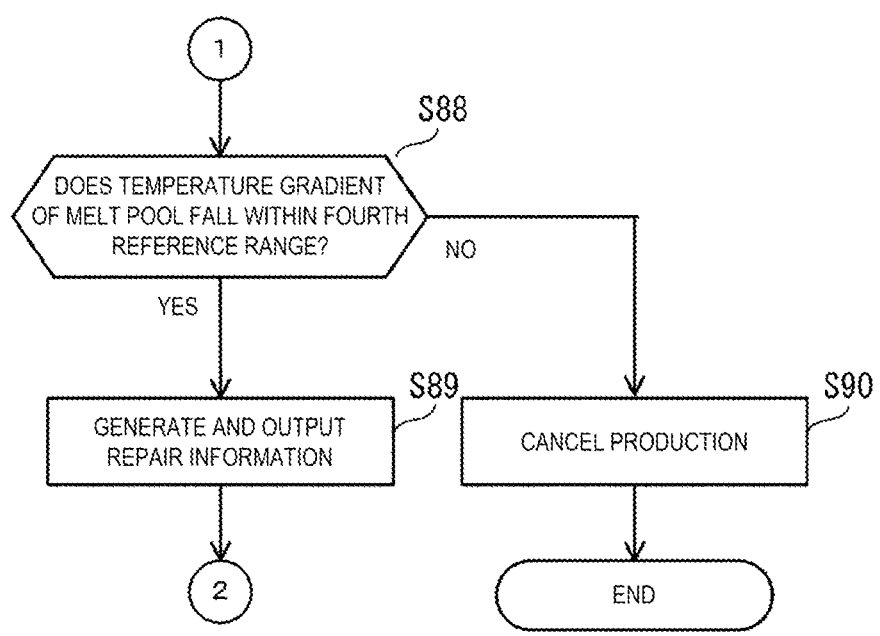
FIG. 16 is a flowchart for explaining processing in the case of change for forming a next layer.

Each processing in a flowchart illustrated in FIGS. 15 and 16 is stored in the storage 58 of the calculation device 50, and is read and executed by the calculation device 50.

The processing in steps S81 and S82, is similar to that in steps S61 and S62 in the flowchart illustrated in FIG. 13. Still, the detection unit 54 uses the thermal history described above to obtain the temperature gradient indicating a change in temperature at a predetermined portion in the material layer over time, as the information on the temperature of the melt pool MP and a portion therearound. In this case, the detection unit 54 obtains the temperature before melting and the temperature during melting at the same portion in the material layer by obtaining the thermal history as described above. Then, based on the time information on the image data used to detect the thermal history, the detection unit 54 calculates a change in the temperature over time when the temperature changes from the temperature before melting to the temperature during the melting. The detection unit 54 obtains this change over time as the temperature gradient.

Note that the detection unit 54 generates and stores the thermal image data in the storage 58 while the solidified layer is being formed, and may obtain the temperature gradient of the melt pool MP from each of the plurality of pieces of thermal image data stored in the storage 58 after formation of one solidified layer ends.

In step S83, the determination unit 57 determines whether the temperature gradient of the melt pool MP obtained by the detection unit 54 falls within a predetermined second reference range. The second reference range is a range of temperature gradients of the melt pool MP for keeping the temperature distribution T(r) with the desired range, and is set through various tests and simulations by the user for example as in the case of step S63 described above. When the determination unit 57 determines that the temperature gradient does not fall within the second reference range, the processing proceeds to step S84, and when the determination unit 57 determines that the temperature gradient falls within the second reference range, the processing proceeds to step S91, which will be described below. In other words, the determination unit 57 determines whether to generate the change information in step S83.

Note that the second reference range described above is not limited to the temperature distribution T(r), and may be set to keep the power density PD and the energy density ED within a desired range. The range of the temperature gradient that is the second reference range may be a temperature range from a temperature gradient between the melting point and the liquidus temperature to a temperature gradient between the melting point and the solidus temperature of the powder material P used.

In step S84, the determination unit 57 determines whether the temperature gradient obtained by the detection unit 54 falls within a predetermined third reference range. The third reference range is a temperature range of the temperature gradient of the melt pool MP for keeping the temperature distribution T(r) within the desired range when the manufacturing condition is changed. The maximum value of the third reference range is greater than the maximum value of the second reference range, and the minimum value of the third reference range is smaller than the minimum value of the second reference range. Note that the third reference range may be from a value close to the maximum value and a value close to the minimum value. When the temperature gradient falls within the third reference range, that is, when the determination unit 57 determines that the temperature distribution T(r) is maintained within a desired range by changing the manufacturing condition (and thus the occurrence of the manufacturing defect can be suppressed), the processing proceeds to step S85. When the temperature gradient does fall within the third reference range, that is, when the determination unit 57 determines that the temperature distribution T(r) cannot be maintained within a desired range by changing the manufacturing condition (and thus the occurrence of the manufacturing defect cannot be suppressed), the processing proceeds to step S88 described below.

Note that the third reference range described above is not limited to the temperature distribution T(r), and may be set to keep the power density PD and the energy density ED within a desired range when the manufacturing condition is changed. The range of the temperature gradient that is the third reference range may be a temperature range from a temperature gradient between the melting point and the liquidus temperature to a temperature gradient between the melting point and the solidus temperature of the powder material P used. Note that the third reference range is stored in advance in the storage 58.

In step S85, the determination unit 57 determines whether the temperature gradient is larger (large slope) than or smaller (small slope) than the second reference range. If the temperature gradient is greater than the second reference range, processing proceeds to step S86, and if the temperature gradient is smaller than the second reference range, processing proceeds to step S87.

In step S86, the calculation unit 56 generates change information for changing the manufacturing condition so as to lower the value of the temperature distribution T(r) so that value of the temperature distribution T(r) is included in the desired range. The value of the temperature distribution T(r) is reduced for the following reasons: The temperature gradient greater than the second reference range (large slope) indicates an excessive amount of heat flowing into the powder material P irradiated with the laser beam, and thus the temperature of the powder material P is anticipated to have sharply increased. Alternatively, despite the low temperature of the powder material P before the laser beam irradiation, excessive amount of heat flowing into the powder material P due to the laser beam irradiation is anticipated to have led to the temperature of the powder material P rising to a desired temperature (for example, melting point) in a short period of time. With a large temperature gradient, the amount of heat flowing into the powder material P is anticipated to be excessive. In such a case, the convection C in the melt pool MP is anticipated to be massive as described above, and to be a cause of manufacturing defects such as production of spatter SP and fume FU. Furthermore, the solidified layer that has been formed by rapid heating and then cooled may involve causes of manufacturing defects such as residual stress.

The output of the laser beam from the irradiator 32 may be reduced to reduce the value of the temperature distribution T(r) to reduce the amount of heat absorbed by the powder material P, so that the amount of energy absorbed by the powder material P decreases.

Furthermore, as described above, how much energy is absorbed by the powder material P due to the laser beam irradiation differs depending on the wavelength of the laser beam and the type of the powder material P. A temperature gradient with a large slope may indicate that the wavelength of the laser beam output and the type of the powder material P used have resulted in a large amount of energy absorbed. Thus, the wavelength of the laser beam may be changed to reduce the amount of energy absorbed in the powder material P.

Furthermore, a large slope of the temperature gradient may indicate a large change in temperature as a result of the laser beam irradiation, due to the temperature of the powder material P before being irradiated with the laser beam being low. Thus, a smaller slope of the temperature gradient may be achieved by raising the temperature of the powder material P before being irradiated with the laser beam. To raise the temperature of the powder material P before being irradiated with the laser beam, at least one of reduction of the flow volume and the flowrate of the inert gas and reduction of the standby time of the blade 221 may be achieved to suppress the cooling of the formed solidified layer by the inert gas to facilitate the transmission of heat from the solidified layer to the powder material P. Furthermore, the temperature of the base plate 311 may be raised.

Furthermore, the energy absorbed by the powder material P due to the laser beam irradiation may be reduced by increasing the scanning speed of the laser beam from the scanning unit 33 to shorten the period of time during which the same position on the material layer is irradiated with the laser beam.

Based on the above ideas, the calculation unit 56 generates the change information so that at least one of reduction of the parameters $P_L$ and $\eta$ and an increase in the parameters $T_0$ and $v$ is achieved, whereby the value of the temperature distribution $T(r)$ for forming the next solidified layer is reduced from the current distribution. In this case, the calculation unit 56 generates the change information to make at least one of the following changes in the manufacturing condition: changing the manufacturing condition associated with the parameter $P_L$ to lower the laser output; changing the manufacturing condition associated with the parameter $\eta$ to change the laser wavelength in accordance with the absorption rate of the powder material P; changing the manufacturing condition associated with the parameter $T_0$ to achieve at least one of reducing the flow volume and flowrate of the inert gas, to raise the temperature of the base plate 311, and shortening the standby time of the blade 221; and changing the manufacturing condition associated with the parameter $v$ to increase the scanning speed.

As in the case described with reference to FIGS. 10, 11, 12, and 13 described above, the calculation unit 56 generates the change information by referring to the data in which the values of the parameters of the values of the manufacturing conditions are associated with each other, stored in the storage 58 in advance. The output unit 55 outputs the change information generated by the calculation unit 56 as the state information to the setting unit 59 (at least one of the material controller 51, the manufacturing controller 52 and the housing controller 53). Upon receiving the change information, the material controller 51 makes the recoater 22 move the blade 221 after the new standby time based on the change information elapses. Upon receiving the change information, the manufacturing controller 52 causes at least one of the following operations to be performed by at least one of the irradiator 32, the scanning unit 33, and the heater 313. The operation of the irradiator 32 in this case includes emitting the laser beam with a new laser output based on the change information, and outputting the laser beam of the new wavelength based on the change information. The operation of the scanning unit 33 is to drive the galvano mirrors 331, 332 at a new inclination angle change speed based on the change information. The operation of the heater 313 is to operate with a new heating output based on the change information. Upon receiving the change information, the housing controller 53 makes the intake device 131 and the discharge device 14 operate with the new valve opening degree and the discharge amount based on the change information. The processing then returns to step S81.

Note that in step S86, instead of generating a change condition so as to reduce the value of the temperature distribution $T(r)$, the calculation unit 56 may generate the change information to increase the temperature of the base plate 311 to reduce the temperature gradient. In this case, the calculation unit 56 calculates the value of the heating output of the heater 313 of the base plate 311 based on the difference between the obtained temperature gradient and any value within the second reference range (for example, the median value), and may use the calculated value of the heating output as the change information.

In step S87, the calculation unit 56 generates change information for changing the manufacturing condition so as to raise the value of the temperature distribution $T(r)$ so that value of the temperature distribution $T(r)$ is included in the desired range. The value of the temperature distribution $T(r)$ is raised for the following reasons. Specifically, the temperature gradient smaller than the second reference range (small slope) indicates the amount of heat flowing into the powder material P irradiated with the laser beam is small, and thus the temperature of the powder material P is anticipated to be difficult to raise. Alternatively, despite the high temperature of the powder material P before the laser beam irradiation, the amount of heat flowing into the powder material P due to the laser beam irradiation may be small, and thus it might have taken a long period of time until the temperature of the powder material P rises to a desired temperature (for example, melting point). If the temperature gradient is small, the amount of heat that flows into the powder material P might be too small and cause a manufacturing defect due to insufficient melting of the material layer. Furthermore, when the temperature gradient is small, there is a risk of failure to achieve a desired metallographic structure the solidified layer formed.

In this case, based on the ideas opposite to that in step S86 described above, the calculation unit 56 generates the change information so that at least one of increase in the parameters $P_L$ and $\eta$ and reduction of the parameters $T_0$ and $v$ is achieved, whereby the value of the temperature distribution $T(r)$ for forming the next solidified layer is increased from the current distribution. In this case, the calculation unit 56 generates the change information to make at least one of the following changes in the manufacturing condition: changing the manufacturing condition associated with the parameter $P_L$ to increase the laser output; changing the manufacturing condition associated with the parameter $\eta$ to change the laser wavelength in accordance with the absorption rate of the powder material P; changing the manufacturing condition associated with the parameter $T_0$ to achieve at least one of increasing the flow volume and flowrate of the inert gas, to lower the temperature of the base plate 311, and extending the standby time of the blade 221; and changing the manufacturing condition associated with the parameter $v$ to lower the scanning speed.

The calculation unit 56 generates the change information by referring to the data in which the values of the parameters and the values of the manufacturing conditions are associated with each other, stored in the storage 58 in advance. The output unit 55 outputs the change information generated by the calculation unit 56 as the state information to the setting unit 59 (at least one of the material controller 51, the manufacturing controller 52 and the housing controller 53). Upon receiving the change information, the material controller 51 makes the recoater 22 move the blade 221 after the new standby time based on the change information elapses. Upon receiving the change information, the manufacturing controller 52 causes at least one of the following operations to be performed by at least one of the irradiator 32, the scanning unit 33, and the heater 313. The operation of the irradiator 32 in this case includes emitting the laser beam with a new laser output based on the change information, and outputting the laser beam of the new wavelength based on the change information. The operation of the scanning unit 33 is to drive the galvano mirrors 331, 332 at a new inclination angle change speed based on the change information. The operation of the heater 313 is to operate with a new heating output based on the change information. Upon receiving the change information, the housing controller 53 makes the intake device 131 and the discharge device 14 operate with the new valve opening degree and the discharge amount based on the change information. The processing then returns to step S81.

Note that in step S87, instead of generating a change condition so as to increase the value of the temperature distribution T(r), the calculation unit 56 may generate the change information to lower the temperature of the base plate 311 to increase the temperature gradient. In this case, the calculation unit 56 calculates the value of the heating output of the heater 313 of the base plate 311 based on the difference between the obtained temperature gradient and any value within the second reference range (for example, the median value), and may use the calculated value of the heating output as the change information.

Note that in steps S86 and S87, the calculation unit 56 may also use a difference between the value of the new manufacturing condition and the value of the current manufacturing condition, as the change information.

In step S88 in FIG. 16, the determination unit 57 determines whether the temperature gradient falls within a predetermined fourth reference range. The fourth reference range is a range of the temperature gradient of the melt pool MP in which the temperature distribution T(r) can be kept within a desired range by performing a predetermined repair on the solidified layer formed. In other words, the determination unit 57 determines whether to repair the solidified layer in step S88. The maximum value of the fourth reference range is set a value greater than the maximum value of the third reference range by a predetermined percentage, and the minimum value of the fourth reference range is set as a value smaller than the minimum value of the third reference range by a predetermined percentage. Note that the fourth reference range may be from a value close to the maximum value and a value close to the minimum value of the fourth reference range. When the temperature gradient falls within the fourth reference range, that is, when the determination unit 57 determines that the value the temperature distribution T(r) can be within the desired range if the solidified layer that has been formed is repaired, the processing proceeds to step S89. In other words, when the temperature gradient of the melt pool MP falls within the third reference range, the determination unit 57 determines that change information needs to be generated and when the temperature gradient of the melt pool MP does not fall within the third reference range, the determination unit 57 determines that the solidified layer needs to be repaired.

When the temperature gradient does not fall within the fourth reference range, that is, when the determination unit 57 determines that the value of the temperature distribution T(r) cannot be within the desired range even if the solidified layer that has been formed is repaired, the processing proceeds to step S90.

Note that the fourth reference range described above is not limited to the temperature distribution T(r), and may be set to keep the power density PD and the energy density ED within a desired range when the solidified layer that has been formed is repaired. The range of the temperature gradient that is the fourth reference range may be a temperature range from a temperature gradient between the melting point and the liquidus temperature to a temperature gradient between the melting point and the solidus temperature of the powder material P used. Note that the fourth reference range is stored in advance in the storage 58.

In step S89, the calculation unit 56 generates repair information for repairing the solidified layer formed. In the manufacturing apparatus 1 according to the present embodiment, the solidified layer is repaired by executing thermal treatment on the solidified layer to reduce or remove the residual stress of the solidified layer. Examples of the thermal treatment include: known laser annealing processing of heating the solidified layer by laser beam irradiation to reduce or remove the residual stress of the solidified layer; a known heat isostatic pressing (HIP) of applying high temperature and isostatic pressure to the solidified layer to reduce or remove the residual stress; processing of increasing the temperature of the base plate 311 to heat the solidified layer; and heating the solidified layer using an external heat source such as a heater. When the laser annealing processing is executed as the thermal treatment, based on a difference between the temperature gradient obtained by the detection unit 54 and any value (for example, the median value) within the second reference range, the calculation unit 56 generates the repair information as a value of the manufacturing condition for the irradiator 32 to emit the laser beam such as a laser output, a beam quality, an oscillation mode, a wavelength of the laser beam, a polarization state of the laser beam, the intensity distribution of the laser beam, and the spot size of the laser beam. The difference between the temperature gradient and any value within the second reference range (for example, a median value) and the value of the manufacturing condition associated with the irradiator 32 when performing the thermal treatment are stored in advance in the storage 58, and the calculation unit 56 generates the repair information by referring to the memory. The output unit 55 outputs the repair information generated by the calculation unit 56 to the manufacturing controller 52. The manufacturing controller 52 causes the irradiator 32 to output the laser beam based on the repair information, whereby the repair processing is executed. The processing then returns to step S81.

In step S90, the calculation device 50 cancels the production of the next 3D manufactured object and terminates the processing. Thus, when the average temperature of the melt pool MP is within the fourth reference range in step S88, the determination unit 57 determines that the solidified layer needs to be repaired, and when the average temperature of the melt pool MP is outside the fourth reference range, the determination unit 57 determines that the production needs to be canceled.

The processing in step S91, to which the processing proceeds when the average temperature of the melt pool MP falls within the second reference range is similar to the processing in step S38 of FIG. 10.

Through the processing described above, the occurrence of the manufacturing defect in the solidified layer formed is suppressed and the residual stress and the like produced in the solidified layer formed can be reduced, whereby the manufacturing defect such as shape abnormalities due to distortion in the 3D manufactured object produced can be suppressed.

Note that, in steps S86 and S87 in the flowchart illustrated in FIG. 15 described above, the calculation unit 56 may vary which of the parameters $P_L$, $\eta$, $T_0$, and v is changed or not changed depending on a request from the user for the production of the 3D manufactured object. For example, if the user desires to avoid a long manufacturing time, in the above step S87, the calculation unit 56 may not change the value of the parameter v so that the scanning speed of the laser beam is not reduced.

Furthermore, in steps S86 and S87, the calculation unit 56 may generate the change information for the manufacturing condition other than the manufacturing condition described above which has an impact on the value of the temperature distribution T(r) and can be changed as a change for forming the next layer. For example, the calculation unit 56 may generate change information for the oscillation mode of the laser beam of the irradiator 32, the intensity distribution of the laser beam, a spot size of the laser beam, and a scanning pitch and a scanning pass of the scanning unit 33, the temperature in the housing 10, the moving speed of the blade 221, the pressure applied to the powder material P from the blade 221, and the hygroscopicity of the powder material P.

Note that, as in the above described cases, the calculation unit 56 may broadcast the designation target information to the user and accept a user's designation in order to determine parameters and manufacturing conditions for which the change information is generated.

Furthermore, in steps S61 and S81 of the flowchart in FIGS. 13 and 15, the detection unit 54 may obtain the following elements as the temperature distribution of the melt pool MP as the information on the temperature of the melt pool MP and a portion therearound from the thermal image data: the maximum temperature of the melt pool MP; the minimum temperature of the melt pool MP; the difference between the maximum temperature and the minimum temperature of the melt pool MP; the diameter of an isotherm corresponding to any temperature in the melt pool MP; and the diameter of the keyhole KH.

In this case, a range of the maximum temperature of the melt pool MP, the minimum temperature of the melt pool MP, the difference between the maximum temperature and the minimum temperature of the melt pool MP, the diameter of an isotherm corresponding to any temperature in the melt pool MP, and the diameter of the keyhole KH (length of the short axis) may be set as the second, the third, and the fourth reference ranges for maintaining at least one of the power density PD, the energy density ED, and the temperature distribution T(r) within a desired range. The difference between the maximum temperature and the minimum temperature of the melt pool MP may be calculated to be obtained.

Note that in the processing for the change for forming the next layer illustrated in FIGS. 13 to 16 described above, the calculation device 50 may not cancel the production of the 3D manufactured object. In other words, the calculation device 50 may not execute the processing in steps S68 and S70 in FIG. 14 and steps S88 and S90 in FIG. 16. In this case, when the average temperature of the melt pool MP does not fall within the third reference range in step S64 in FIG. 13, the determination unit 57 determines that the repair information needs to be generated, and the processing proceeds to step 69 in FIG. 14. When the temperature gradient does not fall within the third reference range in step S84 in FIG. 15, the determination unit 57 determines that the repair information needs to be generated, and the processing proceeds to step 89 in FIG. 16. In other words, when the state of the detection target region obtained by the detection unit 54 falls within the third reference range, the determination unit 57 determines that the change information needs to be generated. When the state of the detection target region does not fall within the third reference range, the determination unit 57 determines that the solidified layer needs to be repaired.

The description has been given above for the case of real time change and change for forming the next layer. However, as described above, the manufacturing apparatus 1 of the present embodiment also performs a change for producing the next manufactured object, so that the manufacturing condition is changed when production of a 3D manufactured object is completed with the solidified layer built, and the production for the next 3D manufactured object starts. In this case, based on the state of the detection target region obtained by the detection unit 54 from the start to the end of the production, the determination unit 57 determines whether to change the manufacturing conditions for producing the next 3D manufactured object. In this case, the determination unit 57 determines whether the state of the detection target region falls within the predetermined first or the second reference range as in step S34 in FIG. 10, step S44 in FIG. 11, step S54 in FIG. 12, step S65 in FIG. 13, and step S85 in FIG. 15. When the determination unit 57 determines that the state of the detection target region does not fall within the first or the second reference range, the calculation unit 56 generates the change information for changing the manufacturing condition based on an obtained difference between the detected state of the detection target region and any value (for example, the median value) within the first or the second reference range.

When the state of the detection target region falls within the first or the second reference range, no change information is generated by the calculation unit 56, and post-processing is executed as necessary. This post-processing includes, for example, processing of removing the support portion that supports the 3D manufactured object that is produced together with the 3D manufactured object produced, for example. To remove the support portion, the manufacturing apparatus 1 may include a cutting unit (not illustrated) including, for example, a milling head or the like.

When a change for producing the next manufactured object involves a risk of causing a manufacturing defect or the like in the 3D manufactured object to be newly produced, a manufacturing condition for suppressing the occurrence of the manufacturing defect or the like is set in advance.

Note that the formed solidified layer may be repaired with a real time change or a change for producing the next manufactured object. For example, in the case of real time change, the determination unit 57 may determine that the repair information is required, when the state of the detection target region does not fall within the first reference range with a deviation from the first reference range being large but not too large to require the provision of the reference range (the fourth reference range in FIGS. 14 and 16) for determining whether to cancel the production. In other words, in a case where it is determined in step S33 in FIG. 10, step S43 in FIG. 11, and step S53 in FIG. 12 that the state of the detection target region obtained by the detection unit 54 does not fall within the first reference range, the determination unit 57 executes the following determination processing. The determination unit 57 determines that the change information needs to be generated when the state of the detection target region obtained by the detection unit 54 falls within a reference range (the third reference range in FIGS. 13 and 15 for example) that is wider than a range from the maximum value and the minimum value of the first reference range, the determination unit 57 determines that the change information needs to be generated, and the processing proceeds to step S34 in FIG. 10, step S44 in FIG. 11, or step S54 in FIG. 12. When the state of the detection target region does not fall within the aforementioned reference range, the determination unit 57 determines that the solidified layer needs to be repaired, and for example, the same processing as in step S69 in FIG. 14 or step S89 in FIG. 16 is executed. In this case, repairing may be performed on a solidified layer being formed, or may be performed after such a solidified layer has been formed.

Of course, also in the case of real time change, the fourth reference range may be provided, and the determination unit 57 may determine whether to cancel the production, as in the case of the change for forming the next layer. When the determination unit 57 determines that the state of the detection target region does not fall within the first reference range in step S33 in FIG. 10, step S43 in FIG. 11, or step S53 in FIG. 12, the determination unit 57 determines whether the state of the detection target region falls within the third reference range. When the determination unit 57 determines that the state of the detection target region falls within the third reference range, the processing proceeds to step S34 in FIG. 10, step S44 in FIG. 11, or step S54 in FIG. 12. When the determination unit 57 determines that the state of the detection target region does not fall within the third reference range, the determination unit 57 determines whether the production is to be canceled based on the fourth reference range. Thereafter, the processing is executed as in steps S68 to S70 in FIG. 14 or steps S88 to S90 in FIG. 16. In other words, when the state of the detection target region falls within the fourth reference range, the determination unit 57 determines that the solidified layer needs to be repaired. When the state of the detection target region does not fall within the fourth reference range, the determination unit 57 determines that the production needs to be canceled.

Furthermore, in the case of a change for producing the next manufactured object, the repairing can be performed when a portion to be repaired is on the contour of the 3D manufactured object. When the determination unit 57 determines that the state of the detection target region does not fall within the first or the second reference range but falls within the reference range (the third reference range in FIG. 13 or FIG. 15 for example) wider than the first or the second reference range, the determination unit 57 determines that the change information needs to be generated. In this case, as in the case described above, the calculation unit 56 generates change information for changing the manufacturing conditions. When the state of the detection target region does not fall within the first or the second reference range, the determination unit 57 determines that the repair is required, and the calculation unit 56 may generate the repair information based on a difference between the state of the detection target region obtained and any value within the first or the second reference range (for example, a median value).

Of course, also in the case of a change for producing the next manufactured object, the fourth reference range may be provided, and the determination unit 57 may determine whether to cancel the production, as in the case of the change for forming the next layer. When the determination unit 57 determines that the state of the detection target region does not fall within the first or the second reference range, the determination unit 57 determines whether the state of the detection target region falls within the third reference range. When the state of the detection target region falls with the third reference range, the determination unit 57 determines that the change information needs to be generated. When the state of the detection target region does not fall within the third reference range, the determination unit 57 determines whether the repairing is required or to cancel the production using the fourth reference range described above. In other words, when the state of the detection target region falls within the fourth reference range, the determination unit 57 determines that the solidified layer needs to be repaired as described above. When the state of the detection target region does not fall within the fourth reference range, the determination unit 57 may determine that the production of the next 3D manufactured object needs to be canceled.

According to the first embodiment described above, the following actions and effects are obtained.

(1) The calculation device 50 used in the manufacturing apparatus 1 configured to produce a 3D manufactured object from a solidified layer formed by heating the powder material P by irradiation with a laser beam includes the detection unit 54 and the output unit 55. The detection unit 54 obtains a state of detection target region, that is, at least a part of a predetermined region including the melt pool MP in which the powder material P melts by being heated by irradiation with the laser beam, and the output unit 55 outputs state information based on the state obtained by the detection unit 54. With this configuration, whether the 3D manufactured object being produced involves a risk of manufacturing defect or the like can be estimated from the state of the powder material P while the solidified layer is being formed. With the obtained state reflected on the production of the 3D manufactured object, the occurrence of the manufacturing defect or the like in the 3D manufactured object can be suppressed.

(2) The state of the detection target region includes the state of the powder material P before heating by irradiation with the laser beam. With this configuration, the states of the powder material P before and after laser beam irradiation are obtained, and the state of a change in temperature of the material layer due to the laser beam irradiation can be detected. Thus, whether the 3D manufactured object being produced involves a risk of manufacturing defects or the like can be estimated in detail.

(3) The state includes at least one state out of a melting state in the detection target region, a state of the spatter PS generated by the heating, and a state of a fume FU generated by the heating. With this configuration, the state of the progress of melting of the powder material P due to the laser beam irradiation can be detected. Thus, whether the 3D manufactured object being produced involves a risk of manufacturing defects or the like can be estimated in detail.

(4) The melting state in the detection target region includes information on a temperature of at least a part of the melt pool MP and a portion around the melt pool MP; the state of the spatter SP includes at least one piece of information out of a spattering direction, a spattering amount, and a spattering speed of the spatter SP; and the state of the fume FU includes at least one piece of information out of a concentration and a range of the fume. With this configuration, the amount of heat flowed into the powder material P due to the laser beam irradiation can be detected. Thus, whether the 3D manufactured object being produced involves a risk of manufacturing defects or the like can be estimated, and if the manufacturing defects or the like occurs, the cause of the defects or the like can be estimated.

(5) Based on brightness information for each different wavelength included in image data obtained by capturing an image of at least a part of the detection target region, the detection unit 54 obtains at least one piece of information out of: information on a temperature of the melt pool MP and a portion around the melt pool MP; at least one piece of information out of a spattering direction, a spattering amount, and a spattering speed of spatter SP; and at least one piece of information out of a concentration and a range of the fume. With this configuration, the image indicating the state of the detection target region is captured regardless of the status of a portion around the melt pool MP formed in the material layer. Thus, the state of the powder material P is accurately obtained, and the amount of heat flowing into the powder material P due to laser beam irradiation and the like can be more accurately detected.

(6) The calculation unit 56 generates change information for changing the manufacturing condition used for producing the 3D manufactured object, based on the state of the detection target region obtained by the detection unit 54, and the output unit 55 outputs the generated change information as the state information. With this configuration, the manufacturing condition can be changed to suppress the occurrence of the manufacturing defect or the like in the 3D manufactured object based on the melting state of the powder material P.

(7) The calculation unit 56 generates the change information for changing the manufacturing conditions for the powder material P that is unmelted in forming the solidified layer by heating the powder material P. With this configuration, by changing the manufacturing condition for the solidified layer while it is being formed, the occurrence of the manufacturing defect or the like in the solidified layer being formed can be suppressed.

(8) The calculation unit 56 generates the change information for changing the manufacturing condition for the powder material P to be newly supplied to the upper part of the solidified layer or the powder material P newly supplied to an upper part of the solidified layer. With this configuration, when a solidified layer to be newly formed involves a risk of causing a manufacturing defect or the like, a manufacturing condition for suppressing the occurrence of the manufacturing defect or the like can be set in advance.

(9) The calculation unit 56 generates the change information for changing the manufacturing condition for a newly produced 3D manufactured object after production of the 3D manufactured object is completed. With this configuration, when a 3D manufactured object to be newly produced involves a risk of causing a manufacturing defect or the like, a manufacturing condition for suppressing the occurrence of the manufacturing defect or the like can be set in advance.

(10) The calculation unit 56 generates the change information with a condition of the laser beam, with which the powder material P is irradiated to heat the powder material P, serving as the manufacturing condition. With this configuration, the amount of heat that flows into the powder material P is controlled, and a solidified layer can be formed with the occurrence of the manufacturing defect or the like suppressed.

(11) The calculation unit 56 generates the change information with a scanning condition for the laser beam scanning to heat the powder material P, serving as the manufacturing condition. With this configuration, the amount of heat that flows into the powder material P is controlled, and a solidified layer can be formed with the occurrence of the manufacturing defect or the like suppressed.

(12) The calculation unit 56 generates the change information with a condition associated with an atmosphere inside the housing 10 that houses the solidified layer, serving as the manufacturing condition. With this configuration, by controlling the environment in which the formation is executed, the amount of heat that flows into the powder material P is controlled, and a solidified layer can be formed with the occurrence of the manufacturing defect or the like suppressed.

(13) The calculation unit 56 generates the change information with a material layer forming condition for forming the material layer from the powder material P with the blade 221, serving as the manufacturing condition. With this configuration, since the material layer is formed such that the amount of heat that flows into the powder material P can be controlled, a solidified layer can be formed with the occurrence of the manufacturing defect or the like suppressed.

(14) The calculation unit 56 generates the change information with a supporting unit condition associated with the base plate 311, which is a supporting unit that supports the powder material P and the solidified layer, serving as the manufacturing condition. With this configuration, the amount of heat that flows into the powder material P is controlled, and a solidified layer can be formed with the occurrence of the manufacturing defect or the like suppressed.

(15) The calculation unit 56 generates the change information with design data associated with the shape of the solidified layer or the 3D manufactured object, serving as the manufacturing condition. With this configuration, since slice model data or the like is generated such that the amount of heat that flows into the powder material P can be controlled using the design data, a solidified layer can be formed with the occurrence of the manufacturing defect or the like suppressed.

(16) The calculation unit 56 generates the change information with a condition associated with the powder material P, serving as the manufacturing condition. With this configuration, since the material layer can be formed using the powder material P that enables the amount of heat flowing into the powder material P to be controlled, a solidified layer can be formed with the occurrence of the manufacturing defect or the like suppressed.

(17) The determination unit 57 determines whether the solidified layer is to be repaired, based on the state of the detection target region obtained by the detection unit 54. With this configuration, since a portion regarded as a manufacturing defect is repaired during production of a 3D manufactured object, making it possible to produce a high-quality 3D manufactured object with the occurrence of the manufacturing defect or the like suppressed.

(18) The determination unit 57 determines whether to generate the change information for producing the 3D manufactured object, based on the state of the detection target region obtained by the detection unit 54. With this configuration, when a manufacturing defect or the like is likely to occur during production of the 3D manufactured object, the manufacturing condition can be changed. As a result, it is possible to produce a high-quality 3D manufactured object with the occurrence of the manufacturing defect or the like suppressed.

(19) When the state of the detection target region obtained by the detection unit 54 falls within the third reference range, the determination unit 57 determines that the change information needs to be generated for producing a 3D manufactured object. When the state of the detection target region obtained by the detection unit 54 does not fall within the third reference range, the determination unit 57 determines that the solidified layer needs to be repaired. With this configuration, depending on the melting state generated by the laser beam irradiation, processing suitable for suppressing the occurrence of a manufacturing defect or the like can be selected.

(20) When the state of the detection target region obtained by the detection unit 54 falls within the fourth reference range, the determination unit 57 determines that the solidified layer needs to be repaired. When the state of the detection target region does not fall within the fourth reference range, the determination unit 57 determines that production of a 3D manufactured object needs to be canceled. With this configuration, since production of the 3D manufactured object that will involve a manufacturing defect can be canceled, waste of the powder material P and operation time is suppressed.

(21) When the determination unit 57 determines that the solidified layer needs to be repaired, the calculation unit 56 generates repair information for performing repair processing (for example, remelting) to remelt the solidified layer for repair. With this configuration, the formed solidified layer is formed again, making it possible to produce a high-quality 3D manufactured object with the occurrence of the manufacturing defect or the like suppressed.

(22) When the determination unit 57 determines that the solidified layer needs to be repaired, the calculation unit 56 generates repair information for applying thermal treatment to the solidified layer for repair. With this configuration, processing for relaxing residual stress or the like can be made on the formed solidified layer, making it possible to produce a high-quality 3D manufactured object with the occurrence of the manufacturing defect or the like suppressed.

The first embodiment described above can be modified as follows.

(1) In the first embodiment described above, the detection unit 54, the calculation unit 56, and the determination unit 57 perform processing to keep at least one of the basic conditions including the power density PD, the energy density ED, and the temperature distribution T(r) to be within a desired range. In addition to the basic conditions described above, or in place of the basic conditions, processing may be performed to satisfy detailed conditions that are compatible with the productivity and quality required by the user. Here, the manufacturing rate BR, the defect rate DR, the residual stress RS, the temperature gradient G, and the solidification rate R are given as examples of the detail condition. Hereinafter, the manufacturing rate BR, the defect rate DR, the residual stress RS, the temperature gradient G, and the solidification rate R are referred to as detailed conditions.

The manufacturing rate BR is the amount of the powder material P irradiated with the laser beam per unit time, and is represented by the following Formula (4). The larger the manufacturing rate BR, the greater the amount of the powder material P irradiated with the laser beam per unit time, whereby the time required to form the solidified layer is reduced and the operational efficiency can be improved.

$$BR = v \times \Delta y \times \Delta z \tag{4}$$

The defect rate DR represents the state of occurrence of defects occurring inside the solidified layer. As described above, the convection C is caused inside the melt pool MP as a result of the difference in surface tension due to the temperature difference between the surface and inside of the melt pool MP. When this convection C becomes large, fluctuation occurs, and gas entrapment or the like occurs. Solidifying in this state will result in internal defects. Furthermore, the spatter SP that scatters from the melt pool MP and is solidified, impedes the formation of the material layer with the blade 221, and voids or the like that are not filled with the powder material P can be formed inside the material layer. Such voids also cause internal defects in forming the solidified layer. Thus, by keeping the fluid behavior of the melt pool MP, i.e., the convection C, and the solidifying process of the melt pool MP within desired ranges, the defect rate DR due to the convection C and the solidifying process of the melt pool MP can be reduced within an acceptable range.

The residual stress RS represents a history of temperature changes until the melted powder material P is solidified by irradiation of the material layer with a laser beam. By referring to this history of temperature changes, the state of residual stress remaining in the solidified layer because of the solidifying of the melted powder material P can be determined. The thermal history is acquired by using the plurality of pieces of thermal image data generated by the detection unit 54.

The temperature gradient G and the solidification rate R are elements that determine the state of the metallographic structure within the solidified layer that has been solidified. The temperature gradient G is a value obtained by partially differentiating the temperature distribution T(r) according to Formula (3) described above with the distance r as expressed by Formula (5) below, and represents the state of temperature changes in a certain cross section in the material layer. The solidification rate R is a value obtained by partially differentiating the temperature distribution T(r) according to Formula (3) described above with time t as expressed by Formula (6) below, and represents how the melt pool MP cools.

$$G = \partial T / \partial r \tag{5}$$

$$R = \partial T / \partial t \tag{6}$$

In general, it is known that the higher the product G×R of the temperature gradient G and the solidification rate R, the finer the metallographic structure, and the smaller the value of G×R, the coarser the metallographic structure. In addition, the higher the value of G/R obtained by dividing the temperature gradient G by the solidification rate R, the more likely the metallographic structure becomes a crystalline structure called columnar crystal with anisotropic strength. Furthermore, it is known that the smaller the value of G/R, the more likely the metallographic structure has a crystalline structure called isometric crystal with uniform strength. A solidifying map representing the above relationship is known. With reference to this solidifying map, it is possible to predict the metallographic structure inside the solidified layer formed at the temperature gradient G and the solidification rate R.

The detection unit 54, the calculation unit 56, and the determination unit 57 may perform processing for changing the above-described various manufacturing conditions so that at least one of the manufacturing rate BR as described above, the defect rate DR, the residual stress RS, the temperature gradient G, and the solidification rate R is within a range desired by the user during the real time change, the change for forming the next layer, and the change for producing the next manufactured object described in the first embodiment. For example, at least one of the above-described detailed conditions may be applied upon the processing of steps S33 to S36 in FIG. 10, steps S43 to S46 in FIG. 11, steps S53 to S56 in FIG. 12, steps S62 to S69 in FIGS. 13 and 14, or steps S81 to S89 in FIGS. 15 and 16.

(2) In the first embodiment and the modification (1) described above, an example is given in which in the calculation device 50, the calculation unit 56 generates change information based on the state of the detection target region obtained by the detection unit 54, and the output unit 55 outputs the change information to the setting unit 59 as the state information. However, the manufacturing apparatus 1 may include the calculation device 50 illustrated in FIG. 17. In this case, the calculation device 50 includes the detection unit 54, the output unit 55, and a setting unit 69. The setting unit 69 includes the material controller 51, the manufacturing controller 52, the housing controller 53, the calculation unit 56, the determination unit 57, and the storage 58 in the first embodiment. In this case, the detection unit 54 obtains the state of the detection target region using image data output from the imager 41 in the same manner as in the first embodiment. The output unit 55 outputs information on the state of the detection target region obtained by the detection unit 54 to the setting unit 69 as state information. The calculation unit 56 and the determination unit 57 in the setting unit 69 generate change information for changing the manufacturing condition in the same manner as in the first embodiment and the modification (1). At least one of the material controller 51, the manufacturing controller 52, and the housing controller 53 included in the setting unit 69 controls the operation of each of the components of the manufacturing apparatus 1 in the same manner as in the first embodiment and the modification (1) in accordance with the generated change information.

Figure 17:
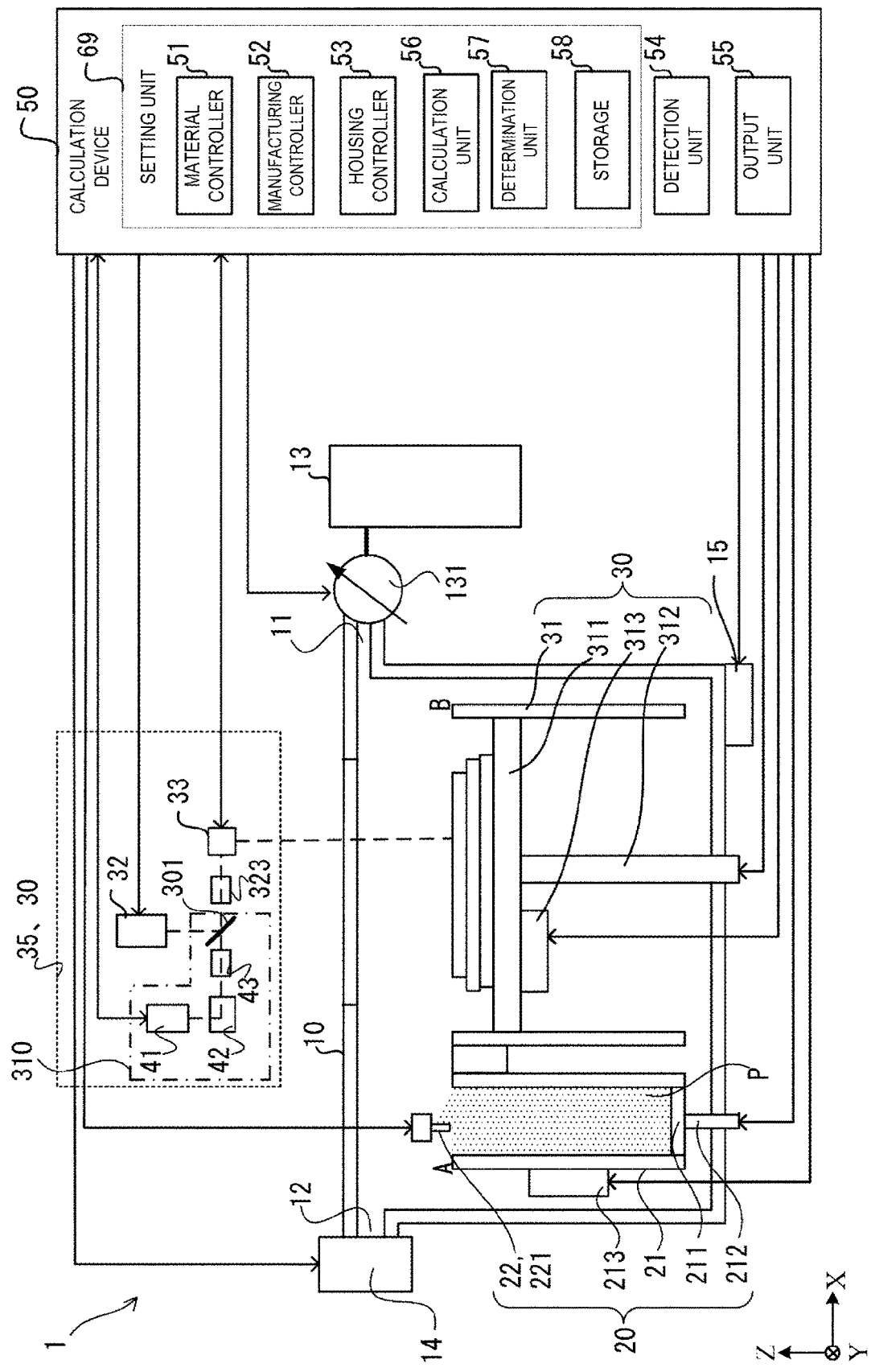
FIG. 17 is a block diagram schematically illustrating a configuration of a main part of a manufacturing apparatus according to a modification (2) of the first embodiment.

Note that components other than the setting unit 59 in the calculation device 50 according to the first embodiment illustrated in FIG. 1 and components other than the setting unit 69 in the calculation device 50 in the modification illustrated in FIG. 17 may be included in an external calculation device different from the manufacturing apparatus 1.

(3) Based on a part of the components of the manufacturing apparatus 1 described in the first embodiment and modifications, a detection system may be formed that acquires information on the detection target region and obtains the state of the detection target region.

FIG. 18(*a*) schematically illustrates an overview of a configuration of main parts of the manufacturing apparatus 1 and the detection system 500 in this case. The manufacturing apparatus 1 includes: the acquisition unit 310 of the manufacturing optical unit 35 of the first embodiment described with reference to FIGS. 1 to 3; the detection system 500 including the detection unit 54, the output unit 55, the calculation unit 56, the determination unit 57, and the storage 58 of the calculation device 50 of the first embodiment in FIG. 1; the housing 10; the material layer forming unit 20; the components of the manufacturing unit 30 other than the acquisition unit 310; and the setting unit 59 of the calculation device 50 in FIG. 1.

The acquisition unit 310 acquires information on the detection target region of the material layer. The information on the detection target region is image data generated in the same manner as described in the first embodiment, based on the thermal radiation light from the detection target region of the material layer by the imager 41 included in the acquisition unit 310. That is, the image data includes image data generated based on each of the light of the different wavelengths (wavelengths $\lambda 1$ and $\lambda 2$) of the thermal radiation light from the detection target region. Note that the acquisition unit 310 may be a thermometer or a high-speed camera. In the case where the acquisition unit 310 is a thermometer, the information on the detection target region is the temperature of the detection target region obtained by the thermometer. In the case where the acquisition unit 310 is a high-speed camera, the information on the detection target region is data on the color image of the detection target region acquired by the high-speed camera. The detection unit 54 of the calculation device 50 obtains the state of the detection target region as in the first embodiment and modifications thereof, using the information on the detection target region acquired by the acquisition unit 310. The calculation unit 56 and the determination unit 57 generate change information for changing the manufacturing condition in the same manner as in the first embodiment and the modification (1). The generated change information is output from the detection system 500 to the setting unit 59 as state information by the output unit 55. At least one of the material controller 51, the manufacturing controller 52, and the housing controller 53 included in the setting unit 59 controls the operation of each of the components of the manufacturing apparatus 1 in the same manner as in the first embodiment and the modification (1) in accordance with the generated change information. Note that as illustrated in FIG. 18(*a*), for convenience of explanation, the detection unit 54, the output unit 55, the calculation unit 56, the determination unit 57, and the storage 58 of the detection system 500 and the setting unit 59 are collectively provided in one calculation device. However, the detection unit 54, the output unit 55, the calculation unit 56, the determination unit 57, and the storage 58 of the detection system 500 and the setting unit 59 may be provided in different calculation devices.

Note that as illustrated in FIG. 18(*b*), a detection system 501 may include the acquisition unit 310 of the manufacturing optical unit 35 of the first embodiment described with reference to FIGS. 1 to 3, and the detection unit 54 and the output unit 55 of the calculation device 50 of the modification (2) of the first embodiment illustrated in FIG. 17. In this case, the manufacturing apparatus 1 includes the detection system 501, the setting unit 69 of the calculation device 50 illustrated in FIG. 17, the housing 10, the material layer forming unit 20, and components of the manufacturing unit 30 other than the acquisition unit 310.

The acquisition unit 310 acquires information on the detection target region in a manner that is similar to that in FIG. 18(*a*). The detection unit 54 obtains the state of the detection target region as in the first embodiment and modifications thereof, using the information on the detection target region. The output unit 55 outputs information on the state of the detection target region obtained by the detection unit 54 from the detection system 501 to the setting unit 69 as state information. The calculation unit 56 and the determination unit 57 in the setting unit 69 generate change information for changing the manufacturing condition in the same manner as in the first embodiment and modifications thereof. At least one of the material controller 51, the manufacturing controller 52, and the housing controller 53 included in the setting unit 69 controls the operation of each of the components of the manufacturing apparatus 1 in the same manner as in the first embodiment and modifications thereof in accordance with the generated change information. Note that as illustrated in FIG. 18(*b*), for convenience of explanation, the detection unit 54 and the output unit 55 of the detection system 501 and the setting unit 69 are collectively provided in one calculation device. However, the detection unit 54 and the output unit 55 of the detection system 501 and the setting unit 69 may be provided in different calculation devices.

(4) The manufacturing apparatus 1 according to the first embodiment and the modifications (1) to (3) may perform at least one of the real time change, the change for forming the next layer, and the change for producing the next manufactured object as a change in the manufacturing condition.

Furthermore, the calculation unit 56 may be a unit that generates the change information only, instead of being a unit that generates the change information and modification information. Furthermore, the calculation unit 56 may generate change information for at least one of manufacturing conditions including: a condition of the laser beam; a scanning condition; a condition associated with an atmosphere inside the housing 10; a material layer forming condition; a supporting unit condition; design data; and a condition associated with the powder material P.

(5) In the embodiment and modifications thereof, the manufacturing apparatus 1 is described using a case where metal powder is used as the powder material P, but powder other than metal powder, such as resin powder or ceramic powder, can be used as the powder material P. Furthermore, the manufacturing apparatus 1 is not limited to production of a 3D manufactured object using the powder material P, and may form a 3D manufactured object using a liquid material or a solid material other than powder.

Second Embodiment

A manufacturing apparatus according to a second embodiment will be described with reference to the drawings. In the following description, components that are the same as those in the first embodiment are given the same reference signs, and differences will be mainly described. Points that are not specifically described are the same as the counterparts in the first embodiment. The present embodiment differs from the first embodiment in that the state of the material layer is obtained and, based on the state information on the material layer obtained, the change information for changing a manufacturing condition is generated.

Figure 19:
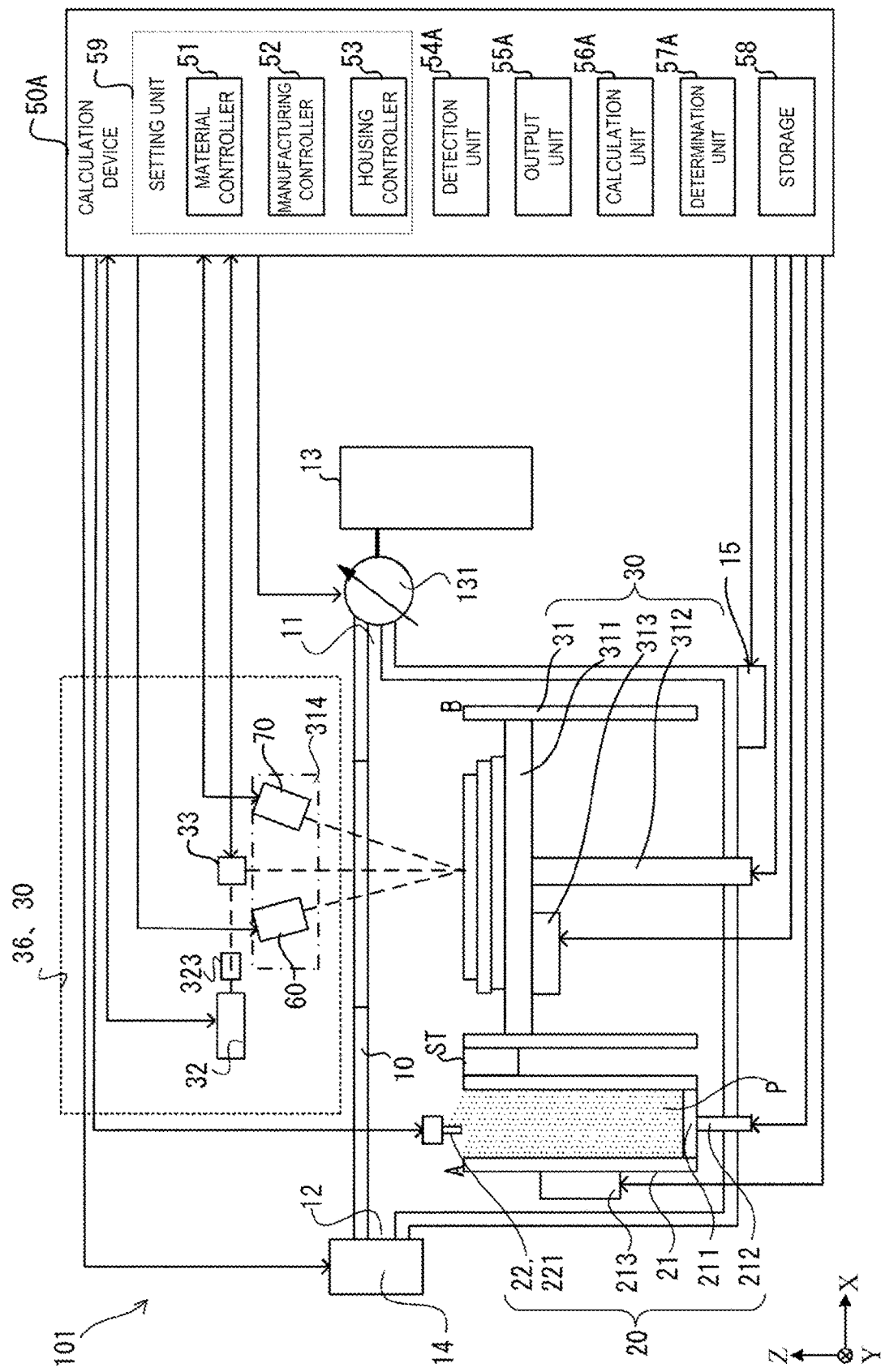
FIG. 19 is a block diagram schematically illustrating a configuration of a manufacturing apparatus according to a second embodiment.

FIG. 19 is a block diagram illustrating an example of a configuration of a main part of a manufacturing apparatus 101 according to the second embodiment. A manufacturing unit 30 of the manufacturing apparatus 101 of the second embodiment includes a manufacturing optical unit 36 instead of the manufacturing optical unit 35 of the first embodiment and its modification, and includes configurations other than this that are the same as those in the manufacturing unit 30 according to the first embodiment. A calculation device 50A of the second embodiment includes the detection unit 54A, an output unit 55A, a calculation unit 56A, and a determination unit 57A instead of the detection unit 54, the output unit 55, the calculation unit 56, and the determination unit 57 of the first embodiment.

As illustrated in FIG. 19, a stage ST is provided between the material supply tank 21 and the manufacturing tank 31. The stage ST has a plane parallel to the XY plane. When processing of obtaining fluidity of the powder material P to be described below is executed, the powder material P is conveyed onto the stage ST by the recoater 22. Although the stage ST is provided between the material supply tank 21 and the manufacturing tank 31 in the example illustrated in FIG. 19, the arrangement of the stage ST is not limited to the position illustrated. For convenience of explanation, in FIG. 19, the material layer forming unit 20 and the manufacturing unit 30 separately described and illustrated as separate configurations, but the material layer forming unit 20 and the manufacturing unit 30 as well as the powder material P may be collectively referred to as a manufacturing unit.

The manufacturing optical unit 36 includes the irradiator 32, the scanning unit 33, a focus lens 323, and a shape measurement unit 314. As described in detail below, the shape measurement unit 314 measures the shape of the material layer in order to determine the state of the formed material layer as described below in detail. The shape measurement unit 314 includes a projection unit 60 and a light receiving unit 70. The projection unit 60 and the light receiving unit 70 use, for example, a known pattern projection phase shift method to measure the shape of the material layer. Note that the shape measurement unit 314 is configured to have a function (the function of determining the shape of the material layer, described below) different from those of the configurations of the manufacturing unit 30 other than the shape calculation unit 314, and thus may be recognized as a configuration separate from the manufacturing unit 30.

The pattern projection method is a method of capturing a plurality of images while changing the intensity distribution of light projected onto a shape measurement target (the material layer and the powder material P in the present embodiment), and processing the plurality of captured images to measure the 3D shape of target. Examples of a known pattern projection method include a phase shift method, a spatial coding method, moire topography, a multi-slit method, and the like. In the phase shift method, a stripe pattern of light having a sinusoidal intensity distribution (stripe pattern light) is used. A plurality of (at least three) images are captured while changing the phase of the stripes, and a sinusoidal phase is calculated for each pixel of the image. Then, the three dimensional coordinates of the measurement target are calculated using the phase thus calculated.

In the present embodiment, methods other than the existing shape measurement method to the pattern projection method such as photocutting method, a Time of Flight (TOF) method, and a stereo camera method can be used for measuring the state of the material layer. Furthermore, the present embodiment is not limited to a shape measurement method in which light is projected onto the measurement target. For example, a known shape measurement method involving no projection of light on the measurement target, such as a stereo camera method, for example, can be used. The stereo camera method is a method of measuring a 3D shape of a measurement target by processing images of the measurement target captured from different directions. In this case, the shape measurement unit 314 needs not to include the projection unit 60.

As described in detail below, the projection unit 60 functions as a light projection unit that projects a projection light having a sinusoidal intensity distribution onto a surface of the formed material layer while changing the phase of the intensity distribution as will be described below in detail. Each time the phase of the sinusoidal intensity distribution of the projection light from the projection unit 60 is changed, the light receiving unit 70 receives light from the surface of the material layer, generates image data on the surface of the material layer, and outputs the generated image data to the calculation device 50. The image data thus generated is signal intensities at pixels photoelectrically converted by an image sensor 72 described below from light from the surface of the material layer. In other words, the light receiving unit 60 functions as an image acquisition unit that acquires image data on the material layer. Note that, in the description below, the light receiving unit 70 is described as being capable of capturing an image of the entire area of the surface of the material layer formed in the manufacturing tank 31, but may also be capable of capturing an image of a part of a region (a region onto which the projection light has been projected from the projection unit 60) of the entire region of the surface of the material layer.

An example of components of the manufacturing optical unit 36 and the arrangement thereof will be described below.

Figure 20:
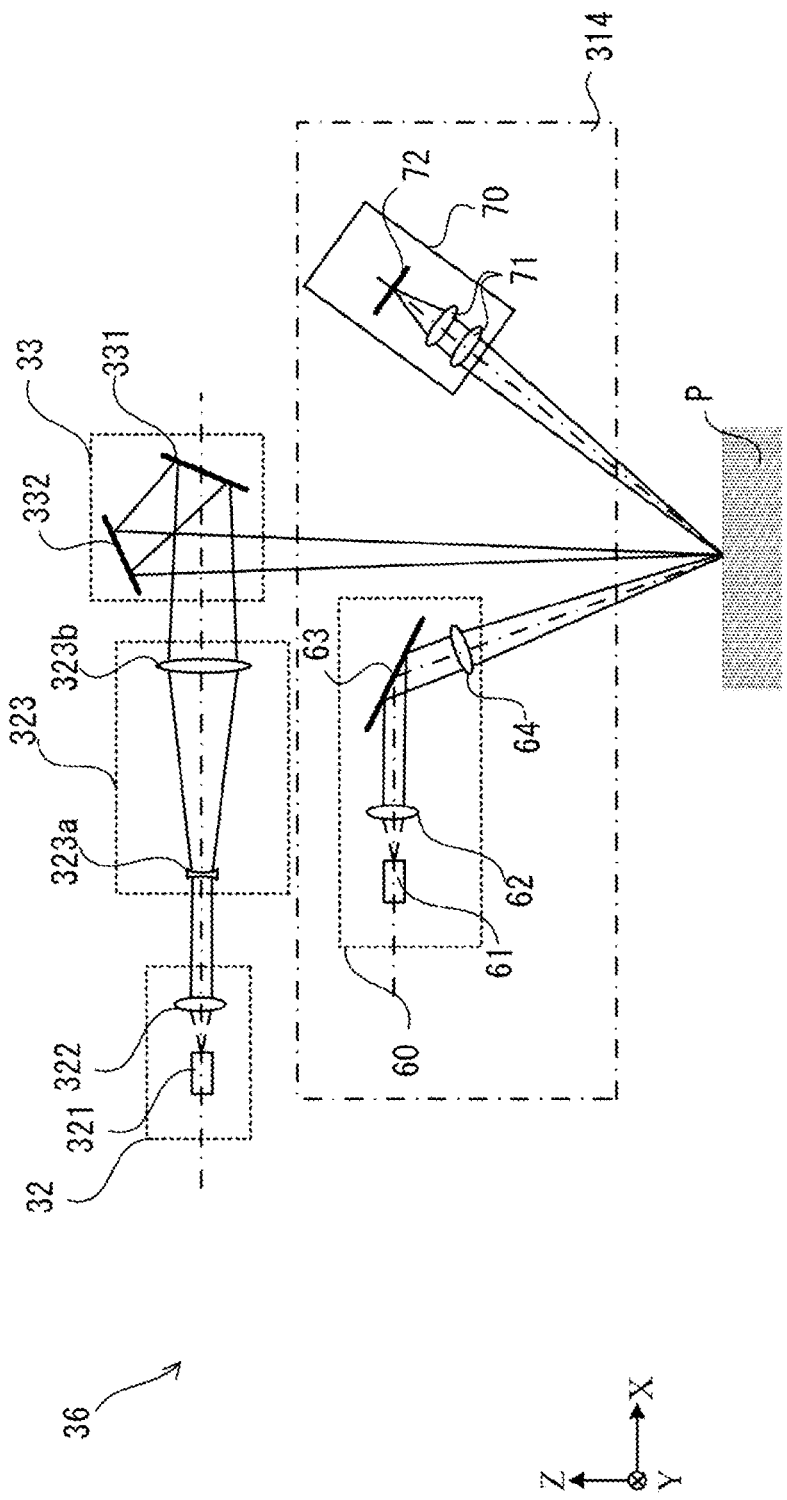
FIG. 20 is a diagram schematically illustrating an example of a specific configuration and arrangement of a manufacturing optical unit included in the manufacturing apparatus according to the second embodiment.

FIG. 20 is a diagram schematically illustrating an example of the arrangement of the irradiator 32, the scanning unit 33, the focus lens 323, and the shape measurement unit 314 (that is, the projection unit 60 and the light receiving unit 70) of the manufacturing optical unit 36.

The irradiator 32 includes, as in the first embodiment, the laser oscillator 321 that emits a laser beam as irradiation light with which the material layer is irradiated and heated, and the collimator lens 322 that collimates the laser beam emitted from the laser oscillator 321. Also in the second embodiment, the irradiator 32 may be a unit capable of emitting an energy beam including light from a known light emitting diode (LED), or a known particle beam such as an electron beam, photon beam, neutron beam, and the like, instead of the laser beam.

The laser beam emitted from the laser oscillator 321 of the irradiator 32 toward the positive side in the X direction passes through the focus lens 323 and enters the scanning unit 33. The focus lens 323 includes the concave lens 323a and the convex lens 323b as in the first embodiment. The scanning unit 33 includes the galvano mirrors 331 and 332 as in the first embodiment, and guides the incident laser beam to the surface of the material layer.

Note that the emission direction of the laser beam from the irradiator 32, the traveling direction of the laser beam, the arrangement of the scanning unit 33 and the galvano mirrors 331, 332, and the reflection direction of the laser beam by the galvano mirror 331 are not limited to those illustrated in the figure, and the emission direction, the traveling direction, and the reflection direction are determined as appropriate, based on the arrangement relationship among the elements of the manufacturing optical unit 36.

The projection unit 60 includes a projection light source 61 that emits projection light, a collimator lens 62, a pattern generation unit 63, and a projection lens 64. The projection light source 61 includes, for example, a laser emitter, and is controlled by the calculation device 50 to emit a laser beam (projection light) toward the positive side in the X direction. Note that a light source such as an LED light source or a halogen lamp may be used as the projection light source 61. The projection light from the projection light source 61 is collimated into parallel light by the collimator lens 62, and then is incident on the pattern generation unit 63.

Note that the projection direction of the projection light from the projection unit 60 is not limited to the direction toward the positive side in the X direction, and suitable arrangement and emission direction are determined as appropriate based on the relationship with other components of the manufacturing optical unit 36.

The pattern generation unit 63 includes, for example, a digital micromirror device (DMD). The surface of the DMD has multiple micromirror surfaces that are two-dimensionally arranged on a plane defined by a Y direction (row direction) and a direction orthogonal to the Y direction (column direction), and the micromirror surfaces are each switched between the ON state and the OFF state under the control by the calculation device 50. In the on state, the angles of the micromirror surfaces are set so that light is projected onto the shape measurement target (such as a material layer). In the OFF state, the angles of the micromirror surfaces are set so that no light is projected onto the shape measurement target (such as a material layer). The projection light incident on the pattern generation unit 63 is converted into light having a preset sinusoidal intensity distribution by controlling the micromirror surfaces as described below. With the projection light having the sinusoidal intensity distribution generated by the pattern generation unit 63, a stripe pattern with the brightness changing in a sinusoidal manner is projected onto the surface of the material layer. Note that the pattern generation unit 63 is not limited to the example including a DMD, and may include a liquid crystal display (LCD) or a Liquid Crystal on Silicon (LCOS).

To generate projection light having a sinusoidal intensity distribution, the pattern generation unit 63 (DMD) is controlled, for example, as follows. The drive power to drive the micromirror surfaces between ON and OFF is controlled so that micromirror surfaces on one row are continuously ON, with ON time and OFF time of the micromirror surfaces on adjacent rows being 98.5% and 1.5%, respectively for example. The drive power to drive the micromirror surfaces between ON and OFF is controlled so that ON time and OFF time of the micromirror surfaces on next adjacent rows are 94% and 6%, respectively for example. With the combination of the ON time and OFF time thus gradually varying along the column direction on a row-by-row basis of the micromirror surfaces of the DMD, the projection light with the sinusoidal intensity distribution is generated, and the stripe pattern with the brightness changing in a sinusoidal manner is projected onto the surface of the material layer. When the drive power for each row of the micromirror surfaces is controlled so that the combinations of the ON time and the OFF time shifts in the column direction, the phase of the sinusoidal intensity distribution of the projection light changes.

Note that, the pattern generation unit 63 may control the drive power between ON and OFF for each row, or for each predetermined number of rows.

Furthermore, the pattern generation unit 63 is not limited to an example in which projection light having an intensity distribution with intensity gradually changing in a sinusoidal manner. For example, the micromirror surfaces may be controlled so that predetermined rows with the micromirror surface being ON and predetermined rows with the micromirror surfaces being OFF are alternately achieved, to obtain projection light with a square wave intensity distribution with bright and dark alternately repeated. Alternatively, the pattern generation unit 63 may generate projection light with a dot-shaped pattern having dark points (or bright points) regularly arranged.

The projection light reflected by the pattern generation unit 63 travels at a predetermined angle with respect to the Z axis toward the material layer formed on the negative side in the Z direction, and is collected by the projection lens 64 to be projected onto the surface of the material layer. As a result, the projection light having the sinusoidal intensity distribution generated by the pattern generation unit 63 is projected onto the surface of the material layer.

The light receiving unit 70 is an imager including an imaging optical system 71 including a plurality of lenses, and an image sensor 72. The image sensor 72 includes, for example: a read circuit including CMOS, CCD, or the like that reads pixels or an image signal as a result of photoelectric conversion by the pixels; a control circuit that controls driving of the pixels; and the like. The light receiving unit 70 is arranged with the optical axis of the imaging optical system 71 being at a predetermined angle with respect to the Z axis. Light from the surface of the material layer is focused by the imaging optical system 71 onto the imaging plane of the image sensor 72. The image sensor 72 performs photoelectric conversion on the incident light to generate image data of the surface of the material layer on which the projection light is projected by the projection unit 60, and outputs the image data to the calculation device 50A. The image data output from the image sensor 72 is used to determine, by the detection unit 54A of the calculation device 50A described below, the state of the material layer based on the shape of the material layer.

Note that, as described above, the manufacturing optical unit 36 has the component irradiating the material layer with the laser beam and the component capturing the state of the material layer partially shared, and thus can also be referred to as an imaging optical system.

The arrangement of the manufacturing optical unit 36 is not limited to the example illustrated in FIG. 20.

The manufacturing optical unit 36 may have, for example, the light receiving unit 70 arranged in an arrangement similar to the example illustrated in FIG. 20, and may have a configuration obtained by replacing the imager 41 and the bifurcated optical system 42 in the manufacturing optical unit 35 according to the first embodiment with the projection unit 60 as illustrated in FIG. 2. In other words, the irradiator 32 and the projection unit 60 may be arranged (coaxial arrangement) such that the laser beam from the irradiator 32 and the projection light from the projection unit 60 travel commonly using the focus lens 323 and the scanning unit 33.

Alternatively, the manufacturing optical unit 36 may have, for example, the projection unit 60 arranged in an arrangement similar to the example illustrated in FIG. 20, and may have a configuration obtained by replacing the imager 41 and the bifurcated optical system 42 in the manufacturing optical unit 35 according to the first embodiment with the light receiving unit 70 as illustrated in FIG. 2. In other words, the irradiator 32 and the projection unit 60 may be arranged (coaxial arrangement) such that the laser beam from the irradiator 32 and the projection light reflected on the surface of the material layer travel commonly using the focus lens 323 and the scanning unit 3.

Furthermore, the irradiator 32 and the projection unit 60 may be commonly used in the manufacturing optical unit 36. In a case where the irradiator 32 has a configuration capable of emitting the guide light to indicate the irradiation position of the laser beam for melting the material layer, the guide light can be used as the projection light for example. In this case, the manufacturing optical unit 36 may not include the projection unit 60 illustrated in FIG. 20. Thus, arrangement (coaxial arrangement) with which the laser beam from the irradiator 32 and the projection light travel while commonly using the focus lens 323 and the scanning unit 33 is obtained.

With the coaxial arrangement as described above, incidence of a specular reflection component of the projection light reflected on the surface of the material layer onto the light receiving unit 70 is suppressed, and scattered light is incident on the light receiving unit 70.

The light receiving unit 70 performs imaging to generate image data with the impact of specular reflected light from the surface of the material layer suppressed. Therefore, the detection unit 54 described below can obtain the surface shape of the material layer using the pattern projection method, with the state of the material layer detected with a higher accuracy because the image data with reduced noise component can be used.

Figure 3:
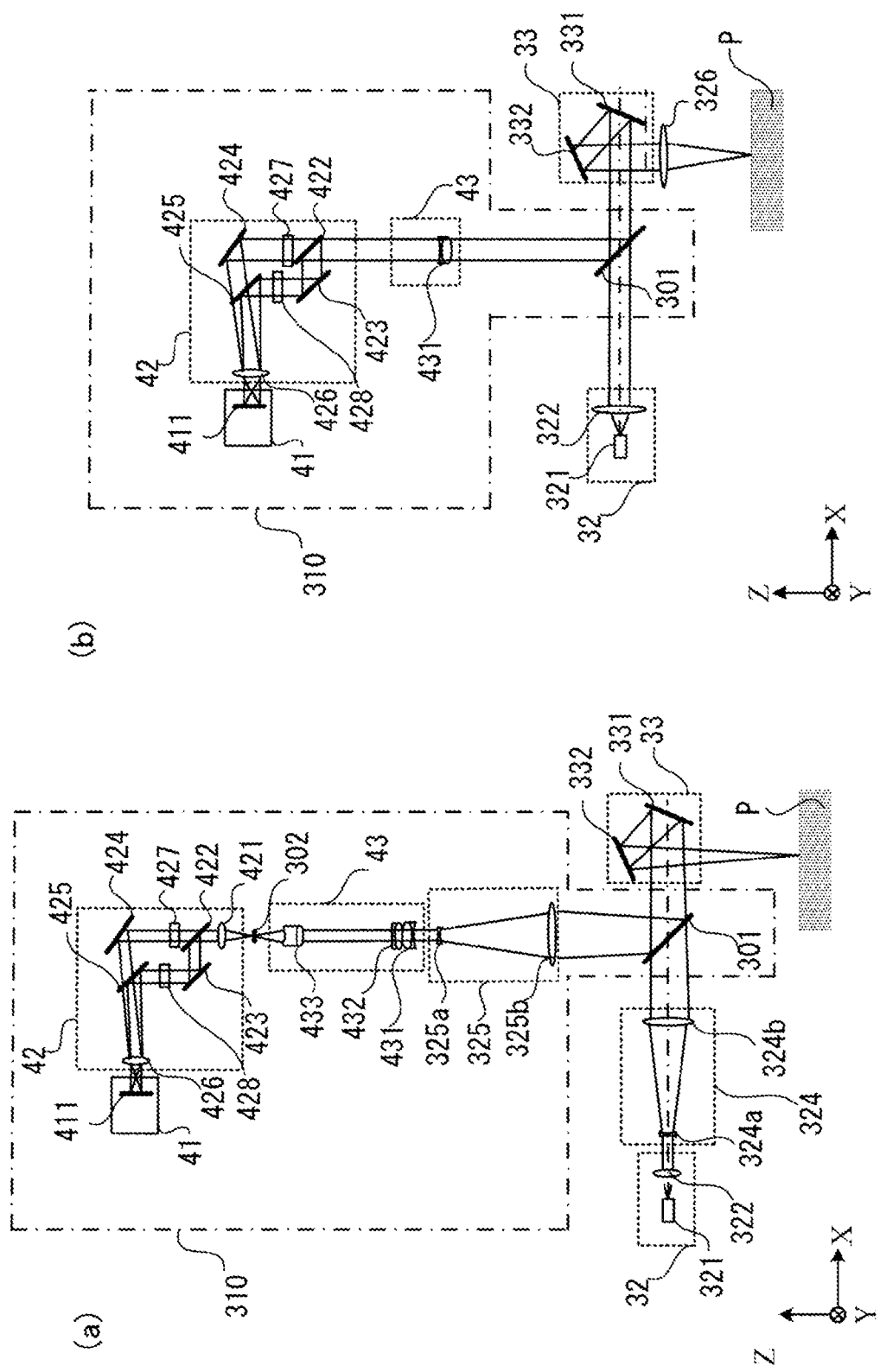
FIG. 3 is a diagram schematically illustrating an example of a specific configuration and arrangement of a manufacturing optical unit according to a modification.

Alternatively, the manufacturing optical unit 36 may have the projection unit 60 arranged in an arrangement similar to the example illustrated in FIG. 20, and may have a configuration obtained by replacing the imager 41 and the bifurcated optical system 42 in the manufacturing optical unit 35 according to the first embodiment illustrated in FIGS. 3(*a*) and 3(*b*) with the light receiving unit 70. Furthermore, in this case, when the irradiator 32 has a configuration capable of emitting the guide light, the projection unit 60 may not be disposed. The guide light from the irradiator 32 may be projected as projection light onto the material layer via the focus lens 324 (see FIG. 3(*a*)) and the scanning unit 33, or via the scanning unit 33 and the fθ lens 326 (see FIG. 3(*b*)).

In addition to the setting unit 59 and the storage 58, the calculation device 50A illustrated in FIG. 19 includes the detection unit 54A, the output unit 55A, the calculation unit 56A, and the determination unit 57A. The detection unit 54A uses the plurality of pieces of image data output from the light receiving unit 70 described above, and obtains the state of the material layer by the pattern projection method based on the shape of the material layer. Here, for convenience of explanation, the expression obtaining the state of the material layer includes obtaining, by the detection unit 54A, the state of at least a partial region of the material layer formed by the powder material P. Based on the shape of the material layer obtained by the detection unit 54A, the determination unit 55A determines whether the change information needs to be generated, whether the repair information needs to be generated, and whether the production of the 3D manufactured object needs to be canceled. When the determination unit 55A determines that the change information needs to be generated, the calculation unit 56A generates the change information for changing the manufacturing condition described as an example in the first embodiment based on the state of the material layer obtained by the detection unit 54A.

The output unit 55A outputs the change information generated by the calculation unit 56A to the setting unit 59 as the state information on the material layer obtained. The state information related to the state of material layer obtained includes the change information for changing the manufacturing condition, for producing the 3D manufactured object, detected by the calculation unit 56A, and information on the state itself of the material layer obtained by the detection unit 54A. Hereinafter, processing executed by the detection unit 54A, the output unit 55A, the calculation unit 56A, and the determination unit 57A according to the second embodiment will be described.

Note that in the present embodiment, the state of the material layer includes at least one of: the flatness of the formed material layer; the density; the layer thickness; the shape of the surface (Z direction height (Z coordinate) at each position of the material layer surface); and the fluidity of the powder material P forming the material layer.

Hereinafter, the processing executed by the detection unit 54A to obtain the state of the material layer will be described.

In the second embodiment, the calculation device 50A projects the projection light onto the projection unit 60 during formation of the material layer. In this process, the calculation device 50A controls the pattern generation unit 63 of the projection unit 60 so that the projection light has a predetermined sinusoidal intensity distribution.

Here, during formation of the material layer refers to a state before the powder material P is conveyed onto the base plate 311 or on the formed solidified layer by the recoater 22, or the state after the powder material P has been transferred onto the base plate 311 or on the formed solidified layer and before the laser beam irradiation by the irradiator 32 has started.

First of all, a case in which the layer thickness of the material layer is determined as the state of the material layer will be described.

The projection unit 60 performs projection with the phase of the sinusoidal intensity distribution of the projection light changed, in the state before the material layer is formed (state where the solidified layer is formed) or in the state where the material layer is formed. The light receiving unit 70 captures an image of the surface of the material layer and the solidified layer every time the phase of the sinusoidal intensity distribution of the projection light changes, and outputs a plurality of pieces of image data on the surface of the material layer and the solidified layer.

The brightness value is difference between the pieces of image data, because the shape of the stripe pattern with the sinusoidal intensity distribution changes in accordance with the shape of the surface of the material layer or the solidified layer. In each image data, assuming that the brightness (brightness value) of the same pixel changes at the same cycle as the projection light having the sinusoidal intensity distribution, the detection unit 54A compares the brightness value of each pixel with the sinusoidal intensity distribution of the projected light that projected for generating the image data, to obtain the phase at each pixel. The detection unit 54A calculates a distance (position in the Z direction) from a predetermined reference position by calculating a phase difference with respect to the phase of the reference position (for example, the upper end of the manufacturing tank 31).

The detection unit 54A uses a plurality of pieces of image data on images captured using the projection light projected before the material layer is formed, to obtain the shape (position in the Z direction) at any position on the XY plane of the surface of the solidified layer that has been formed. The shape (position in the Z direction) of the surface of the solidified layer that has been formed, corresponds to the shape (position on the negative side in the Z direction) of the bottom surface of the material layer to be formed. Note that, in the following description, the shape (position in the Z direction) of the surface of the solidified layer that has been formed is referred to as a first planar shape.

When the material layer is formed on the upper part of the solidified layer, the detection unit 54A uses a plurality of pieces of image data on images captured using the projection light projected after the material layer has been formed, and to obtain the shape (position in the Z direction) at any position on the XY plane of the surface of the material layer that has been formed. Note that, in the following description, the shape (position in the Z direction) of the surface of the formed material layer is referred to as a second planar shape.

The detection unit 54A calculates a difference between the determined first planar shape and the second planar shape (i.e., the difference in position in the Z direction) for each arbitrary position on the XY plane, to calculate the thickness (that is, the layer thickness) of the formed material layer.

Next, a case in which the flatness of the material layer is determined as the state of the material layer will be described.

The detection unit 54A uses a plurality of pieces of image data on images captured using the projection light projected before the material layer is formed, to obtain the second planar shape (the position in the Z direction) as the shape of the surface of the material layer formed. The detection unit 54A obtains the flatness of the material layer from the required second planar shape, based on maximum deviation formula, maximum slope formula, or the like. When the flatness of the material layer is obtained with the maximum deviation formula, the detection unit 54A extracts the positions in the Z direction at three different points separated from each other on the XY plane in the second planar shape (position in the Z direction). The detection unit 54A sets a plane passing through the extracted three points, and obtains as the flatness, the maximum value of the deviation between the set plane and the obtained second planar shape (position in the Z direction). Further, when the flatness of the material layer is obtained by the maximum slope formula, the detection unit 54A sets a plane parallel to the XY plane at a smallest position in the Z direction of the obtained second planar shape (position in the Z direction) and a plane parallel to the XY plane at the largest position in the Z direction of the obtained second planar shape (position in the Z direction). In other words, the detection unit 54A sets two planes that sandwich the required second planar shape (position in the Z direction) so as to be parallel to the XY plane. The detection unit 54A obtains the value of the gap along the Z direction between the two planes and the second planar shape as a planarity.

When the density of the material layer is obtained as the state of the material layer, the detection unit 54A executes the following processing. When the weight of the powder material P used to form the material layer can be determined in advance, the detection unit 54A calculates (detects) the density by dividing the weight of the powder material P by the product of the layer thickness calculated as described above and the area (surface area of the material layer) over which the powder material P is laid. Note that the density obtained by the detection unit 54A may be bulk density, particle density, affinity, and apparent density.

Note that a case where the fluidity of the powder material P is obtained as the state of the material layer will be described in detail later.

Based on the state of the material layer (that is, the flatness, the layer thickness, or the density of the material layer) obtained by the detection unit 54A, when the manufacturing condition needs to be changed, the calculation unit 56A generates the change information for changing the manufacturing condition to maintain at least one of the basic condition for melting and solidifying expressed by Formulae (1) to (3) described in the first embodiment and the detail condition described in Modification (1) of the first embodiment within a desired range. The case where the manufacturing conditions need to be changed is a case where manufacturing defects may occur in the 3D manufactured object when manufacturing is performed under the currently set manufacturing conditions, as described in the first embodiment. The determination unit 57A determines whether the manufacturing conditions need to be changed. When the state of the material layer obtained by the detection unit 54A falls within the reference range described below, the determination unit 57A determines that the manufacturing condition needs to be changed.

Hereinafter, processing executed by the calculation unit 56A to generate change information will be described in detail. The manufacturing condition is changed under the following two conditions: when the solidified layer is formed from the material layer used by the detection unit 54A for obtaining the state of the material layer (real time change); and when a new material layer is formed after the solidified layer has been formed from the material layer used by the detection unit 54A for obtaining the state of the material layer and then the solidified layer is formed from the new material layer (change for forming the next layer). In the case of real time change, the manufacturing condition is changed for the formed material layer. In the case of the change for forming the next layer, the manufacturing conditions are changed for the new powder material P supplied on the solidified layer formed or for the new powder material P supplied on the solidified layer as in the first embodiment. In the following description, the case of real time change and the case of change for forming a next layer will be separately described.

<Real Time Change>

The determination unit 57A determines whether the change information needs to be generated, based on the state of the material layer obtained by the detection unit 54A.

When the layer thickness of the material layer is large, the thickness of the material layer in the Z direction is large, and heat generated by the laser beam emitted from the irradiator 32 is less likely to be transmitted below the material layer (negative side in the Z direction). As a result, sufficient melting of the powder material P might not be achieved over the entire material layer.

Furthermore, when the flatness of the material layer is high, the difference between the high point and the low point of the formed material layer in the Z direction is large, and thus the heat is less likely to be transmitted uniformly inside the material layer irradiated with the laser beam. As a result, there may be locations where sufficient melting of the powder material P fails to be achieved.

If the density is low, many voids (air) between the particles of the powder material P of the material layer are included. The voids impede the transmission of heat between the particles of the powder material P including metal powder, and thus the sufficient melting might fail to be achieved over the entire material layer.

For the reason described above, when the detection unit 54A determines that the flatness of the material layer is high, the layer thickness is large, or the density is low, the determination unit 57A determines that the change information for changing the manufacturing condition needs to be generated. In this case, the calculation unit 56A generates the change information in the following manner.

Note that in the following description, an example is given of a case in which the calculation unit 56A generates change information for changing the manufacturing conditions so that the value of the energy density ED as in Formula (2) is maintained within a desired range.

In order to sufficiently melt the powder material P, the calculation unit 56A changes the parameter of Formula (2) so that the value of the energy density ED in Formula (2) increases. In this case, the calculation unit 56A generates the change information so that at least one of increase in the value of the parameter $P_L$, $P_0$ and reduction of the value of the parameter v, $\Delta y$ is achieved.

The reason why the value of the parameter $P_L$, $P_0$ is increased and the value of the parameter v, $\Delta y$ for increasing the value of the energy density ED is the same as the one described in the first embodiment.

When the value of the parameter $P_L$ is increased, the calculation unit 56A generates the change information so as to increase the laser output of the laser beam emitted from the irradiator 32. When the value of the parameter $P_0$ is increased, the calculation unit 56A generates the change information to make at least one of the following changes in the manufacturing condition: The change in the manufacturing condition in this case includes reducing the flow volume and the flowrate of the inert gas, increasing the temperature of the base plate 311, and setting the scanning pass for reducing the interval between the irradiation positions of the laser beam when the scanning is performed with the laser beam intermittently emitted. In a case where the value of the parameter v is reduced, the calculation unit 56A generates change information for reducing the scanning speed, which is a manufacturing condition. In a case where the value of the parameter $\Delta y$ is reduced, the calculation unit 56A generates change information for implementing at least one of reducing a spot size of the laser beam from the irradiator 32 and reducing a scanning pitch of the scanning unit 33.

When the calculation unit 56A generates the change information as described above, first of all, the amount of change in the value of the energy density ED, that is, the increased amount of the value of the energy density ED is calculated, based on the state of the material layer obtained by the detection unit 54A and the state of the material layer for maintaining the energy density ED in the desired range. In this case, data in which a difference between a value indicating the state of the material layer (for example, the flatness of the material layer, the thickness of the material layer, and the density of the material layer) for maintaining the energy density ED in the desired range and the value indicating the state of the material layer obtained, and the increased amount of the value of the energy density ED are associated with each other is stored in advance in the storage 58. With reference to this data, the calculation unit 56A calculates an increased amount of the value of the energy density ED from the difference in the state of the material layer.

The calculation unit 56A calculates a new value for at least one of the parameters $P_L$, $P_0$, v, and $\Delta y$ from Formula (2) based on the calculated increased amount of the value of the energy density ED. The calculation unit 56A generates change information for changing each of the above-described manufacturing conditions described above based on the new value of at least one of the calculated parameters $P_L$, $P_0$, v, and $\Delta y$. Data in which the value of the parameter $P_L$, $P_0$, v, $\Delta y$ and the value of the manufacturing condition are associated with each other is stored in the storage 58 in advance. With reference to the data, the calculation unit 56A generates the value of the manufacturing condition associated with the calculated new parameter value as the new manufacturing condition value, i.e., the change information.

Note that the calculation unit 56A may also use a difference between the value of the new manufacturing condition and the value of the current manufacturing condition, as the change information.

When the flatness of the material layer is low, the layer thickness is small, or the density is high, the calculation unit 56A generates the change information for changing the manufacturing condition based on an idea that is opposite to that in the case where the flatness of the material layer described above is high, the layer thickness is large, or the density is low. In other words, when the detection unit 54A obtains a low flatness of the material layer, a small layer thickness, or a high density as the state of the material layer, the calculation unit 56A generates change information for changing the manufacturing condition to reduce the value of the energy density ED in Formula (2). In this case, the calculation unit 56A generates the change information so that at least one of reduction of the value of the parameter $P_L$, $P_0$ and an increase in the value of the parameter v, $\Delta y$ is achieved, among the parameters in Formula (2), to reduce the value of the energy density ED.

Also in this case, the calculation unit 56A refers to the data in which the difference between the expected state of the material layer in the case where the material layer is formed by the set manufacturing condition and the obtained state of the material layer, and the amount of reduction in the value of the energy density ED are association with each other, to calculate the reduced amount in the value of the energy density ED. The calculation unit 56A calculates a new value for at least one of the parameters $P_L$, $P_0$, v, and $\Delta y$ from Formula (2) based on the calculated reduced amount of the value of the energy density ED. With reference to the data in which the values of the parameters and the values of the manufacturing conditions are associated with each other, the calculation unit 56A generates the value of the manufacturing condition associated with the calculated new parameter value, i.e., the change information.

Note that the calculation unit 56A may also use a correction value that is a difference between the value of the new manufacturing condition and the value of the current manufacturing condition, as the change information.

The change information generated in association with the parameter $P_L$ is the output value of the laser beam emitted from the irradiator 32 or a correction value for the current laser beam output value. The output unit 55A outputs the generated change information to the manufacturing controller 52 of the setting unit 59 as the state information on the material layer.

The change information generated in association with the parameter $P_0$ is at least one of the following examples. The change information for changing the flow volume and the flowrate of the inert gas is a value of the valve opening degree of the intake device 131, a value of the amount of exhaust of the discharge device 14, and a correction value for the current values of the valve opening degree and the discharge amount. In this case, the output unit 55A outputs the generated change information to the housing controller 53 of the setting unit 59 as the state information on the material layer. The change information for changing the base plate 311 is a value of the heating output of the heater 313 or a correction value for the value of the current heating output. In this case, the output unit 55A outputs the generated change information to the manufacturing controller 52 of the setting unit 59 as the state information on the material layer. The change information for changing the scanning pass is, information on a value of a new inclination angle of the galvano mirrors 331, 332 and on a timing when the inclination angle value is set, or a correction value for the current value. In this case, the output unit 55A outputs the generated change information to the manufacturing controller 52 of the setting unit 59 as the state information on the material layer.

The change information generated for the parameter v is a correction value for the change speed inclination angle of the galvano mirrors 331, 332 or a correction value for the change speed. The output unit 55A outputs the generated change information to the manufacturing controller 52 of the setting unit 59 as the state information on the material layer.

The change information generated for the parameter $\Delta y$ is a newly set angle of the galvano mirrors 331, 332 to which the current set angle is changed, or a correction value for the set angle. The output unit 55A outputs the generated change information to the manufacturing controller 52 of the setting unit 59 as the state information on the material layer.

The output unit 55A outputs the change information generated by the calculation unit 56A to the setting unit 59 as the state information on the material layer.

Upon receiving the change information, the manufacturing controller 52 of the setting unit 59 causes at least one of the following operations to be performed by at least one of the irradiator 32, the scanning unit 33, and the heater 313. The operation of the irradiator 32 in this case is to emit the laser beam with a new laser power based on the change information or the laser output as a result of the correction by the correction value. The operation of the scanning unit 33 includes: driving the galvano mirrors 331, 332 at a new inclination angle change speed based on the change information a change speed as a result of correction by the correction value or at a newly set angle or a set angle as a result of the correction by the correction value; and driving the galvano mirrors 331, 332 at a new inclination angle and timing based on the change information or an inclination angle and timing as a result of the correction by the correction value. The operation of the heater 313 is to operate with a new heating output based on the change information or a heating output as a result of correction by the correction value.

Upon receiving the change information, the housing controller 53 makes the intake device 131 and the discharge device 14 operate with the new valve opening degree and the discharge amount based on the change information or a valve opening degree and a discharge amount as a result of the correction by the correction value.

With this configuration, the solidified layer is formed with the energy density ED controlled to be in the desired range with respect to the formed material layer.

The manufacturing apparatus 1 according to the present embodiment can repair the formed material layer. Hereinafter, repair processing will be described.

The determination unit 57A determines whether the material layer needs to be repaired, based on the state of the material layer obtained by the detection unit 54A. The determination unit 57A determines that the material layer needs to be repaired when the energy density ED cannot be maintained within a desired range even if the manufacturing conditions are changed as described above.

In this case, the calculation unit 56A generates repair information for repairing the formed material layer, and the output unit 55A outputs the repair information to the material controller 51 and the manufacturing controller 52. In the present embodiment, processing of removing the material layer that has already been formed and forming a material layer again is executed as repairing. In this case, the manufacturing controller 52 controls the driving mechanism 312 to move the base plate 311 toward the positive side in the Z direction by a distance corresponding to the thickness of the formed material layer. The material controller 51 controls the recoater 22 in this state to move the blade 221 along the X direction from an end of the manufacturing tank 31 on the negative side in the X direction to the position B. As a result, the powder material P on the base plate 311 or of the material layer formed on the solidified layer is conveyed by the blade 221 toward the positive side in the X direction, and is removed from the manufacturing tank 31 when the blade 221 reaches the position B. Note that the removed powder material P is recovered in a collection tank (not illustrated) provided on the positive side in the X direction of the position B.

When the material layer is removed, the manufacturing controller 52 again controls the driving mechanism 312 to move the base plate 311 toward the negative side in the Z direction depending on the thickness of the material layer to be formed. The material controller 51 controls the driving mechanism 212 to move the bottom surface 211 toward the positive side in the Z direction to push the powder material P out of the material supply tank 21. The material controller 51 controls the recoater 22 to move the recoater 22 from the position A to the position B to convey the powder material P pushed out from the material supply tank 21 to the manufacturing tank 31 and lay it on the base plate 311 or the solidified layer.

Processing executed by the calculation device 50A according to the second embodiment described above in a case of the real time change will be described with reference to flowcharts illustrated in FIGS. 21 and 22. Each processing illustrated in FIG. 21 and FIG. 22 is stored in the storage 58 and read and executed by the calculation device 50A.

Figure 21:
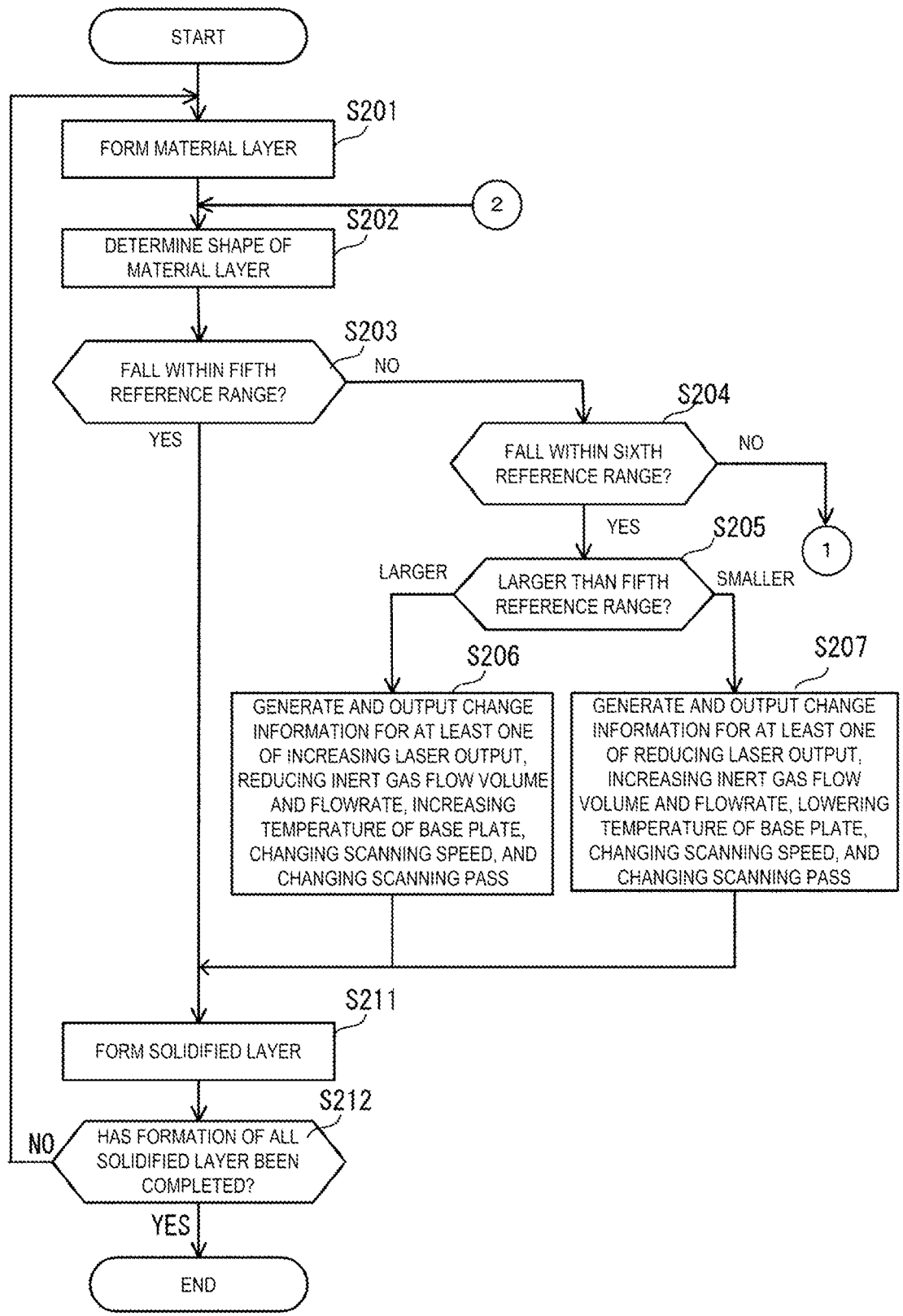
FIG. 21 is a flowchart for explaining processing executed by the manufacturing apparatus according to the second embodiment.
Figure 22:
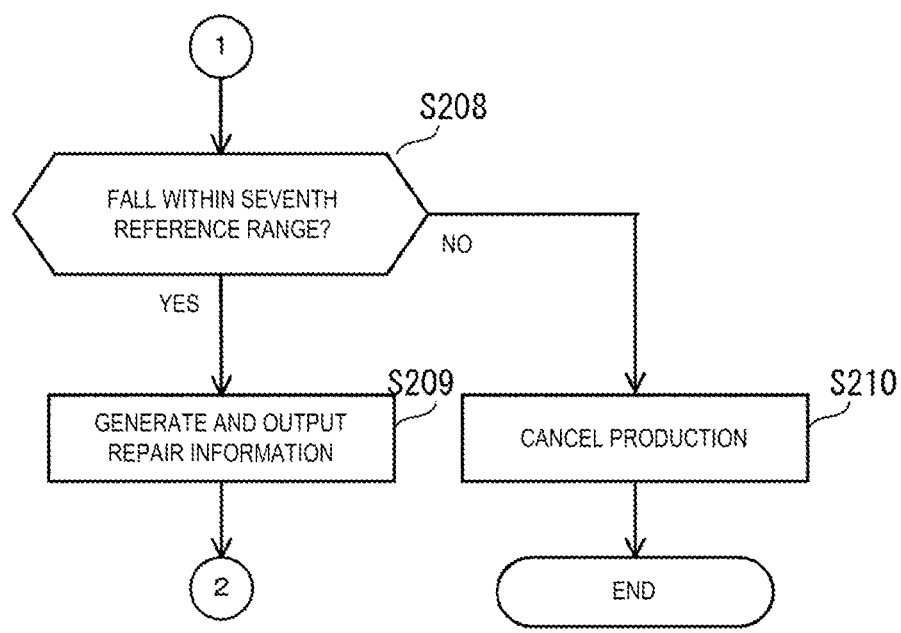
FIG. 22 is a flowchart for explaining processing executed by the manufacturing apparatus according to the second embodiment.

Note that, in the flowcharts of FIGS. 21 and 22, an example is given of a case in which the calculation unit 56A generates change information for changing the manufacturing condition so that the value of the energy density ED of Formula (2) is kept within a desired range. Alternatively, change information for keeping at least one of Formulae (1) to (3) and the detail condition in a desired range may be generated. Furthermore, in the following description, an example is given of a case in which the detection unit 54A obtains the layer thickness of the material layer as the state of the material layer.

In step S201, the calculation device 50A controls the projection unit 60 to project the projection light having a sinusoidal intensity distribution onto the solidified layer that is formed, while changing the phase of the intensity distribution. The calculation device 50A controls the light receiving unit 70 to capture an image of a surface of the solidified layer on which the projection light is projected each time the phase of the projection light having a sinusoidal intensity distribution is changed, and output a plurality of pieces of image data. The material controller 51 makes the material layer forming unit 20 form a material layer under the set manufacturing conditions and, then the processing proceeds to step S202.

In step S202, the calculation device 50A controls the projection unit 60 to project the projection light having a sinusoidal intensity distribution onto the material layer that is formed, while changing the phase of the intensity distribution. The calculation device 50A controls the light receiving unit 70 to capture an image of a surface of the material layer on which the projection light is projected each time the phase of the projection light having a sinusoidal intensity distribution is changed, and output image data. The detection unit 54A uses image data from the light receiving unit 70 to determine the layer thickness as the state of the material layer. In this case, the detection unit 54A obtains the layer thickness of the formed material layer using the first planar shape determined from the plurality of pieces of image data generated with the projection light projected onto the surface of the solidified layer at the beginning of step S201, and the second planar shape obtained from the plurality of pieces of image data generated with the projection light projected onto the surface of the material layer formed on the solidified layer.

In step S203, the determination unit 57A determines whether the state of the material layer obtained by the detection unit 54A (that is, the layer thickness of the material layer) falls within a predetermined fifth reference range. Note that the fifth reference range is a range of the layer thickness of the material layer for keeping the energy density ED within the desired range. The fifth reference range (the range of the layer thickness) is set based on a correlation between the range of the layer thickness of the material layer and the energy density ED obtained through various tests, simulations, and the like by the user for example. The fifth reference range is stored in advance in the storage 58, and the determination unit 57A reads the fifth reference range and uses the fifth reference range in step S203 or the determination processing in step S205 described below. When the determination unit 57A determines that the obtained layer thickness of the material layer does not fall within the fifth reference range, the processing proceeds to step S204, and when the determination unit 57A determines that the obtained layer thickness of the material layer falls within the fifth reference range, the processing proceeds to step S211, which will be described below.

Note that the fifth reference range is not limited to a range of the layer thickness of the material layer for maintaining the energy density ED within a desired range, and may be a range of the layer thickness of the material layer for maintaining the power density PD and the temperature distribution T(r) within a desired range.

In step S204, the determination unit 57A determines whether the layer thickness of the material layer is within a sixth reference range. Note that the sixth reference range is a value of the layer thickness of the material layer with which the energy density ED in Formula (2) can be maintained within a desired range by changing the manufacturing condition. The sixth reference range is a range of layer thickness greater than the fifth reference range of the layer thickness. Note that the sixth reference range may be from a value close to the maximum value and a value close to the minimum value. When the determination unit 57A determines that the layer thickness of the material layer falls within the sixth reference range, the processing proceeds to step S205, and when the determination unit 57A does not determine that the layer thickness falls within the sixth reference range, the processing proceeds to step S208 in FIG. 22. In other words, in step S204, the determination unit 57A determines whether the change information needs to be generated based on the sixth reference range, and determines that the change information needs to be generated when the layer thickness falls within the sixth reference range.

Note that the sixth reference range is not limited to a range of the layer thickness of the material layer for maintaining the energy density ED within a desired range by changing the manufacturing condition, and may be a range of the layer thickness of the material layer for maintaining the power density PD and the temperature distribution T(r) within a desired range by changing the manufacturing condition. Note that the sixth reference range is stored in advance in the storage 58.

In step S205, the determination unit 57A determines whether the layer thickness of the material layer obtained is larger than the fifth reference range. When the determination unit 57A determines that the layer thickness is larger than the fifth reference range, the processing proceeds to step S206, and when the determination unit 57A determines that the layer thickness is smaller than the fifth reference range, the processing proceeds to step S207. In step S206, the calculation unit 56A generates change information for changing the manufacturing condition to increase the value of the energy density ED. In this case, as described above, the calculation unit 56A generates the change information so that at least one of an increase in the value of the parameter $P_L$, $P_0$ and reduction of the value of the parameter v, $\Delta y$ is achieved, among the parameters in Formula (2), to increase the value of the energy density ED in Formula (2). In this case, the calculation unit 56A generates the change information to make at least one of the following changes in the manufacturing condition: The change in the manufacturing condition in this case includes increasing the laser output of the laser beam emitted from the irradiator 32, reducing the flow volume and the flowrate of the inert gas, increasing the temperature of the base plate 311, and changing the scanning pass to one with a shorter interval between the irradiation positions. The output unit 55A outputs the change information generated by the calculation unit 56A to the setting unit 59 as the state information on the material layer.

Upon receiving the change information, the manufacturing controller 52 causes at least one of the following operations to be performed by at least one of the irradiator 32, the scanning unit 33, and the heater 313. The operation of the irradiator 33 in this case is increasing the laser output based on the change information. The operation of the scanning unit 33 is to change the driving of the galvano mirrors 331, 332 based on the change information. The operation of the heater 313 is to operate with a heating output based on the change information.

Upon receiving the change information, the housing controller 53 sets up the intake device 131, the discharge device 14, the valve opening degree, and the discharge amount based on the change information.

The processing then proceeds to step S211, which will be described below.

In step S207 to which the processing proceeds when the layer thickness of the material layer is smaller than the fifth reference range, the calculation unit 56A generates change information for changing the manufacturing condition so as to lower the value of the energy density ED. In this case, as described above, the calculation unit 56A generates the change information so that at least one of reduction of the value of the parameter $P_L$, $P_O$ and an increase in the value of the parameter v, $\Delta y$ is achieved, among the parameters in Formula (2), to reduce the value of the energy density ED in Formula (2). In this case, the calculation unit 56A generates the change information to make at least one of the following changes in the manufacturing condition: The change in the manufacturing condition in this case includes reducing the laser output of the laser beam emitted from the irradiator 32, increasing the flow volume and the flowrate of the inert gas, lowering the temperature of the base plate 311, and setting the scanning pass to be one with a longer interval between scanning positions. The output unit 55A outputs the change information generated by the calculation unit 56A to the setting unit 59 as the state information on the material layer. Upon receiving the change information, the manufacturing controller 52 changes the setting of at least one of the irradiator 32, the scanning unit 33, and the heater 313 and makes the component(s) operate, based on the change information. Upon receiving the change information, the housing controller 53 changes the setting of the intake device 131 and the discharge device 14 and makes the components operate, based on the change information. The processing then proceeds to step S211, which will be described below.

On the other hand, in step S208 in FIG. 22 to which the processing proceeds when the layer thickness of the material layer is determined to be outside the sixth reference range in step S204, whether the layer thickness of the material layer obtained falls within a seventh reference range is determined. Note that the seventh reference range is a value of the layer thickness of the material layer with which the energy density ED in Formula (2) can be maintained within a desired range by repairing the material layer formed. The maximum value of the seventh reference range is set a value greater than the maximum value of the sixth reference range by a predetermined percentage, and the minimum value of the seventh reference range is set as a value smaller than the minimum value of the sixth reference range by a predetermined percentage. Note that the seventh reference range may be from a value close to the maximum value and a value close to the minimum value. Note that the seventh reference range is stored in advance in the storage 58.

When the layer thickness of the material layer obtained falls within the seventh reference range, that is, when the determination unit 57A determines that the material layer needs to be repaired, the processing proceeds to step S209. In other words, when the layer thickness of the material layer falls within the sixth reference range, the determination unit 57A determines that change information needs to be generated and when the layer thickness of the material layer does not fall within the sixth reference range, the determination unit 57A determines that the material layer needs to be repaired.

When the layer thickness of the material layer does not fall within the seventh reference range, that is, when the determination unit 57A determines that the value of the energy density ED cannot be maintained within the desired range even if the material layer is repaired, the processing proceeds to step S210.

In step S209, the calculation unit 56A generates the repair information, and the output unit 55 outputs the generated repair information to the material controller 51 and the manufacturing controller 52. Upon receiving the repair information, the material controller 51 and the manufacturing controller 52 control the operations of the driving mechanism 312 of the base plate 311 and the recoater 22 to remove the material layer formed and form the new material layer. The processing then returns to step S202 of FIG. 21. As a result, the material layer having an abnormal layer thickness is removed, and a new material layer is formed.

In step S210, the calculation device 50A cancels the production of the 3D manufactured object and terminates the processing. In other words, in step 208, when the layer thickness of the material layer falls within the seventh reference range, the determination unit 57A determines that material layer needs to be repaired and when the layer thickness of the material layer does not fall within the seventh reference range, the determination unit 57A determines that the production needs to be canceled.

Furthermore, in step S211 to which the processing proceeds when the layer thickness of the material layer obtained determined falls within the fifth reference range in step S203, or when the change information for changing the manufacturing condition is generated in step S206 or step S207, the solidified layer is formed. If the process proceeds from step S203 to step S211, a solidified layer is formed from the material layer formed based on the set manufacturing condition.

In a case where the processing proceeds from step S206 or step S207 to step S211, at least one of the irradiator 32, the scanning unit 33, the heater 313, the intake device 131, and the discharge device 14 performs the operation set based on the change information to form the solidified layer from the formed material layer.

In step S212, the calculation device 50A determines whether all the solidified layers forming the 3D manufactured object have been formed. When the formation of all the solidified layers has been completed, a result of the determination by the calculation device 50A in step S212 is YES, and the entire processing is terminated. When the formation there is a solidified layer yet to be formed, a result of the determination by the calculation device 50A is step S212 is NO, and the processing returns to step S201.

Note that, in the above description, an example is given of a case where production is canceled in accordance with the determination result in step S208, but the present disclosure is not limited to this example. For example, when the state of the material layer is determined not to be within the sixth reference range in step S204 in FIG. 21, the calculation unit 56A may generate the repair information in step S209 in FIG. 22. In other words, the determination unit 57B may determine that the change information needs to be generated when the state of the material layer obtained by the detection unit 54B falls within the sixth reference range, and may determine that the material layer needs to be repaired when the state of the material layer falls within the sixth reference range.

<Change for Forming Next Layer>

For a change for forming the next layer, after the solidified layer has been formed from the material layer used for detecting the state of the material layer by the detection unit 54A, the change information is generated for the powder material P supplied onto this solidified layer.

In the following description, a case is described where the determination unit 57A has determined that the change information needs to be generated, due to a large flatness of the material layer, a large layer thickness, or a low density obtained by the detection unit 54A, as in the case described for the real time change.

The calculation unit 56A changes the manufacturing condition so that at least one of the basic conditions in Formulae (1) to (3) is maintained within a desired range, as in the case described for the real time change. Note that in the following description, an example is given of a case in which the calculation unit 56A generates change information for changing the manufacturing conditions so that the value of the energy density ED as in Formula (2) is maintained within a desired range.

In order to sufficiently melt the powder material P, the calculation unit 56A changes the parameter of Formula (2) so that the value of the energy density ED in Formula (2) increases. In this case, the calculation unit 56A generates the change information so that at least one of increase in the value of the parameter $P_L$, $P_0$, $\rho$ and reduction of the value of the parameter v, $\Delta y$, $\Delta z$ is achieved. The reason why the value of the parameter $P_L$, $P_0$ is increased and the value, $\rho$ of the parameter v, $\Delta y$, $\Delta z$ for increasing the value of the energy density ED is the same as the one described in the first embodiment.

The change information generated by the calculation unit 56A to increase the value of the parameter $P_L$ is the same as in the case of real time change.

When the value of the parameter $\rho$ is increased, the calculation unit 56A generates the change information so that the pressure applied to the powder material P from the blade 221 is increased.

When the value of the parameter $\Delta z$ is increased, the calculation unit 56A generates the change information so that the layer thickness is reduced, that is, the pressure applied to the powder material P from the blade 221 is increased.

Note that, manufacturing conditions that can be changed to increase the value of the parameter $P_0$ include reduction of the flow volume and the flowrate of the inert gas, the increase in the temperature of the base plate 311, and the change in the scanning pass that are the manufacturing conditions changed for real time change, as well as shortening of the standby time of the blade 221. Shortening the standby time of the blade 221 is for the following reason. Specifically, with such a change, the time during which the solidified layer formed is cooled is reduced so that transmission of heat to the material layer from the solidified layer, whereby the temperature drop of the powder material P can be suppressed. In this case, the calculation unit 56 generates the change information to shorten the standby time of the blade 221.

As in the case of real time change, the calculation unit 56A refers to the data stored in the storage 58 to calculate the amount of increase in the value of the energy density ED in Formula (2), and calculates a new value of at least one of the parameters $P_L$, $P_0$, $\rho$, v, $\Delta y$, and $\Delta z$ based on the calculated increased amount. As in the case of real time change, the calculation unit 56A refers to the data stored in the storage 58 to calculate a new manufacturing condition value based on the calculated new parameter value, whereby the calculated new manufacturing condition is generated as the change information.

When the flatness of the material layer is low, the layer thickness is small, or the density is high, the calculation unit 56A generates the change information for changing the manufacturing condition to reduce the value of the energy density ED in Formula (2). In this case, the calculation unit 56A generates the change information so that at least one of reduction of the value of the parameter $P_L$, $P_0$, $\rho$ and an increase in the value of the parameter v, $\Delta y$, $\Delta z$ is achieved, among the parameters in Formula (2), to reduce the value of the energy density ED. Also in this case, the calculation unit 56A refers to the data stored in the storage 58 to calculate the reduced amount of the value of the energy density ED, and calculates a new value of at least one of the parameters $P_L$, $P_0$, $\rho$, v, $\Delta y$, and $\Delta z$ based on the calculated reduced amount. The calculation unit 56A refers to the data stored in the storage 58 to calculate a new manufacturing condition value based on the calculated new parameter value, whereby the calculated new manufacturing condition is generated as the change information.

Note that the calculation unit 56A may also use a correction value that is a difference between the value of the new manufacturing condition and the value of the current manufacturing condition, as the change information.

The output unit 55A outputs the generated change information to the setting unit 59 as the state of the material layer. The change information generated for the parameters $P_L$, v, and $\Delta y$ is the same as the change information generated in the real time change, and is output to the manufacturing controller 52 of the setting unit 59 as the state information on the material layer, by the output unit 55A. Of the change information generated for the parameter $P_0$, one similar to the change information generated in the real time change is output by the output unit 55A to the manufacturing controller 52 of the setting unit 59. Of the change information generated for the parameter $P_0$, the change information indicating the standby time of the blade 221 is output by the output unit 55A to the material controller 51 of the setting unit 59. The change information generated for the parameters $\rho$ and $\Delta z$ is pressure applied by the blade 221 or a drive value of the pressing mechanism, and is output by the output unit 55A to the material controller 51 of the setting unit 59.

Upon completion of the formation of the solidified layer from the currently formed material layer, the material controller 51, the manufacturing controller 52, and the housing controller 53 control the operation of each part based on the change information.

Figure 23:
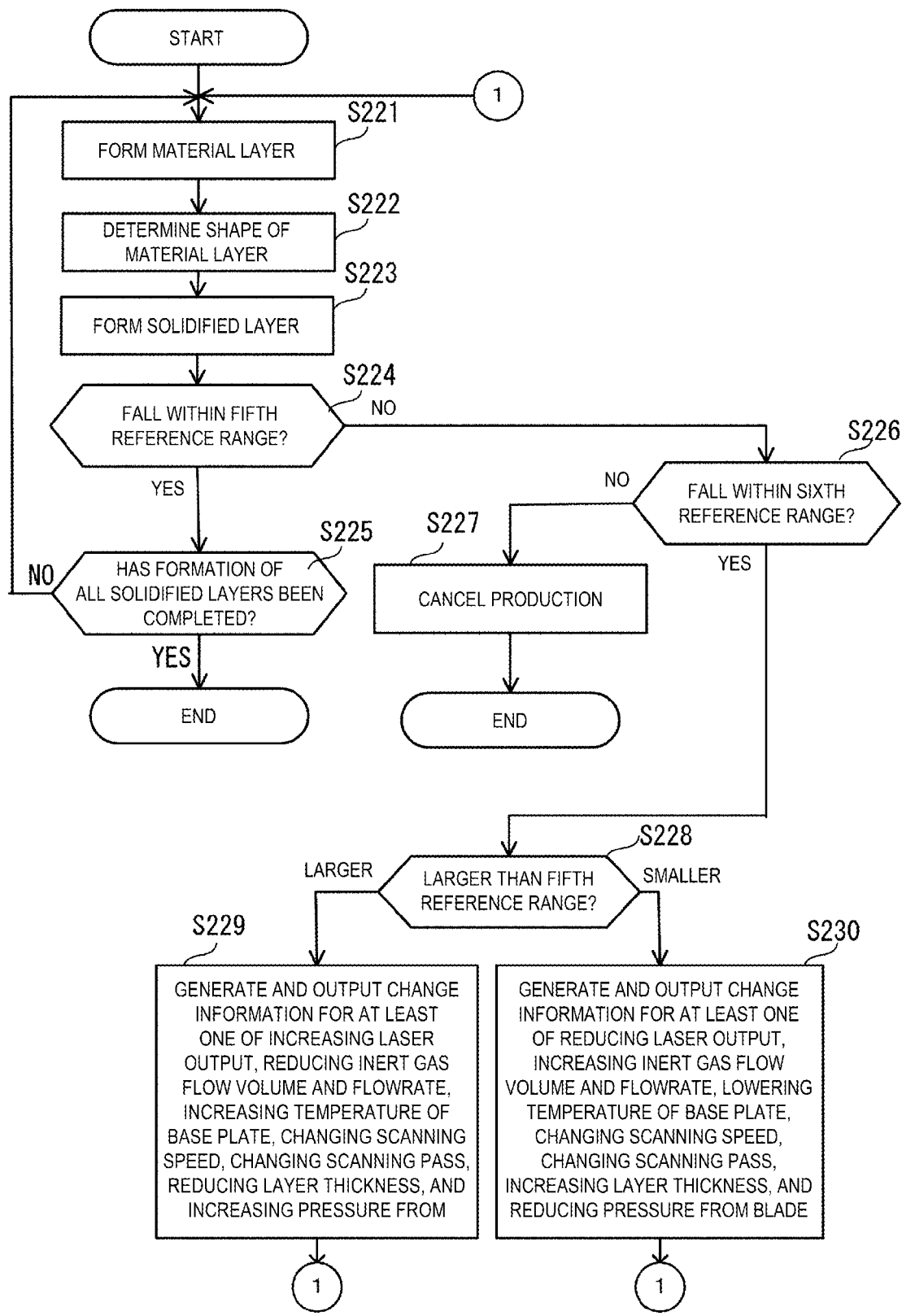
FIG. 23 is a flowchart for explaining processing executed by the manufacturing apparatus according to the second embodiment.

Next, processing executed by the calculation device 50A will be described with reference to a flowchart illustrated in FIG. 23, for a change for forming the next layer. Each processing illustrated in FIG. 23 is stored in the storage 58 and read and executed by the calculation device 50A. Also in this case, description will be given of a case in which the detection unit 54A obtains the layer thickness as a state of the material layer.

Note that, in the flowchart of FIG. 23, an example is given of a case in which the calculation unit 56A generates change information for changing the manufacturing condition so that the value of the energy density ED of Formula (2) is kept within a desired range. Alternatively, change information for keeping at least one of Formulae (1) to (3) and the detail condition in a desired range may be generated.

Processing in steps S221, S222, and S223 is similar to the processing in steps S201, S202 and S221 of FIG. 21, respectively. In step S224, as in step S203 of FIG. 21, the determination unit 57A determines whether the layer thickness of the material layer falls within the fifth reference range described above. When the determination unit 57A determines that the value falls within the fifth reference range, the processing proceeds to step S225. In step S225, processing similar to that in step S212 of FIG. 21 is executed. In step S224, when the determination unit 57A determines that the layer thickness of the material layer does not fall within the fifth reference range, the processing proceeds to step S226. In step S226, the determination unit 57A determines whether the layer thickness of the material layer falls within the sixth reference range described above. When the determination unit 57A determines that the value does not fall within the sixth reference range, the processing proceeds to step S227. In step S227, processing similar to that in step S210 of FIG. 22 is executed and the process ends.

When the determination unit 57A determines that the layer thickness of the material layer falls within the sixth reference range, the processing proceeds to step S228. In step S228, as in step S205 of FIG. 21, the determination unit 57A determines whether the layer thickness of the material layer is larger than the fifth reference range. When the determination unit 57A determines that the value is larger than the fifth reference range, the processing proceeds to step S229, and when the determination unit 57A determines that the value is smaller than the fifth reference range, the processing proceeds to step S230. In step S229, the calculation unit 56A generates change information for changing the manufacturing condition to increase the value of the energy density ED. In the change for next material layer, in addition to the parameter changing the value in the case of step S206 in FIG. 21, an increase in the value of parameter $\rho$ and reduction of the value of $\Delta z$ can be implemented. That is, in addition to the case of step S206 of FIG. 21, the calculation unit 56A generates change information to implement at least one of reduction of the standby time of the blade 221, reduction of the layer thickness, and an increase in the pressure applied to the powder material P from the blade 221. The processing then returns to step S221.

In step S230, the calculation unit 56A generates change information for changing the manufacturing condition to reduce the value of the energy density ED. In the change for the next material layer, in addition to the parameter changing the value in the case of step S207 in FIG. 21, a reduction of the value of parameter $\rho$ and an increase in the value of $\Delta z$ can be implemented. In other words, in addition to the case of step S207 of FIG. 21, the calculation unit 56A generates change information to implement at least one of extending the standby time of the blade 221, increasing the layer thickness, or lowering the pressure applied to the powder material P from the blade 221. The output unit 55A outputs the generated change information to the setting unit 59 as the state information on the material layer. The processing then returns to step S221.

In other words, in step S226, when the layer thickness of the material layer falls within the sixth reference range, the determination unit 57A determines that change information needs to be generated and when the layer thickness of the material layer does not fall within the sixth reference range, the determination unit 57A determines to cancel the production of the 3D manufactured object.

The change information generated in steps S229 and S230 described above is used to change the manufacturing conditions when executing the processing in step S223 to which the processing proceeds after returning from step S229 or S230 to step S221. In other words, upon receiving the change information, the material controller 51 changes the setting of the recoater 22 based on the change information. Upon receiving the change information, the manufacturing controller 52 changes the setting of at least one of the irradiator 32, the scanning unit 33, and the heater 313 and makes the component(s) operate, based on the change information. Upon receiving the change information, the housing controller 53 changes the setting of the intake device 131 and the discharge device 14 and makes the components operate, based on the change information.

Note that, for the real time change and change for forming the next layer as described above, the calculation unit 56A makes which of the parameters $P_L$, $P_0$, $\rho$, $v$, $\Delta y$, and $\Delta z$ is changed or not changed vary depending on a request from the user for the production of the 3D manufactured object. For example, if the user desires to avoid manufacturing time, the calculation unit 56A may not change the value of the parameter v so that the scanning speed of the laser beam is not reduced.

Furthermore, the calculation unit 56A can generate the change information in addition to the manufacturing conditions described above in order to keep the basic conditions, in Formulas (1) to (3), within a desired range. An example where the change information is generated for the manufacturing condition affecting the energy density ED is described. For example, the calculation unit 56 may generate the change information for one or more of the wavelength of the laser beam emitted from the irradiator 32, the intensity distribution of the laser beam, the temperature in the housing 10, the moving speed of the blade 221, the pressure applied from the blade 221 to the powder material P, the shape of the blade 221 (shape or material), the slice model data that is shape data on a solidified layer to be formed, shape data on the support portion that supports the solidified layer or the 3D manufactured object, particle diameter/particle size distribution of the powder material, the hygroscopicity of the powder material P, and the type of the powder material P, among the manufacturing conditions illustrated in FIGS. 8 and 9.

Note that, as in the above described first embodiment, the calculation unit 56A may broadcast the designation target information to the user and accept a user's designation in order to determine parameters and manufacturing conditions for which the change information is generated.

Furthermore, in the description of the flowcharts in FIGS. 21 to 23 described above, an example is given of a case in which the detection unit 54A obtains the layer thickness as the shape of the powder material P, and the fifth, sixth, and seventh reference ranges are described as ranges of layer thickness with which the energy density ED can be kept within the desired range. However, each of the aforementioned reference ranges may be set based on, for example, the average value of the layer thicknesses in all regions of the material layer and the degree of variation in the layer thickness of the material layer. Furthermore, the detection unit 54A may determine the flatness of the surface of the material layer, or may determine the density. In this case, the fifth, sixth, and seventh reference ranges used by the determination unit 57A are set as a range of the flatness of the surface of the material layer or a range of density, with which at least one of the basic conditions (power density PD, energy density ED, temperature distribution T(r)) and the detail condition described in Modification (1) of the first embodiment can be kept within the desired range.

Furthermore, the detection unit 54A may determine, as the state of the material layer, a foreign matter included in the material layer, an inclination of the surface of the material layer with respect to the base plate 311 (that is, the XY plane), the surface roughness of the material layer, and the like. The surface roughness is, for example, the difference between the highest point in the Z direction and the lowest point in the Z direction of the surface of the material layer, and is obtained from the spatial frequency as a result of FFT processing on the image based on the projection light. By obtaining the surface roughness, the detection unit 54A can detect a state in which, for example, protrusions and recesses of the surface of the material layer a stripe form extends along the X direction, for example, due to the shape abnormality of the blade 221 and the like. In this case, the ranges are set as a range of values of spatial frequency or a range of values of difference between the highest and the lowest points in the Z direction, for keeping the basic condition and the detail condition within a desired range. In a case where the detection unit 54A detects a foreign matter, the range of values of the size of the foreign substance is set for keeping the basic condition and the detailed condition within the desired range. When the detection unit 54A detects the inclination of the surface of the material layer with respect to the base plate 311, the range of values of the inclination angle with respect to the base plate 311 is set for keeping the basic condition and the detailed condition within a desired range.

Furthermore, in steps S206 and S207, the calculation unit 56A may generate the change information for the manufacturing condition other than the manufacturing condition described above which has an impact on the energy density ED. For example, the calculation unit 56A may generate change information for the laser beam intensity distribution of the irradiator 32, the temperature in the housing 10, and the hygroscopicity of the powder material P.

By performing the above-described processing, the state of the formed material layer can be obtained, and based on the state of the material layer obtained, change information can be generated to change the manufacturing condition. With this configuration, when the laser beam is emitted, the energy density ED absorbed by the powder material P can be maintained within a desired range so that melt defects or excessive melting can be suppressed, whereby the 3D manufactured object can be produced with the occurrence of the manufacturing defect suppressed.

Next, a case where the detection unit 54A obtains the fluidity of the powder material P is obtained as the state of the material layer will be described.

The manufacturing apparatus 101 first executes processing for obtaining the fluidity of the powder material P. The fluidity of the powder material P is detected before a material layer is formed in the manufacturing tank 31. The material controller 51 controls the recoater 22 to convey a predetermined amount of powder material P onto the stage ST illustrated in FIG. 19 for the detection of the fluidity of the powder material P. The detection unit 54A obtains the fluidity of the powder material P based on the shape formed by this predetermined amount of powder material P conveyed onto the stage ST. In the following description, the detection of the fluidity of the powder material P is referred to as pre-detection.

FIG. 24 is a diagram schematically illustrating the cross-sectional shape on the ZX plane formed by the predetermined amount of powder material P that is the target of the pre-detection, and illustrates a case where the powder material P has been conveyed onto the stage ST such that a heap shaped cross section is obtained. FIG. 24(a) illustrates the state immediately after the powder material P has been conveyed onto the stage ST. When the fluidity of the powder material P is high, the powder material P slides downward (negative side in the Z direction) along the slope of the cross-sectional shape due to gravity, whereby a cross-sectional shape as illustrated in FIG. 24(b) is obtained. As a result of the powder material P sliding down along the slope, a height of a top portion TP in the Z direction is lower, an angle of repose θ is larger, and a lower part BT has a wider shape on the XY plane, than those in FIG. 24(a). The angle of repose θ is the angle formed between the upper surface (i.e., the XY plane) of the stage ST and the slope.

On the other hand, in the powder material P with low fluidity, even if a cross-sectional shape such as that in FIG. 24(a) is formed, the powder material P is less likely to slide down along the slope. Therefore, as in a cross-sectional shape illustrated in FIG. 24(c), the height of the top portion TP in the Z direction is high, the angle of repose θ is large, and the lower part BT has a small shape on the XY plane, compared with the cross-sectional shape in FIG. 24(b).

The calculation device 50A makes the projection unit 60 project projection light having a sinusoidal intensity distribution on the material powder P conveyed onto the stage ST as described above. The light receiving unit 70 captures an image of the powder material P on the stage ST onto which the projection light is projected, and outputs image data on the surface shape of the powder material P provided on the stage ST to be in a heap shape. Using this image data, the detection unit 54A measures the shape formed by the powder material P conveyed onto the stage ST, and obtains the angle of repose θ, the height of the top portion TP (highest point) in the Z direction, and the expansion width of the lower part BT on the XY plane described above.

The determination unit 57A determines whether the powder material P needs to be repaired based on the fluidity of the powder material P obtained by the detection unit 54A as described above.

In the case where the obtained angle of repose θ, the highest point TP, and the expansion width of the lower part BT fall within a preset eighth reference range, that is, in the case of a cross-sectional shape such as that illustrated in FIG. 24(b), the determination unit 57A determines that the fluidity of the powder material P is of a desired fluidity. In the case where the obtained angle of repose θ, the highest point TP, and the expansion width of the lower part BT does not fall within a preset eighth reference range, that is, in the case of a cross-sectional shape such as that illustrated in FIG. 24(c), the determination unit 57A determines that the fluidity of the powder material P is not a desired fluidity.

Note that the eighth reference range is a range of the angle of repose θ, the height of the highest point TP in the Z direction, and a range of the expansion width of the lower part BT in a case where the powder material P of a heap shape having a fluidity enabling the basic condition and the detail condition can be maintained within a desired range The eighth reference range is set, for example, based on a correlation between the above-described angle of repose θ, the height of the highest point TP in the Z direction, and the expansion width of the lower part BT measured with the powder material P formed in a heap shape and the basic condition and the detail condition, obtained by the user through various tests and simulations for example. The eighth reference range is stored in advance in the storage 58, and the determination unit 57A reads the eighth reference range and uses the eighth reference range in the determination processing in step S242 described below. When the range of the angle of repose θ is used as the eighth reference range, a higher value of the angle of repose θ corresponds to a higher fluidity of the powder material P. When the range of the height of the highest point TP in the Z direction is used as the eighth reference range, a higher height of the highest point TP in the Z direction corresponds to a higher fluidity of the powder material P. When the range of the expansion width of the lower part BT is used as the eighth reference range, a larger expansion width of the lower part BT corresponds to a higher fluidity of the powder material P.

When the determination unit 57A determines that the fluidity of the powder material P falls within the eighth reference range (that is, the powder material P has the desired fluidity or higher), the material controller 51 controls the recoater 22 to form a material layer in the manufacturing tank 31 using the powder material P contained in the material supply tank 21. When the determination unit 57 determines that the fluidity of the powder material P does not fall within the eighth reference range (that is, the powder material P does not have the desired fluidity), the calculation unit 56A generates the repair information for repairing the powder material P contained in the material supply tank 21. Since the powder material P with low fluidity is anticipated to have absorbed humidity in the surrounding environment, the calculation unit 56A generates repair information for repairing the powder material P by heating and dehumidifying the powder material P in the material supply tank 21. In this case, the repair processing includes heating processing executed by the heater 213 that heats the material supply tank 21 and heating processing executed by an external heater. In other words, the calculation unit 56A generates the value of the heating output of the heater 213 as the repair information. The generated repair information is output by the output unit 55 to the material controller 51.

Note that the heater 313 may be controlled to increase the temperature of the base plate 311 of the manufacturing tank 31 to which the powder material P is conveyed later.

Note that when it is determined that the powder material P does not have the desired fluidity, the powder material P that has been conveyed onto the stage ST may be housed in a recovery tank (not illustrated) by movement of the blade 221, or may be returned to the material supply tank 21 and subjected to the repair processing.

Next, for the powder material P having the desired fluidity, the detection unit 54A executes processing to determine the state of the material layer. In the following description, an example is given of a case in which the detection unit 54A obtains the particle diameter/particle size distribution of the powder material P as the state of the material layer.

When the pre-detection process described above is executed so that the powder material P has the desired fluidity, the material controller 51 controls the recoater 22 to convey the powder material P in the material supply tank 21 to the manufacturing tank 31 to form a material layer, as in the method described above. In this case, the powder material P used in the pre-detection process can also be used to form the material layer. That is, with the movement of the recoater 22, the powder material P on the stage ST is conveyed onto the manufacturing tank 31. When the material layer is formed, as in the above-described case where the shape of the material layer is obtained, the calculation device 50A controls the projection unit 60 to project projection light having a sinusoidal intensity distribution on the surface of the material layer, and the light receiving unit 70 captures an image of the surface of the material layer onto which the projection light is projected, and outputs image data. The detection unit 54A uses the image data to obtain the particle diameter/particle size distribution of the powder material P forming the material layer.

The detection unit 54A obtains, on the image data, a powder material P having certain a particle size, a powder material P having a particle size substantially equal to this particle size, and a position thereof. The detection unit 54A obtains, on the image data, a powder material P with a particle size different from that described above, a powder material P having a particle size substantially equal to this particle size, and a position thereof. The detection unit 54A repeats the above processing to determine a plurality of powder materials P for each particle size to determine the particle diameter/particle size distribution, that is, the level of uniformity of distribution of the powder materials P of different particle sizes in the material layer. As a result, a region where heat transmission might be affected such as a state where the powder material P with a large or small particle size is densely arranged in a certain partial region of the material layer is detected.

The determination unit 57A determines whether the particle diameter/particle size distribution obtained by the detection unit 54A falls within the fifth reference range. The fifth reference range is set as a range of particle diameter/particle size distribution with which the heat required for melting and solidifying the powder material P is transmitted with at least one of the basic condition in Formulae (1) to (3) and the detail condition described in Modification (1) of the first embodiment maintained within a desired range, when the material layer is irradiated with the laser beam. This range of the particle diameter/particle size distribution is set, for example, based on the results of various tests, simulations, and the like by the user, as in step S203 described above.

Note that the detection unit 54A may determine the sphericity of the powder material P instead of obtaining the particle diameter/particle size distribution of the powder material P for example. The sphericity is a value indicating how much the shape of the individual powder of powder material P deviates from the true sphere. The detection unit 54A calculates (detects) the sphericity based on, for example, the area and the circumferential length of the individual powder obtained on the image data. A high sphericity indicates that the shape of the individual powder of powder material P is close to the true sphere, meaning that the heat is uniformly transmitted inside the individual powder material P. When the detection unit 54A obtains the sphericity, the fifth reference range is set as a range of sphericity with which the heat required for melting and solidifying the powder material P is transmitted with at least one of the basic condition in Formulae (1) to (3) and the detail condition described in Modification (1) of the first embodiment maintained within a desired range, when the material layer is irradiated with the laser beam. The range of the sphericity is set, for example, based on the results of various tests, simulations, and the like by the user, as in step S203 described above.

When the determination unit 57A determines that the obtained particle diameter/particle size distribution falls within the fifth reference range, the manufacturing controller 52 controls the irradiator 32 and the scanning unit 33 under the set manufacturing conditions to irradiate the material layer with laser beam. When the determination unit 57A determines that the obtained particle diameter/particle size distribution does not fall within the fifth reference range, the determination unit 57A determines whether the change information needs to be generated. Upon determining that the obtained particle diameter/particle size distribution falls within the sixth reference range, the determination unit 57A determines that the change information needs to be generated. The sixth reference range may be, for example, a range from a value predetermined times smaller than a minimum value of the fifth reference range to a value predetermined times greater than a maximum value of the fifth reference range, for example. Alternatively, the sixth reference range, for example, may indicate whether the remaining amount of powder material P in the material supply tank 21 is an amount required to form the material layer. The remaining amount of the powder material P in the material supply tank 21 that is greater than the amount required to form the material layer is determined to fall within the sixth reference range by the determination unit 57A.

When the amount is determined to fall within the sixth reference range, the calculation unit 56A generates information instructing removal of the formed material layer and formation of a new material layer, as the change information. The output unit 55A outputs the change information to the material controller 51 and the manufacturing controller 52 as the state information on the material layer.

The material controller 51 and the manufacturing controller 52 control each unit as follows based on the input change information to remove the already formed material layer, and again perform processing for forming a material layer again. In this case, the manufacturing controller 52 controls the driving mechanism 312 to move the base plate 311 toward the positive side in the Z direction by a distance corresponding to the thickness of the formed material layer. The material controller 51 controls the recoater 22 in this state to move the blade 221 along the X direction to remove the powder material P of the material layer formed on the base plate 311 or on the solidified layer, from the manufacturing tank 31.

When the material layer is removed, the manufacturing controller 52 again controls the driving mechanism 312 to move the base plate 311 toward the negative side in the Z direction depending on the thickness of the material layer to be formed. The material controller 51 controls the recoater 22 to move the recoater 211 from the position A to the position B to convey the powder material in the material supply tank 21 to the manufacturing tank 31 and lay it on the base plate 311 or the solidified layer.

Figure 25:
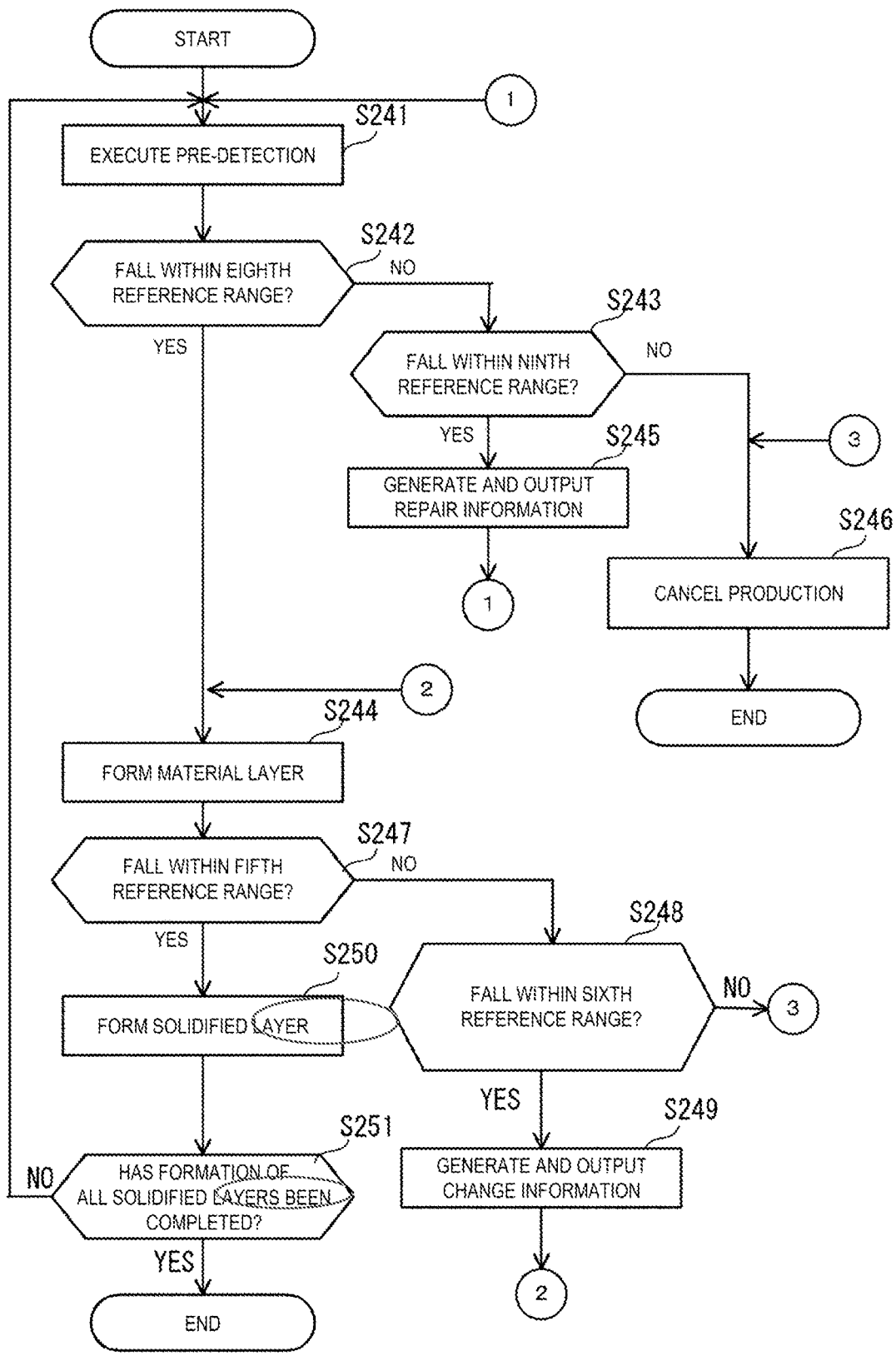
FIG. 25 is a flowchart for explaining processing executed by the manufacturing apparatus according to the second embodiment.

Processing executed by the calculation device 50A according to the second embodiment described above with reference to a flowchart illustrated in FIG. 25. Each processing illustrated in FIG. 25 is stored in the storage 58 and read and executed by the calculation device 50A.

In step S241, for pre-detection, the material controller 51 controls the recoater 22 to move the blade 221 to convey the powder material P onto the stage ST. The calculation device 50A makes the projection unit 60 project the projection light having a sinusoidal intensity distribution onto the powder material P on the stage ST, while changing the phase of the intensity distribution. The calculation device 50A makes the light receiving unit 70 capture an image of the powder material P on the stage ST each time the projection light with a sinusoidal intensity distribution is projected with the phase of the intensity distribution changed, and output a plurality of pieces of image data. The detection unit 54A uses the plurality of pieces of image data from the light receiving unit 70 to obtain the fluidity of the powder material P, and the processing proceeds to step S242.

In step S242, the determination unit 57A determines whether the obtained fluidity of the powder material P falls within the eighth reference range. When the determination unit 57A determines that the fluidity of the powder material P does not fall within the eighth reference range, the processing proceeds to step S243. When the fluidity of the powder material P is determined to fall within the eighth reference range, the processing proceeds to step S244.

In step S243, the determination unit 57A determines whether the obtained fluidity of the powder material P falls within a ninth reference range. The range of the ninth reference range is a range of fluidity of the powder material P with which at least one of the basic condition in Formulae (1) to (3) and the detail condition described in Modification (1) of the first embodiment can be maintained within a desired range, when the powder material P is repaired. The ninth reference range is wider than the eighth reference range, with the maximum value of the ninth reference range being greater than the maximum value of the eighth reference range, and the minimum value of the ninth reference range being smaller than the minimum value of the eighth reference range. Note that the ninth reference range may be from a value close to the maximum value and a value close to the minimum value. When the determination unit 57A determines that the fluidity of the powder material P falls within the ninth reference range, the processing proceeds to step S245. When the determination unit 57A determines that the fluidity of the powder material P does not fall within the ninth reference range, the processing proceeds to step S246. Note that the ninth reference range is stored in advance in the storage 58.

In step S245, the calculation unit 56A generates repair information for repairing the powder material P, and the output unit 55A outputs the repair information generated to the material controller 51. As described above, the repairing is a process for heating the powder material P in the material supply tank 21. Thus, the calculation unit 56A generates the amount of heating by the heater 213 of the material supply tank 21 as the repair information based on the difference between the obtained fluidity of the powder material P and any value (e.g., median value) within the eighth reference range. In this case, the obtained difference between the fluidity of the powder material P and any value (for example, the median value) within the eighth reference range, and the heating amount of the heater 213 are stored in advance in the storage 58 as the associated data, and the calculation unit 56A calculates (detects) the heating amount with reference to this data. When the processing in step S245 ends, the processing returns to step S241. In step S246, to which the processing proceeds when the fluidity of the powder material does not fall within the ninth reference range, the calculation device 50A cancels the production of the 3D manufactured object and terminates the processing. In other words, when the fluidity of the powder material P falls within the ninth reference range in step S243, the determination unit 57A determines that the powder material P needs to be repaired, and when the fluidity of the powder material P does not fall within the ninth reference range, the determination unit 57A determines to cancel the production of the 3D manufactured object.

On the other hand, in step S244 to which the processing has progressed when the fluidity of the powder material P falls within the eighth reference range, the material controller 51 makes the material layer forming unit 20 form the material layer under the set manufacturing condition. The calculation device 50A makes the projection unit 60 project the projection light having a sinusoidal intensity distribution onto the material layer formed, while changing the phase of the intensity distribution. The calculation device 50A controls the light receiving unit 70 to capture an image of a surface of the material layer on which the projection light is projected each time the phase of the intensity distribution of the projection changes. The detection unit 54A obtains the state of the material layer using the plurality of pieces of image data output from the light receiving unit 70. As described above, the detection unit 54A obtains the particle diameter/particle size distribution of the powder material P, as described above as the state of the material layer.

When processing of step S244 ends, the processing proceeds to step S247.

In step S247, the determination unit 57A determines whether the obtained particle diameter/particle size distribution of the powder material P falls within the fifth reference range. When the determination unit 57A determines that the particle diameter/particle size distribution of the powder material P does not fall within the fifth reference range, the processing proceeds to step S248. When the determination unit 57A determines that the particle diameter/particle size distribution of the powder material P falls within the fifth reference range, the processing proceeds to step S250. In step S248, the determination unit 57A determines whether the value falls within the sixth reference range. When the obtained particle diameter/particle size distribution falls within the sixth reference range, a result of the determination by the determination unit 57A in step S248 is YES, and the processing proceeds to step S249. When the obtained particle diameter/particle size distribution does not fall within the sixth reference range, a result of the determination by the determination unit 57A in step S248 in NO, and the processing proceeds to step S246, where the calculation device 50 cancels the production of the 3D manufactured object and terminates the processing.

In step S249, the calculation unit 56A generates the change information, and the output unit 55A outputs the generated change information as the state information on the material layer to the setting unit 59 (the material controller 51 and the manufacturing controller 52). The material controller 51 operates the driving mechanism 212 and the recoater 22 based on the change information, and the manufacturing controller 52 operates the driving mechanism 312 based on the change information. With the operations, the already formed material layer is removed and a material layer is formed again. In other words, in step S248, when the particle diameter/particle size distribution falls within the sixth reference range, the determination unit 57A determines that change information needs to be generated and when the distribution does not fall within the sixth reference range, the determination unit 57A determines to cancel the production of the 3D manufactured object.

The processing then returns to step S244. As a result, the powder material P whose particle diameter/particle size distribution does not fall within the fifth reference range is removed, and a new material layer is formed in the manufacturing tank 31.

Processing in steps S250 and S251 is similar to the processing in steps S211 and S212 of FIG. 21, respectively.

Note that the detection unit 54A may obtain, as the state of the material layer, a surface roughness of the material layer, a position on the material layer to which the amount of the powder material P conveyed is insufficient (that is, an insufficient position in which the amount of powder material P is insufficient), and abnormality of the diameter of the particles of the powder material P (the diameter is too large or the diameter is too small). In this case, the fifth reference range may be set based on a range of spatial frequency, or a range of the number or an area of the insufficient position of the powder material P or a value of the particle diameter of the powder material P, with which at least one of the basic condition in Formulae (1) to (3) and the detail condition described in Modification (1) of the first embodiment can be maintained within the desired range, based on a result of tests, simulations, and the like.

Note that, in the flowchart illustrated in FIG. 25, processing in step S243 and step S246 may not be executed. In this case, when the obtained fluidity of the powder material P determined in step S242 does not fall within the eighth reference range, the processing may proceed to step S245 to generate the repair information. That is, based on the state of the material layer (fluidity of the powder material P), the determination unit 57A may determine whether the powder material P needs to be repaired.

The pre-detection for obtaining the fluidity of the powder material P described above may be performed when executing the processing of the flowcharts illustrated in FIGS. 21 to 23. That is, processing in steps S241 to S243, steps S245, and S246 illustrated in FIG. 25 may be executed before step S201 starts in FIG. 21 or before step S221 starts in FIG. 23. In this case, if the state of the material layer (fluidity of the powder material P) does not fall within the eighth reference range, the repairing may be performed, without performing step S243 and step S246.

Note that in the second embodiment described above, an example is given in which in the calculation device 50A of the manufacturing apparatus 101, the calculation unit 56A generates change information based on the state of the material layer obtained by the detection unit 54A, and the output unit 55A outputs the change information to the setting unit 59 as the state information. However, the calculation device 50A is not limited to such an example, and may have a configuration illustrated in FIG. 26. In other words, the calculation device 50A includes the detection unit 54A, the output unit 55A, and a setting unit 69A. The setting unit 69A includes the material controller 51, the manufacturing controller 52, the housing controller 53, the calculation unit 56A, the determination unit 57A, and the storage 58 in the second embodiment. In this case, the detection unit 54A obtains the state of the material layer using image data output from the light receiving unit 70 as in the second embodiment. The output unit 55A directly uses the state information on the material layer obtained by the detection unit 54A as the state information on the material layer, and outputs the information to the setting unit 59. The calculation unit 56A and the determination unit 57A of the setting unit 69A generate change information for changing the manufacturing conditions as in the second embodiment. At least one of the material controller 51, the manufacturing controller 52, and the housing controller 53 of the setting unit 69A controls the operation of a corresponding one of the components of the manufacturing apparatus 101 as in the second embodiment based on the generated change information.

Figure 26:
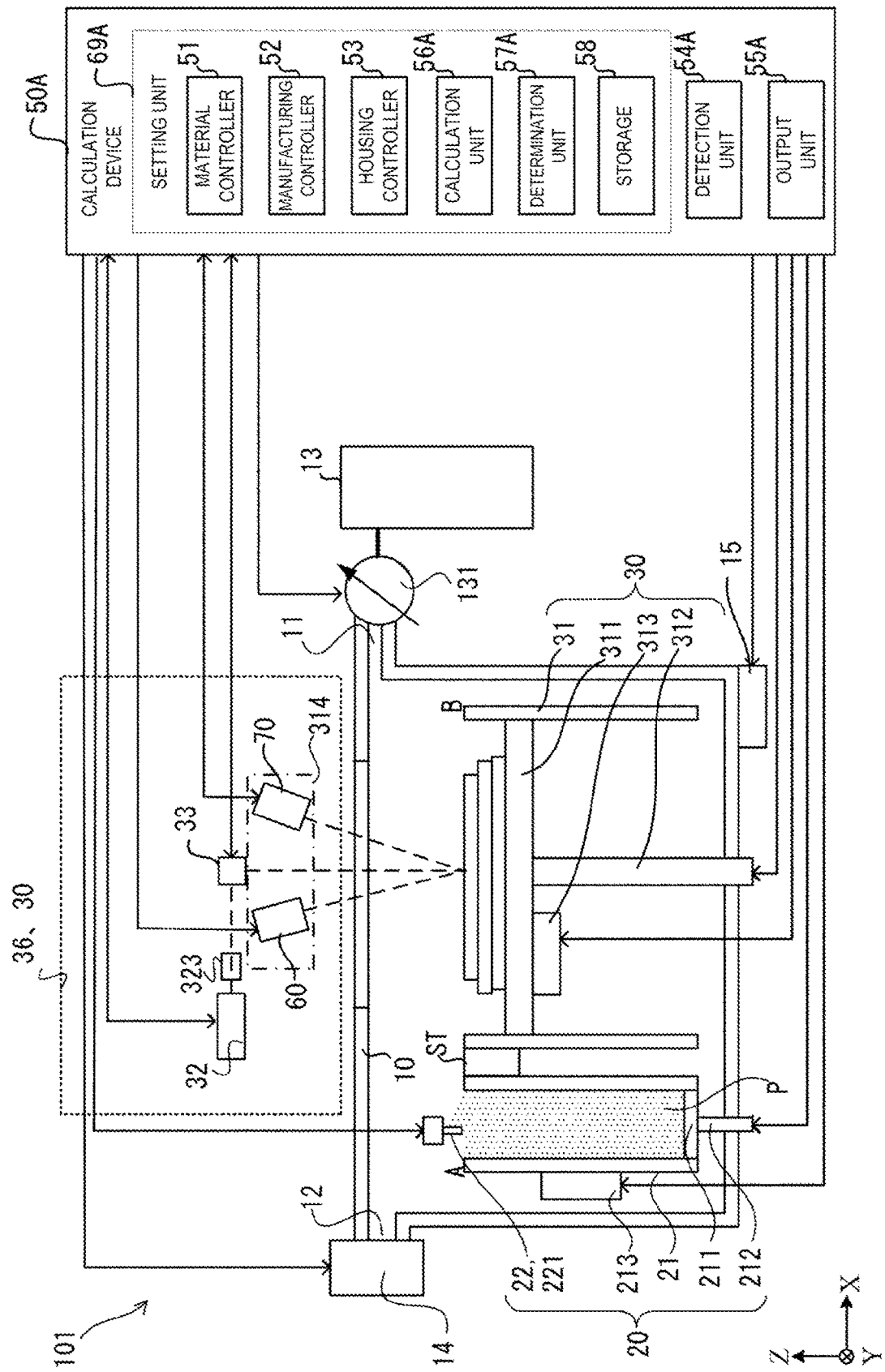
FIG. 26 is a block diagram schematically illustrating a configuration of a main part of a manufacturing apparatus according to a modification of the second embodiment.

Note that components of the calculation device 50A of the second embodiment other than the setting unit 59 illustrated in FIG. 19 and components of the calculation device 50A in the modification other than the setting unit 69A illustrated in FIG. 26 may be included in an external calculation device different from the manufacturing apparatus 101.

Further, based on a part of the components of the manufacturing apparatus 101 described in the second embodiment, a detection system may be formed that acquires the state information on the material layer and obtains the state of the material layer based on the state information on the material layer.

FIG. 27(a) schematically illustrates an overview of a configuration of a main part of the manufacturing apparatus 101 and a detection system 500A in this case. The manufacturing apparatus 101 includes: the shape measurement unit 314 of the manufacturing optical unit 36 of the second embodiment described with reference to FIG. 19; the detection system 500A including the detection unit 54A, the output unit 55A, the calculation unit 56A, the determination unit 57A, and the storage 58 of the calculation device 50A of the second embodiment; the housing 10; the material layer forming unit 20; the components of the manufacturing unit 30 other than the shape measurement unit 314; and the setting unit 59 of the calculation device 50A in FIG. 19.

The shape measurement unit 314 projects projection light having a sinusoidal intensity distribution onto the material layer, and acquires image data of at least a partial region of the material layer on which the projection light is projected. Note that when the state of the material layer is determined using, for example, a stereo camera method or the like, the shape measurement unit 314 may not include the projection unit 60. The detection unit 54A of the calculation device 50A obtains the state of the material layer as in the second embodiment, using the image data acquired by the shape measurement unit 314. The calculation unit 56A and the determination unit 57A generate change information for changing the manufacturing conditions as in the second embodiment. The generated change information is output from the detection system 500A to the setting unit 59 as the state information on the material layer by the output unit 55A. At least one of the material controller 51, the manufacturing controller 52, and the housing controller 53 of the setting unit 59 controls the operation of a corresponding one of the components of the manufacturing apparatus 101 as in the second embodiment based on the generated change information. Note that as illustrated in FIG. 27(a), for convenience of explanation, the detection unit 54A, the output unit 55A, the calculation unit 56A, the determination unit 57A, and the storage 58A of the detection system 500A and the setting unit 59 are collectively provided in one calculation device. However, the detection unit 54A, the output unit 55A, the calculation unit 56A, the determination unit 57A, and the storage 58 of the detection system 500A and the setting unit 59 may be provided in different calculation devices.

Note that as illustrated in FIG. 27(b), a detection system 501A may include the shape measurement unit 314 in the configuration illustrated in FIG. 27(a) and the detection unit 54A and the output unit 55A of the calculation device 50A described with reference to FIG. 26. In this case, the manufacturing apparatus 101 includes the detection system 501A, the setting unit 69A of the calculation device 50A illustrated in FIG. 26, the housing 10, the material layer forming unit 20, and components of the manufacturing unit 30 other than the shape measurement unit 314.

The shape measurement unit 314 acquires image data as in the case described with reference to FIG. 27(a). The detection unit 54A uses this image data to obtain the state of the material layer as in the second embodiment. The output unit 55A directly uses the state information on the material layer obtained by the detection unit 54A as the state information on the material layer, and outputs the information to the setting unit 69A. The setting unit 69A, the calculation unit 56A, and the determination unit 57A generate change information for changing the manufacturing conditions as in the second embodiment. At least one of the material controller 51, the manufacturing controller 52, and the housing controller 53 of the setting unit 69A controls the operation of a corresponding one of the components of the manufacturing apparatus 101 as in the second embodiment based on the generated change information. Note that as illustrated in FIG. 27(b), for convenience of explanation, the detection unit 54A and the output unit 55A of the detection system 501A and the setting unit 69A are collectively provided in one calculation device. However, the detection unit 54A and the output unit 55A of the detection system 501A and the setting unit 69A may be provided in different calculation devices.

Furthermore, the calculation unit 56A may be a unit that generates the change information only, instead of being a unit that generates the change information and modification information. Furthermore, the calculation unit 56A may generate change information for at least one of manufacturing conditions including: a condition of the laser beam; a scanning condition; a condition associated with an atmosphere inside the housing 10; a material layer forming condition; a supporting unit condition; design data; and a condition associated with the powder material P.

Furthermore, in the second embodiment described above, an example of a change for forming the next layer has been given. However, the manufacturing condition may be changed by the change information generated based on the shape of the powder material P also when a change for producing the next manufactured object is made as described in the first embodiment. That is, the calculation unit 56 can generate the change information when newly manufacturing the 3D manufactured object after the production of a 3D manufactured object has been completed.

For a change for producing the next manufactured object, the determination unit 57A determines that the change information needs to be generated when the state does not fall within the fifth reference range but falls within the sixth reference range. In this case, as in the case described above, the calculation unit 56A generates change information for changing the manufacturing conditions. When the state of the material layer does not fall within the sixth reference range, the determination unit 57A determines that the 3D manufactured object needs to be repaired, and the calculation unit 56A may generate the repair information based on a difference between the state of the material layer obtained and any value within the fifth reference range (for example, a median value). Furthermore, in the case of a change for producing the next manufactured object, the repairing can be performed when a portion to be repaired is on the contour of the 3D manufactured object.

Of course, the seventh reference range may be provided also for a change for producing the next manufactured object, and the determination unit 57A may determine whether to cancel the production using the range. When the determination unit 57A determines that the state of the material layer does not fall within the sixth reference range, whether the state of the material layer falls within the seventh reference range is determined. When the state of the material layer falls within the seventh reference range, the determination unit 57A determines that the produced 3D manufactured object needs to be repaired. When the state of the material layer does not fall within the seventh reference range, the determination unit 57A may determine that the production of the next 3D manufactured object needs to be canceled.

With the second embodiment described above, the following effects can be obtained in addition to the effects of (8) to (16) obtained with the first embodiment.

(1) The calculation device 50 used in the manufacturing apparatus 1 for producing a 3D manufactured object from a solidified layer formed by heating a layer-shaped material layer formed of the powder material P by irradiation with a laser beam includes the detection unit 54A and the output unit 55A. The detection unit 54A obtains a state of the material layer based on the shape of the formed material layer, and the output unit 55A outputs the state information on the material layer obtained by the detection unit 54A to the manufacturing apparatus 1. With this configuration, whether the 3D manufactured object being produced involves a risk of manufacturing defects or the like can be estimated from the state of the material layer used for forming the solidified layer. With the obtained state information on the material layer reflected on the production of the 3D manufactured object, the occurrence of the manufacturing defect or the like in the 3D manufactured object can be suppressed.

(2) The state of the material layer includes the fluidity of the powder material P forming the material layer. With this configuration, whether the powder material P is in a state suitable for forming the material layer can be detected, the occurrence of the manufacturing defect or the like in the 3D manufactured object is suppressed.

(3) The state of the material layer includes at least one of the flatness, density, and layer thickness of the material layer. With this configuration, whether the formed material layer is suitable for forming the solidified layer can be detected, the occurrence of the manufacturing defect or the like in the 3D manufactured object is suppressed.

(4) The calculation unit 56A generates change information for changing the manufacturing condition used for producing the 3D manufactured object, based on the state of the material layer obtained by the detection unit 54A, and the output unit 55A outputs the generated change information as the state information on the material layer. With this configuration, the manufacturing condition can be changed to suppress the occurrence of the manufacturing defect or the like in the 3D manufactured object based on the state of the material layer.

(5) The determination unit 57A determines whether the powder material P needs to be repaired based on the fluidity of the powder material P obtained by the detection unit 54A. With this configuration, the powder material P unsuitable for forming the material layer with low fluidity can be repaired before being used for forming the material layer, making it possible to produce a high-quality 3D manufactured object with the occurrence of the manufacturing defect or the like suppressed.

(6) The determination unit 57A determines whether to generate the change information for producing the 3D manufactured object, based on the state of the material layer obtained by the detection unit 54A. With this configuration, the manufacturing condition can be changed in cases where a manufacturing defect or the like is likely to occur during the production of the 3D manufactured object, making it possible to produce a high-quality 3D manufactured object with the occurrence of the manufacturing defect or the like suppressed inside the 3D manufactured object.

(7) When the state of the material layer obtained by the detection unit 54A falls within the sixth reference range, the determination unit 57A determines that the change information needs to be generated. When the state of the material layer obtained by the detection unit 54A does not fall within the sixth reference range, the determination unit 57A determines that the powder material P needs to be repaired. With this configuration, depending on the state of the material layer, processing suitable for suppressing the occurrence of a manufacturing defect or the like can be selected.

(8) When the state of the material layer obtained by the detection unit 54A falls within the seventh reference range (or the ninth reference range), the determination unit 57A determines that the repair information needs to be generated. When the state does not fall within the seventh reference range (or the ninth reference range), the determination unit 57A determines that production of the 3D manufactured object needs to be canceled. With this configuration, since production of the 3D manufactured object that will involve a manufacturing defect or the like due to the use of the powder material P unsuitable for producing the 3D manufactured object can be canceled, waste of the powder material P and operation time is suppressed.

(9) When the determination unit 57A determines that the material layer needs to be repaired, the calculation unit 56A generates repair information for removing the formed material layer and newly forming a material layer. With this configuration, the material layer unsuitable for forming the solidified layer is removed, so that a material layer can be formed again to suppress the occurrence of a manufacturing defect or the like in forming the solidified layer, making it possible to produce a high-quality 3D manufactured object.

(10) When the determination unit 57A determines that the powder material P needs to be repaired based on the fluidity of the powder material P obtained by the detection unit 54A, the calculation unit 56A generates repair information for applying thermal treatment to the powder material P for repair. With this configuration, the powder material P can be returned back to a state suitable for forming the solidified layer with low hygroscopicity by heating the powder material P that has absorbed humidity to have low fluidity, making it possible to produce a high-quality 3D manufactured object with the occurrence of the manufacturing defect or the like suppressed.

Third Embodiment

A manufacturing apparatus according to a third embodiment will be described with reference to the drawings. In the following description, components that are the same as those in the first embodiment and the second embodiment are given the same reference signs, and differences will be mainly described. Points that are not specifically described are the same as the counterparts in the first embodiment and the second embodiment. In the present embodiment, the imager of the manufacturing apparatus of the first embodiment, and the projection unit and the light receiving unit of the manufacturing apparatus of the second embodiment are provided. The state of the detection target region is obtained based on the image data acquired by the imager, the change information is generated based on the state of the detection target region. Furthermore, the state of the material layer is obtained based on the image data acquired by the light receiving unit, and the change information is generated based on the state of the material layer.

Figure 28:
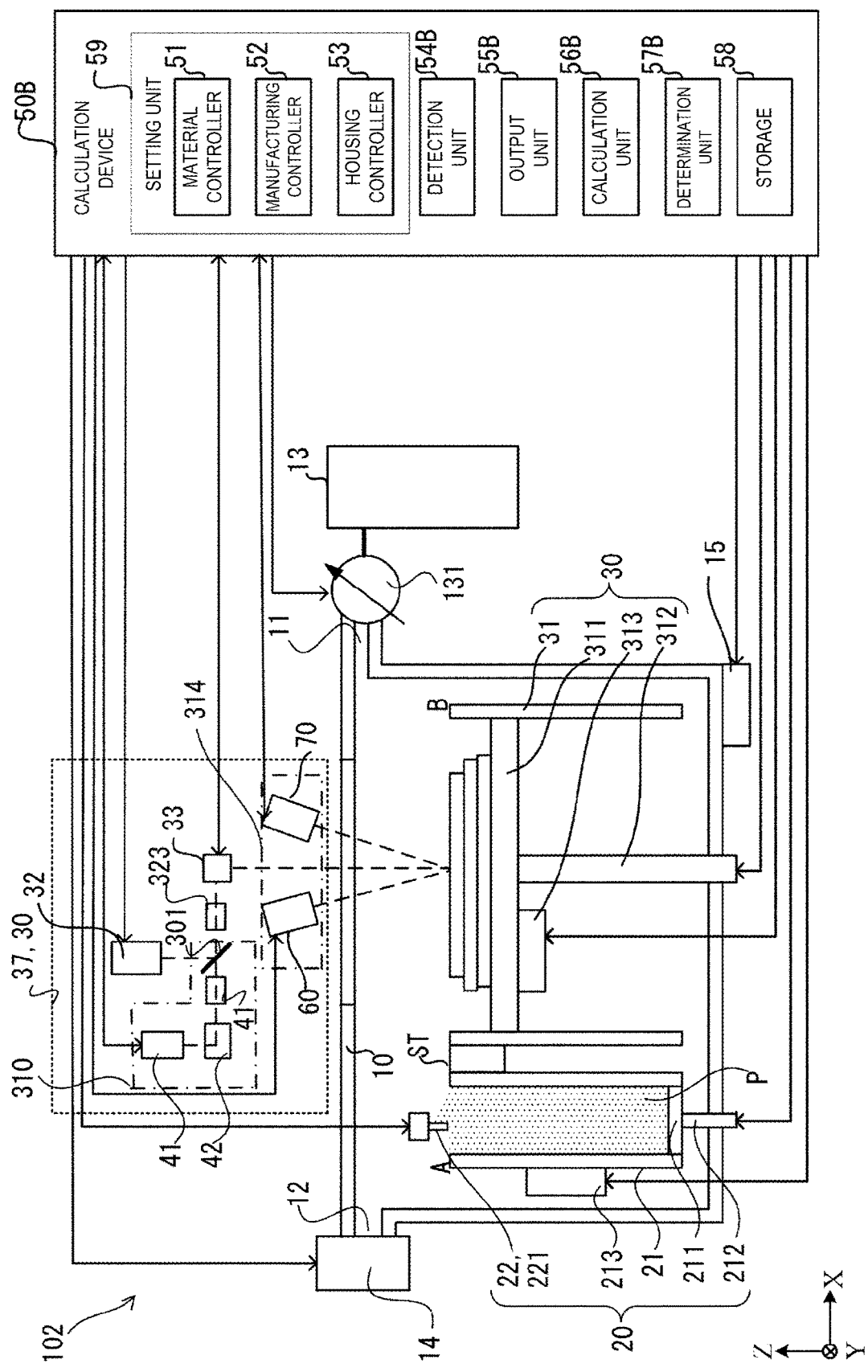
FIG. 28 is a block diagram schematically illustrating a configuration of a manufacturing apparatus according to a third embodiment.

FIG. 28 is a block diagram schematically illustrating a configuration of a main part of a manufacturing apparatus 102 according to the third embodiment. The manufacturing apparatus 101 of the third embodiment includes a manufacturing optical unit 37 that is different from the manufacturing optical unit 35 of the first embodiment illustrated in FIG. 1. The manufacturing optical unit 37 includes the manufacturing optical unit 35 of the first embodiment and the shape measurement unit 314 (the projection unit 60 and the light receiving unit 70) of the second embodiment illustrated in FIG. 19. A calculation device 50B of the third embodiment includes a detection unit 54B, an output unit 55B, a calculation unit 56B, and a determination unit 57B instead of the detection unit 54, the output unit 55, the calculation unit 56, and the determination unit 57 of the first embodiment.

Figure 29:
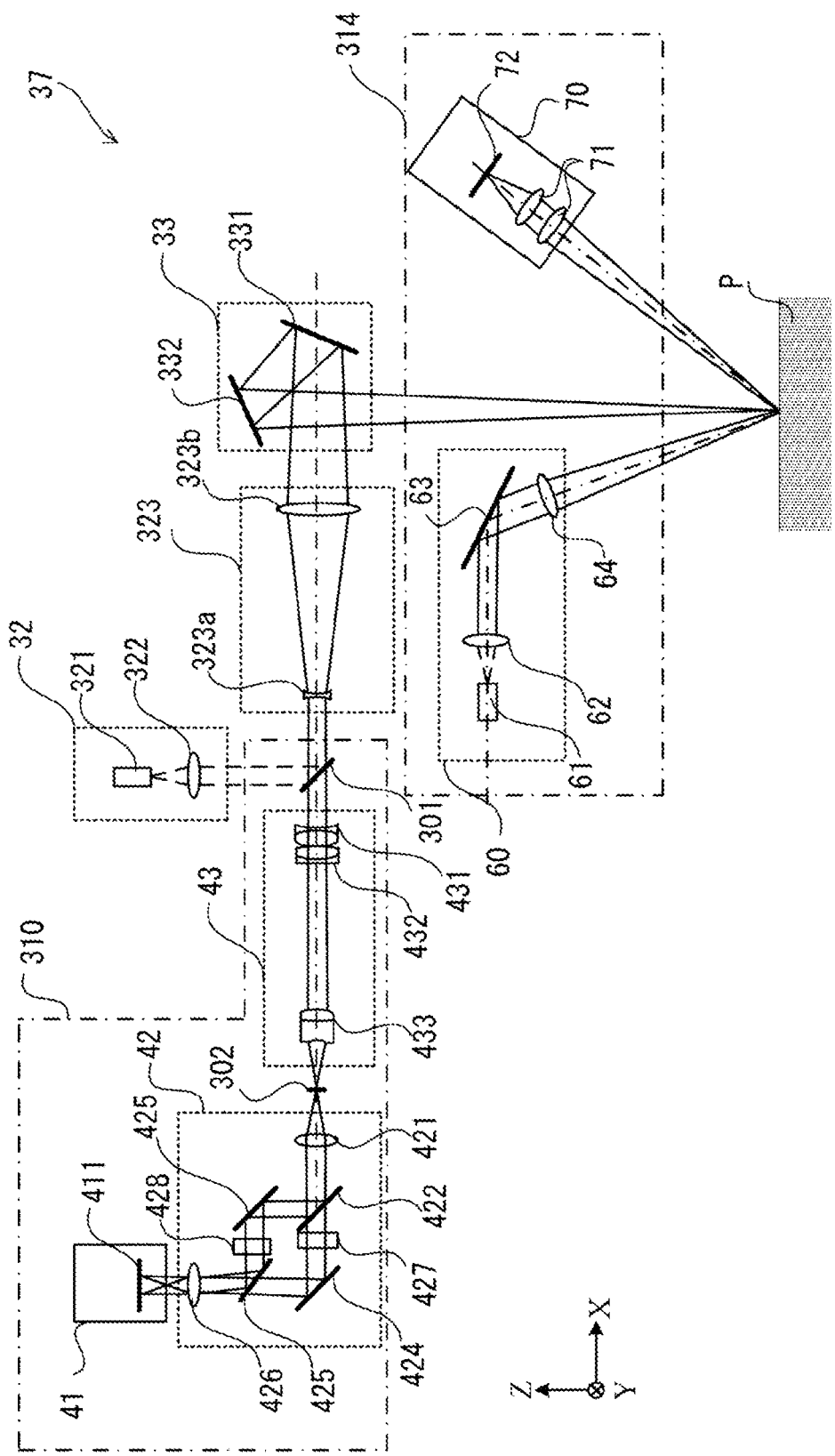
FIG. 29 is a diagram schematically illustrating an example of a specific configuration and arrangement of a manufacturing optical unit included in the manufacturing apparatus according to the third embodiment.

FIG. 29 is a diagram schematically illustrating an example of the arrangement of the manufacturing optical unit 37 of the third embodiment.

The irradiator 32, the scanning unit 33, the focus lens 323, and the acquisition unit 310 (that is, the chromatic aberration correction optical system 43, the bifurcated optical system 42, the imager 41, the half mirror 301, and the field stop 302) are arranged as in the first embodiment illustrated in FIG. 2. As in the example illustrated in FIG. 20, the shape measurement unit 314 (i.e., the projection unit 60 and the light receiving unit 70) of the second embodiment are arranged so as to enable the projection of the projected light onto the material layer and the imaging of the material layer on which the projection light is projected.

In the arrangement example illustrated in FIG. 29, the emission direction, the traveling direction, and the reflection direction of the laser beam are an example, and the emission direction, the traveling direction, and the reflection direction of the laser beam are set as appropriate in accordance with the arrangement of the components of the manufacturing optical unit 37. Furthermore, the acquisition unit 310 need not include the half mirror 301 and the field stop 302 depending on the arrangement of the components of the manufacturing optical unit 37.

Note that the manufacturing optical unit 37 can have and an arrangement that is a combination of the arrangement examples described in the first embodiment and modifications thereof and the arrangement example described in the second embodiment and the modification thereof. For example, the manufacturing optical unit 37 may have two imagers instead of the bifurcated optical system 42. Alternatively, the manufacturing optical unit 37 may have a filter capable of switching the wavelength of light transmitted instead of the bifurcated optical system 42. Still alternatively, the manufacturing optical unit 37 may include the imager 41 that includes a filter for selecting each of the wavelengths λ1 and λ2, instead of the bifurcated optical system 42. Yet still alternatively, the manufacturing optical unit 37 may include the manufacturing optical unit 35 arranged as illustrated in FIG. 3, as well as the projection unit 60 and the light receiving unit 70 illustrated in the arrangement example of FIG. 20.

Furthermore, the manufacturing optical unit 37 may include the projection unit 60 illustrated in the arrangement example of FIG. 20 and a bifurcated optical system. The bifurcated optical system in this case has, in addition to a configuration in which the bifurcated optical system 42 illustrated in the arrangement examples in FIG. 2 and FIG. 3 branches the thermal radiation light from the detection target region into light beams of two different wavelengths, a configuration of guiding the projection light reflected from the surface of the material layer to the image sensor 411. In this case, the bifurcated optical system is preferably provided with a configuration in which the light transmitted through the luminous flux combining unit 425 is guided to the image sensor 411 via a band pass filter that transmits the wavelength of the projection light. With this configuration, the projection light from the projection unit 60 can be received by the image sensor 411 of the imager 41, and thus the imager 41 can have the same function as the light receiving unit 70. Thus, the manufacturing optical unit 37 may not include the light receiving unit 70.

Furthermore, the manufacturing optical unit 37 may make the irradiator 32 illustrated in the arrangement example in FIGS. 2 and 3 function as a light projection unit for projecting the projected light, and the light receiving unit 70 illustrated in the example arrangement of FIG. 20 may receive the projection light. In this case, a low power output laser beam emitted from the irradiator 32 is used as the projection light. Alternatively, in a case where the irradiator 32 has a configuration capable of emitting the guide light to indicate the irradiation position of the laser beam for melting the material layer for example, the guide light is used as the projection light. In a case where the guide light from the irradiator 32 is used as the projection light, as described above, in addition to the configuration with which the thermal radiation light from the detection target region is split into light beams of two different wavelengths as described above, a bifurcated optical system having a configuration with which the projected light reflected from the surface of the material layer is guided to the image sensor 411 may make the guide light from the irradiator 32 received by the imager 41.

In the manufacturing apparatus 102 of the third embodiment, the detection unit 54B uses the image data output from the imager 41 to determine the state of the detection target region of the powder material P as in the first embodiment. Based on the state of the detection target region of the powder material P obtained by the detection unit 54B, the calculation unit 56B generates, as in the first embodiment and the modification (1), the change information for changing the manufacturing condition and repair information for repairing. The manufacturing apparatus 102 may change the manufacturing condition as at least one of the real time change, a change for forming the next layer, and a change for producing the next manufactured object.

In the manufacturing apparatus 102 of the third embodiment, the detection unit 54B uses image data from the light receiving unit 70 to determine the state of the material layer as in the second embodiment. Based on the state of the material layer obtained by the detection unit 54B, the calculation unit 56B generates, as in the second embodiment, the change information for changing the manufacturing condition and repair information for repairing.

Figure 30:
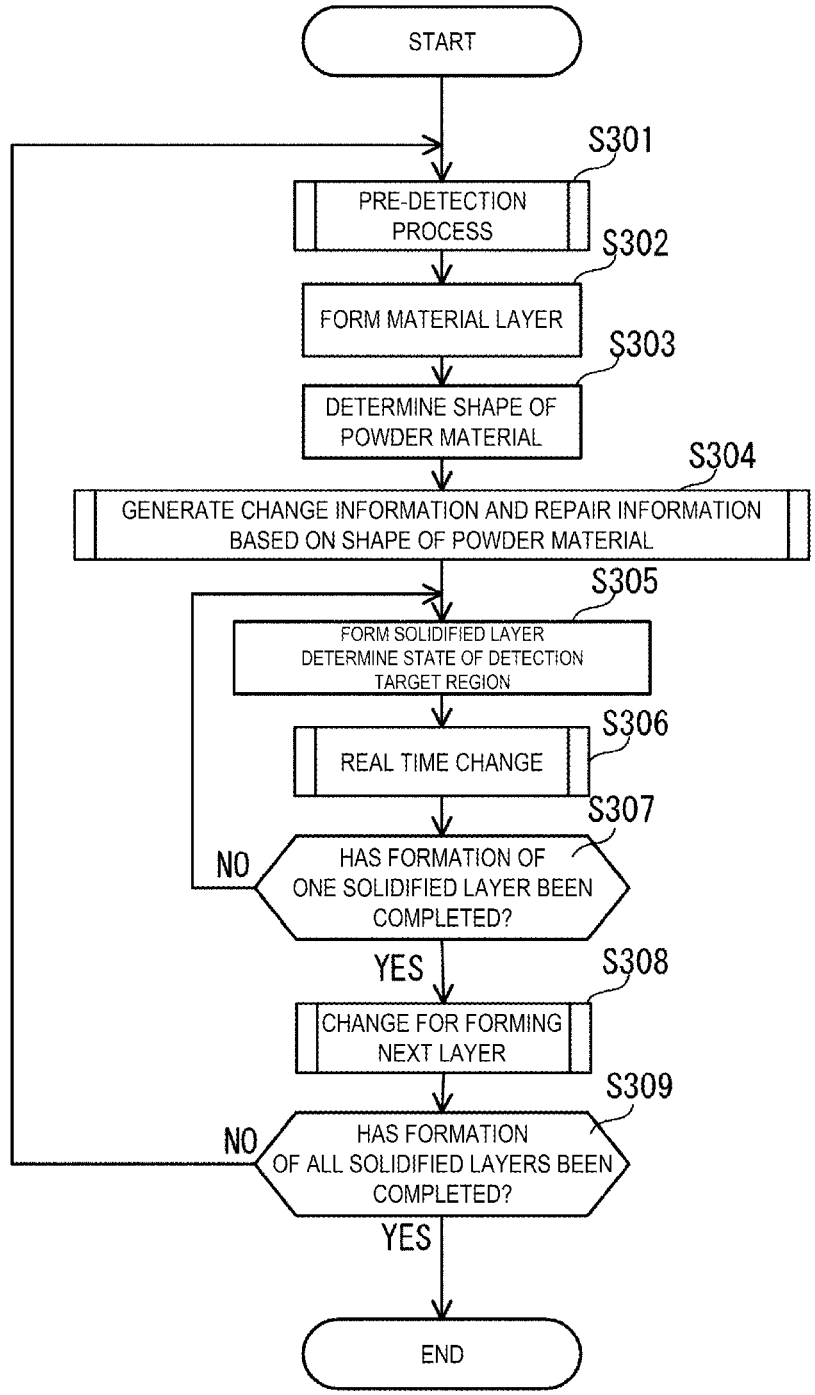
FIG. 30 is a flowchart for explaining processing executed by the manufacturing apparatus according to the third embodiment.

Processing executed by the calculation device 50B according to the second embodiment described above with reference to a flowchart illustrated in FIG. 30. Each processing illustrated in FIG. 30 is stored in a memory (not illustrated) and read and executed by the calculation device 50B.

In step S301, the calculation device 50B executes the pre-detection processing. In other words, processing in steps S241 to S243, S245, and S246 in FIG. 25 is executed. When the pre-detection processing ends, the processing proceeds to step S302. In step S302, the calculation device 50B controls the projection unit 60 to project the projection light having a sinusoidal intensity distribution onto the surface of the material layer, while changing the phase of the intensity distribution. The calculation device 50B controls the light receiving unit 70 to capture an image of a surface of the material layer on which the projection light is projected each time the phase of the intensity distribution of the projection changes, and generates a plurality of pieces of image data. The material controller 51 controls the recoater 22 to form a material layer in the manufacturing tank 31 and the processing proceeds to step S303. In step S303, the calculation device 50B controls the projection unit 60 to project the projection light having a sinusoidal intensity distribution onto the surface of the material layer, while changing the phase of the intensity distribution. The calculation device 50B controls the light receiving unit 70 to capture an image of a surface of the material layer on which the projection light is projected each time the phase of the intensity distribution of the projection changes, and generate a plurality of pieces of image data. Based on the plurality pieces of image data acquired in step S302 and the plurality of pieces of image data acquired in step S303, the detection unit 54B obtains the state of the material layer (such as flatness, layer thickness, density, and fluidity of the powder material P), and the processing proceeds to step S304.

In step S304, based on the state of the material layer obtained by the detection unit 54B, the determination unit 57B determines whether the change information needs to be generated and whether the repair information needs to be generated. When the determination unit 57B determines that the change information and the repair information need to be generated, the calculation unit 56B generates the change information for changing the manufacturing condition and the repair information for performing the repair. In other words, the determination unit 57B and the calculation unit 56B execute processing in steps S203 to S209 in FIGS. 21 and 22, and processing in steps S248 and S249 in FIG. 25, and the processing proceeds to step S305. In step S305, the manufacturing controller 52 controls the irradiator 32 and the scanning unit 33 to irradiate the material layer with the laser beam to form the solidified layer. For example, the imager 41 captures an image of the detection target region including the melt pool irradiated by laser beam and output image data at a predetermined time interval, or every time the XY plane is scanned by the scanning unit 33 using the laser beam for a predetermined distance. Each time the image data is output from the imager 41, the detection unit 54B obtains the state of the detection target region around the position on the material layer irradiated with the laser beam, and the processing proceeds to step S306.

In step S306, based on the state of the detection target region obtained by the detection unit 54B, the determination unit 57 determines whether the change information needs to be generated. When the determination unit 57B determines that the change information needs to be generated, the calculation unit 56B generates change information for the real time change. In other words, the determination unit 57B and the calculation unit 56B execute the processing in steps S33 to S36 illustrated in FIG. 10, steps S43 to S46 illustrated in FIG. 11, and steps S53 to S56 illustrated in FIG. 12, and the processing proceeds to step S307.

In step S307, the calculation device 50B determines whether formation of one solidified layer has been completed. When the formation of one solidified layer has been completed, a result of the determination by the calculation device 50B in step S307 is YES, and the processing proceeds to step S308. When the formation of one solidified layer has not been completed yet, a result of the determination by the calculation device 50B in step S307 is NO, and the processing returns to step S305. In step S308, based on the state of the material layer obtained by the detection unit 54B, the determination unit 57B determines whether the change information needs to be generated and whether the repair information needs to be generated. When the determination unit 57B determines that the change information and the repair information need to be generated, the calculation unit 56B generates the change information for a change for forming the next layer and the repair information. In other words, the determination unit 57B and the calculation unit 56B execute processing in steps S63 to S70 in FIGS. 13 and 14, and steps S83 to S90 in FIGS. 15 and 16, and the processing proceeds to step S309.

In step S309, the calculation device 50B determines whether all of the plurality of solidified layers forming the 3D manufactured object have been formed. When the formation of all the solidified layers has been completed, a result of the determination by the calculation device 50B in step S309 is YES, and the entire processing is terminated. When the formation of all the solidified layers has not been completed yet, a result of the determination by the calculation device 50B in step S309 is NO, and the processing returns to step S301.

Note that, after the processing in step S309, the calculation device 50B may execute processing a change for producing the next manufactured object. In this case, based on the state of the detection target region and the state of the material layer obtained by the detection unit 54B from the start to the end of the production, the determination unit 57B determines whether to change the manufacturing conditions for producing the next 3D manufactured object. In this case, the determination unit 57B determines whether the state of the detection target region or the state of the material layer falls within the corresponding predetermined reference range as in step S34 in FIG. 10, step S44 in FIG. 11, step S54 in FIG. 12, step S65 in FIG. 13, step S85 in FIG. 15, step S205 in FIG. 21, step S228 in FIG. 23, and step S248 in FIG. 25. When the determination unit 57B determines that the manufacturing condition needs to be changed, the calculation unit 56B generates the change information for changing the manufacturing condition based on a difference between the state of the detection target region or the state of the material layer obtained and any value within the reference range (for example, a median value). When the determination unit 57B determines that the manufacturing condition needs not to be changed, the above-described post-processing is executed on the 3D manufactured object produced.

The determination unit 57B may determine whether the state falls within the corresponding reference range, as in step S64 in FIG. 13, steps S68 to S70 in FIG. 14, step S84 in FIG. 15, steps S88 to S90 in FIG. 16, step S204 in FIG. 21, steps S208 to 210 in FIG. 22, and the like. When the determination unit 57B determines that the 3D manufactured object produced needs to be modified, the calculation unit 56B generates modification information for modifying the produced 3D manufactured object. When the determination unit 57B determines that the 3D manufactured object produced needs no modification, the calculation device 50B cancels the production of the 3D manufactured object thereafter.

Through the processing described above, as in the first embodiment and the second embodiment, the solidified layer can be formed with the basic condition in Formulae (1) to (3) for melting and solidifying satisfied, as in the first embodiment and the second embodiment, whereby occurrence of manufacturing defects or the like in the 3D manufactured object can be suppressed.

Note that in the third embodiment described above, an example is given in which in the calculation device 50B of the manufacturing apparatus 102, the detection unit 54B obtains the state of the detection target region and the state of the material layer, the calculation unit 56B generates change information, and the output unit 55B outputs the change information to the setting unit 59 as the state information. However, the calculation device 50B is not limited to such an example, and may have a configuration illustrated in FIG. 31. In other words, the calculation device 50B includes the detection unit 54B, the output unit 55B, and a setting unit 69B. The setting unit 69B includes the material controller 51, the manufacturing controller 52, the housing controller 53, the calculation unit 56B, the determination unit 57B, and the storage 58 in the third embodiment. In this case, the detection unit 54B uses image data output from the imager 41 as in the first embodiment to obtain the state of the detection target region, and uses the image data output from the light receiving unit 70 as in the second embodiment to obtain the state of the material layer. The output unit 55B directly uses the information on the state of the detection target region obtained by the detection unit 54B as the state information, and outputs the information to the setting unit 69B. The output unit 55B directly uses the information on the material layer obtained by the detection unit 54B as the information on the state of the material layer, and outputs the information to the setting unit 69B. The calculation unit 56B and the determination unit 57B of the setting unit 69B generate change information for changing the manufacturing conditions as in Modification (1) of the first embodiment and the second embodiment. At least one of the material controller 51, the manufacturing controller 52, and the housing controller 53 of the setting unit 69B controls the operation of a corresponding one of the components of the manufacturing apparatus 102 as in Modification (1) of the first embodiment and the second embodiment based on the change information generated.

Figure 31:
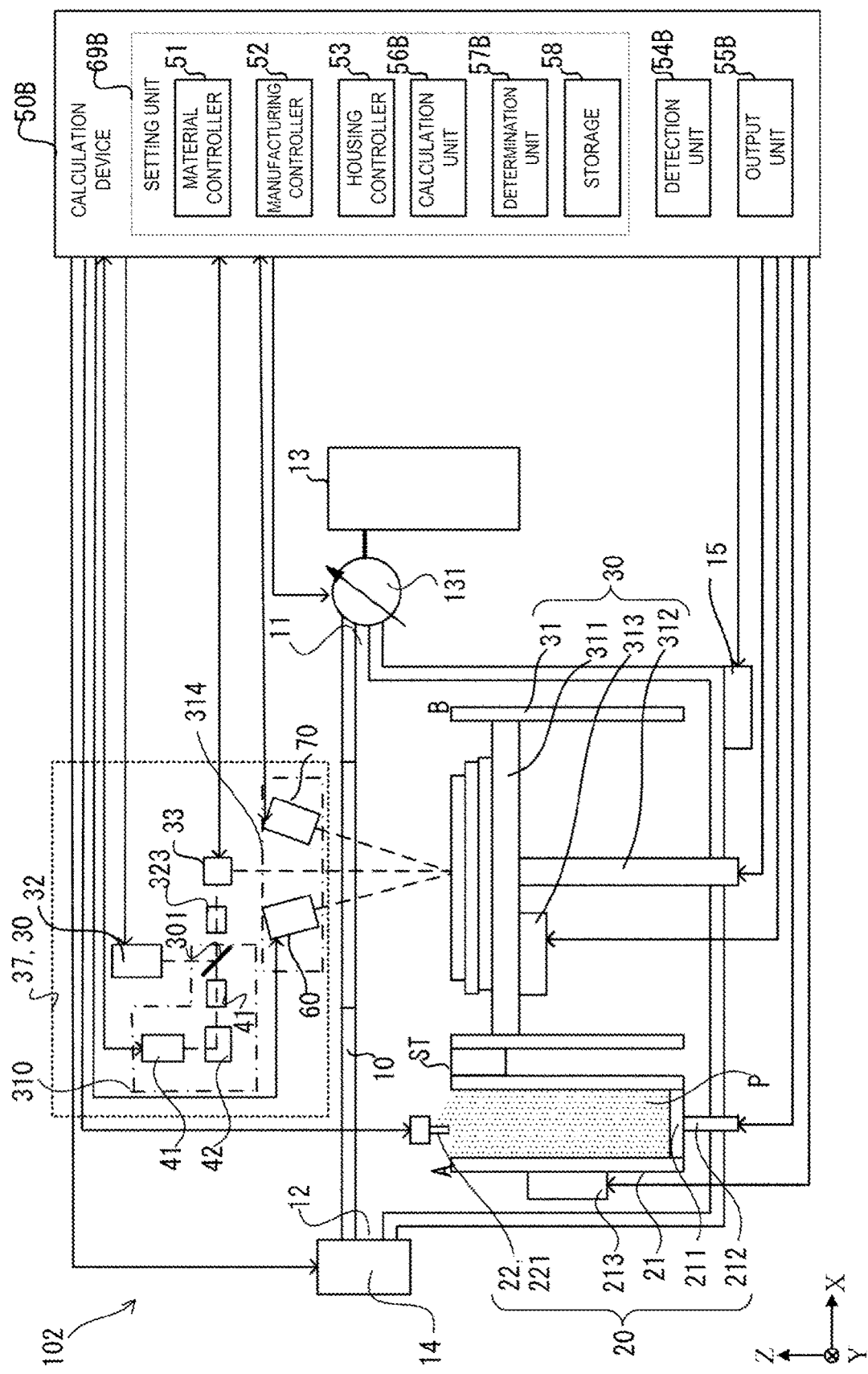
FIG. 31 is a block diagram schematically illustrating a configuration of a main part of a manufacturing apparatus according to a modification of the third embodiment.

Note that components of the calculation device 50B of the third embodiment other than the setting unit 59 illustrated in FIG. 28 and components of the calculation device 50B in the modification other than the setting unit 69B illustrated in FIG. 31 may be included in an external calculation device different from the manufacturing apparatus 102.

Based on a part of the components of the manufacturing apparatus 102 described in the third embodiment, a detection system may be formed that acquires information on the detection target region and image data on at least a partial region of the material layer on which the projection light is projected, to obtain the state of the detection target region and the state of the material layer.

FIG. 32(a) schematically illustrates an overview of a configuration of a main part of the manufacturing apparatus 1 and a detection system 500B in this case. The manufacturing apparatus 1 includes: the acquisition unit 310 and the shape measurement unit 314 of the manufacturing optical unit 37 of the third embodiment described with reference to FIG. 28; the detection system 500B including the detection unit 54B, the output unit 55B, the calculation unit 56B, the determination unit 57B, and the storage 58 of the calculation device 50B of the third embodiment in FIG. 28; the housing 10; the material layer forming unit 20; the components of the manufacturing unit 30 other than the acquisition unit 310 and the shape measurement unit 314; and the setting unit 59 of the calculation device 50B in FIG. 28.

The acquisition unit 310 acquires information on the detection target region of the material layer in a manner similar to that described with reference to FIG. 18(a). The information on the detection target region is image data generated in the same manner as described in the first embodiment, based on the thermal radiation light from the detection target region of the material layer by the imager 41 included in the acquisition unit 310. That is, the image data includes image data generated based on each of the light of the different wavelengths (wavelengths λ1 and λ2) of the thermal radiation light from the detection target region. Note that also in this case, a thermometer, a high-speed camera, or the like may be used as the acquisition unit 310. In the case where the acquisition unit 310 is a thermometer, the information on the detection target region is the temperature of the detection target region obtained by the thermometer. In the case where the acquisition unit 310 is a high-speed camera, the information on the detection target region is data on the color image of the detection target region acquired by the high-speed camera. The detection unit 54B of the calculation device 50B obtains the state of the detection target region as in the first embodiment and modifications thereof, using the information on the detection target region acquired by the acquisition unit 310.

The shape measurement unit 314 projects projection light having a sinusoidal intensity distribution onto the material layer, and acquires image data of at least a partial region of the material layer on which the projection light is projected, in a manner similar to that illustrated with reference to FIG. 27(a). Note that when the state of the material layer is determined using, for example, a stereo camera method or the like, the shape measurement unit 314 may not include the projection unit 60.

The calculation unit 56B and the determination unit 57B generate change information for changing the manufacturing conditions as in Modification (1) of the first embodiment and the second embodiment. The generated change information is output from the detection system 500B to the setting unit 59 as the state information or/and the state information on the material layer by the output unit 55B. At least one of the material controller 51, the manufacturing controller 52, and the housing controller 53 of the setting unit 59 controls the operation of a corresponding one of the components of the manufacturing apparatus 102 as in Modification (1) of the first embodiment and the second embodiment based on the change information generated. Note that as illustrated in FIG. 32(a), for convenience of explanation, the detection unit 54B, the output unit 55B, the calculation unit 56B, the determination unit 57B, and the storage 58 of the detection system 500B and the setting unit 59 are collectively provided in one calculation device. However, the detection unit 54B, the output unit 55B, the calculation unit 56B, the determination unit 57B, and the storage 58 of the detection system 500B and the setting unit 59 may be provided in different calculation devices.

Note that as illustrated in FIG. 32(b), a detection system 501B may include the acquisition unit 310 and the shape measurement unit 314 of the manufacturing optical unit 37 illustrated in FIG. 31, and the detection unit 54B and the output unit 55B of the calculation device 50B of the third embodiment. In this case, the manufacturing apparatus 102 includes the detection system 501B, the setting unit 69B of the calculation device 50B illustrated in FIG. 31, the housing 10, the material layer forming unit 20, and components of the manufacturing unit 30 other than the acquisition unit 310 and the shape measurement unit 314.

The acquisition unit 310 acquires information on the detection target region in a manner that is similar to that in FIG. 32(a). The shape measurement unit 314 acquires image data on at least a partial region of the material layer as in the case described with reference to FIG. 32(a). Using the information on the detection target region, the detection unit 54B obtains the state of the detection target region as in the first embodiment and modifications thereof, using the image data from the acquisition unit 310. The detection unit 54B obtains the state of the material layer using image data from the shape measurement unit 314 as in the second embodiment. The output unit 55B directly uses the information on the state of the detection target region obtained by the detection unit 54B as the state information, and outputs the information to the setting unit 69B. The output unit 55B directly uses the information on the material layer obtained by the detection unit 54B as the state information on the material layer, and outputs the information to the setting unit 69B as the state information on the material layer. The calculation unit 56B and the determination unit 57B of the setting unit 69B generate change information for changing the manufacturing conditions as the modification of the first embodiment and the second embodiment. At least one of the material controller 51, the manufacturing controller 52, and the housing controller 53 of the setting unit 69B controls the operation of a corresponding one of the components of the manufacturing apparatus 102 as in the modification of the first embodiment and the second embodiment based on the change information generated. Note that as illustrated in FIG. 32(b), for convenience of explanation, the detection unit 54B and the output unit 55B of the detection system 501B and the setting unit 69B are collectively provided in one calculation device. However, the detection unit 54B and the output unit 55B of the detection system 501B and the setting unit 69B may be provided in different calculation devices.

Furthermore, the calculation unit 56B may be a unit that generates the change information only, instead of being a unit that generates the change information and modification information. Furthermore, the calculation unit 56B may generate change information for at least one of manufacturing conditions including: a condition of the laser beam; a scanning condition; a condition associated with an atmosphere inside the housing 10; a material layer forming condition; a supporting unit condition; design data; and a condition associated with the powder material P.

The manufacturing apparatus 102 may change the manufacturing condition as at least one of the real time change, a change for forming the next layer, and a change for producing the next manufactured object.

According to the third embodiment described above, similar actions and effects are obtained to the actions and effects obtained by the first and the second embodiments.

A program to be executed by the calculation devices 50, 50A, 50B described in the above-described first embodiment and modifications thereof, second embodiment and modifications thereof, and third embodiment and modifications thereof may be recorded on a computer-readable recording medium, and the program may be read into a computer system to perform the above-described processing. Note that a computer system referred to here may include an operating system (OS) and hardware such as a peripheral device.

In addition, the computer system includes a homepage provision environment (or a display environment) that uses a WWW system. In addition, the computer-readable recording medium refers to a writable non-volatile memory such as a flexible disk, a magneto-optical disk, a ROM, or a flash memory, a portable recording medium such as a CD-ROM, or a storage device such as a hard disk built into the computer system. Furthermore, the computer-readable recording medium also includes a medium holding a program for a certain period of time, such as a volatile memory (a dynamic random access memory (DRAM), for example) built into a computer system serving as a server or a client when the program is transmitted over a network such as the Internet or a communication line such as a telephone line.

In addition, the above-described program may be transmitted from the computer system in which the program is stored in a storage device or the like, to another computer system, via a transmission medium or by a transmission wave in the transmission medium. Here, the "transmission medium" via which the program is transmitted refers to a medium having a function to transmit information, such as the Internet or another network (communication network), and a communication line such as a telephone line. In addition, the above-described program may be a program for executing a portion of the above-described functions. Further, the above-described program may be a so-called differential file (differential program) that can execute the above-described functions by a combination with a program having already been recorded in the computer system.

The present disclosure is not limited to the embodiments described above, and various modifications may be made without departing from the spirit of the present disclosure. Other embodiments that embody the technical concepts of the present disclosure are also included within the scope of the present disclosure.

The invention claimed is:

1. A calculation device used in a manufacturing apparatus configured to produce a 3D manufactured object from a solidified layer formed by heating a layer-shaped unmelted material layer formed of a powder material by irradiation with an energy beam, the calculation device comprising:
   a detection unit configured to obtain a state of the material layer based on a shape of the formed material layer; and
   an output unit configured to output information on the state of the material layer obtained by the detection unit to set a manufacturing condition of the manufacturing apparatus,
   wherein the manufacturing condition includes at least one of:
   a condition of the energy beam with which the unmelted material layer is irradiated to melt the unmelted material layer;
   a scanning condition for the energy beam scanning to melt the unmelted material layer;
   a condition associated with an atmosphere inside a housing in which at least a part of the unmelted material layer is melted by irradiation with the energy beam;
   a supporting unit condition associated with a supporting unit that supports the unmelted material layer and the solidified layer; and
   design data associated with a shape of the solidified layer or the 3D manufactured object,
   wherein the condition of the energy beam includes at least one condition out of:
   an oscillation mode of the energy beam;
   a wavelength of the energy beam;
   a polarization state of the energy beam; and
   an intensity distribution of the energy beam, and
   wherein the scanning condition includes at least one condition out of:
   a scanning pitch of the energy beam, and
   a scanning pass of the energy beam.

2. The calculation device according to claim 1, wherein the manufacturing condition includes the scanning condition for the energy beam scanning to melt the unmelted material layer; and
   at least one of the following conditions:
   the condition of the energy beam with which the unmelted material layer is irradiated to melt the unmelted material layer;
   the condition associated with an atmosphere inside a housing in which at least a part of the unmelted material layer is melted by irradiation with the energy beam;

a material layer forming condition for forming the unmelted material layer;

the supporting unit condition associated with a supporting unit that supports the unmelted material layer and the solidified layer; and the design data associated with a shape of the solidified layer or the 3D manufactured object, and a condition associated with the powder material.

3. The calculation device according to claim 1, wherein the state of the material layer includes at least one of the flatness, density, and layer thickness of the material layer.

4. The calculation device according to claim 1, further comprising a calculation unit configured to generate change information for changing the manufacturing condition used for producing the 3D manufactured object, based on the state of the material layer obtained by the detection unit, wherein the output unit is configured to output the generated change information as the information on the state of the material layer.

5. The calculation device according to claim 4, wherein the calculation unit generates the change information for changing the manufacturing condition for the powder material to be newly supplied to an upper part of the solidified layer or the powder material newly supplied to an upper part of the solidified layer.

6. The calculation device according to claim 4, wherein the calculation unit generates the change information for changing the manufacturing condition for a newly produced 3D manufactured object after production of the 3D manufactured object is completed.

7. The calculation device according to claim 4, wherein the calculation unit is configured to generate the change information with the condition of the energy beam, with which the material layer is irradiated to heat the material layer, serving as the manufacturing condition.

8. The calculation device according to claim 7, wherein the condition of the energy beam includes at least one condition out of an output of the energy beam, the oscillation mode of the energy beam, the wavelength of the energy beam, the polarization state of the energy beam, an intensity distribution of the energy beam, and a spot size of the energy beam, with which the material layer is irradiated.

9. The calculation device according to claim 7, wherein the calculation unit is configured to generate the change information with the scanning condition for the energy beam scanning to heat the material layer, serving as the manufacturing condition.

10. The calculation device according to claim 4, wherein the calculation unit is configured to generate the change information with the condition associated with the atmosphere inside the housing that houses the solidified layer, serving as the manufacturing condition.

11. The calculation device according to claim 10, wherein the condition associated with the atmosphere inside the housing includes at least one condition out of a type of inert gas introduced into the housing, a flow volume of the inert gas introduced into the housing, a flowrate of the inert gas introduced into the housing, an oxygen concentration within the housing, a pressure within the housing, and a temperature within the housing.

12. The calculation device according to claim 4, wherein the calculation unit is configured to generate the change information with a material layer forming condition for forming the material layer, serving as the manufacturing condition.

13. The calculation device according to claim 12, wherein the material layer forming condition includes at least one condition out of: a moving speed of a material layer forming member used for forming the material layer; a pressure applied from the material layer forming member to the powder material; a standby time to start forming a new material layer on an upper part of the solidified layer; a shape of the material layer forming member; a material of the material layer forming member; and a layer thickness of the material layer.

14. The calculation device according to claim 4, wherein the calculation unit is configured to generate the change information with a supporting unit condition associated with a supporting unit that supports the material layer and the solidified layer, serving as the manufacturing condition.

15. The calculation device according to claim 14, wherein the supporting unit condition includes at least one condition out of a temperature of the supporting unit and a type of the supporting unit.

16. The calculation device according to claim 4, wherein the calculation unit is configured to generate the change information with design data associated with a shape of the solidified layer or the 3D manufactured object, serving as the manufacturing condition.

17. The calculation device according to claim 16, wherein the design data associated with the shape includes at least one data out of shape data on the solidified layer to be formed, manufacturing orientation data, shape data on a support portion that supports the solidified layer or the 3D manufactured object, and shape data on the 3D manufactured object.

18. The calculation device according to claim 4, wherein the calculation unit is configured to generate the change information with a condition associated with the powder material, serving as the manufacturing condition.

19. The calculation device according to claim 18, wherein the condition associated with the powder material includes at least one condition out of a particle size distribution of the powder material, a hygroscopicity of the powder material, an oxygen concentration of the powder material, and a material of the powder material.

20. The calculation device according to claim 4, further comprising a determination unit configured to determine whether the formed material layer is to be repaired, based on the state of the material layer obtained by the detection unit.

21. The calculation device according to claim 4, further comprising a determination unit configured to determine whether the powder material is to be repaired, based on the state of the material layer based on fluidity of the powder material obtained by the detection unit.

22. The calculation device according to claim 4, further comprising a determination unit configured to determine whether to generate the change information for producing the 3D manufactured object, based on the state of the material layer obtained by the detection unit.

23. The calculation device according to claim 20, wherein the determination unit is configured to determine that the change information needs to be generated when the state of the material layer obtained by the detection unit satisfies a first reference value, and the determination unit is configured to determine that the material layer needs to be repaired when the state of the material layer obtained by the detection unit does not satisfy the first reference value.

24. The calculation device according to claim 23, wherein the determination unit is configured to determine that the material layer needs to be repaired when the state of the material layer obtained by the detection unit satisfies a second reference value, and the determination unit is configured to determine that production of the 3D manufactured object needs to be canceled in a case that the state of the material layer obtained by the detection unit does not satisfy the second reference value.

25. The calculation device according to claim 22, wherein when the determination unit is configured to determine that the material layer needs to be repaired, the calculation unit is configured to generate repair information for removing the formed material layer and forming a new material layer.

26. The calculation device according to claim 21, wherein in a case that the determination unit determines that the powder material layer needs to be repaired, based on the fluidity of the powder material obtained by the detection unit, the calculation unit is configured to generate repair information for applying thermal treatment to the powder material for repair.

27. A detection system comprising:
the calculation device according to claim 1; and
an image acquiring unit configured to acquire image data of the material layer, wherein
the detection unit in the calculation device is configured to obtain a shape of the material layer based on the image data acquired by the image acquiring unit and obtains a state of the material layer based on the shape.

28. The detection system according to claim 27, further comprising a light projection unit configured to project light having a predetermined intensity distribution onto the material layer, wherein the image acquiring unit is configured to acquire image data of at least a part of a region onto which the light is projected in the material layer, and
the detection unit in the calculation device is configured to obtain the shape of the material layer based on the image data acquired by the image acquiring unit and obtain the state of the material layer based on the shape.

29. A manufacturing apparatus comprising:
the calculation device according to claim 1;
a setting unit configured to set the manufacturing condition of the manufacturing apparatus, based on the information on the state of the material layer output from the output unit in the calculation device; and
a manufacturing unit configured to produce the 3D manufactured object by layering the solidified layers formed by heating the material layer formed of the powder material, based on the manufacturing condition.

30. A manufacturing apparatus comprising:
the detection system according to claim 27;
a setting unit configured to set the manufacturing condition of the manufacturing apparatus, based on the information on the state of the material layer output from the output unit in the calculation device in the detection system; and
a manufacturing unit configured to produce the 3D manufactured object by layering the solidified layers formed by heating the material layer formed of the powder material, based on the manufacturing condition.

* * * * *